US012578787B2

(12) United States Patent
Kim et al.

(10) Patent No.: US 12,578,787 B2
(45) Date of Patent: Mar. 17, 2026

(54) GAZE DETERMINATION USING ONE OR MORE NEURAL NETWORKS

(71) Applicant: Nvidia Corporation, Santa Clara, CA (US)

(72) Inventors: Joohwan Kim, San Jose, CA (US); Josef Spjut, Durham, NC (US); Iuri Frosio, San Jose, CA (US); Orazio Gallo, Santa Cruz, CA (US); Ekta Prashnani, Goleta, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/841,447

(22) Filed: Apr. 6, 2020

(65) Prior Publication Data

US 2025/0216934 A1      Jul. 3, 2025

(51) Int. Cl.
| *G06F 3/01* | (2006.01) |
| *G06F 18/21* | (2023.01) |
| *G06N 3/04* | (2023.01) |
| *G06N 3/08* | (2023.01) |
| *G06V 20/40* | (2022.01) |

(52) U.S. Cl.
CPC .............. *G06F 3/013* (2013.01); *G06F 18/21* (2023.01); *G06N 3/04* (2013.01); *G06N 3/08* (2013.01); *G06V 20/46* (2022.01)

(58) Field of Classification Search
CPC ....... G06F 3/013; G06F 18/21; G06K 9/6217; G06K 9/6274; G06K 9/6223; G06N 3/04; G06N 3/08; G06V 20/46
See application file for complete search history.

(56) References Cited

U.S. PATENT DOCUMENTS

| | | | |
|---|---|---|---|
| 8,073,287 B1 | 12/2011 | Wechsler et al. | |
| 9,747,812 B2 * | 8/2017 | Misu ................... | G09B 19/167 |
| 2011/0202340 A1 | 8/2011 | Ariyaeeinia et al. | |
| 2014/0292751 A1 | 10/2014 | Azar | |
| 2015/0194128 A1 | 7/2015 | Hicok | |
| 2015/0339589 A1 | 11/2015 | Fisher | |
| 2016/0117947 A1 * | 4/2016 | Misu ................... | B60W 50/085 |
| | | | 434/62 |
| 2017/0169658 A1 * | 6/2017 | Froy ................... | G07F 17/3206 |
| 2017/0263046 A1 | 9/2017 | Patney et al. | |
| 2017/0308770 A1 | 10/2017 | Jetley | |
| 2017/0357866 A1 * | 12/2017 | Welland ................... | B60R 1/00 |

(Continued)

FOREIGN PATENT DOCUMENTS

| | | |
|---|---|---|
| CN | 109313490 A | 2/2019 |
| WO | 2019147677 A1 | 8/2019 |

OTHER PUBLICATIONS

Sajad Mousavi et al., "Learning to Predict Where to Look in Interactive Environments Using Deep Recurrent Qlearning", arXiv:1612.05753v2 [cs.CV] Feb. 18, 2017.*

(Continued)

*Primary Examiner* — Samir A Ahmed

(74) *Attorney, Agent, or Firm* — Davis Wright Tremaine LLP

(57)      ABSTRACT

Apparatuses, systems, and techniques are presented to predict gaze of an observer. In at least one embodiment, a network is trained to predict a gaze of one or more users based, at least in part, on one or more gazes corresponding to objects not always visible to the one or more users.

39 Claims, 52 Drawing Sheets

(56) References Cited

U.S. PATENT DOCUMENTS

| | | | | |
|---|---|---|---|---|
| 2017/0364150 | A1* | 12/2017 | Lovtjärn | G06F 3/017 |
| 2017/0372487 | A1* | 12/2017 | Lagun | G06T 7/33 |
| 2018/0164880 | A1 | 6/2018 | Kim et al. | |
| 2018/0181809 | A1 | 6/2018 | Ranjan et al. | |
| 2018/0229372 | A1 | 8/2018 | Breazeal et al. | |
| 2018/0249213 | A1 | 8/2018 | Bostick et al. | |
| 2019/0073562 | A1 | 3/2019 | Stolikj et al. | |
| 2019/0080474 | A1 | 3/2019 | Lagun et al. | |
| 2019/0178988 | A1 | 6/2019 | England | |
| 2019/0228215 | A1 | 7/2019 | Najafirad et al. | |
| 2019/0251707 | A1* | 8/2019 | Gupta | G06T 9/002 |
| 2019/0265712 | A1 | 8/2019 | Satzoda | |
| 2019/0302883 | A1 | 10/2019 | Greer et al. | |
| 2019/0313010 | A1 | 10/2019 | Vounckx et al. | |
| 2019/0392830 | A1 | 12/2019 | Abdollahian | |
| 2020/0097754 | A1 | 3/2020 | Tawari et al. | |
| 2020/0110572 | A1 | 4/2020 | Lenke et al. | |
| 2020/0234124 | A1 | 7/2020 | Park | |
| 2020/0342303 | A1* | 10/2020 | Stent | B60W 30/0956 |
| 2020/0348755 | A1* | 11/2020 | Gebauer | G06V 10/82 |
| 2020/0394116 | A1* | 12/2020 | Hammitt | G06F 11/3041 |
| 2021/0056306 | A1 | 2/2021 | Hu et al. | |
| 2021/0064127 | A1 | 3/2021 | Park et al. | |
| 2021/0098112 | A1 | 4/2021 | Gagnon | |
| 2021/0158779 | A1* | 5/2021 | Singh | G06F 3/013 |
| 2021/0166271 | A1 | 6/2021 | Seok et al. | |
| 2021/0264476 | A1 | 8/2021 | Kawakami et al. | |
| 2021/0297635 | A1 | 9/2021 | Horiuchi et al. | |
| 2021/0374402 | A1 | 12/2021 | Kim et al. | |
| 2021/0392278 | A1 | 12/2021 | Zhang et al. | |
| 2022/0005072 | A1 | 1/2022 | Chhipa et al. | |

OTHER PUBLICATIONS

Jixu Chen, et al., "A Probabilistic Approach to Online Eye Gaze Tracking Without Explicit Personal Calibration", IEEE Transactions on Image Processing, vol. 24, No. 3, Mar. 2015.*

Extended European Search Report issued in EP Application No. 20203079.7 dated Mar. 11, 2021.

Jha Sumit et al: "Probabilistic Estimation of the Gaze Region of the Driver using Dense Classification", 2018 21st International Conference on.

Zhang Mengmi et al: "Anticipating Where People will Look Using Adversarial Networks", IEEE Transactions on Pattern Analysis and Machine Intelligence, IEEE Computer Society, USA, vol. 41, No. 8, Aug. 1, 2019 (Aug. 1, 2019), pp. 1783-1796, XP011732596, ISSN: 0162-8828, DOI: 10.1109/TPAMI.2018.2871688 [retrieved on Jun. 28, 2019-] * the whole document*.

IEEE "IEEE Standard for Floating-Point Arithmetic", Microprocessor Standards Committee of the IEEE Computer Society, IEEE Std 754-2008, dated Jun. 12, 2008, 70 pages.

Jha et al., "Probabilistic Estimation of the Gaze Region of the Driver using Dense Classification," International Conference on Intelligent Transportation Systems, Nov. 4, 2018, 6 pages.

Office Action for European Application No. 20203079.7, mailed Apr. 6, 2023, 6 pages.

Office Action for Chinese Application No. 202011205600.3, mailed Aug. 31, 2023, 22 pages.

Office Action for Chinese Application No. 202011205600.3, mailed Jul. 24, 2024, 18 pages.

Office Action for Chinese Application No. 202011205600.3, mailed Mar. 15, 2024, 18 pages.

Decision of Rejection for Chinese Application No. 202011205600.3, mailed Nov. 5, 2024, 9 pages.

* cited by examiner

200

240

242

280

280

300

400

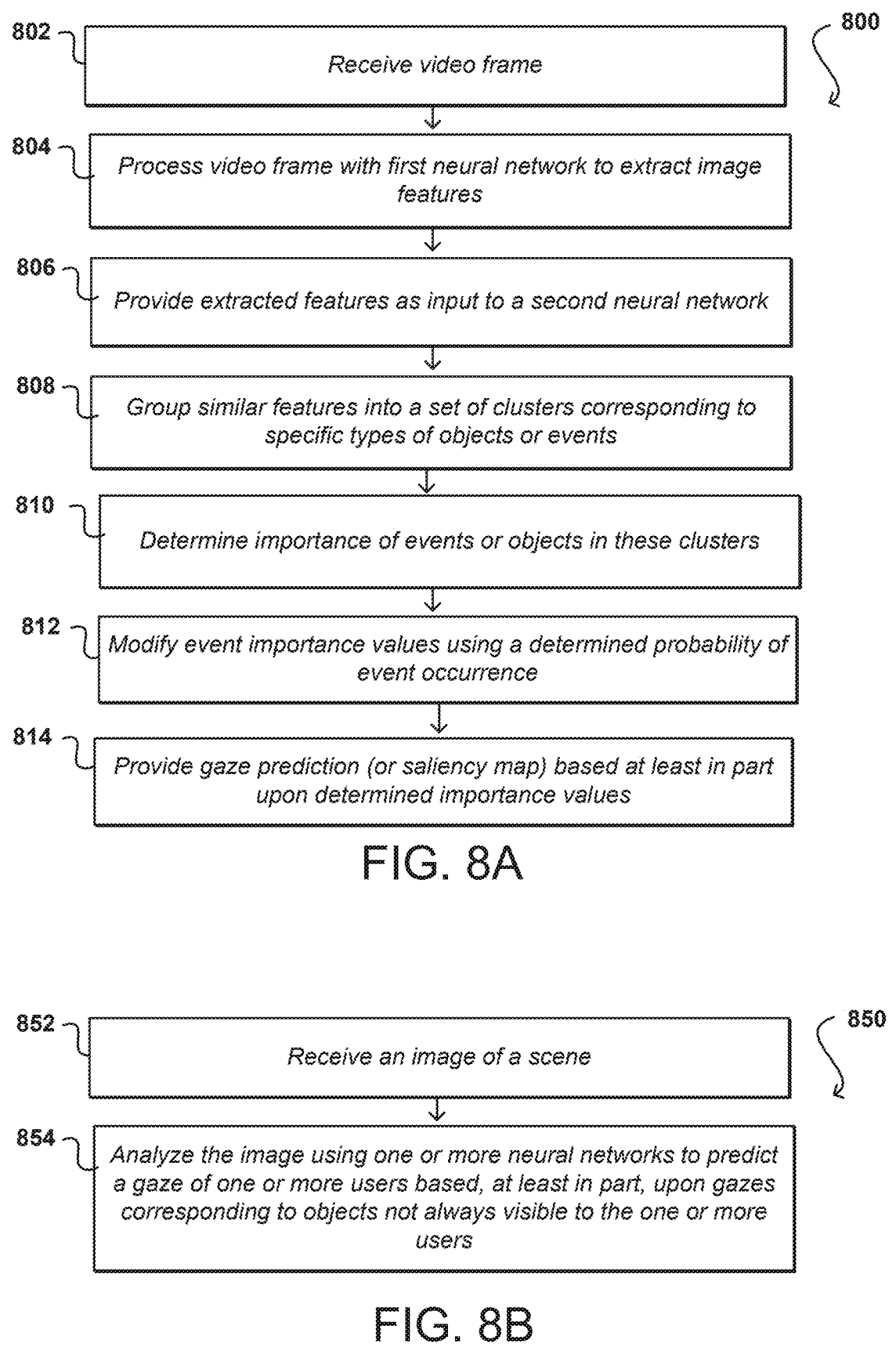

802 — | Receive video frame | ⌐ 800

804 — | Process video frame with first neural network to extract image features |

806 — | Provide extracted features as input to a second neural network |

808 — | Group similar features into a set of clusters corresponding to specific types of objects or events |

810 — | Determine importance of events or objects in these clusters |

812 — | Modify event importance values using a determined probability of event occurrence |

814 — | Provide gaze prediction (or saliency map) based at least in part upon determined importance values |

FIG. 8A

852 — | Receive an image of a scene | ⌐ 850

854 — | Analyze the image using one or more neural networks to predict a gaze of one or more users based, at least in part, upon gazes corresponding to objects not always visible to the one or more users |

FIG. 8B

DATA CENTER
1100

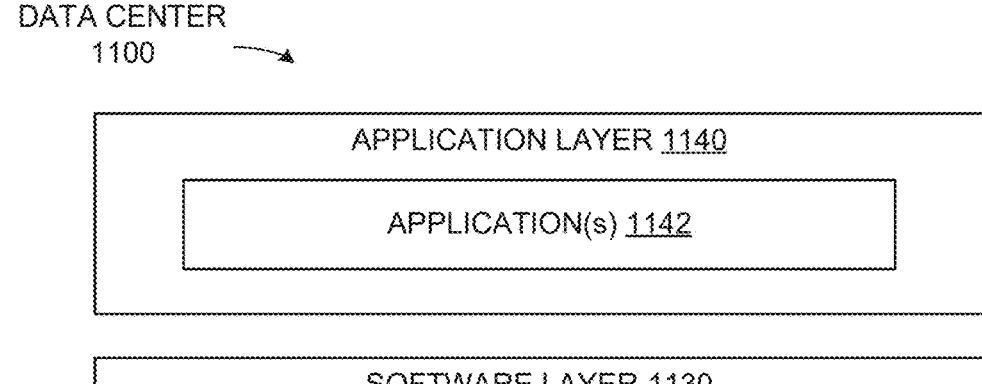

APPLICATION LAYER <u>1140</u>

APPLICATION(s) <u>1142</u>

SOFTWARE LAYER <u>1130</u>

SOFTWARE <u>1132</u>

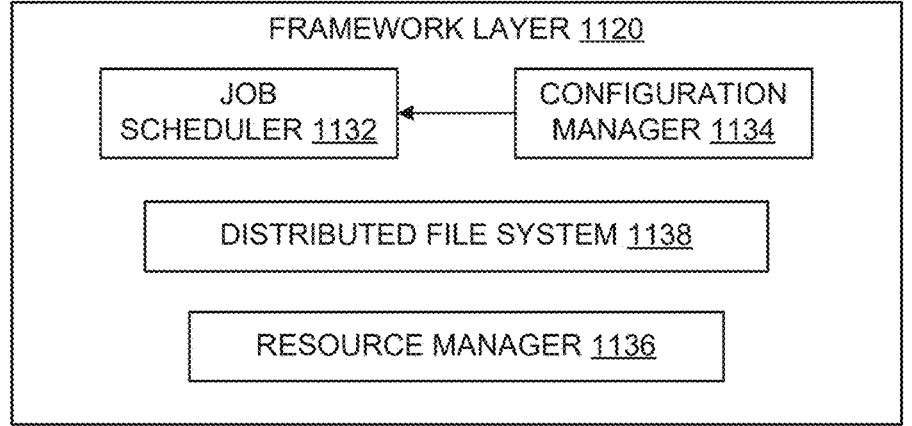

FRAMEWORK LAYER <u>1120</u>

JOB SCHEDULER <u>1132</u>

CONFIGURATION MANAGER <u>1134</u>

DISTRIBUTED FILE SYSTEM <u>1138</u>

RESOURCE MANAGER <u>1136</u>

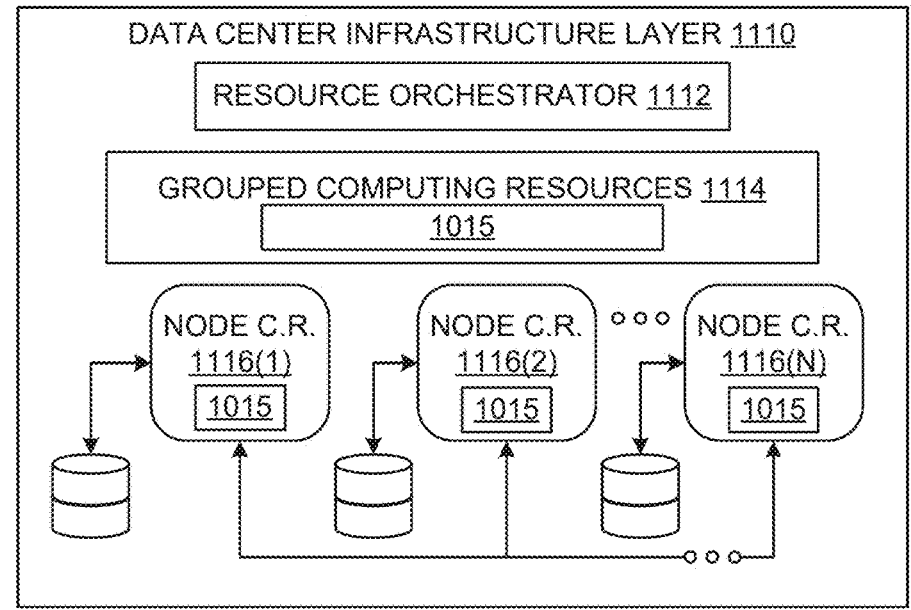

DATA CENTER INFRASTRUCTURE LAYER <u>1110</u>

RESOURCE ORCHESTRATOR <u>1112</u>

GROUPED COMPUTING RESOURCES <u>1114</u>
<u>1015</u>

NODE C.R.
1116(1)
<u>1015</u>

NODE C.R.
1116(2)
<u>1015</u>

∘ ∘ ∘

NODE C.R.
1116(N)
<u>1015</u>

FIG. 11

GRAPHICS PROCESSOR
2310

1/2

GAZE DETERMINATION USING ONE OR MORE NEURAL NETWORKS

FIELD

At least one embodiment pertains to processing resources used to perform and facilitate artificial intelligence. For example, at least one embodiment pertains to processors or computing systems used to train neural networks according to various novel techniques described herein.

BACKGROUND

An ever-increasing amount of assistance and automation is being provided across various industries. For at least some of these applications, this can involve determining when and how to assist a user or adjust an experience. Unfortunately, determining or predicting actions or focus of a user can prove challenging, which can negatively impact the quality of this assistance or accuracy of these determinations.

BRIEF DESCRIPTION OF THE DRAWINGS

Various embodiments in accordance with the present disclosure will be described with reference to the drawings, in which:

FIGS. 8A and 8B illustrate processes for determining gaze, according to at least one embodiment;

FIG. 11 illustrates a data center system, according to at least one embodiment;

DETAILED DESCRIPTION

Figure 1A:
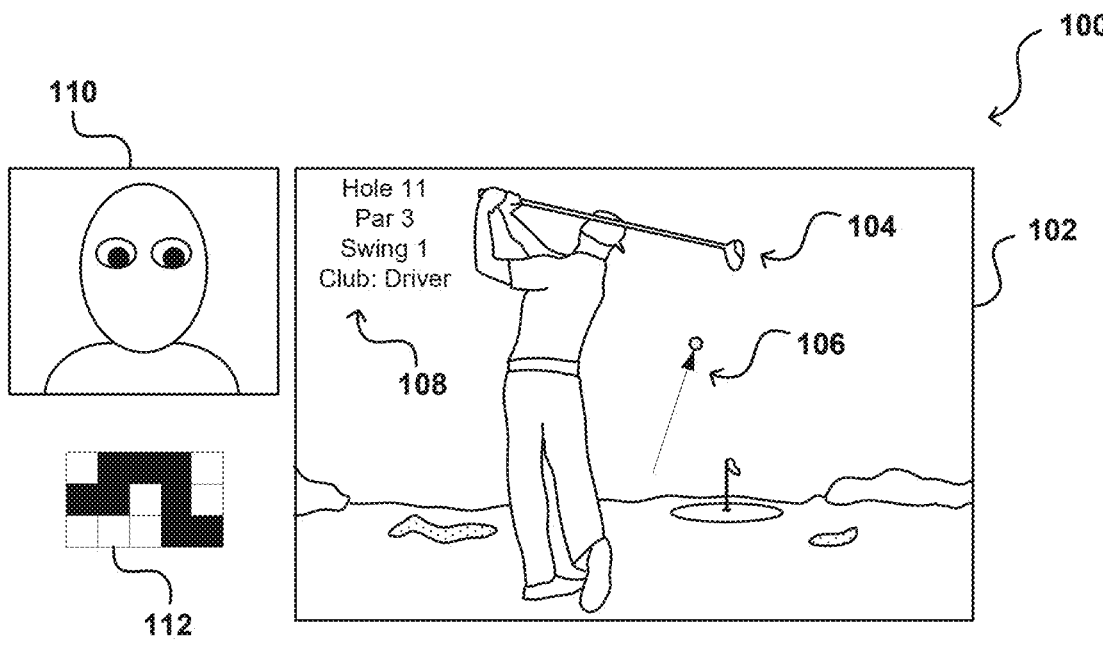
FIGS. 1A and 1B illustrate images that can be used as training data for training one or more neural networks, according to at least one embodiment.

In at least one embodiment, gaze data for one or more viewers can be used to train one or more neural networks to infer a gaze location. In at least one embodiment, video data can be displayed to a viewer, such as a player of a video game, an observer of a video game being played, or a viewer of a video file. In at least one embodiment, for at least a subset of frames 102 of displayed video data, an image 110 of at least a portion of a viewer can be captured, such as may contain representations of a face and eyes of a viewer, as illustrated in images 100 of FIG. 1A. In at least one embodiment, this image 110 can be analyzed to determine a gaze direction or location of a user with respect to displayed video frame 102. In at least one embodiment, a gaze tracking system can generate gaze data 112 corresponding to a determined gaze of a viewer for video frame 102 using captured image 110.

In at least one embodiment, there may be various objects or occurrences in video frame 102 that may be of interest to a viewer, or may attract a viewer's attention, such that a gaze direction of this viewer will intersect a display of video frame 102 at a specific location. In at least one embodiment, a viewer may be interested in an avatar of a playable character, a golf club 104, a golf ball 106, or game data 108 being displayed in this frame. In at least one embodiment, a player may have attention drawn to an action or occurrence that happens over a sequence of frames, such as a swinging of golf club 104, a motion of golf ball 106, or an updating of game data 108. In at least one embodiment, audio data can be analyzed as well, such as where a sound is generated corresponding to golf club 104 hitting golf ball 106, which may draw a viewer's gaze or attention to a specific location or region of displayed video. In at least one embodiment, this audio would be provided to an observer at least for such purposes.

In at least one embodiment, a viewer may also have certain detectable reactions to content displayed in video data. In at least one embodiment, this may include surprise, excitement, sadness, or disappointment. In at least one embodiment, detectable reactions may also include certain types of movements, such as jumping, sitting back, darting of a head or eyes, etc. In at least one embodiment, detectable reactions may also be captured in audio data, such as a viewer gasping, screaming, cheering, cursing, or making another such sound or utterance. In at least one embodiment, any of this information can be analyzed and used as training data for purposes of predicting one or more locations of attention, or gaze locations, in video to be displayed or presented. In at least one embodiment, sentiment analysis can also be used to determine whether a particular frame sequence is significant with respect to an entire video, referring to a temporal saliency rather than a spatial saliency.

In at least one embodiment, different neural networks can be trained for different types of content, as there may be different types of events, occurrences, or objects represented in this content. In at least one embodiment, a separate neural network might be used for a racing game represented in FIG. 1B than is used for a golf game represented in images 150 of FIG. 1A. In at least one embodiment, a video frame 152 for this game might include objects such as a primary vehicle 154, as well as other objects such as buildings, opponent vehicles, pedestrians, and a navigation map. In at least one embodiment, images 156 of a viewer can be obtained and used to generate gaze tracking data 158 for purposes of training one or more neural networks. In at least one embodiment, separate models or networks may be trained for players of this game and for viewers of this game, as players may focus on different objects or occurrences than viewers. In at least one embodiment, players may be more likely to gaze at anticipated actions while viewers may be more reactive in their gaze or attention. In at least one embodiment, separate models for players and observers might also be used for different purposes, such as where game video is rendered using anticipated gaze of a player, while video of that gameplay to be streamed might use a model for viewer attention and use that gaze information to modify video data to be streamed.

In at least one embodiment, different DNNs can be used for different games, such as where there is a desire to overfit to maximize accuracy. In at least one embodiment, DNNs can be trained for different types of videos, and a classifier DNN may be used that first classifies a video into a sub-class, such that a specific DNN can be selected to analyze gaze.

In at least one embodiment, use of an auto-encoder, or one or more encoders and decoders, can provide for encoding on a server side, or on a host, then decoding on a client side, while providing only this decoder to this client. In at least one embodiment, encoders can then be trained for specific games, while a single decoder is used for various types of games. In at least one embodiment, this can help to minimize space requirements on a client side. In at least one embodiment, use of a single encoder on a host can help to minimize space usage on that host, and different decoders can be used with different games.

Figure 1B:
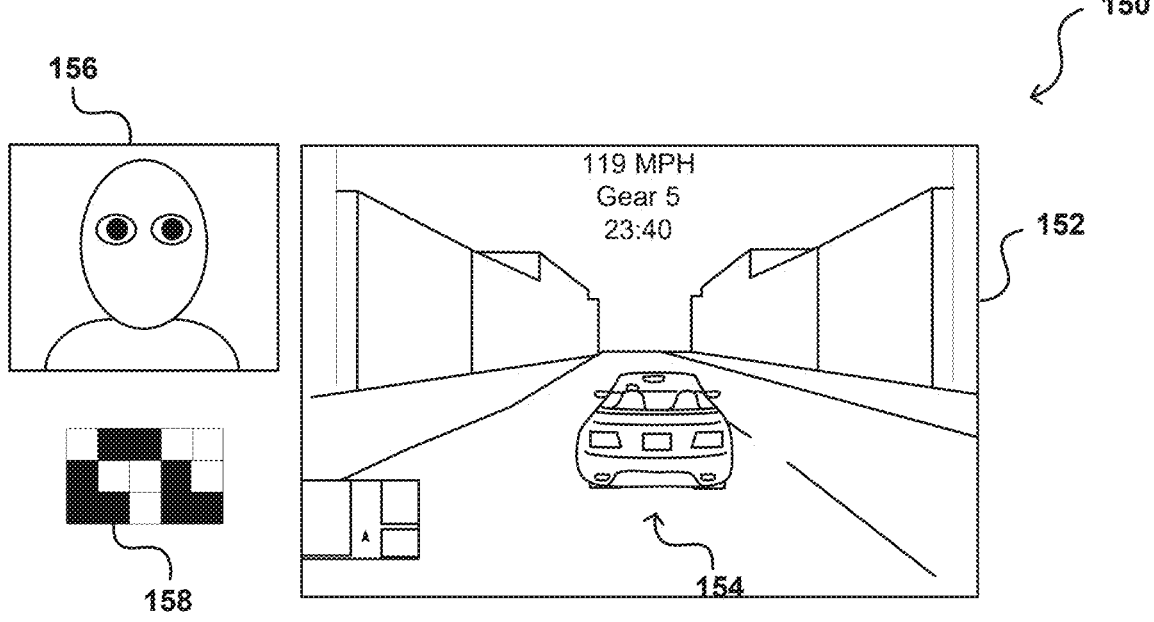
Figure 2A:
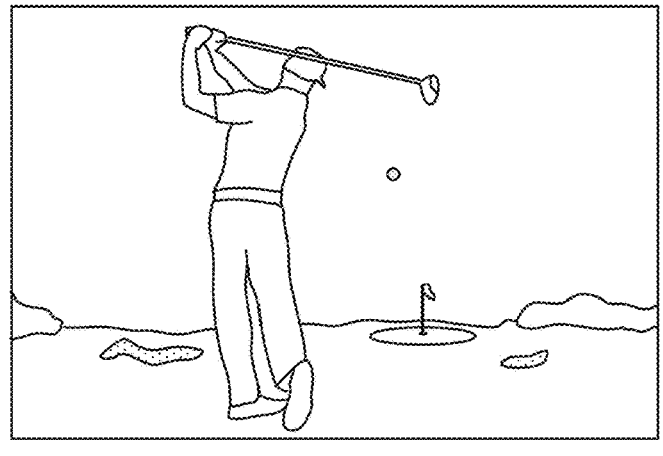
FIGS. 2A, 2B, and 2C illustrate a saliency map and attention region for a frame of video data, according to at least one embodiment.
Figure 2B:
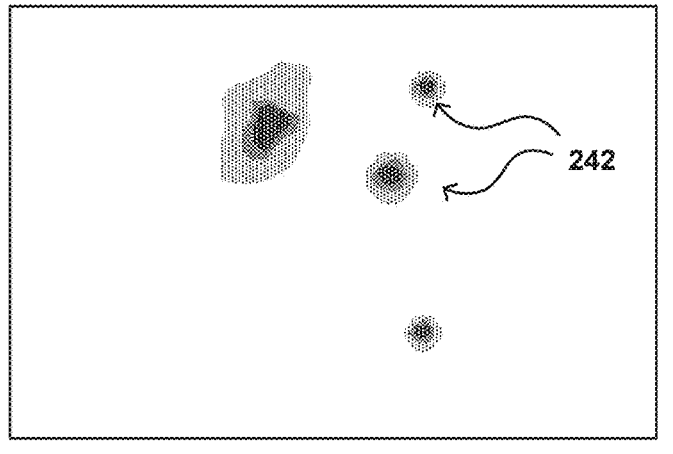
Figure 2C:
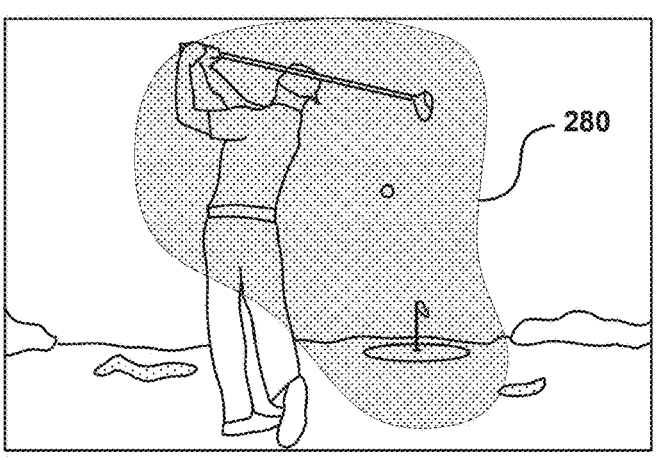

In at least one embodiment, data described with respect to FIGS. 1A and 1B can be analyzed to generate one or more saliency maps for a given video frame at inference time. In at least one embodiment, one or more frames 200 (e.g., a sequence of frames) of gameplay data for a session can be provided as input to a neural network trained using a process such as that discussed above. In at least one embodiment, output of this neural network can be a saliency map 240 as illustrated in FIG. 2B. In at least one embodiment, a saliency map can include one or more regions 242 that are inferred to be regions that a viewer might direct his or her gaze or attention. In at least one embodiment, a saliency map may include a peak for each saliency region 242, corresponding to a most likely gaze location, surrounded by regions of lower likelihood. In at least one embodiment, these saliency regions 242 can be used to modify how video data is rendered, compressed, or displayed. In at least one embodiment, these saliency maps can be used to determine an attention region 280 in a video frame 280, as illustrated in FIG. 2C. In at least one embodiment, an attention region can include one or more saliency regions, as well as some buffer amount. In at least one embodiment, a buffer amount can depend upon a type of modification to be applied, such as a compression or difference in resolution, such that a viewer will not be distracted by a noticeable difference in image quality.

In at least one embodiment, video content to be rendered might have a higher resolution in attention region 280 than outside attention region 280. In at least one embodiment, this allows region likely to be viewed by a viewer to be of sufficiently high resolution and video quality, while a region less likely to be viewed can be rendered at a lower resolution, thereby reducing an overall size of video data while not significantly impacting a viewing experience of a viewer. In at least one embodiment, a similar approach can be used for compression, where a higher level of video compression can be applied to a region outside an attention region 280, in order to reduce video data size while not significantly impacting a viewing experience. Various other image manipulation approaches may be utilized as well, as may include encoding using different bit depths across color blocks or to use higher bit depth for color or a higher update rate for those regions, such as with more frequency frame updates.

In at least one embodiment, video content to be rendered can be modified in order to bring certain items or objects to an attention of a viewer. In at least one embodiment, this can include moving advertising within an attention region 280 such that this advertising is more likely to be viewed or noticed by a viewer. In at least one embodiment, advertising can be positioned away from specific gaze positions or saliency regions, in order to avoid inadvertently obscuring content of interest. In at least one embodiment, a game developer or film studio might use information about an attention region to determine where to position objects, such as to place a collectable game item where an item is likely to be noticed, or to place an important film item where a viewer is likely to notice this item. In at least one embodiment, a game developer or film producer might also place such items outside an attention region in order to make those items harder to notice or detect.

In at least one embodiment, output of a trained DNN can be used to infer a-priori information about an area of an image to be rendered. In at least one embodiment, if a user is wearing a headset, a current gaze position of that user may be available but noisy. In at least one embodiment, output of a trained DNN can be used to regularize this position. In at least one embodiment, if a user is blinking then a DNN can still provide an estimate of gaze using, for example, a Bayesian approach. In at least one embodiment, instead of giving p(gaze|observation), an approach can provide p(gaze)=p(gaze|observation)*p(observation)/p(observation|gaze), where p(observation) is an output of a trained DNN, and p(gaze|observation) is output of a gaze tracker.

Figure 3:
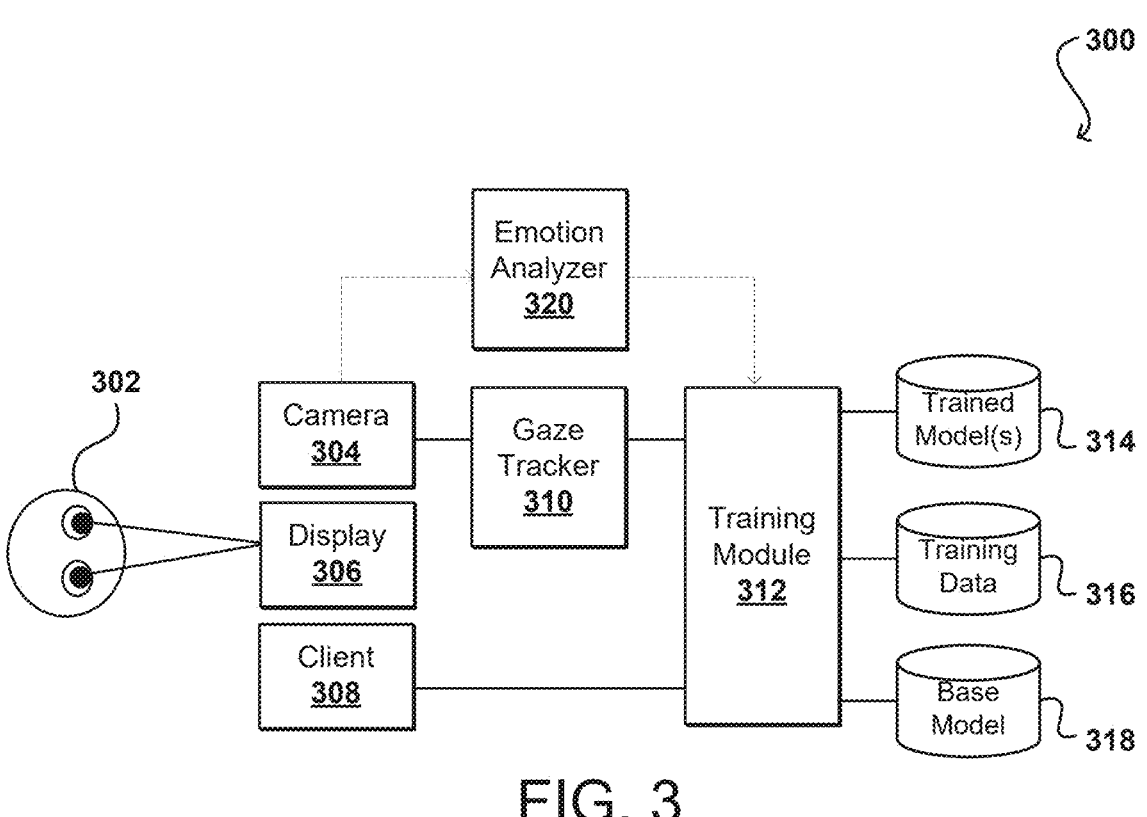
FIG. 3 illustrates a network training system, according to at least one embodiment.

In at least one embodiment, a network training system 300 can be used as illustrated in FIG. 3. In at least one embodiment, video data can be displayed using a display 306, such as a television or computer monitor. In at least one embodiment, this video data can include gameplay video rendered on a client device 308 or video data received to client device 308, such as from a remote server. In at least one embodiment, one or more cameras 304 can be positioned to capture image data of a viewer 302 relative to display 306. In at least one embodiment, viewer 302 will be positioned at a known location relative to display 306 in order to provide accurate ground truth data. In at least one embodiment, microphones or other sensors can be used to capture data about viewer 302 during display of this video content as well.

In at least one embodiment, image data captured by camera 304 can be fed to a gaze tracker 310 that is able to determine, from this captured image data, a gaze direction of user viewer 302. In at least one embodiment, knowing a relative location and orientation of viewer 302 to display 306 enables a gaze location on display 306 to be determined, where this gaze direction intersects display 306. In at least one embodiment, knowing content displayed on display 306 enables this gaze location to be correlated with a position, such as a pixel location, of this displayed content. In at least one embodiment, this gaze position data and this content can be fed as training data to training model 312. In at least one embodiment, other information can be utilized as training data as well. In at least one embodiment, image data (or a stream of video data) captured by camera 304 of viewer 302 can be fed to an emotion analyzer 320 to determine an emotion of viewer 302 during display of a particular video frame or sequence of frames. In at least one embodiment, face expression analysis can be performed to determine a current sentiment of a viewer. In at least one embodiment, an emotion of a viewer, such as excitement, surprise, or concern may be indicative of attention regions as well, such as where a viewer surprised by an explosion may be more likely to gaze quickly at this explosion, or a viewer who is sad during a scene of dialog may be more likely to gaze at a person speaking at a current time. In at least one embodiment, headset position can be tracked as well to serve as a proxy when gaze information is not available due to factors such as obstruction or glare.

In at least one embodiment, this information can be fed to a training module 312 for purposes of training one or more neural networks. In at least one embodiment, other data such as audio or biometric data for viewer 302 may be utilized as well. In at least one embodiment, training data can be captured for multiple viewers of a single video file, and may also be captured for different types of viewers. In at least one embodiment, a based model 318 can be selected and trained using this and other training data 316 in order to generate one or more trained machine learning models 314 that can be used for inferring gaze or attention locations or regions for image, video, or other such content.

Figure 4:
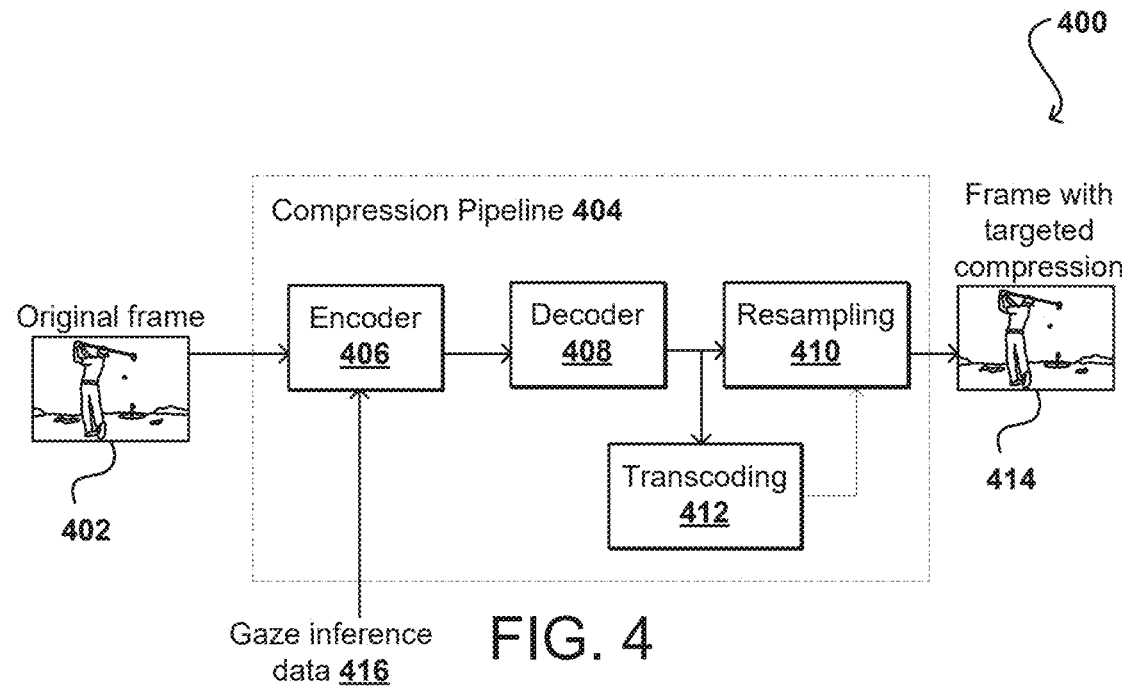
FIG. 4 illustrates a video compression pipeline, according to at least one embodiment.

In at least one embodiment, gaze or attention data output from such a trained model can be used to modify video content. In at least one embodiment, content can be compressed using a compression pipeline 404 as illustrated in system 400 of FIG. 4. In at least one embodiment, an original (or unmodified) frame 402 (or sequence of frames) of video data can be provided to compression pipeline 404. In at least one embodiment, gaze inference data 416 that is output from a trained neural network can also be provided as input to compression pipeline 404. In at least one embodiment, such a pipeline can include separate encoders and decoders for clients and hosts as discussed elsewhere herein. In at least one embodiment, this video data can pass through components of compression pipeline 404, such as encoder 406, decoder 408, transcoder 412, and resampling module 410. In at least one embodiment, this compression can be performed at different compression levels for different regions, such as a higher level of compression outside a determined attention region for a given video frame. In at least one embodiment, an encoder can take a saliency map for pixels in a video frame or image and determine how much to compress and where, or how highly to render and where. In at least one embodiment, levels of compression may depend upon other factors as well, such as available bandwidth or display resolution. In at least one embodiment, a video frame 414 output from compression pipeline 404 can then have targeted compression, where higher levels of compression can be used away from an inferred region of interest or gaze location of a potential viewer. In at least one embodiment, a similar process can be used to render video content with targeted resolution, having higher resolution in an attention region than outside that attention region.

Figure 5:
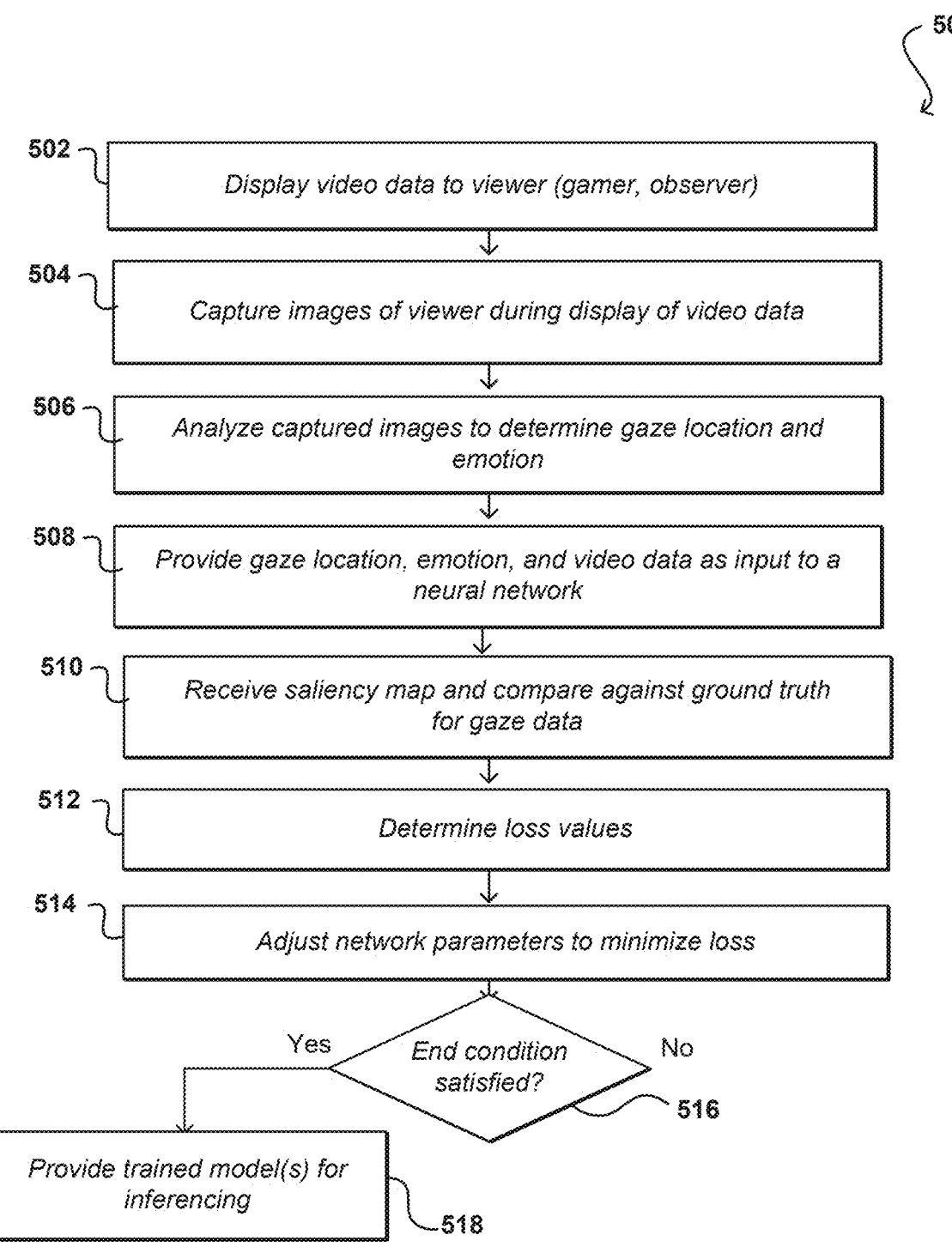
FIG. 5 illustrates a process for training a gaze determination model, according to at least one embodiment.

In at least one embodiment, a process 500 for training at least one model to infer attention or gaze locations in video or image content can be performed as illustrated in FIG. 5. In at least one embodiment, video data is displayed 502 to a viewer, where that viewer can be any of a number of types of viewers, such as a player of a game, an observer of gameplay video, or a viewer of other media content. In at least one embodiment, images are captured 504 of this viewer during display of video data, where those images include representations of at least a portion of this viewer, such as at least a face and eyes of a viewer. In at least one embodiment, these images are analyzed 506 to determine a gaze location of this viewer with respect to displayed video content, as well as emotion data for this viewer over that time. In at least one embodiment, this gaze location, emotion, and video data can be provided 508 as input for training a neural network. In at least one embodiment, this neural network will produce a saliency map for frame of this video content, where this saliency map represents an inferred gaze location of this viewer. In at least one embodiment, this saliency map can be compared 510 against ground truth for gaze data, such as an actual gaze location of that user for that frame of video content. In at least one embodiment, one or more loss values are determined 512 from this comparison, and one or more network parameters are adjusted 514 in order to attempt to minimize this loss. A determination can be made 516 as to whether an end condition or criterion has been satisfied, such as where a maximum number of training passes has been reached or a convergence criterion satisfied. In at least one embodiment, if an end condition has been satisfied then these trained models can be provided 518 for inferencing.

Figure 6:
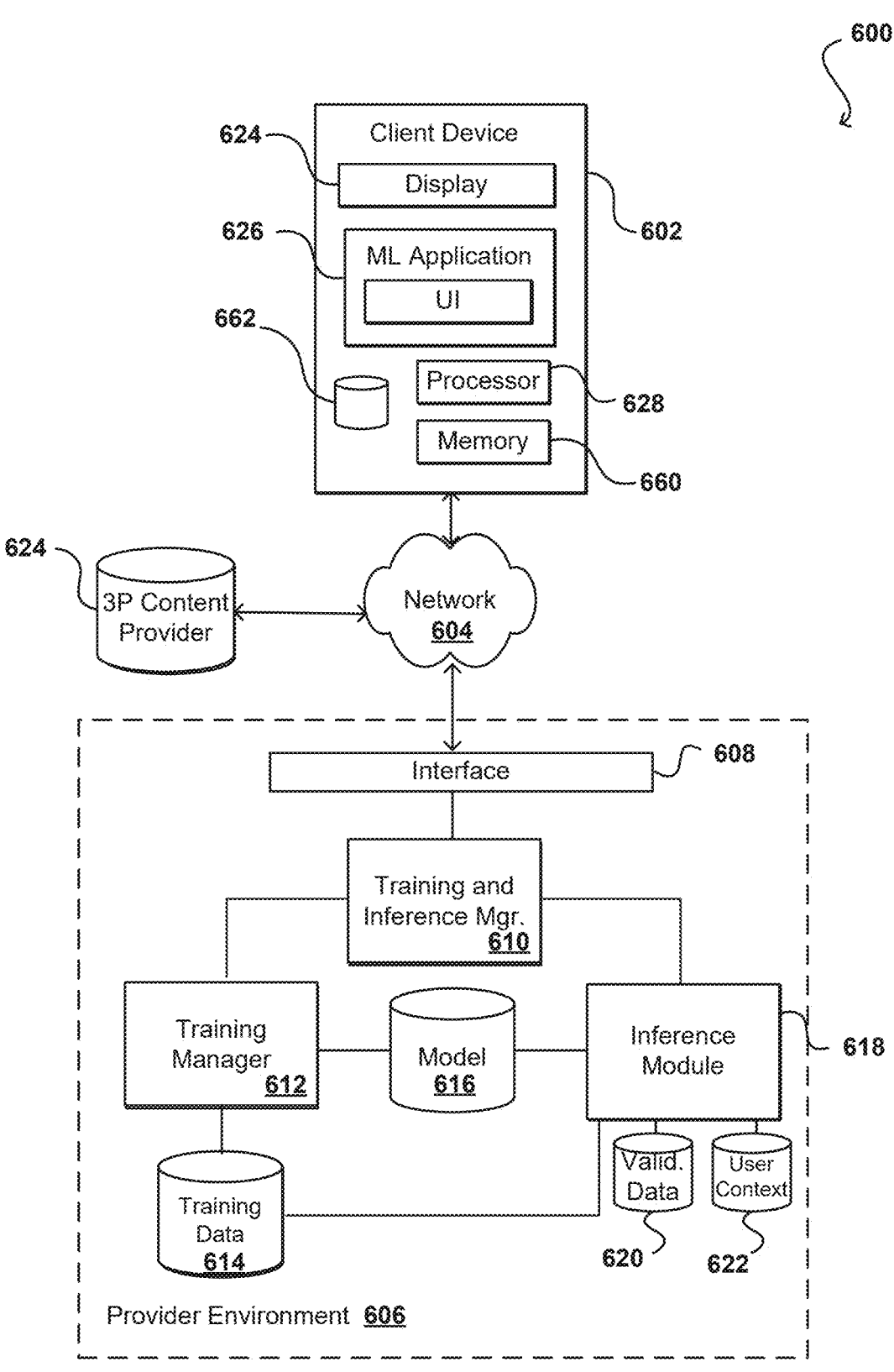
FIG. 6 illustrates an environment, according to at least one embodiment.

FIG. 6 illustrates components of a system 600 that can be used to train and utilize machine learning, in at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 606, while in at least one embodiment training might be requested by a customer or other user having access to a provider environment through a client device 602 or other such resource. In at least one embodiment, training data (or data to be analyzed by a trained neural network) can be provided by a provider, a user, or a third party content provider 624. In at least one embodiment, client device 602 may be a vehicle or object that is to be navigated on behalf of a user, for example, which can submit requests and/or receive instructions that assist in navigation of a device.

In at least one embodiment, requests are able to be submitted across at least one network 604 to be received to a provider environment 606. In at least one embodiment, a client device may be any appropriate electronic and/or computing devices enabling a user to generate and send such requests, as may include desktop computers, notebook computers, computer servers, smartphones, tablet computers, gaming consoles (portable or otherwise), computer processors, computing logic, and set-top boxes. Network(s) 604 can include any appropriate network for transmitting a request or other such data, as may include Internet, an intranet, an Ethernet, a cellular network, a local area network (LAN), a network of direct wireless connections among peers, and so on.

In at least one embodiment, requests can be received to an interface layer 608, which can forward data to a training and inference manager 610 in this example. This manager can be a system or service including hardware and software for managing requests and service corresponding data or content. In at least one embodiment, this manager can receive a request to train a neural network, and can provide data for a request to a training manger 612. In at least one embodiment, training manager 612 can select an appropriate model or network to be used, if not specified by a request, and can train a model using relevant training data. In at least one embodiment training data can be a batch of data stored to a training data repository 614, received from client device 602 or obtained from a third party provider 624. In at least one embodiment, training manager 612 can be responsible for training data, such as by using a LARC-based approach as discussed herein. A network can be any appropriate network, such as a recurrent neural network (RNN) or convolutional neural network (CNN). Once a network is trained and successfully evaluated, a trained network can be stored to a model repository 616, for example, that may store different models or networks for users, applications, or services, etc. In at least one embodiment there may be multiple models for a single application or entity, as may be utilized based on a number of different factors.

In at least one embodiment, at a subsequent point in time, a request may be received from client device 602 (or another such device) for content (e.g., path determinations) or data that is at least partially determined or impacted by a trained neural network. This request can include, for example, input data to be processed using a neural network to obtain one or more inferences or other output values, classifications, or predictions. In at least one embodiment, input data can be received to interface layer 608 and directed to inference module 618, although a different system or service can be used as well. In at least one embodiment, inference module 618 can obtain an appropriate trained network, such as a trained deep neural network (DNN) as discussed herein, from model repository 616 if not already stored locally to inference module 618. Inference module 618 can provide data as input to a trained network, which can then generate one or more inferences as output. This may include, for example, a classification of an instance of input data. In at least one embodiment, inferences can then be transmitted to client device 602 for display 634 or other communication to a user. In at least one embodiment, context data for a user may also be stored to a user context data repository 622, which may include data about a user which may be useful as input to a network in generating inferences, or determining data to return to a user after obtaining instances. In at least one embodiment, relevant data, which may include at least some of input or inference data, may also be stored to a local database 620 for processing future requests. In at least one embodiment, a user can use account or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 626 executing on client device 602, and results displayed through a same interface. A client device can include resources such as a processor 628 and memory 630 for generating a request and processing results or a response, as well as at least one data storage element 632 for storing data for machine learning application 626.

In at least one embodiment a processor 628 (or a processor of training manager 612 or inference module 618) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, prediction of spatial location of gaze and emotions of observers can be determined using a single network or separate networks. In at least one embodiment, separate networks may be used where different outputs may be desired for different applications, and where higher accuracy may be desired for at least one of these aspects. In at least one embodiment, emotion prediction can be used to build a summary of a video, while gaze prediction can be used to compress video. In at least one embodiment, these can be used together to produce a compressed summary.

In at least one embodiment, a process can be used at inference time to infer gaze locations. In at least one embodiment, video data is received and provided as input to a trained model. In at least one embodiment, this model can determine, via inference, one or more gaze or attention locations in this video data. In at least one embodiment, this determination is based at least in part upon objects detected in this video data.

In at least one embodiment, a deep neural network (DNN) can be utilized that can output a temporal saliency map for video content, which can be used to optimize different aspects of this video content over a duration of playback. In at least one embodiment, a recurrent neural network (RNN) with long-term short memory (LSTM) can be utilized. In at least one embodiment, inferred gaze data output from this DNN can be used to adjust parameters for a video encoder/decoder pair in order to optimize for image quality in important parts, identify compression artifacts that are annoying to a viewer, and place important information in locations likely to be observed by a viewer. In at least one embodiment, temporal saliency can be used to determine whether a sequence of frames is important, or whether a single object may have different importance values at different points in time.

In at least one embodiment, a training pipeline can utilize images to be shown to an observer that are corrupted by one or more compression artifacts. In at least one embodiment, a DNN could be trained to predict gaze position based at least in part upon a presence of one or more artifacts of a specific type. In at least one embodiment, a presence of a significant artifact may attract attention or observer gaze, at least for an initial period of time. In at least one embodiment, a gaze map of a clean image and a gaze map of a corrupted image may differ significantly, indicating that this artifact is clearly visible and is altering observer gaze. In at least one embodiment, this can be used to establish compression parameters such that this gaze map is not altered. In at least one embodiment, compression artifacts can include blurring, color quantization, block boundary quantization, and pixilation.

In at least one embodiment, attention data can be used to solve several problems related to optimal fruition of gaming experiences. In at least one embodiment, video quality can be improved by removing artifacts that are annoying to a final user that may occur during streaming-time compression. In at least one embodiment, a saliency model can be used to identify important objects or moments in a video game that should be characterized by maximum quality. In at least one embodiment, a model can be trained using artifacts in corrupted video in order to better identify artifacts that catch an attention of a viewer, whereby a model can serve to develop a perceptually-based video quality metric. In at least one embodiment, attention data can be used to ensure that important content is presented at a good time in a location that is likely to be noticed. In at least one embodiment, this content may be related or unrelated to a game, such as for an advertisement has to be shown within a video game. In at least one embodiment, attention information can also help with design and improvements of games for a game designer by providing statistics about gaze and sentiment of a player while playing. In at least one embodiment, attention information can also help with coaching a player, such as by determining when a player is paying attention to incorrect objects or occurrences, or could benefit from shifting attention in a game.

In at least one embodiment, such a content modification process can be used to optimize streaming in real time, such as by using GeForce NOW® from NVidia Corporation, or offline using a video quality metric to identify visible and annoying artifacts. In at least one embodiment, it can be used to help game designers by providing sentiment statistics, and can be used by advertisement companies to add content in a video game. In at least one embodiment, gaze and other data can serve as a proxy of attention for a viewer of this content. In at least one embodiment, a Bayesian model for foveated rendering can be used to render content with different image quality outside an attention region, but this rendering will be based upon inferred attention and not real-time image tracking. In at least one embodiment, attention data can also provide a measure of overall attention or interaction for a viewer, enabling a designer to modify content in order to attempt to keep attention high or optimize for certain levels of excitement at certain points in a game or video.

Figure 7A:
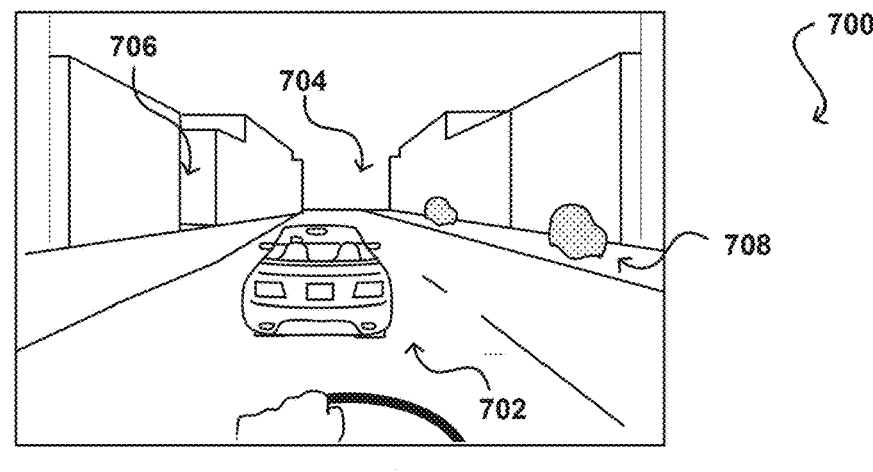
FIGS. 7A, 7B, and 7C illustrate video frames, according to at least one embodiment.

In at least one embodiment, gaze determination can be utilized for applications such as navigation assistance and robotics, as well as for gaming and other applications discussed herein. In at least one embodiment, a vehicle may have at least one front-facing camera that can capture images or video in a forward direction in front of that vehicle. In at least one embodiment, such an image or video frame 700 may contain various types of objects that may catch attention or gaze of an observer, such as a driver or passenger, as illustrated in FIG. 7A. In at least one embodiment, these types of objects might include another vehicle 702 located in front of this vehicle, or a point 704 along a path of a vehicle, for purposes such as route determination and collision avoidance. In at least one embodiment, a gaze network can be trained to determine a relative importance of each of these types of objects visible in this frame 700. In at least one embodiment, there will be an amount of explainability for these importance values, as they correlate to specific object types that may have been learned through training and may be represented in training data for loss determination.

In at least one embodiment, however, determining attention based on only known object types that are currently visible, or otherwise determinable, in a frame may not be sufficient. In at least one embodiment, there may be a corner of a building 706 in this frame, which in and of itself may not be enough to draw attention or gaze of an observer. In at least one embodiment, it might be possible, however, for there to be space behind that building that might hide or mask an object, such that an event corresponding to that object may occur without prior notice. In at least one embodiment, this may include a car driving out from behind this building, a bicycle or pedestrian running into this street, or another such event. In at least one embodiment, an experienced driver can learn to anticipate locations where certain types of events may occur that have at least some importance to this observer, so that this observer may move his or her gaze to those locations for at least a short period of time. In at least one embodiment, there may be other objects 708, such as a bush, tree, or sign, that may obscure a person or animal that might step out in front of this vehicle. In at least one embodiment, while a given bush may not have much importance, a bush of a certain size and opacity within a given distance of a road or pedestrian crossing may warrant at least some attention from this user in anticipation of an event that may occur with respect to this bush.

In at least one embodiment, a network can be trained to determine gaze, or other values such as saliency or importance, based at least in part upon potential events as well as detectable objects. In at least one embodiment, this can include determining a type of potential event, and a probability of that event occurring at one or more specific locations. In at least one embodiment, an importance of a type of event can also be determined, as may be based upon a type of this event and a position relative to this user, among other such factors. In at least one embodiment, an importance of an event type can then be modified by a probability of that event occurring. In at least one embodiment, and as a specific example, an event that has a high probability of occurring but low importance, such as a person walking out of a door on a sidewalk on an opposite side of a street, may not be predicted to draw a gaze of an observer. In at least one embodiment, a person running out of that door into this street and in front of this vehicle has a very high importance, but low probability so that door may not be determined to be likely to draw a gaze of a user. In at least one embodiment, objects such as a door may thus have multiple potential event types determined, and those event types can be aggregated for purposes of determining an overall importance of that object.

Figure 7B:
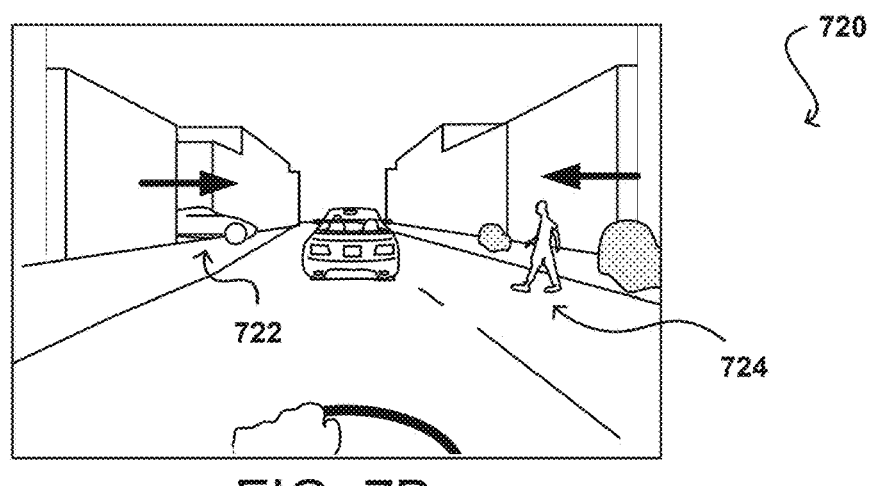

In at least one embodiment, a subsequent frame 720 might be captured as illustrated in FIG. 7. In at least one embodiment, it can be determined that a vehicle 722 pulled out from behind that building, and a pedestrian 724 entered this roadway from behind this bush. In at least one embodiment, these objects would only have been determined to draw attention of an observer after a sufficient portion of those objects is visible and determinable in this view, as well as some reaction time of this observer. In at least one embodiment, instead being able to assign importance of events that may occur can provide a more accurate determination of attention and gaze of an observer, who might actually anticipate that these events may occur and may transfer gaze accordingly. In at least one embodiment, a more accurate determination can help to better assist an observer, such as a driver, based on more accurate predictions and inferences.

Figure 7C:
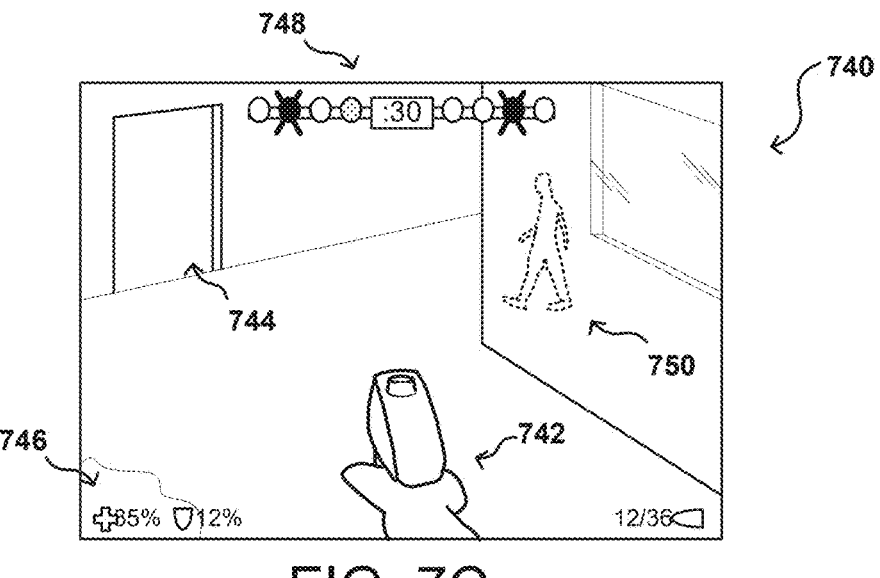

In at least one embodiment, such an approach can be applied to gaming and other applications as illustrated in captured frame 740 of FIG. 7C. In at least one embodiment, a gaze determination network can determine an importance or attention value for detectable objects, such as a player weapon 742, a doorway 744 along a path, or user performance information 746. In at least one embodiment, a model can be trained to learn importance of events that may occur based on what is detectable from one or more frames, such as a sequence of current or past frames. In at least one embodiment, events different from objects at least because events can be temporal in nature. In at least one embodiment, a corner of a building with space on an opposite side can potentially be hiding an enemy 750 who may attack this user at some future point in gameplay. In at least one embodiment, a building corner may not on its own be enough to draw attention, but a certain type of corner in a certain location relative to this player avatar may be sufficient to draw attention of a user. In at least one embodiment, a probability of this type of event can be combined with an importance of this type of event for gaze importance. In at least one embodiment, this event type can also be used to explain why gaze was determined for a specific location when there may be no corresponding object at that location in ground truth data for explanation. In at least one embodiment, this can correspond to one or more generative models, such as a variational auto-encoder or a generator in a generative adversarial network (GAN)-based system) to generate this explanation. In at least one embodiment, this can be true for spaces, locations, horizons, or other regions of a frame where an object may not be located but a type of event may be probable. In at least one embodiment, if buildings may explode then that may provide an event or importance for building objects where for other games these buildings may have no importance. In at least one embodiment, it can then be of some value for certain applications to provide game- or application-specific training, as event probabilities may differ drastically between games and applications, unless a network can be trained to take this difference into account.

In at least one embodiment, a system for deep learning can be trained end-to-end, whereby images or video frames can be provided as input and one or more deep neural networks can be trained to accurately infer gaze of an observer, location importance, saliency, or other such information. In at least one embodiment, this network can also be trained to provide at least some level of explainability for each gaze decision. In at least one embodiment, a first neural network can be trained to extract image or object features as discussed elsewhere herein. In at least one embodiment, a deep neural network (DNN) can utilize those features to attempt to predict gaze. In at least one embodiment, this DNN can attempt to combine, aggregate, or cluster those features to determine features that are relevant for gaze having some importance or otherwise attracting attention of a user. In at least one embodiment, this gaze information can then be used to modify or determine actions to be taken, such as to adjust a type of control offered in a driver assistance system.

In at least one embodiment, a captured image or video frame may have multiple objects visible, or otherwise detectable, in that frame. In at least one embodiment, this may include a vehicle and an intersection. In at least one embodiment, both these objects may have importance for an observer. In at least one embodiment, training data can be generated for such a location by showing video for this location to a small number of observers, as data for a large number of observers can be very time-consuming and expensive to generate. In at least one embodiment, for a first frame of this video training data all these observers may gaze at this vehicle. In at least one embodiment, for a second frame all but one of these observers may gaze at this vehicle, while another observer may gaze at this intersection. In at least one embodiment, this limited data set will then only provide ground truth importance data for these two objects in these frames of video, even though there may be other objects that may draw gaze or attention of other observers. In at least one embodiment, using a limited data set may fall into a local minimum problem where for this first frame a network might output a gaze probability for this vehicle at 100%, which is not accurate for all observers in all situations. In at least one embodiment, a gaze determination approach can attempt to minimize importance of individual frames in gaze prediction, which may lead to false positives during training. In at least one embodiment, it may be possible to allow for these false positives, but provide at least some amount of explainability.

In at least one embodiment, an object such as a pedestrian or other vehicle may appear on a horizon or in a specific location. In at least one embodiment, there may be a horizon but no such object visible for an inference-time decision. In at least one embodiment, a gaze prediction model might put at least some importance to this horizon, even though there are no objects of interest present. In at least one embodiment, a prediction network can provide explanation for a potential event instead of an object, to provide explainability for this inference. In at least one embodiment, it is desirable to ensure that these additional probabilities are included in this inference process as these probabilities improve accuracy, which can be important for applications such as driver assistance in vehicles.

In at least one embodiment, a gaze determination module can include one or more auto-encoders. In at least one embodiment, a feature detection model can identify features in input image or video data, and can provide these features to these one or more auto-encoders to attempt to reconstruct this input. In at least one embodiment, there will be some error between input and reconstructed images. In at least one embodiment, an auto-encoder can be designed to include at least one additional property that can account for false positives in training. In at least one embodiment, a given image frame can be described locally in terms of these image features. In at least one embodiment, only some of these features may be associated with gaze in ground truth data due to a limited number of observations captured in this ground truth data. In at least one embodiment, a gaze network can output importance for gaze prediction for other objects corresponding to other features, and this additional property can help to provide explainability for this additional importance that is not represented in this ground truth data. In at least one embodiment, such a network can maximize a component that relates to something that cannot be explained from this ground truth data, and appears to be a false positive based on this training data. In at least one embodiment, regeneration of an image using a generative model will include what may be thought to be errors relative to this ground truth image, but it is desirable to retain these differences as discussed herein. In at least one embodiment, this can include hallucinating this network by maximizing output in one or more locations where there is little attention, then back-projecting this signal to maximize feature activations. In at least one embodiment, this enables attention to be assigned to a location such as a horizon line due to a potential event at that location that may trigger attention or draw observer gaze. In at least one embodiment, such an approach can provide explainability based on a type of event that is probable at a location in an image or video frame, even though there is no visible evidence of that event in that frame.

In at least one embodiment, a gaze determination network can be designed and trained to include a temporal dimension in its inferences, which can provide explainability in terms of events in addition to specific objects visible in image or video data. In at least one embodiment, this temporal component can consider movement or changes over a sequence of images or frames, and is not limited to a single image or frame. In at least one embodiment, an event may be recognized that may attract observer attention. In at least one embodiment, a DNN can be used to extract relevant features, and an attempt can be made to cluster or classify these features into specific types of events. In at least one embodiment, a determined event J might have a probability of P(J), where J runs from $1 \rightarrow n$. In at least one embodiment, a network can also learn an importance of this event, as may be given by K(J). In at least one embodiment, K(J) can be thought of as a probability of this event capturing observer gaze, while P(J) is a probability of that event occurring. In at least one embodiment, for each pixel in space, an attention value k should be given by a sum of probabilities multiplied by a relevant importance. In at least one embodiment, an attention value for a pixel can be given by:

$$K(\text{pixel})=K(1)*P(1)+K(2)*P(2)+ \ldots +K(n)*P(n)$$

In at least one embodiment, however, K may provide a measure of an absolute value for an event. In at least one embodiment, these values for K can be used to provide an absolute ranking of probable events. In at least one embodiment, then is not a probability but is a value in some unit of measure that provides relative importance of these events. In at least one embodiment, a relevant importance of an event for an entire scene may be different from a relative importance of that event for an individual frame. In at least one embodiment, K is not determined using a linear function, but may be a much more complicated function depending upon a variety of different factors or context.

In at least one embodiment, gaze determination can still analyze local features. In at least one embodiment, an input image or video frame can be divided into a grid comprised of an array of cells. In at least one embodiment, there can be features associated with a given cell. In at least one embodiment, an importance can be determined by multiplying a probability of a given event by its importance for each event that may be associated with pixels in that cell. In at least one embodiment, this can provide a weighted sum of all events whose occurrence may appear in that cell. In at least one embodiment, event importance does not need to be determined for a specific frame, but can be determined from an entire dataset. In at least one embodiment, this can prevent a network from improperly assigning all importance to a single object because it is biased by appearance in a single frame if looking at a local maximum. In at least one embodiment, K(J) can be estimated over an entire dataset.

In at least one embodiment, an auto-encoder can be used to analyze input image data and extract relevant features. In at least one embodiment, these features can be provided as input to a second neural network that does not need to be an auto-encoder, but able to accept local features. In at least one embodiment, a classifying algorithm can be used to attempt to group or cluster features that are similar in feature space into one or more classes or clusters, such that similar features can be assigned to a similar classification that have an importance determined. In at least one embodiment, two objects have features that are similar in feature space then they should belong to a same object or event class. In at least one embodiment, if there are two walls visible in an image that could each have cars hidden behind them, those walls can be placed in a same cluster and treated similarly. In at least one embodiment, this can help to explain why looking at these walls is important. In at least one embodiment, this clustering algorithm may be any appropriate clustering algorithm, such as a k-means clustering algorithm. In at least one embodiment, such an algorithm may be based on a minimum entropy and can be trained using unsupervised learning.

In at least one embodiment, clustering can be performed based at least in part upon gaze data. In at least one embodiment, an attempt can be made to optimize clustering such that reconstruction of an inferred gaze map, or saliency map, is optimal. In at least one embodiment, such an approach would not be unsupervised. In at least one embodiment, an error in reconstruction would be projected back into this network in order to adjust clustering to reduce this error with respect to gaze map reconstruction. In at least one embodiment, such an approach would move analysis from features to classifications of events, and can assign probabilities to those events for purposes of predicting gaze. In at least one embodiment, a loss function can be utilized that does not penalize for false positives. In at least one embodiment, such an approach can help to explain otherwise unexplained false positives in output of this neural network.

In at least one embodiment, missing observations in ground truth data can be handled using a DNN as discussed herein but with a recurrent implementation. In at least one embodiment, such a recurrent implementation and appropriate training can be used to fill in missing data. In at least one embodiment, there may be a limited number of observers, such as five observers. In at least one embodiment, a network can be trained to predict gaze of a next observer based on processed observer data. In at least one embodiment, image data can be input to a DNN with zero observer gaze data, and output will correspond to gaze of a first observer. In at least one embodiment, this gaze data is input to this DNN again, and gaze of these first two observers is predicted. In at least one embodiment, this can be performed iteratively up to a target number of observers. In at least one embodiment, at testing time this DNN trained that was trained for five observers can predict gaze up to six observers, and so on. In at least one embodiment, such an approach can extrapolate beyond a number of observers for which ground truth data is available. In at least one embodiment, this is a recurrent neural network where data can be reused. In at least one embodiment, a first pass can identify a first object of highest importance. In at least one embodiment, for subsequent iterations importance values cam be lowered as other objects and events appear. In at least one embodiment, such an approach can help to learn an importance of objects and events in sequence. In at least one embodiment, a DNN can be trained as a recursive neural network, with training ending when this network is capable of providing explanations for gaze determinations. In at least one embodiment, such an approach can help to not only estimate an importance of an object, but also to add important objects in a scene based at least in part upon a ranking of their importance.

In at least one embodiment, such gaze determination can be used to predict gaze of an observer such as a driver of a vehicle. In at least one embodiment, being able to accurately anticipate gaze of a driver can help a driver assistance system to better provide assistance as needed. In at least one embodiment, this can include taking more control of a vehicle when a driver gaze is predicted to be in a direction away from an unexpected event of importance, such as an object appearing unexpectedly in a roadway or a tree being down over this road. In at least one embodiment, this can cause a vehicle control system to take action to maneuver, or otherwise change operation of, this vehicle to avoid a collision or at least minimize impact. In at least one embodiment, a vehicle assistance system might also, or alternatively, draw attention to an object or event if a user is predicted to be gazing in a different direction, such as by using a heads up display or audio command. In at least one embodiment, such an approach can also be used to train a driver as to where this driver should be looking while driving, based upon an importance of surrounding events. In at least one embodiment, approaches discussed herein can also provide explainability as to why a driver should gaze in a particular direction when there may be no object currently visible in that location.

In at least one embodiment, such importance determinations can also be used in robotics. In at least one embodiment, these determinations can be used to indicate to a robot where interesting things are happening, as well as where certain events may occur, such that this robot can be proactive instead of reactive. In at least one embodiment, such an approach can also be used to train a robot with more efficient approaches to operation, where that robot can be better trained to anticipate certain events in order to avoid having to stop or take evasive actions, as well as to simply determine a best course of action based upon a probability of various types of events that may impact operation.

In at least one embodiment, a process 800 for determining gaze can be utilized as illustrated in FIG. 8A. In at least one embodiment, a video frame 802 is received that includes one or more objects that may be visible to an observer. In at least one embodiment, this video frame, after any desired preprocessing, can be processed 804 with a first neural network to extract image features, such as may be representative of objects of interest in a scene or environment in which that video frame was captured. In at least one embodiment, these extracted features can be provided 806 as input to a second neural network. In at least one embodiment, this network can attempt to group 808 similar features into a set of clusters corresponding to specific types of objects or events. In at least one embodiment, a second network may attempt to classify these features into a set of event clusters, where an appearance of an object is considered a type of event. In at least one embodiment, importance of events or objects in these clusters can be determined 810, as may have been learned by this network during training by analyzing an entire training dataset for importance data for these events or objects. In at least one embodiment, these importance values can be modified 812 using a determined probability of occurrence for various events. In at least one embodiment, an object appearing can be considered an event with 100% probability. In at least one embodiment, these probability-modified importance values can then be used assigned to various pixels of this image. In at least one embodiment, these importance values at various pixel locations can then be used to generate a gaze prediction 814, such as a saliency map, for this input video frame. In at least one embodiment, regions of a map with high saliency or importance values may correspond to locations where there is no object of interest present, but that may correspond to a type of event with a determined probability of importance. In at least one embodiment, this event probability can provide explainability for these determinations.

In at least one embodiment, a process 850 for predicting gaze can be utilized as illustrated in FIG. 8B. In at least one embodiment, an image of a scene is received 852. In at least one embodiment, this may be received from a camera capturing an image of a scene or may be received on a stream of video data. In at least one embodiment, this image can be analyzed 854, using one or more neural networks, to predict a gaze of one or more users based, at least in part, upon gazes corresponding to objects not always visible to these one or more users.

In at least one embodiment, such an attention model that can classify events in an image or video, which helps to provide an explainable and robust estimate of gaze or attention of an observer. In at least one embodiment, such a model can be trained to determine events with a probability of occurrence, as events catch attention rather than single objects in an image. In at least one embodiment, such an approach can help to deal with missing ground truth data, such as where an event may occur but is not represented in ground truth.

Inference and Training Logic

Figure 9:
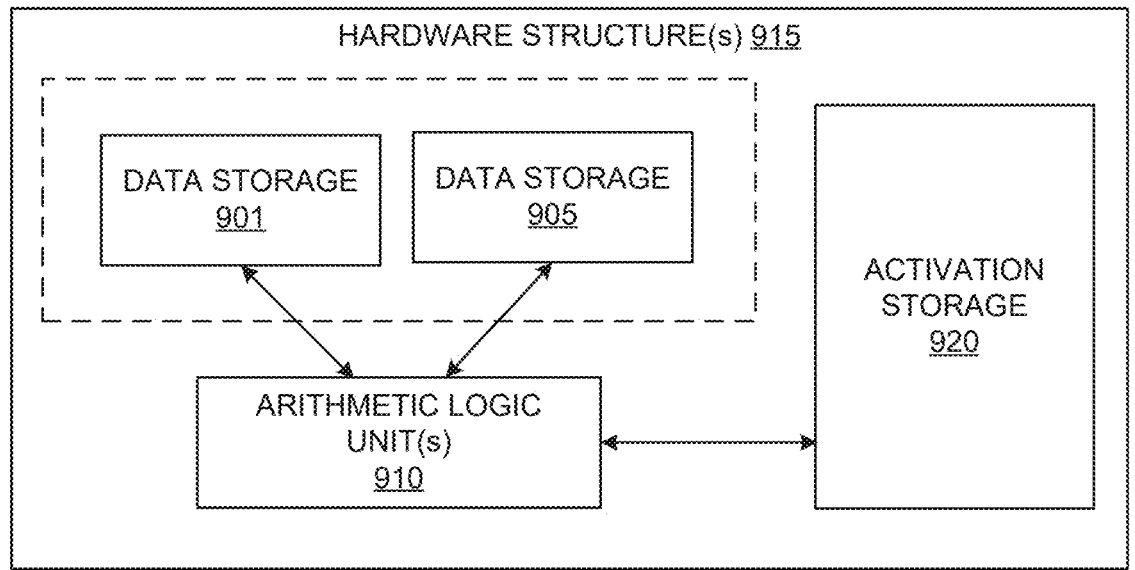
FIG. 9 illustrates inference and/or training logic, according to at least one embodiment.

FIG. 9 illustrates inference and/or training logic 915 used to perform inferencing and/or training operations associated with one or more embodiments. Details regarding inference and/or training logic 915 are provided below in conjunction with FIGS. 9 and/or 10.

In at least one embodiment, inference and/or training logic 915 may include, without limitation, code and/or data storage 901 to store forward and/or output weight and/or input/output data, and/or other parameters to configure neurons or layers of a neural network trained and/or used for inferencing in aspects of one or more embodiments. In at least one embodiment, training logic 915 may include, or be coupled to code and/or data storage 901 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which this code corresponds. In at least one embodiment, code and/or data storage 901 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 901 may be included with other on-chip or off-chip data storage, including a processor's L1, L2, or L3 cache or system memory.

In at least one embodiment, any portion of code and/or data storage 901 may be internal or external to one or more processors or other hardware logic devices or circuits. In at least one embodiment, code and/or code and/or data storage 901 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 901 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 915 may include, without limitation, a code and/or data storage 905 to store backward and/or output weight and/or input/output data corresponding to neurons or layers of a neural network trained and/or used for inferencing in aspects of one or more embodiments. In at least one embodiment, code and/or data storage 905 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 915 may include, or be coupled to code and/or data storage 905 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which this code corresponds. In at least one embodiment, any portion of code and/or data storage 905 may be included with other on-chip or off-chip data storage, including a processor's L1, L2, or L3 cache or system memory. In at least one embodiment, any portion of code and/or data storage 905 may be internal or external to on one or more processors or other hardware logic devices or circuits. In at least one embodiment, code and/or data storage 905 may be cache memory, DRAM, SRAM, non-volatile memory (e.g., Flash memory), or other storage. In at least one embodiment, choice of whether code and/or data storage 905 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 901 and code and/or data storage 905 may be separate storage structures. In at least one embodiment, code and/or data storage 901 and code and/or data storage 905 may be same storage structure. In at least one embodiment, code and/or data storage 901 and code and/or data storage 905 may be partially same storage structure and partially separate storage structures. In at least one embodiment, any portion of code and/or data storage 901 and code and/or data storage 905 may be included with other on-chip or off-chip data storage, including a processor's L1, L2, or L3 cache or system memory.

In at least one embodiment, inference and/or training logic 1015 may include, without limitation, one or more arithmetic logic unit(s) ("ALU(s)") 1010, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1020 that are functions of input/output and/or weight parameter data stored in code and/or data storage 1001 and/or code and/or data storage 1005. In at least one embodiment, activations stored in activation storage 1020 are generated according to linear algebraic and or matrix-based mathematics performed by ALU(s) 1010 in response to performing instructions or other code, wherein weight values stored in code and/or data storage 1005 and/or code and/or data storage 1001 are used as operands along with other values, such as bias values, gradient information, momentum values, or other parameters or hyperparameters, any or all of which may be stored in code and/or data storage 1005 or code and/or data storage 1001 or another storage on or off-chip.

In at least one embodiment, ALU(s) 1010 are included within one or more processors or other hardware logic devices or circuits, whereas in another embodiment, ALU(s) 1010 may be external to a processor or other hardware logic device or circuit that uses them (e.g., a co-processor). In at least one embodiment, ALUs 1010 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1001, code and/or data storage 1005, and activation storage 1020 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1020 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1020 may be cache memory, DRAM, SRAM, non-volatile memory (e.g., Flash memory), or other storage. In at least one embodiment, activation storage 1020 may be completely or partially within or external to one or more processors or other logical circuits. In at least one embodiment, choice of whether activation storage 1020 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1015 illustrated in FIG. 9 may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 9 may be used in conjunction with central processing unit ("CPU") hardware, graphics processing unit ("GPU") hardware or other hardware, such as field programmable gate arrays ("FPGAs").

Figure 10:
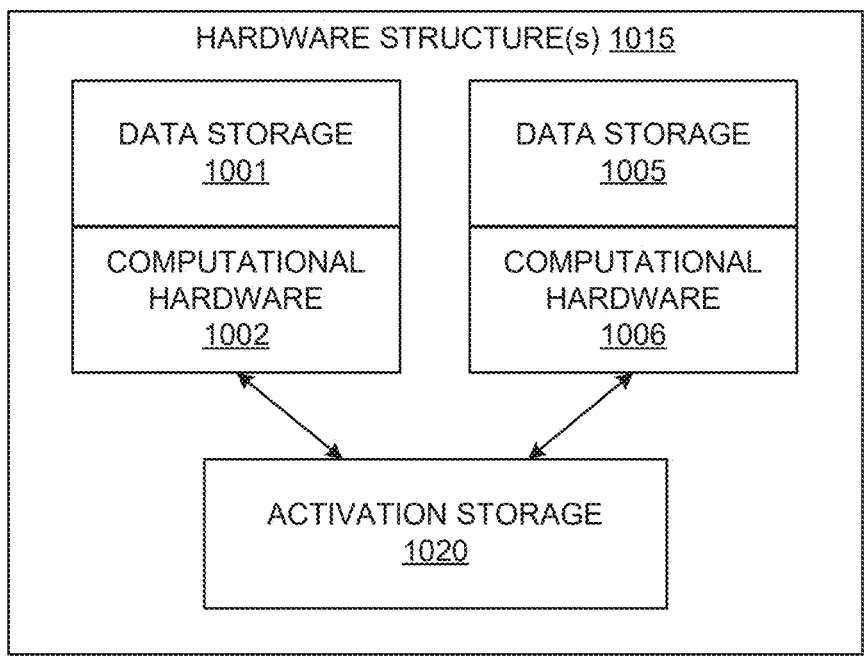
FIG. 10 illustrates inference and/or training logic, according to at least one embodiment.

FIG. 10 illustrates inference and/or training logic 1015, according to at least one or more embodiments. In at least one embodiment, inference and/or training logic 1015 may include, without limitation, hardware logic in which computational resources are dedicated or otherwise exclusively used in conjunction with weight values or other information corresponding to one or more layers of neurons within a neural network. In at least one embodiment, inference and/or training logic 1015 illustrated in FIG. 10 may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic

1015 illustrated in FIG. 10 may be used in conjunction with central processing unit (CPU) hardware, graphics processing unit (GPU) hardware or other hardware, such as field programmable gate arrays (FPGAs). In at least one embodiment, inference and/or training logic 1015 includes, without limitation, code and/or data storage 1001 and code and/or data storage 1005, which may be used to store code (e.g., graph code), weight values and/or other information, including bias values, gradient information, momentum values, and/or other parameter or hyperparameter information. In at least one embodiment illustrated in FIG. 10, each of code and/or data storage 1001 and code and/or data storage 1005 is associated with a dedicated computational resource, such as computational hardware 1002 and computational hardware 1006, respectively. In at least one embodiment, each of computational hardware 1002 and computational hardware 1006 comprises one or more ALUs that perform mathematical functions, such as linear algebraic functions, only on information stored in code and/or data storage 1001 and code and/or data storage 1005, respectively, result of which is stored in activation storage 1020.

In at least one embodiment, each of code and/or data storage 1001 and 1005 and corresponding computational hardware 1002 and 1006, respectively, correspond to different layers of a neural network, such that resulting activation from one "storage/computational pair 1001/1002" of code and/or data storage 1001 and computational hardware 1002 is provided as an input to "storage/computational pair 1005/1006" of code and/or data storage 1005 and computational hardware 1006, in order to mirror conceptual organization of a neural network. In at least one embodiment, each of storage/computational pairs 1001/1002 and 1005/1006 may correspond to more than one neural network layer. In at least one embodiment, additional storage/computation pairs (not shown) subsequent to or in parallel with storage computation pairs 1001/1002 and 1005/1006 may be included in inference and/or training logic 1015.

Data Center

FIG. 11 illustrates an example data center 1100, in which at least one embodiment may be used. In at least one embodiment, data center 1100 includes a data center infrastructure layer 1110, a framework layer 1120, a software layer 1130, and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114. In at least one embodiment, resource orchestrator 1112 may include a software design infrastructure ("SDI") management entity for data center 1100. In at least one embodiment, resource orchestrator may include hardware, software or some combination thereof.

In at least one embodiment, as shown in FIG. 11, framework layer 1120 includes a job scheduler 1122, a configuration manager 1124, a resource manager 1126 and a distributed file system 1128. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1128 for large-scale data processing (e.g., "big data"). In at least one embodiment, job scheduler 1122 may include a Spark driver to facilitate scheduling of workloads supported by various layers of data center 1100. In at least one embodiment, configuration manager 1124 may be capable of configuring different layers such as software layer 1130 and framework layer 1120 including Spark and distributed file system 1128 for supporting large-scale data processing. In at least one embodiment, resource manager 1126 may be capable of managing clustered or grouped computing resources mapped to or allocated for support of distributed file system 1128 and job scheduler 1122. In at least one embodiment, clustered or grouped computing resources may include grouped computing resource 1114 at data center infrastructure layer 1110. In at least one embodiment, resource manager 1126 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1128 of framework layer 1120. one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1128 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1124, resource manager 1126, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

In at least one embodiment, data center 1100 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 11 for inferencing or predicting operations based, at least in part, on weight parameters calculated using neural network training operations, neural network functions and/or architectures, or neural network use cases described herein. In at least one embodiment, inference and/or training logic 1015 can be used to predict gaze of an observer based upon gazes corresponding to events or objects not always visible to one or more observers.

Computer Systems

Figure 12:
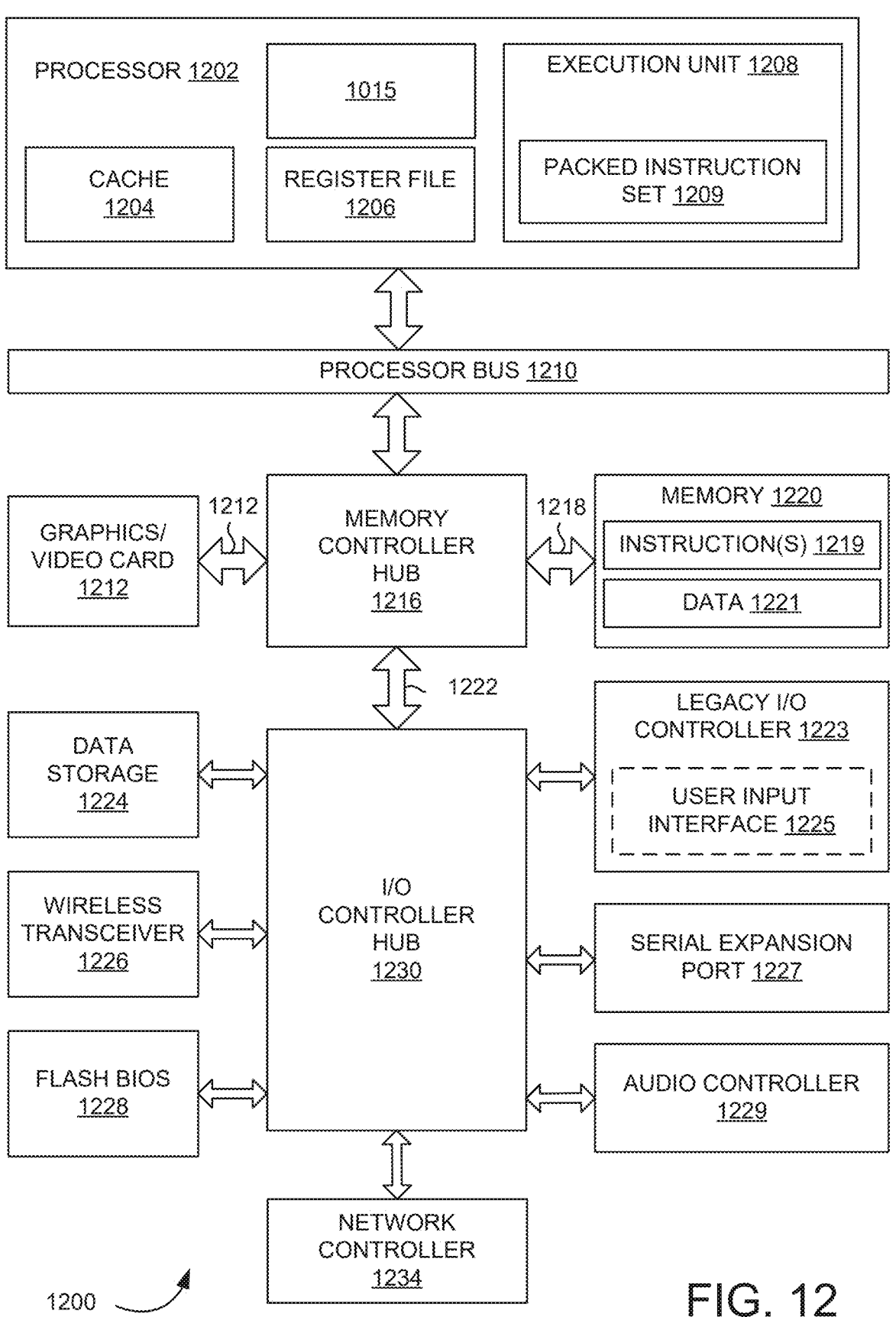
FIG. 12 illustrates a computer system, according to at least one embodiment.

FIG. 12A is a block diagram illustrating an exemplary computer system, which may be a system with interconnected devices and components, a system-on-a-chip (SOC) or some combination thereof 1200 formed with a processor that may include execution units to execute an instruction, according to at least one embodiment. In at least one embodiment, computer system 1200 may include, without limitation, a component, such as a processor 1202 to employ execution units including logic to perform algorithms for process data, in accordance with present disclosure, such as in embodiment described herein. In at least one embodiment, computer system 1200 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1200 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1200 may include, without limitation, processor 1202 that may include, without limitation, one or more execution units 1208 to perform machine learning model training and/or inferencing according to techniques described herein. In at least one embodiment, computer system 1200 is a single processor desktop or server system, but in another embodiment computer system 1200 may be a multiprocessor system. In at least one embodiment, processor 1202 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1202 may be coupled to a processor bus 1210 that may transmit data signals between processor 1202 and other components in computer system 1200.

In at least one embodiment, processor 1202 may include, without limitation, a Level 1 ("L1") internal cache memory ("cache") 1204. In at least one embodiment, processor 1202 may have a single internal cache or multiple levels of internal cache. In at least one embodiment, cache memory may reside external to processor 1202. Other embodiments may also include a combination of both internal and external caches depending on particular implementation and needs. In at least one embodiment, register file 1206 may store different types of data in various registers including, without limitation, integer registers, floating point registers, status registers, and instruction pointer register.

In at least one embodiment, execution unit 1208, including, without limitation, logic to perform integer and floating point operations, also resides in processor 1202. In at least one embodiment, processor 1202 may also include a microcode ("ucode") read only memory ("ROM") that stores microcode for certain macro instructions. In at least one embodiment, execution unit 1208 may include logic to handle a packed instruction set 1209. In at least one embodiment, by including packed instruction set 1209 in an instruction set of a general-purpose processor 1202, along with associated circuitry to execute instructions, operations used by many multimedia applications may be performed using packed data in a general-purpose processor 1202. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1208 may also be used in microcontrollers, embedded processors, graphics devices, DSPs, and other types of logic circuits. In at least one embodiment, computer system 1200 may include, without limitation, a memory 1220. In at least one embodiment, memory 1220 may be implemented as a Dynamic Random Access Memory ("DRAM") device, a Static Random Access Memory ("SRAM") device, flash memory device, or other memory device. In at least one embodiment, memory 1220 may store instruction(s) 1219 and/or data 1221 represented by data signals that may be executed by processor 1202.

In at least one embodiment, system logic chip may be coupled to processor bus 1210 and memory 1220. In at least one embodiment, system logic chip may include, without limitation, a memory controller hub ("MCH") 1216, and processor 1202 may communicate with MCH 1216 via processor bus 1210. In at least one embodiment, MCH 1216 may provide a high bandwidth memory path 1218 to memory 1220 for instruction and data storage and for storage of graphics commands, data and textures. In at least one embodiment, MCH 1216 may direct data signals between processor 1202, memory 1220, and other components in computer system 1200 and to bridge data signals between processor bus 1210, memory 1220, and a system I/O 1222. In at least one embodiment, system logic chip may provide a graphics port for coupling to a graphics controller. In at least one embodiment, MCH 1216 may be coupled to memory 1220 through a high bandwidth memory path 1218 and graphics/video card 1212 may be coupled to MCH 1216 through an Accelerated Graphics Port ("AGP") interconnect 1214.

In at least one embodiment, computer system 1200 may use system I/O 1222 that is a proprietary hub interface bus to couple MCH 1216 to I/O controller hub ("ICH") 1230. In at least one embodiment, ICH 1230 may provide direct connections to some I/O devices via a local I/O bus. In at least one embodiment, local I/O bus may include, without limitation, a high-speed I/O bus for connecting peripherals to memory 1220, chipset, and processor 1202. Examples may include, without limitation, an audio controller 1229, a firmware hub ("flash BIOS") 1228, a wireless transceiver 1226, a data storage 1224, a legacy I/O controller 1223 containing user input and keyboard interfaces 1225, a serial expansion port 1227, such as Universal Serial Bus ("USB"), and a network controller 1234. data storage 1224 may comprise a hard disk drive, a floppy disk drive, a CD-ROM device, a flash memory device, or other mass storage device.

In at least one embodiment, FIG. 12A illustrates a system, which includes interconnected hardware devices or "chips", whereas in other embodiments, FIG. 12A may illustrate an exemplary System on a Chip ("SoC"). In at least one embodiment, devices illustrated in FIG. cc may be interconnected with proprietary interconnects, standardized interconnects (e.g., PCIe) or some combination thereof. In at least one embodiment, one or more components of computer system 1200 are interconnected using compute express link (CXL) interconnects.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 12A for inferencing or predicting operations based, at least in part, on weight parameters calculated using neural network training operations, neural network functions and/or architectures, or neural network use cases described herein. In at least one embodiment, inference and/or training logic 1015 can be used to predict gaze of an observer based upon gazes corresponding to events or objects not always visible to one or more observers.

Figure 13:
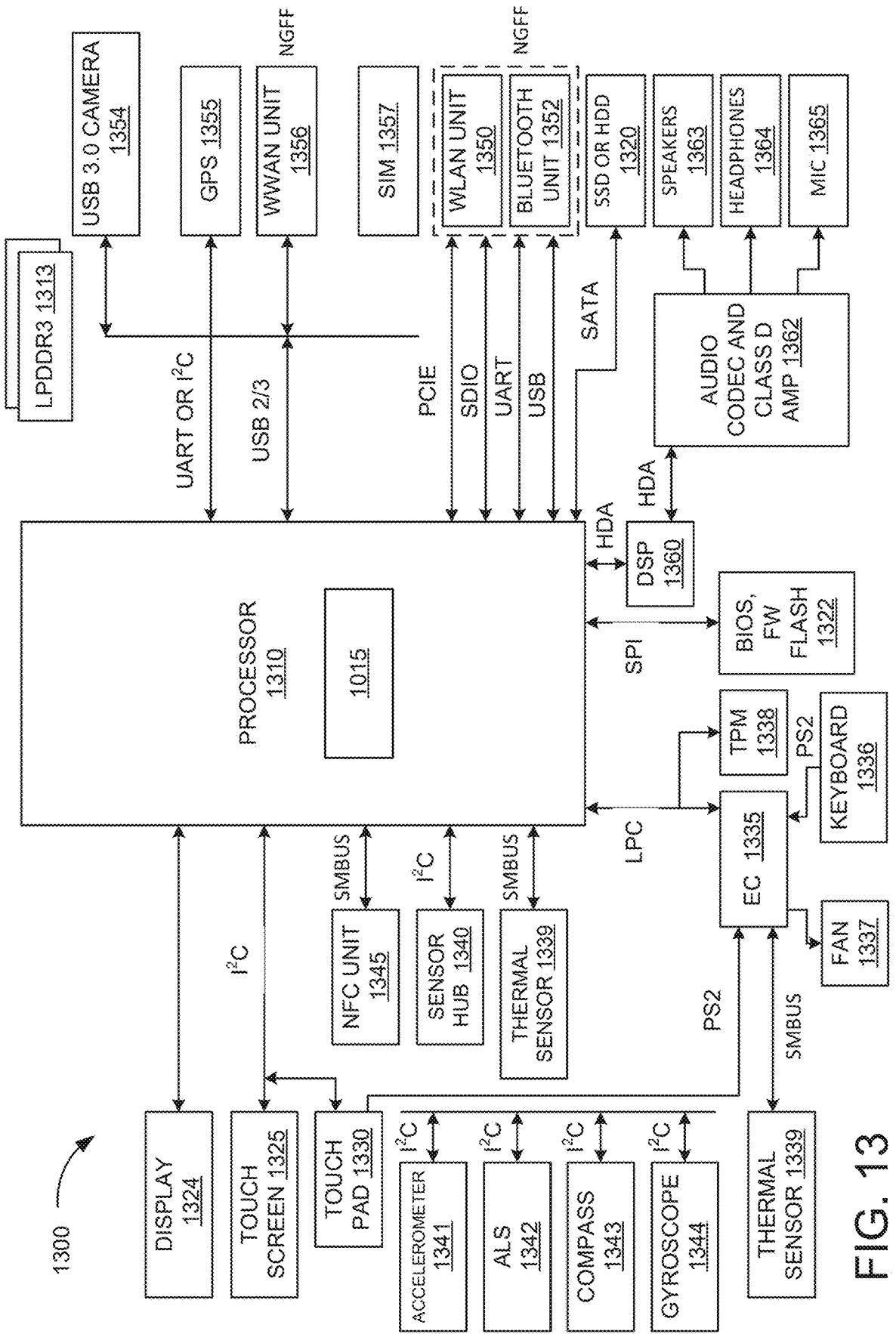
FIG. 13 illustrates a computer system, according to at least one embodiment.

FIG. 13 is a block diagram illustrating an electronic device 1300 for utilizing a processor 1310, according to at least one embodiment. In at least one embodiment, electronic device 1300 may be, for example and without limitation, a notebook, a tower server, a rack server, a blade server, a laptop, a desktop, a tablet, a mobile device, a phone, an embedded computer, or any other suitable electronic device.

In at least one embodiment, system 1300 may include, without limitation, processor 1310 communicatively coupled to any suitable number or kind of components, peripherals, modules, or devices. In at least one embodiment, processor 1310 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 13 illustrates a system, which includes interconnected hardware devices or "chips", whereas in other embodiments, FIG. 13 may illustrate an exemplary System on a Chip ("SoC"). In at least one embodiment, devices illustrated in FIG. 13 may be interconnected with proprietary interconnects, standardized interconnects (e.g., PCIe) or some combination thereof. In at least one embodiment, one or more components of FIG. 13 are interconnected using compute express link (CXL) interconnects.

In at least one embodiment, FIG. 13 may include a display 1324, a touch screen 1325, a touch pad 1330, a Near Field Communications unit ("NFC") 1345, a sensor hub 1340, a thermal sensor 1346, an Express Chipset ("EC") 1335, a Trusted Platform Module ("TPM") 1338, BIOS/firmware/flash memory ("BIOS, FW Flash") 1322, a DSP 1360, a drive 1320 such as a Solid State Disk ("SSD") or a Hard Disk Drive ("HDD"), a wireless local area network unit ("WLAN") 1350, a Bluetooth unit 1352, a Wireless Wide Area Network unit ("WWAN") 1356, a Global Positioning System (GPS) 1355, a camera ("USB 3.0 camera") 1354 such as a USB 3.0 camera, and/or a Low Power Double Data Rate ("LPDDR") memory unit ("LPDDR3") 1315 implemented in, for example, LPDDR3 standard. These components may each be implemented in any suitable manner.

In at least one embodiment, other components may be communicatively coupled to processor 1310 through components discussed above. In at least one embodiment, an accelerometer 1341, Ambient Light Sensor ("ALS") 1342, compass 1343, and a gyroscope 1344 may be communicatively coupled to sensor hub 1340. In at least one embodiment, thermal sensor 1339, a fan 1337, a keyboard 1346, and a touch pad 1330 may be communicatively coupled to EC 1335. In at least one embodiment, speaker 1363, headphones 1364, and microphone ("mic") 1365 may be communicatively coupled to an audio unit ("audio codec and class d amp") 1362, which may in turn be communicatively coupled to DSP 1360. In at least one embodiment, audio unit 1364 may include, for example and without limitation, an audio coder/decoder ("codec") and a class D amplifier. In at least one embodiment, SIM card ("SIM") 1357 may be communicatively coupled to WWAN unit 1356. In at least one embodiment, components such as WLAN unit 1350 and Bluetooth unit 1352, as well as WWAN unit 1356 may be implemented in a Next Generation Form Factor ("NGFF").

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 13 for inferencing or predicting operations based, at least in part, on weight parameters calculated using neural network training operations, neural network functions and/or architectures, or neural network use cases described herein. In at least one embodiment, inference and/or training logic 1015 can be used to predict gaze of an observer based upon gazes corresponding to events or objects not always visible to one or more observers.

Figure 14:
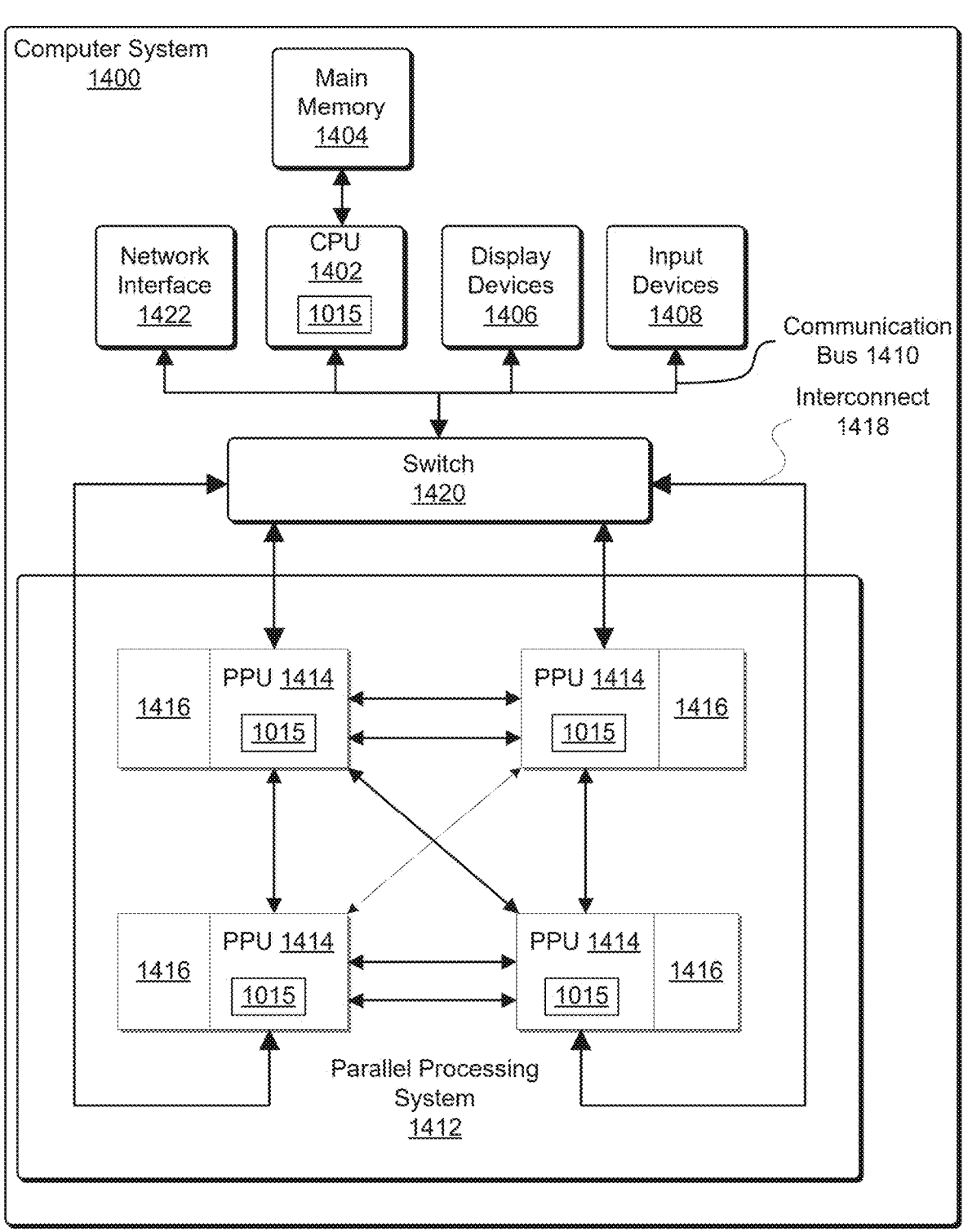
FIG. 14 illustrates a computer system, according to at least one embodiment.

FIG. 14 illustrates a computer system 1400, according to at least one embodiment. In at least one embodiment, computer system 1400 is configured to implement various processes and methods described throughout this disclosure.

In at least one embodiment, computer system 1400 comprises, without limitation, at least one central processing unit ("CPU") 1402 that is connected to a communication bus 1410 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1400 includes, without limitation, a main memory 1404 and control logic (e.g., implemented as hardware, software, or a combination thereof) and data are stored in main memory 1404 which may take form of random access memory ("RAM"). In at least one embodiment, a network interface subsystem ("network interface") 1422 provides an interface to other computing devices and networks for receiving data from and transmitting data to other systems from computer system 1400.

In at least one embodiment, computer system 1400, in at least one embodiment, includes, without limitation, input devices 1408, parallel processing system 1412, and display devices 1406 which can be implemented using a conventional cathode ray tube ("CRT"), liquid crystal display ("LCD"), light emitting diode ("LED"), plasma display, or other suitable display technologies. In at least one embodiment, user input is received from input devices 1408 such as keyboard, mouse, touchpad, microphone, and more. In at least one embodiment, each of foregoing modules can be situated on a single semiconductor platform to form a processing system.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 14 for inferencing or predicting operations based, at least in part, on weight parameters calculated using neural network training operations, neural network functions and/or architectures, or neural network use cases described herein. In at least one embodiment, inference and/or training logic 1015 can be used to predict gaze of an observer based upon gazes corresponding to events or objects not always visible to one or more observers.

Figure 15:
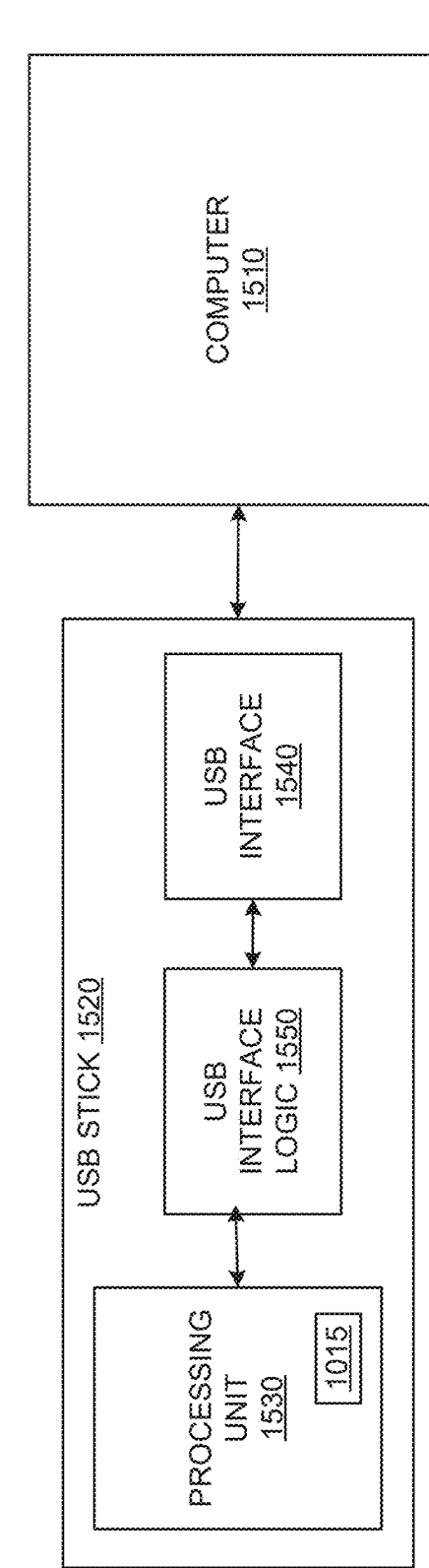
FIG. 15 illustrates a computer system, according at least one embodiment.

FIG. 15 illustrates a computer system 1500, according to at least one embodiment. In at least one embodiment, computer system 1500 includes, without limitation, a computer 1510 and a USB stick 1520. In at least one embodiment, computer 1510 may include, without limitation, any number and type of processor(s) (not shown) and a memory (not shown). In at least one embodiment, computer 1510 includes, without limitation, a server, a cloud instance, a laptop, and a desktop computer.

In at least one embodiment, USB stick 1520 includes, without limitation, a processing unit 1530, a USB interface 1540, and USB interface logic 1550. In at least one embodiment, processing unit 1530 may be any instruction execution system, apparatus, or device capable of executing instructions. In at least one embodiment, processing unit 1530 may include, without limitation, any number and type of processing cores (not shown). In at least one embodiment, processing core 1530 comprises an application specific integrated circuit ("ASIC") that is optimized to perform any amount and type of operations associated with machine learning. For instance, in at least one embodiment, processing core 1530 is a tensor processing unit ("TPC") that is optimized to perform machine learning inference operations. In at least one embodiment, processing core 1530 is a vision processing unit ("VPU") that is optimized to perform machine vision and machine learning inference operations.

In at least one embodiment, USB interface 1540 may be any type of USB connector or USB socket. For instance, in at least one embodiment, USB interface 1540 is a USB 3.0 Type-C socket for data and power. In at least one embodiment, USB interface 1540 is a USB 3.0 Type-A connector. In at least one embodiment, USB interface logic 1550 may include any amount and type of logic that enables processing unit 1530 to interface with or devices (e.g., computer 1510) via USB connector 1540.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 15 for inferencing or predicting operations based, at least in part, on weight parameters calculated using neural network training operations, neural network functions and/or architectures, or neural network use cases described herein. In at least one embodiment, inference and/or training logic 1015 can be used to predict gaze of an observer based upon gazes corresponding to events or objects not always visible to one or more observers.

Figure 16:
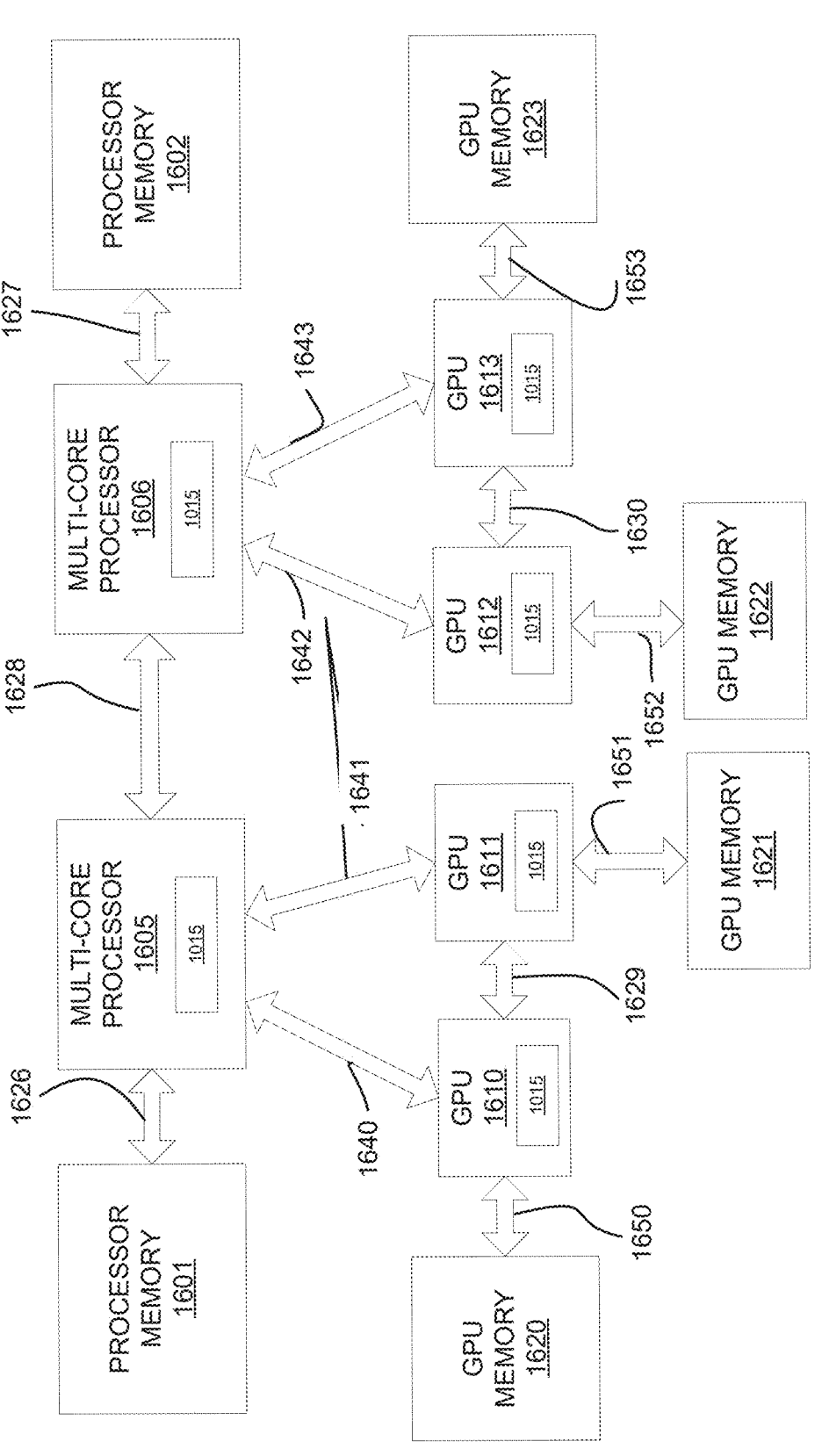
FIG. 16 illustrates a computer system, according to at least one embodiment.

FIG. 16A illustrates an exemplary architecture in which a plurality of GPUs 1610-1613 is communicatively coupled to a plurality of multi-core processors 1605-1606 over high-speed links 1640-1643 (e.g., buses, point-to-point interconnects, etc.). In one embodiment, high-speed links 1640-1643 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 1610-1613 are interconnected over high-speed links 1629-1630, which may be implemented using same or different protocols/links than those used for high-speed links 1640-1643. Similarly, two or more of multi-core processors 1605-1606 may be connected over high speed link 1628 which may be symmetric multi-processor (SMP) buses operating at 20 GB/s, 30 GB/s, 120 GB/s or higher. Alternatively, all communication between various system components shown in FIG. 16A may be accomplished using same protocols/links (e.g., over a common interconnection fabric).

In one embodiment, each multi-core processor 1605-1606 is communicatively coupled to a processor memory 1601-1602, via memory interconnects 1626-1627, respectively, and each GPU 1610-1613 is communicatively coupled to GPU memory 1620-1623 over GPU memory interconnects 1650-1653, respectively. Memory interconnects 1626-1627 and 1650-1653 may utilize same or different memory access technologies. By way of example, and not limitation, processor memories 1601-1602 and GPU memories 1620-1623 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 1601-1602 may be volatile memory and another portion may be non-volatile memory (e.g., using a two-level memory (2LM) hierarchy).

As described below, although various processors 1605-1606 and GPUs 1610-1613 may be physically coupled to a particular memory 1601-1602, 1620-1623, respectively, a unified memory architecture may be implemented in which a same virtual system address space (also referred to as "effective address" space) is distributed among various physical memories. For example, processor memories 1601-1602 may each comprise 64 GB of system memory address space and GPU memories 1620-1623 may each comprise 32 GB of system memory address space (resulting in a total of 256 GB addressable memory in this example).

Figure 17:
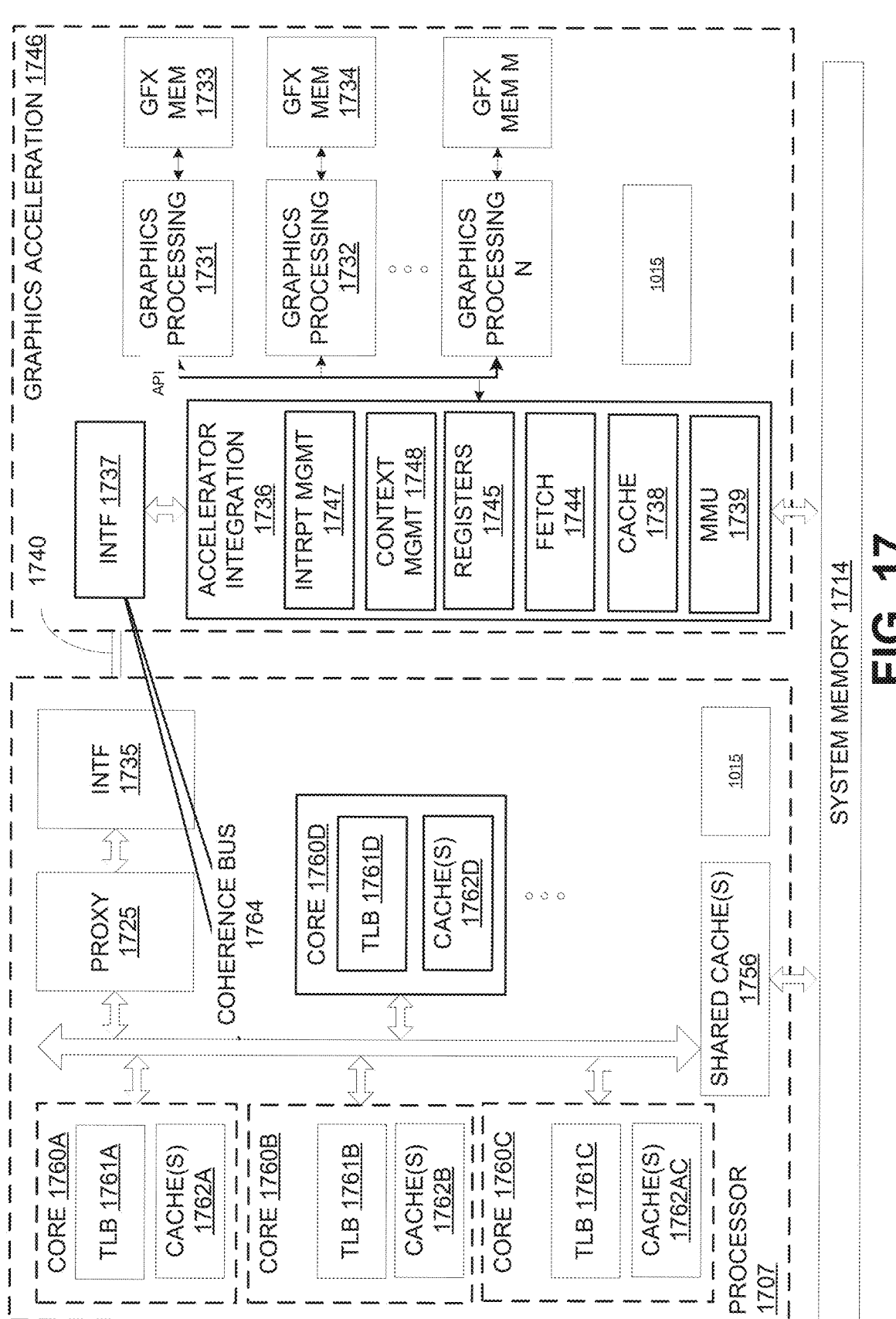
FIG. 17 illustrates a computer system, according to at least one embodiment.

FIG. 17 illustrates additional details for an interconnection between a multi-core processor 1607 and a graphics acceleration module 1646 in accordance with one exemplary embodiment. Graphics acceleration module 1646 may include one or more GPU chips integrated on a line card which is coupled to processor 1607 via high-speed link 1640. Alternatively, graphics acceleration module 1646 may be integrated on a same package or chip as processor 1607.

In at least one embodiment, illustrated processor 1607 includes a plurality of cores 1660A-1660D, each with a translation lookaside buffer 1661A-1661D and one or more caches 1662A-1662D. In at least one embodiment, cores 1660A-1660D may include various other components for executing instructions and processing data which are not illustrated. Caches 1662A-1662D may comprise level 1 (L1) and level 2 (L2) caches. In addition, one or more shared caches 1656 may be included in caches 1662A-1662D and shared by sets of cores 1660A-1660D. For example, one embodiment of processor 1607 includes 24 cores, each with its own L1 cache, twelve shared L2 caches, and twelve shared L3 caches. In this embodiment, one or more L2 and L3 caches are shared by two adjacent cores. Processor 1607 and graphics acceleration module 1646 connect with system memory 1614, which may include processor memories 1601-1602 of FIG. 16A.

Coherency is maintained for data and instructions stored in various caches 1662A-1662D, 1656 and system memory 1614 via inter-core communication over a coherence bus 1664. For example, each cache may have cache coherency logic/circuitry associated therewith to communicate to over coherence bus 1664 in response to detected reads or writes to particular cache lines. In one implementation, a cache snooping protocol is implemented over coherence bus 1664 to snoop cache accesses.

In one embodiment, a proxy circuit 1625 communicatively couples graphics acceleration module 1646 to coherence bus 1664, allowing graphics acceleration module 1646 to participate in a cache coherence protocol as a peer of cores 1660A-1660D. In particular, an interface 1635 provides connectivity to proxy circuit 1625 over high-speed link 1640 (e.g., a PCIe bus, NVLink, etc.) and an interface 1637 connects graphics acceleration module 1646 to link 1640.

In one implementation, an accelerator integration circuit 1636 provides cache management, memory access, context management, and interrupt management services on behalf of a plurality of graphics processing engines 1631, 1632, N of graphics acceleration module 1646. Graphics processing engines 1631, 1632, N may each comprise a separate graphics processing unit (GPU). Alternatively, graphics processing engines 1631, 1632, N may comprise different types of graphics processing engines within a GPU such as graphics execution units, media processing engines (e.g., video encoders/decoders), samplers, and blit engines. In at least one embodiment, graphics acceleration module 1646 may be a GPU with a plurality of graphics processing engines 1631-1632, N or graphics processing engines 1631-1632, N may be individual GPUs integrated on a common package, line card, or chip.

In one embodiment, accelerator integration circuit 1636 includes a memory management unit (MMU) 1639 for performing various memory management functions such as virtual-to-physical memory translations (also referred to as effective-to-real memory translations) and memory access protocols for accessing system memory 1614. MMU 1639 may also include a translation lookaside buffer (TLB) (not shown) for caching virtual/effective to physical/real address translations. In one implementation, a cache 1638 stores commands and data for efficient access by graphics processing engines 1631-1632, N. In one embodiment, data stored in cache 1638 and graphics memories 1633-1634, M is kept coherent with core caches 1662A-1662D, 1656, and system memory 1614. As mentioned above, this may be accomplished via proxy circuit 1625 on behalf of cache 1638 and memories 1633-1634, M (e.g., sending updates to cache 1638 related to modifications/accesses of cache lines on processor caches 1662A-1662D, 1656, and receiving updates from cache 1638).

A set of registers 1645 store context data for threads executed by graphics processing engines 1631-1632, N and a context management circuit 1648 manages thread contexts. For example, context management circuit 1648 may perform save and restore operations to save and restore contexts of various threads during contexts switches (e.g., where a first thread is saved and a second thread is stored so that a second thread can be executed by a graphics processing engine). For example, on a context switch, context management circuit 1648 may store current register values to a designated region in memory (e.g., identified by a context pointer). It may then restore register values when returning to a context. In one embodiment, an interrupt management circuit 1647 receives and processes interrupts received from system devices.

In one implementation, virtual/effective addresses from a graphics processing engine 1631 are translated to real/physical addresses in system memory 1614 by MMU 1639. One embodiment of accelerator integration circuit 1636 supports multiple (e.g., 4, 8, 16) graphics accelerator modules 1646 and/or other accelerator devices. Graphics accelerator module 1646 may be dedicated to a single application executed on processor 1607 or may be shared between multiple applications. In one embodiment, a virtualized graphics execution environment is presented in which resources of graphics processing engines 1631-1632, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1636 performs as a bridge to a system for graphics acceleration module 1646 and provides address translation and system memory cache services. In addition, accelerator integration circuit 1636 may provide virtualization facilities for a host processor to manage virtualization of graphics processing engines 1631-1632, N, interrupts, and memory management.

Because hardware resources of graphics processing engines 1631-1632, N are mapped explicitly to a real address space seen by host processor 1607, any host processor can address these resources directly using an effective address value. One function of accelerator integration circuit 1636, in one embodiment, is physical separation of graphics processing engines 1631-1632, N so that they appear to a system as independent units.

In at least one embodiment, one or more graphics memories 1633-1634, M are coupled to each of graphics processing engines 1631-1632, N, respectively. Graphics memories 1633-1634, M store instructions and data being processed by each of graphics processing engines 1631-1632, N. Graphics memories 1633-1634, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 1640, biasing techniques are used to ensure that data stored in graphics memories 1633-1634, M is data which will be used most frequently by graphics processing engines 1631-1632, N and preferably not used by cores 1660A-1660D (at least not frequently). Similarly, a biasing mechanism attempts to keep data needed by cores (and preferably not graphics processing engines 1631-1632, N) within caches 1662A-1662D, 1656 of cores and system memory 1614.

Figure 18:
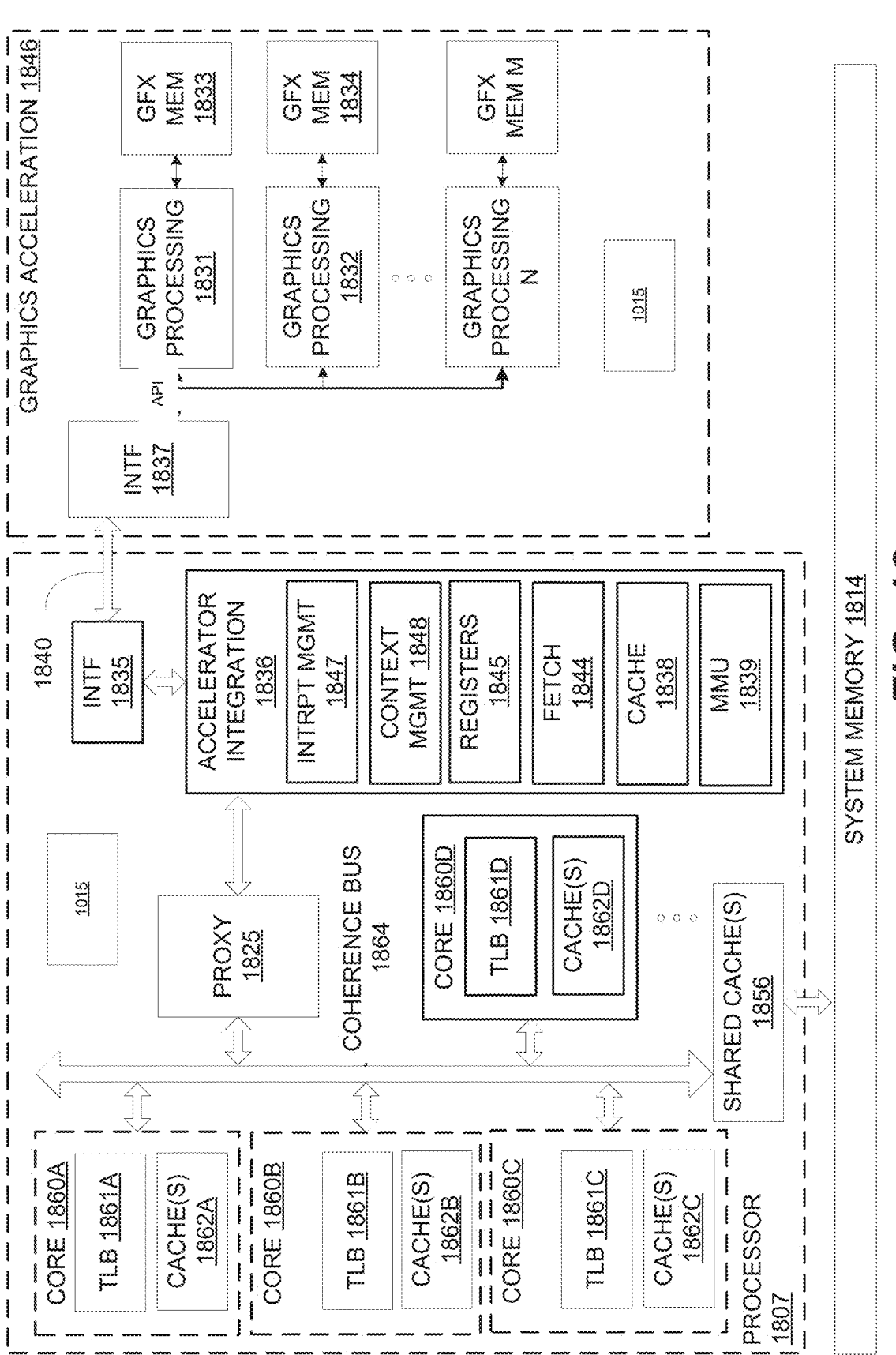
FIG. 18 illustrates a computer system, according to at least one embodiment.

FIG. 18 illustrates another exemplary embodiment in which accelerator integration circuit 1636 is integrated within processor 1607. In at least this embodiment, graphics processing engines 1631-1632, N communicate directly over high-speed link 1640 to accelerator integration circuit 1636 via interface 1637 and interface 1635 (which, again, may be utilize any form of bus or interface protocol). Accelerator integration circuit 1636 may perform same operations as those described with respect to FIG. 17, but potentially at a higher throughput given its close proximity to coherence bus 1664 and caches 1662A-1662D, 1656. At least one embodiment supports different programming models including a dedicated-process programming model (no graphics acceleration module virtualization) and shared programming models (with virtualization), which may include programming models which are controlled by accelerator integration circuit 1636 and programming models which are controlled by graphics acceleration module 1646.

In at least one embodiment, graphics processing engines 1631-1632, N are dedicated to a single application or process under a single operating system. In at least one embodiment, a single application can funnel other application requests to graphics processing engines 1631-1632, N, providing virtualization within a VM/partition.

In at least one embodiment, graphics processing engines 1631-1632, N, may be shared by multiple VM/application partitions. In at least one embodiment, shared models may use a system hypervisor to virtualize graphics processing engines 1631-1632, N to allow access by each operating system. For single-partition systems without a hypervisor, graphics processing engines 1631-1632, N are owned by an operating system. In at least one embodiment, an operating system can virtualize graphics processing engines 1631-1632, N to provide access to each process or application.

In at least one embodiment, graphics acceleration module 1646 or an individual graphics processing engine 1631-1632, N selects a process element using a process handle. In at least one embodiment, process elements are stored in system memory 1614 and are addressable using an effective address to real address translation techniques described herein. In at least one embodiment, a process handle may be an implementation-specific value provided to a host process when registering its context with graphics processing engine 1631-1632, N (that is, calling system software to add a process element to a process element linked list). In at least one embodiment, a lower 16-bits of a process handle may be an offset of a process element within a process element linked list.

Figure 19:
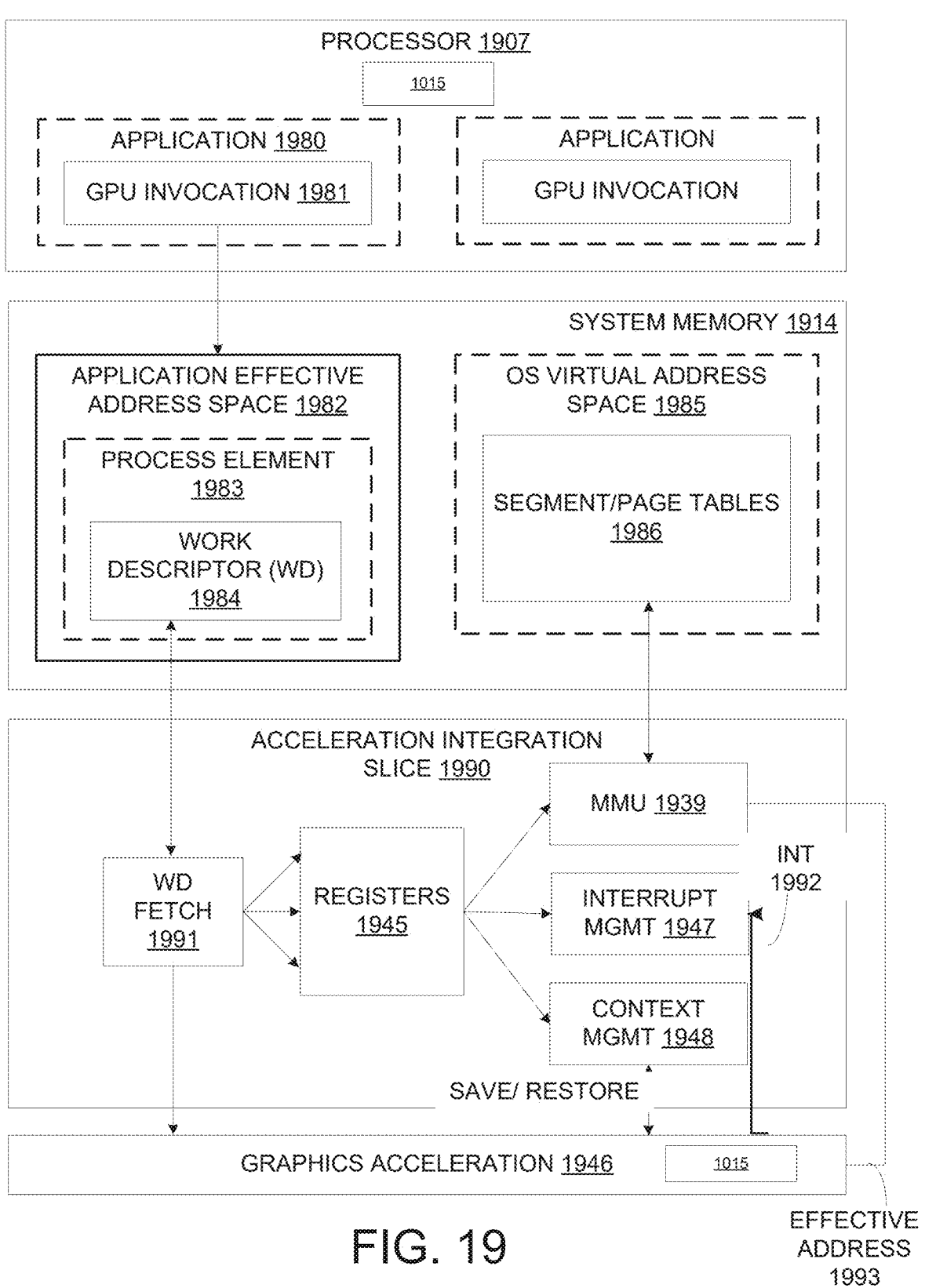
FIG. 19 illustrates a computer system, according to at least one embodiment.

FIG. 19 illustrates an exemplary accelerator integration slice 1690. As used herein, a "slice" comprises a specified portion of processing resources of accelerator integration circuit 1636. Application effective address space 1682 within system memory 1614 stores process elements 1683. In one embodiment, process elements 1683 are stored in response to GPU invocations 1681 from applications 1680 executed on processor 1607. A process element 1683 contains process state for corresponding application 1680. A work descriptor (WD) 1684 contained in process element 1683 can be a single job requested by an application or may contain a pointer to a queue of jobs. In at least one embodiment, WD 1684 is a pointer to a job request queue in an application's address space 1682.

Graphics acceleration module 1646 and/or individual graphics processing engines 1631-1632, N can be shared by all or a subset of processes in a system. In at least one embodiment, an infrastructure for setting up process state and sending a WD 1684 to a graphics acceleration module 1646 to start a job in a virtualized environment may be included.

In at least one embodiment, a dedicated-process programming model is implementation-specific. In this model, a single process owns graphics acceleration module 1646 or an individual graphics processing engine 1631. Because graphics acceleration module 1646 is owned by a single process, a hypervisor initializes accelerator integration circuit 1636 for an owning partition and an operating system initializes accelerator integration circuit 1636 for an owning process when graphics acceleration module 1646 is assigned.

In operation, a WD fetch unit 1691 in accelerator integration slice 1690 fetches next WD 1684 which includes an indication of work to be done by one or more graphics processing engines of graphics acceleration module 1646. Data from WD 1684 may be stored in registers 1645 and used by MMU 1639, interrupt management circuit 1647, and/or context management circuit 1648 as illustrated. For example, one embodiment of MMU 1639 includes segment/page walk circuitry for accessing segment/page tables 1686 within OS virtual address space 1685. Interrupt management circuit 1647 may process interrupt events 1692 received from graphics acceleration module 1646. When performing graphics operations, an effective address 1693 generated by a graphics processing engine 1631-1632, N is translated to a real address by MMU 1639.

In one embodiment, a same set of registers 1645 are duplicated for each graphics processing engine 1631-1632, N and/or graphics acceleration module 1646 and may be initialized by a hypervisor or operating system. Each of these duplicated registers may be included in an accelerator integration slice 1690. Exemplary registers that may be initialized by a hypervisor are shown in Table 1.

TABLE 1

| Hypervisor Initialized Registers |
| --- |
| 1  Slice Control Register |
| 2  Real Address (RA) Scheduled Processes Area Pointer |
| 3  Authority Mask Override Register |
| 4  Interrupt Vector Table Entry Offset |
| 5  Interrupt Vector Table Entry Limit |
| 6  State Register |
| 7  Logical Partition ID |
| 8  Real address (RA) Hypervisor Accelerator Utilization Record Pointer |
| 9  Storage Description Register |

Exemplary registers that may be initialized by an operating system are shown in Table 2.

TABLE 2

| Operating System Initialized Registers |
| --- |
| 1  Process and Thread Identification |
| 2  Effective Address (EA) Context Save/Restore Pointer |
| 3  Virtual Address (VA) Accelerator Utilization Record Pointer |
| 4  Virtual Address (VA) Storage Segment Table Pointer |
| 5  Authority Mask |
| 6  Work descriptor |

In one embodiment, each WD 1684 is specific to a particular graphics acceleration module 1646 and/or graphics processing engines 1631-1632, N. It contains all information required by a graphics processing engine 1631-1632, N to do work or it can be a pointer to a memory location where an application has set up a command queue of work to be completed.

Figure 20:
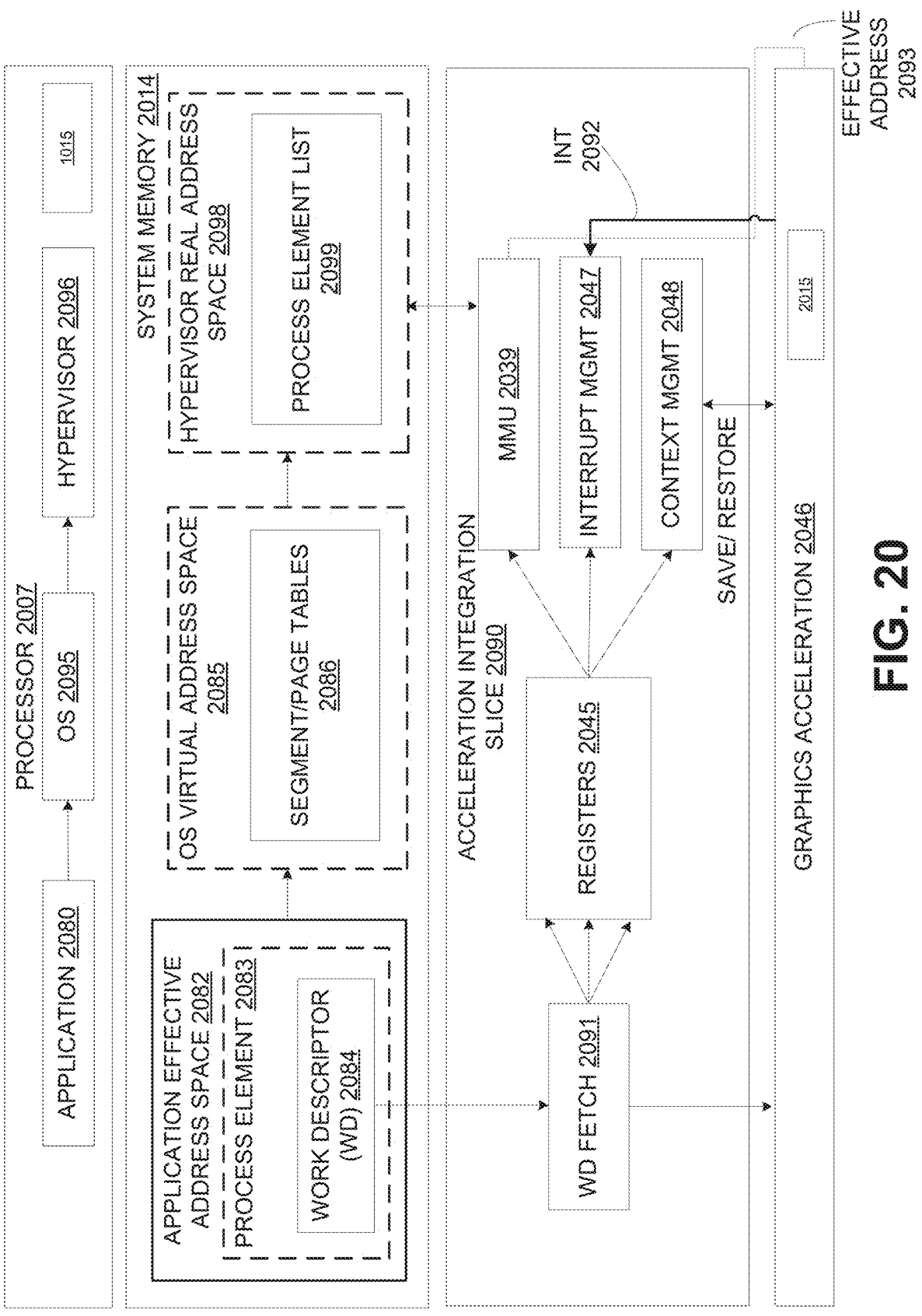
FIGS. 20 and 21 illustrate a shared programming model, according to at least one embodiment.

FIG. 20 illustrates additional details for one exemplary embodiment of a shared model. This embodiment includes a hypervisor real address space 1698 in which a process element list 1699 is stored. Hypervisor real address space 1698 is accessible via a hypervisor 1696 which virtualizes graphics acceleration module engines for operating system 1695.

In at least one embodiment, shared programming models allow for all or a subset of processes from all or a subset of partitions in a system to use a graphics acceleration module 1646. There are two programming models where graphics acceleration module 1646 is shared by multiple processes and partitions: time-sliced shared and graphics-directed shared.

In this model, system hypervisor 1696 owns graphics acceleration module 1646 and makes its function available to all operating systems 1695. For a graphics acceleration module 1646 to support virtualization by system hypervisor 1696, graphics acceleration module 1646 may adhere to the following: 1) An application's job request must be autonomous (that is, state does not need to be maintained between jobs), or graphics acceleration module 1646 must provide a context save and restore mechanism. 2) An application's job request is guaranteed by graphics acceleration module 1646 to complete in a specified amount of time, including any translation faults, or graphics acceleration module 1646 provides an ability to preempt processing of a job. 3) Graphics acceleration module 1646 must be guaranteed fairness between processes when operating in a directed shared programming model.

In at least one embodiment, application 1680 is required to make an operating system 1695 system call with a graphics acceleration module 1646 type, a work descriptor (WD), an authority mask register (AMR) value, and a context save/restore area pointer (CSRP). In at least one embodiment, graphics acceleration module 1646 type describes a targeted acceleration function for a system call. In at least one embodiment, graphics acceleration module 1646 type may be a system-specific value. In at least one embodiment, WD is formatted specifically for graphics acceleration module 1646 and can be in a form of a graphics acceleration module 1646 command, an effective address pointer to a user-defined structure, an effective address pointer to a queue of commands, or any other data structure to describe work to be done by graphics acceleration module 1646. In one embodiment, an AMR value is an AMR state to use for a current process. In at least one embodiment, a value passed to an operating system is similar to an application setting an AMR. If accelerator integration circuit 1636 and graphics acceleration module 1646 implementations do not support a User Authority Mask Override Register (UAMOR), an operating system may apply a current UAMOR value to an AMR value before passing an AMR in a hypervisor call. Hypervisor 1696 may optionally apply a current Authority Mask Override Register (AMOR) value before placing an AMR into process element 1683. In at least one embodiment, CSRP is one of registers 1645 containing an effective address of an area in an application's effective address space 1682 for graphics acceleration module 1646 to save and restore context state. This pointer is optional if no state is required to be saved between jobs or when a job is preempted. In at least one embodiment, context save/restore area may be pinned system memory.

Upon receiving a system call, operating system 1695 may verify that application 1680 has registered and been given authority to use graphics acceleration module 1646. Operating system 1695 then calls hypervisor 1696 with information shown in Table 3.

TABLE 3

OS to Hypervisor Call Parameters

1 A work descriptor (WD)
2 An Authority Mask Register (AMR) value (potentially masked)
3 An effective address (EA) Context Save/Restore Area Pointer (CSRP)
4 A process ID (PID) and optional thread ID (TID)
5 A virtual address (VA) accelerator utilization record pointer (AURP)
6 Virtual address of storage segment table pointer (SSTP)
7 A logical interrupt service number (LISN)

Upon receiving a hypervisor call, hypervisor 1696 verifies that operating system 1695 has registered and been given authority to use graphics acceleration module 1646. Hypervisor 1696 then puts process element 1683 into a process element linked list for a corresponding graphics acceleration module 1646 type. A process element may include information shown in Table 4.

TABLE 4

Process Element Information

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 Virtual address of storage segment table pointer (SSTP)

TABLE 4-continued

Process Element Information

7 A logical interrupt service number (LISN)
8 Interrupt vector table, derived from hypervisor call parameters
9 A state register (SR) value
10 A logical partition ID (LPID)
11 A real address (RA) hypervisor accelerator utilization record pointer
12 Storage Descriptor Register (SDR)

In at least one embodiment, hypervisor initializes a plurality of accelerator integration slice 1690 registers 1645.

Figure 21:
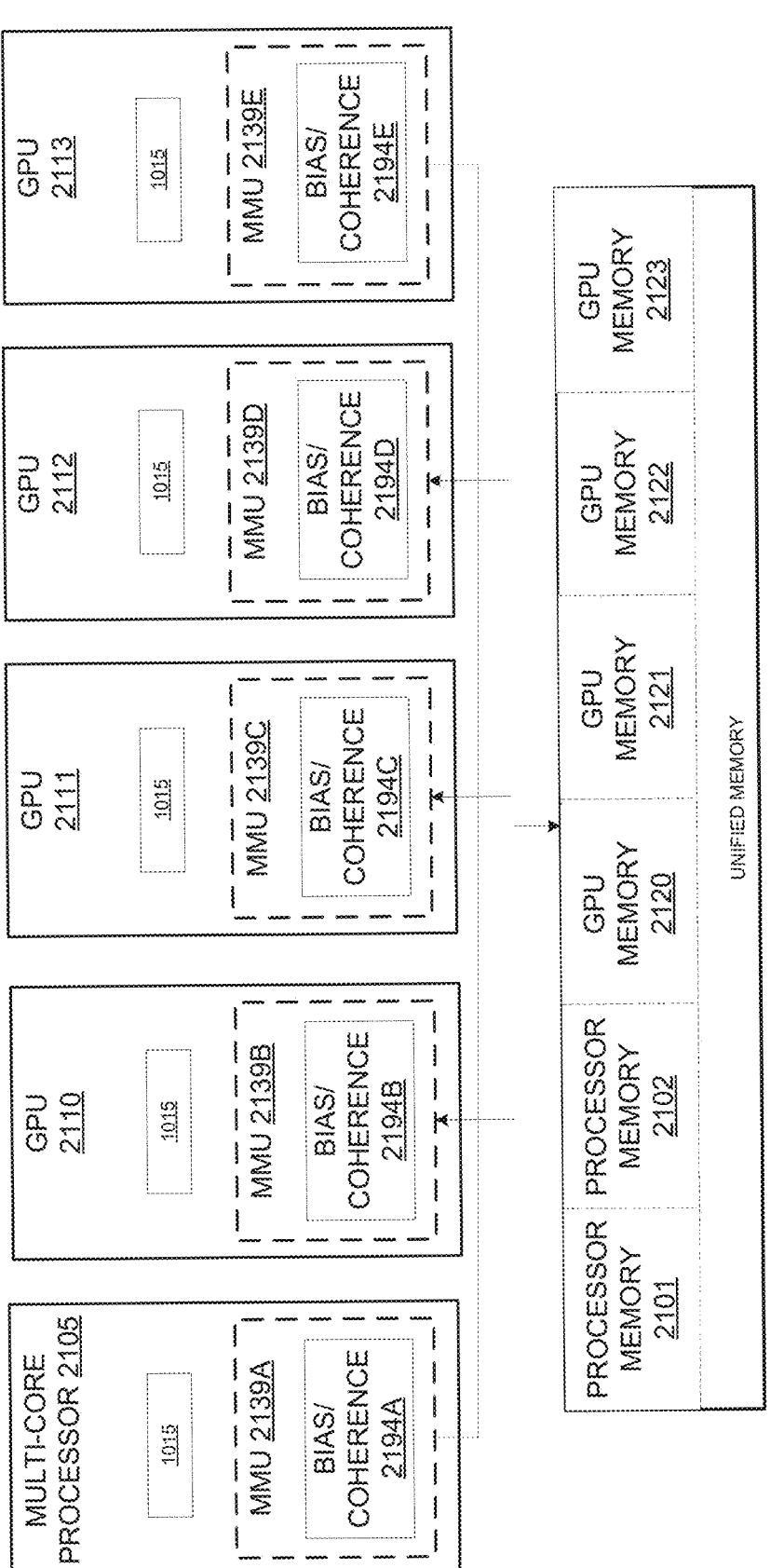

As illustrated in FIG. 21, in at least one embodiment, a unified memory is used, addressable via a common virtual memory address space used to access physical processor memories 1601-1602 and GPU memories 1620-1623. In this implementation, operations executed on GPUs 1610-1613 utilize a same virtual/effective memory address space to access processor memories 1601-1602 and vice versa, thereby simplifying programmability. In one embodiment, a first portion of a virtual/effective address space is allocated to processor memory 1601, a second portion to second processor memory 1602, a third portion to GPU memory 1620, and so on. In at least one embodiment, an entire virtual/effective memory space (sometimes referred to as an effective address space) is thereby distributed across each of processor memories 1601-1602 and GPU memories 1620-1623, allowing any processor or GPU to access any physical memory with a virtual address mapped to that memory.

In one embodiment, bias/coherence management circuitry 1694A-1694E within one or more of MMUs 1639A-1639E ensures cache coherence between caches of one or more host processors (e.g., 1605) and GPUs 1610-1613 and implements biasing techniques indicating physical memories in which certain types of data should be stored. While multiple instances of bias/coherence management circuitry 1694A-1694E are illustrated in FIG. 21, bias/coherence circuitry may be implemented within an MMU of one or more host processors 1605 and/or within accelerator integration circuit 1636.

One embodiment allows GPU-attached memory 1620-1623 to be mapped as part of system memory, and accessed using shared virtual memory (SVM) technology, but without suffering performance drawbacks associated with full system cache coherence. In at least one embodiment, an ability for GPU-attached memory 1620-1623 to be accessed as system memory without onerous cache coherence overhead provides a beneficial operating environment for GPU offload. This arrangement allows host processor 1605 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 1620-1623 without cache coherence overheads can be critical to execution time of an offloaded computation. In cases with substantial streaming write memory traffic, for example, cache coherence overhead can significantly reduce an effective write bandwidth seen by a GPU 1610-1613. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 1620-1623, with or without a bias cache in GPU 1610-1613 (e.g., to cache frequently/recently used entries of a bias table). Alternatively, an entire bias table may be maintained within a GPU.

In at least one embodiment, a bias table entry associated with each access to GPU-attached memory 1620-1623 is accessed prior to actual access to a GPU memory, causing the following operations. First, local requests from GPU 1610-1613 that find their page in GPU bias are forwarded directly to a corresponding GPU memory 1620-1623. Local requests from a GPU that find their page in host bias are forwarded to processor 1605 (e.g., over a high-speed link as discussed above). In one embodiment, requests from processor 1605 that find a requested page in host processor bias complete a request like a normal memory read. Alternatively, requests directed to a GPU-biased page may be forwarded to GPU 1610-1613. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 1605 bias to GPU bias, but is not for an opposite transition.

In one embodiment, cache coherency is maintained by temporarily rendering GPU-biased pages uncacheable by host processor 1605. To access these pages, processor 1605 may request access from GPU 1610 which may or may not grant access right away. Thus, to reduce communication between processor 1605 and GPU 1610 it is beneficial to ensure that GPU-biased pages are those which are required by a GPU but not host processor 1605 and vice versa.

Inference and/or training logic 1015 are used to perform one or more embodiments. Details regarding the inference and/or training logic 1015 are provided below in conjunction with FIGS. 9 and/or 10. In at least one embodiment inference and/or training logic 1015 are used for segmentation based on a set of extreme points.

Figure 22:
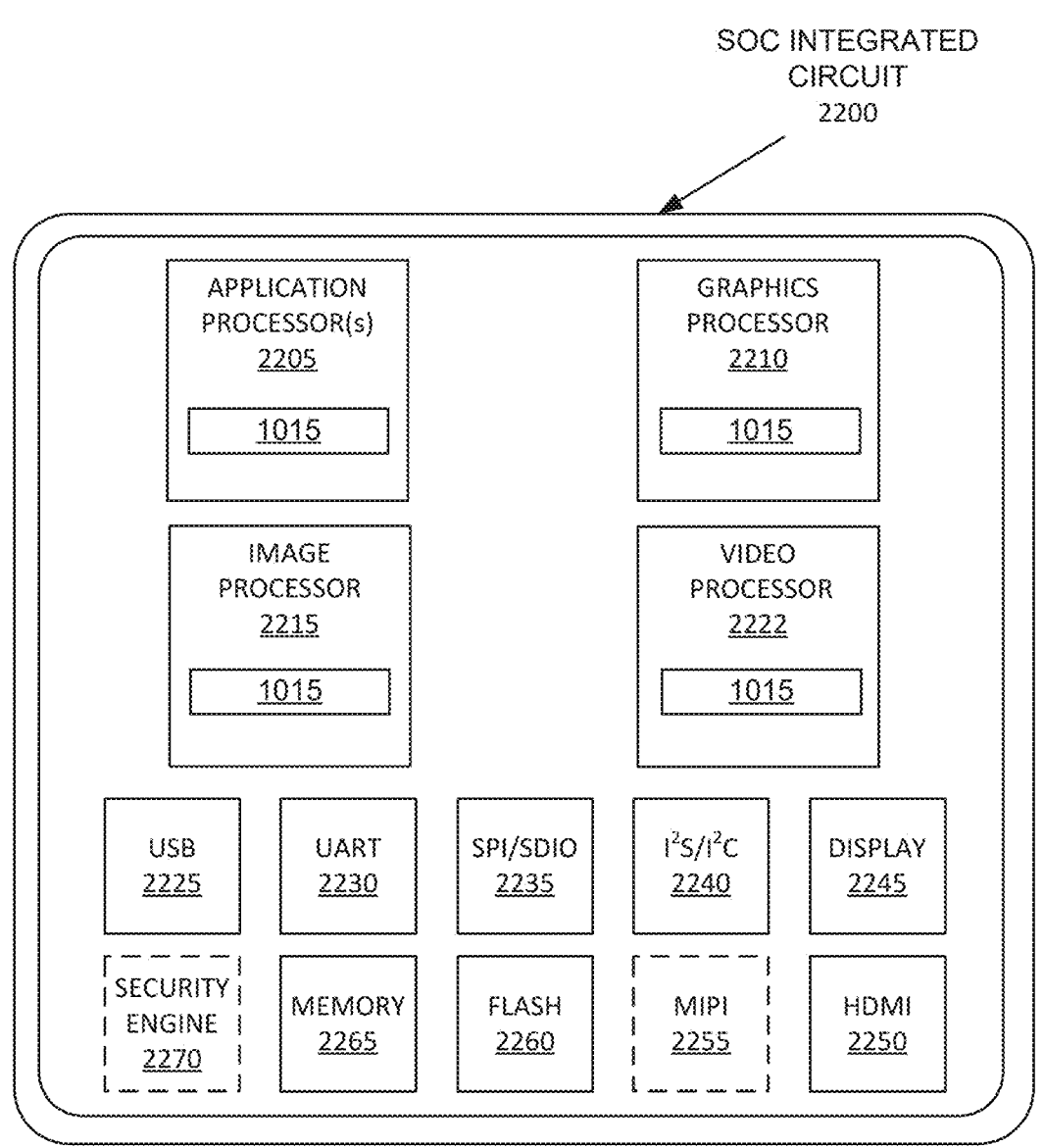
FIG. 22 illustrates exemplary integrated circuits and associated graphics processors, according to at least one embodiment.

FIG. 22 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 22 is a block diagram illustrating an exemplary system on a chip integrated circuit 2200 that may be fabricated using one or more IP cores, according to at least one embodiment. In at least one embodiment, integrated circuit 2200 includes one or more application processor(s) 2205 (e.g., CPUs), at least one graphics processor 2210, and may additionally include an image processor 2215 and/or a video processor 2220, any of which may be a modular IP core. In at least one embodiment, integrated circuit 2200 core. In at least one embodiment, integrated circuit 2200 includes peripheral or bus logic including a USB controller

2225, UART controller 2230, an SPI/SDIO controller 2235, and an I²S/I²C controller 2240. In at least one embodiment, integrated circuit 2200 can include a display device 2245 coupled to one or more of a high-definition multimedia interface (HDMI) controller 2250 and a mobile industry processor interface (MIPI) display interface 2255. In at least one embodiment, storage may be provided by a flash memory subsystem 2260 including flash memory and a flash memory controller. In at least one embodiment, memory interface may be provided via a memory controller 2265 for access to SDRAM or SRAM memory devices. In at least one embodiment, some integrated circuits additionally include an embedded security engine 2270.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in integrated circuit 2200 for inferencing or predicting operations based, at least in part, on weight parameters calculated using neural network training operations, neural network functions and/or architectures, or neural network use cases described herein. In at least one embodiment inference and/or training logic 1015 are used for segmentation based on a set of extreme points.

Figure 23:
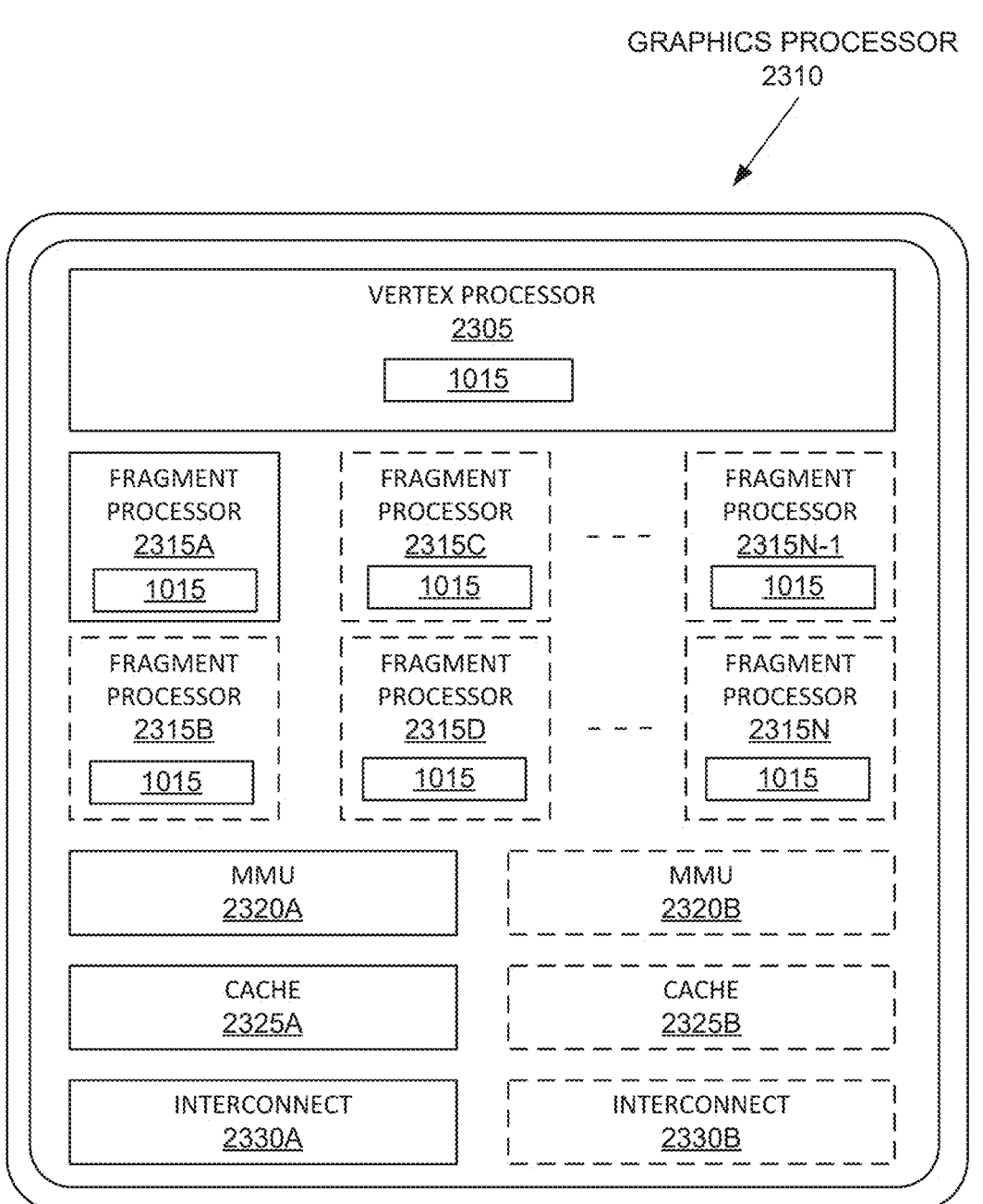
FIGS. 23-24 illustrate exemplary integrated circuits and associated graphics processors, according to at least one embodiment.
Figure 24:
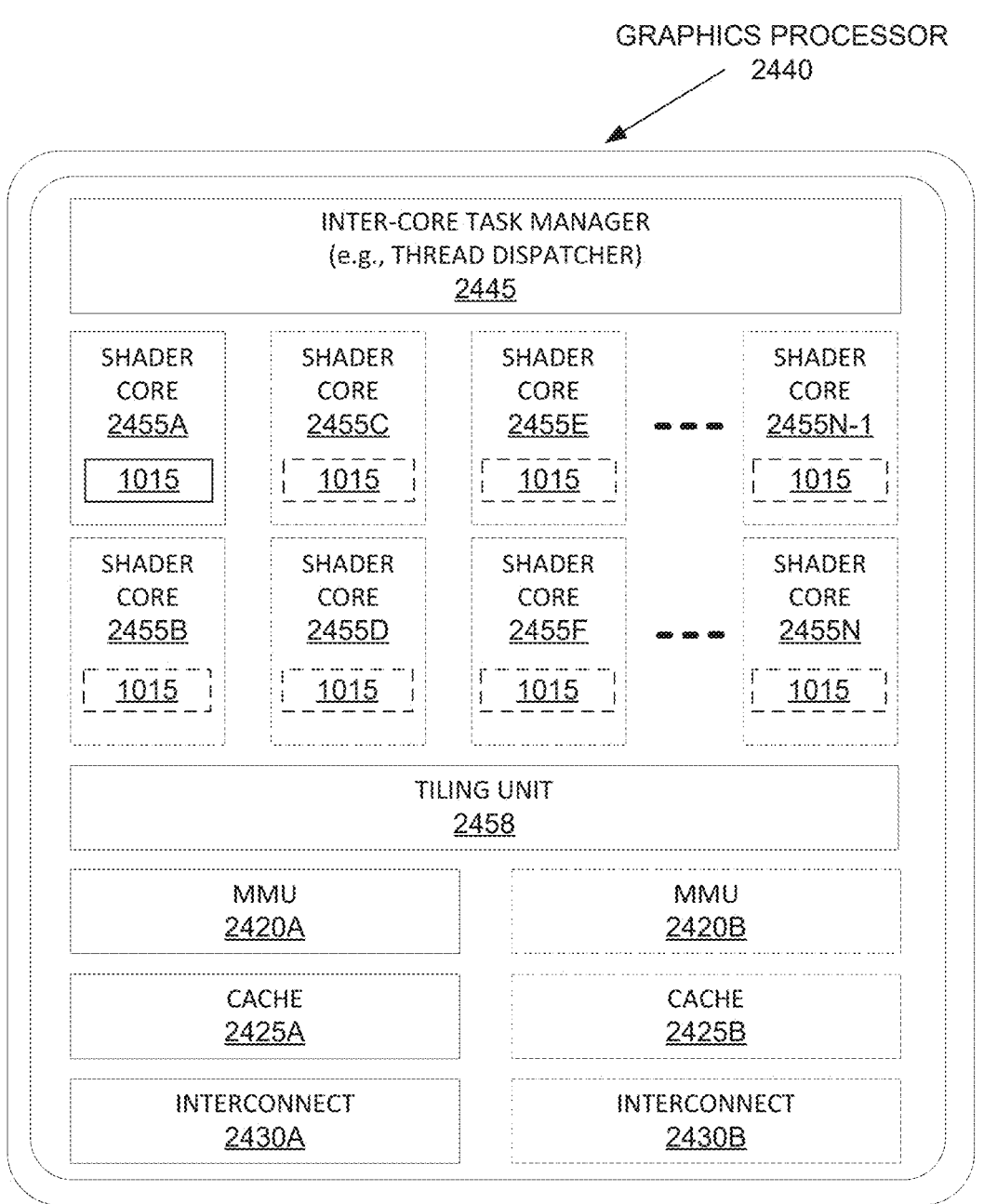

FIGS. 23-24 illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 23-24 are block diagrams illustrating exemplary graphics processors for use within an SoC, according to embodiments described herein. FIG. 23 illustrates an exemplary graphics processor 2310 of a system on a chip integrated circuit that may be fabricated using one or more IP cores, according to at least one embodiment. FIG. 24 illustrates an additional exemplary graphics processor 2340 of a system on a chip integrated circuit that may be fabricated using one or more IP cores, according to at least one embodiment. In at least one embodiment, graphics processor 2310 of FIG. 23 is a low power graphics processor core. In at least one embodiment, graphics processor 2340 of FIG. 24 is a higher performance graphics processor core. In at least one embodiment, each of graphics processors 2310, 2340 can be variants of graphics processor 2210 of FIG. 22.

In at least one embodiment, graphics processor 2310 includes a vertex processor 2305 and one or more fragment processor(s) 2315A-2315N (e.g., 2315A, 2315B, 2315C, 2315D, through 2315N-1, and 2315N). In at least one embodiment, graphics processor 2310 can execute different shader programs via separate logic, such that vertex processor 2305 is optimized to execute operations for vertex shader programs, while one or more fragment processor(s) 2315A-2315N execute fragment (e.g., pixel) shading operations for fragment or pixel shader programs. In at least one embodiment, vertex processor 2305 performs a vertex processing stage of a 3D graphics pipeline and generates primitives and vertex data. In at least one embodiment, fragment processor(s) 2315A-2315N use primitive and vertex data generated by vertex processor 2305 to produce a framebuffer that is displayed on a display device. In at least one embodiment, fragment processor(s) 2315A-2315N are optimized to execute fragment shader programs as provided for in an OpenGL API, which may be used to perform similar operations as a pixel shader program as provided for in a Direct 3D API.

In at least one embodiment, graphics processor 2310 additionally includes one or more memory management units (MMUs) 2320A-2320B, cache(s) 2325A-2325B, and circuit interconnect(s) 2330A-2330B. In at least one embodiment, one or more MMU(s) 2320A-2320B provide for virtual to physical address mapping for graphics processor 2310, including for vertex processor 2305 and/or fragment processor(s) 2315A-2315N, which may reference vertex or image/texture data stored in memory, in addition to vertex or image/texture data stored in one or more cache(s) 2325A-2325B. In at least one embodiment, one or more MMU(s) 2320A-2320B may be synchronized with other MMUs within system, including one or more MMUs associated with one or more application processor(s) 2205, image processors 2215, and/or video processors 2220 of FIG. 22, such that each processor 2205-2220 can participate in a shared or unified virtual memory system. In at least one embodiment, one or more circuit interconnect(s) 2330A-2330B enable graphics processor 2310 to interface with other IP cores within SoC, either via an internal bus of SoC or via a direct connection.

In at least one embodiment, graphics processor 2340 includes one or more MMU(s) 2320A-2320B, cache(s) 2325A-2325B, and circuit interconnect(s) 2330A-2330B of graphics processor 2310 of FIG. 23. In at least one embodiment, graphics processor 2340 includes one or more shader core(s) 2355A-2355N (e.g., 2355A, 2355B, 2355C, 2355D, 2355E, 2355F, through 2355N-1, and 2355N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2340 includes an inter-core task manager 2345, which acts as a thread dispatcher to dispatch execution threads to one or more shader cores 2355A-2355N and a tiling unit 2358 to accelerate tiling operations for tile-based rendering, in which rendering operations for a scene are subdivided in image space, for example to exploit local spatial coherence within a scene or to optimize use of internal caches.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in integrated circuit 23 and/or 24 for inferencing or predicting operations based, at least in part, on weight parameters calculated using neural network training operations, neural network functions and/or architectures, or neural network use cases described herein. In at least one embodiment inference and/or training logic 1015 are used for segmentation based on a set of extreme points.

Figure 25:
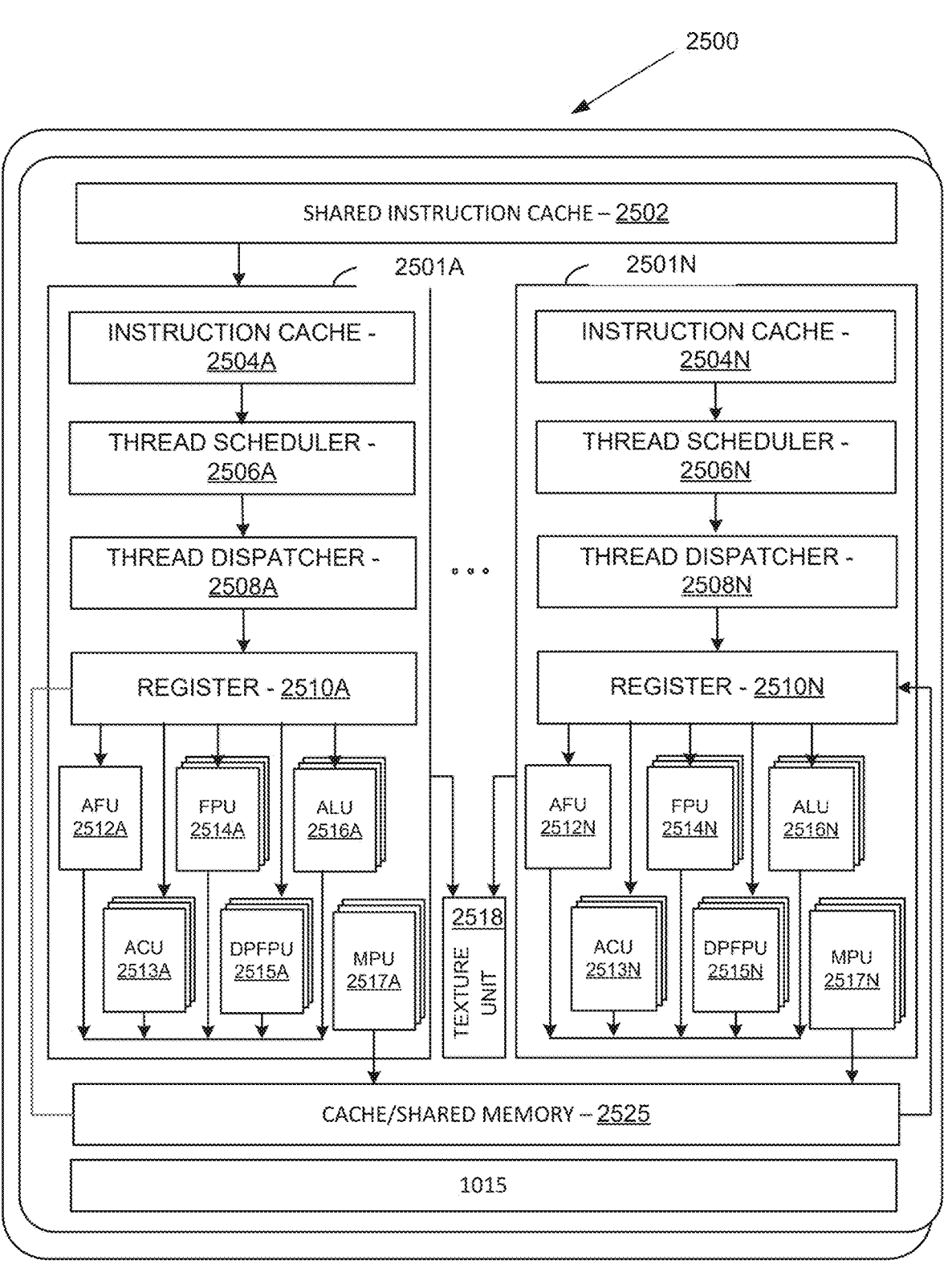
FIGS. 25-26 illustrate additional exemplary graphics processor logic, according to at least one embodiment.
Figure 26:
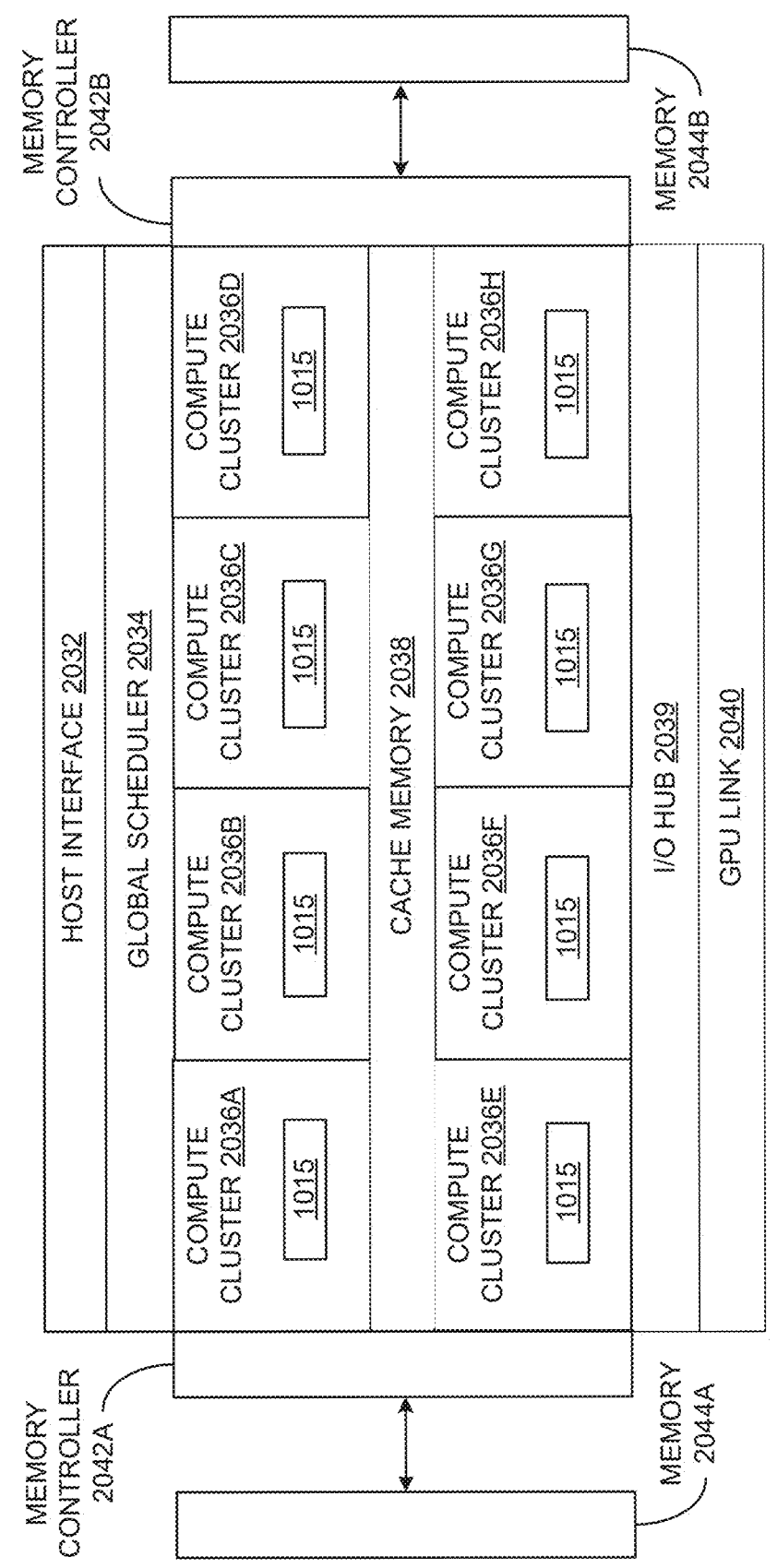

FIGS. 25-26 illustrate additional exemplary graphics processor logic according to embodiments described herein. FIG. 25 illustrates a graphics core 2500 that may be included within graphics processor 2210 of FIG. 22, in at least one embodiment, and may be a unified shader core 2355A-2355N as in FIG. 24 in at least one embodiment. FIG. 26 illustrates a highly-parallel general-purpose graphics processing unit 2530 suitable for deployment on a multi-chip module in at least one embodiment.

In at least one embodiment, graphics core 2500 includes a shared instruction cache 2502, a texture unit 2518, and a cache/shared memory 2520 that are common to execution resources within graphics core 2500. In at least one embodiment, graphics core 2500 can include multiple slices 2501A-2501N or partition for each core, and a graphics processor can include multiple instances of graphics core 2500. Slices 2501A-2501N can include support logic including a local instruction cache 2504A-2504N, a thread scheduler 2506A-2506N, a thread dispatcher 2508A-2508N, and a set of registers 2510A-2510N. In at least one embodiment, slices 2501A-2501N can include a set of additional function units (AFUs 2512A-2512N), floating-point units (FPU 2514A-2514N), integer arithmetic logic units (ALUs 2516-2516N), address computational units (ACU 2513A-2513N), double-precision floating-point units (DPFPU 2515A-2515N), and matrix processing units (MPU 2517A-2517N).

In at least one embodiment, FPUs 2514A-2514N can perform single-precision (32-bit) and half-precision (16-bit) floating point operations, while DPFPUs 2515A-2515N perform double precision (64-bit) floating point operations. In at least one embodiment, ALUs 2516A-2516N can perform variable precision integer operations at 8-bit, 16-bit, and 32-bit precision, and can be configured for mixed precision operations. In at least one embodiment, MPUs 2517A-2517N can also be configured for mixed precision matrix operations, including half-precision floating point and 8-bit integer operations. In at least one embodiment, MPUs 2517A-2517N can perform a variety of matrix operations to accelerate machine learning application frameworks, including enabling support for accelerated general matrix to matrix multiplication (GEMM). In at least one embodiment, AFUs 2512A-2512N can perform additional logic operations not supported by floating-point or integer units, including trigonometric operations (e.g., Sine, Cosine, etc.).

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in graphics core 2500 for inferencing or predicting operations based, at least in part, on weight parameters calculated using neural network training operations, neural network functions and/or architectures, or neural network use cases described herein. In at least one embodiment inference and/or training logic 1015 are used for segmentation based on a set of extreme points.

FIG. 26 illustrates a general-purpose processing unit (GPGPU) 2530 that can be configured to enable highly-parallel compute operations to be performed by an array of graphics processing units, in at least one embodiment. In at least one embodiment, GPGPU 2530 can be linked directly to other instances of GPGPU 2530 to create a multi-GPU cluster to improve training speed for deep neural networks. In at least one embodiment, GPGPU 2530 includes a host interface 2532 to enable a connection with a host processor. In at least one embodiment, host interface 2532 is a PCI Express interface. In at least one embodiment, host interface 2532 can be a vendor specific communications interface or communications fabric. In at least one embodiment, GPGPU 2530 receives commands from a host processor and uses a global scheduler 2534 to distribute execution threads associated with those commands to a set of compute clusters 2536A-2536H. In at least one embodiment, compute clusters 2536A-2536H share a cache memory 2538. In at least one embodiment, cache memory 2538 can serve as a higher-level cache for cache memories within compute clusters 2536A-2536H.

In at least one embodiment, GPGPU 2530 includes memory 2544A-2544B coupled with compute clusters 2536A-2536H via a set of memory controllers 2542A-2542B. In at least one embodiment, memory 2544A-2544B can include various types of memory devices including dynamic random access memory (DRAM) or graphics random access memory, such as synchronous graphics random access memory (SGRAM), including graphics double data rate (GDDR) memory.

In at least one embodiment, compute clusters 2536A-2536H each include a set of graphics cores, such as graphics core 2500 of FIG. 25, which can include multiple types of integer and floating point logic units that can perform computational operations at a range of precisions including suited for machine learning computations. For example, in at least one embodiment, at least a subset of floating point units in each of compute clusters 2536A-2536H can be configured to perform 16-bit or 32-bit floating point operations, while a different subset of floating point units can be configured to perform 64-bit floating point operations.

In at least one embodiment, multiple instances of GPGPU 2530 can be configured to operate as a compute cluster. In at least one embodiment, communication used by compute clusters 2536A-2536H for synchronization and data exchange varies across embodiments. In at least one embodiment, multiple instances of GPGPU 2530 communicate over host interface 2532. In at least one embodiment, GPGPU 2530 includes an I/O hub 2539 that couples GPGPU 2530 with a GPU link 2540 that enables a direct connection to other instances of GPGPU 2530. In at least one embodiment, GPU link 2540 is coupled to a dedicated GPU-to-GPU bridge that enables communication and synchronization between multiple instances of GPGPU 2530. In at least one embodiment, GPU link 2540 couples with a high speed interconnect to transmit and receive data to other GPGPUs or parallel processors. In at least one embodiment, multiple instances of GPGPU 2530 are located in separate data processing systems and communicate via a network device that is accessible via host interface 2532. In at least one embodiment GPU, link 2540 can be configured to enable a connection to a host processor in addition to or as an alternative to host interface 2532.

In at least one embodiment, GPGPU 2530 can be configured to train neural networks. In at least one embodiment, GPGPU 2530 can be used within a inferencing platform. In at least one embodiment, in which GPGPU 2530 is used for inferencing, GPGPU may include fewer compute clusters 2536A-2536H relative to when GPGPU is used for training a neural network. In at least one embodiment, memory technology associated with memory 2544A-2544B may differ between inferencing and training configurations, with higher bandwidth memory technologies devoted to training configurations. In at least one embodiment, inferencing configuration of GPGPU 2530 can support inferencing specific instructions. For example, in at least one embodiment, an inferencing configuration can provide support for one or more 8-bit integer dot product instructions, which may be used during inferencing operations for deployed neural networks.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in GPGPU 2530 for inferencing or predicting operations based, at least in part, on weight parameters calculated using neural network training operations, neural network functions and/or architectures, or neural network use cases described herein. In at least one embodiment, inference and/or training logic 1015 are used to perform segmentation based on extreme points.

Figure 27:
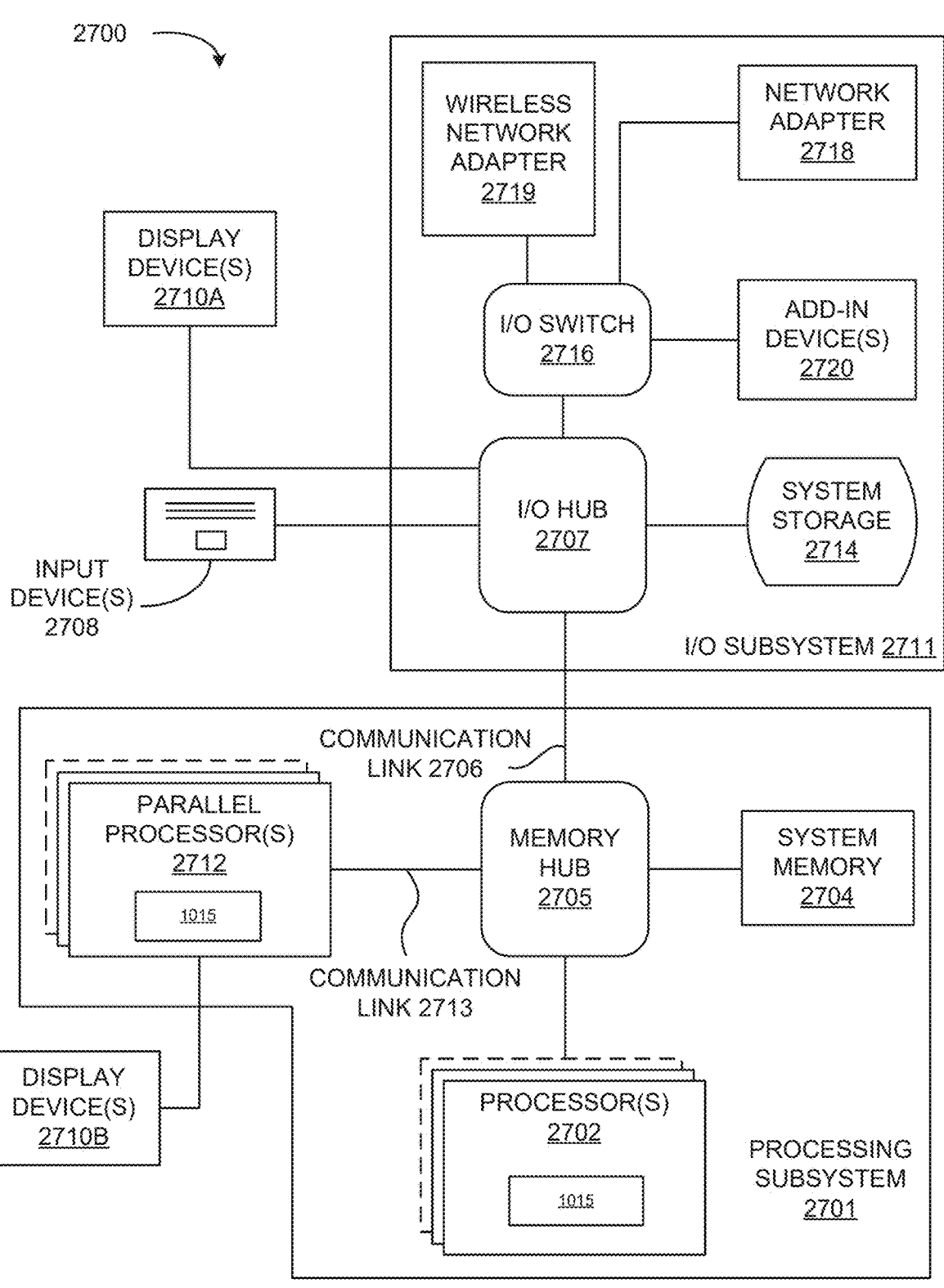
FIG. 27 illustrates a computer system, according to at least one embodiment.

FIG. 27 is a block diagram illustrating a computing system 2700 according to at least one embodiment. In at least one embodiment, computing system 2700 includes a processing subsystem 2701 having one or more processor(s) 2702 and a system memory 2704 communicating via an interconnection path that may include a memory hub 2705. In at least one embodiment, memory hub 2705 may be a separate component within a chipset component or may be integrated within one or more processor(s) 2702. In at least one embodiment, memory hub 2705 couples with an I/O subsystem 2711 via a communication link 2706. In at least one embodiment, I/O subsystem 2711 includes an I/O hub 2707 that can enable computing system 2700 to receive input from one or more input device(s) 2708. In at least one embodiment, I/O hub 2707 can enable a display controller, which may be included in one or more processor(s) 2702, to provide outputs to one or more display device(s) 2710A. In at least one embodiment, one or more display device(s) 2710A coupled with I/O hub 2707 can include a local, internal, or embedded display device.

In at least one embodiment, processing subsystem 2701 includes one or more parallel processor(s) 2712 coupled to memory hub 2705 via a bus or other communication link 2713. In at least one embodiment, communication link 2713 may be one of any number of standards based communication link technologies or protocols, such as, but not limited to PCI Express, or may be a vendor specific communications interface or communications fabric. In at least one embodiment, one or more parallel processor(s) 2712 form a computationally focused parallel or vector processing system that can include a large number of processing cores and/or processing clusters, such as a many integrated core (MIC) processor. In at least one embodiment, one or more parallel processor(s) 2712 form a graphics processing subsystem that can output pixels to one of one or more display device(s) 2710A coupled via I/O Hub 2707. In at least one embodiment, one or more parallel processor(s) 2712 can also include a display controller and display interface (not shown) to enable a direct connection to one or more display device(s) 2710B.

In at least one embodiment, a system storage unit 2714 can connect to I/O hub 2707 to provide a storage mechanism for computing system 2700. In at least one embodiment, an I/O switch 2716 can be used to provide an interface mechanism to enable connections between I/O hub 2707 and other components, such as a network adapter 2718 and/or wireless network adapter 2719 that may be integrated into a platform(s), and various other devices that can be added via one or more add-in device(s) 2720. In at least one embodiment, network adapter 2718 can be an Ethernet adapter or another wired network adapter. In at least one embodiment, wireless network adapter 2719 can include one or more of a Wi-Fi, Bluetooth, near field communication (NFC), or other network device that includes one or more wireless radios.

In at least one embodiment, computing system 2700 can include other components not explicitly shown, including USB or other port connections, optical storage drives, video capture devices, and so on, may also be connected to I/O hub 2707. In at least one embodiment, communication paths interconnecting various components in FIG. 27 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 2712 incorporate circuitry optimized for graphics and video processing, including, for example, video output circuitry, and constitutes a graphics processing unit (GPU). In at least one embodiment, one or more parallel processor(s) 2712 incorporate circuitry optimized for general purpose processing. In at least one embodiment, components of computing system 2700 may be integrated with one or more other system elements on a single integrated circuit. For example, in at least one embodiment, one or more parallel processor(s) 2712, memory hub 2705, processor(s) 2702, and I/O hub 2707 can be integrated into a system on chip (SoC) integrated circuit. In at least one embodiment, components of computing system 2700 can be integrated into a single package to form a system in package (SIP) configuration. In at least one embodiment, at least a portion of components of computing system 2700 can be integrated into a multi-chip module (MCM), which can be interconnected with other multi-chip modules into a modular computing system.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in system FIG. 2700 for inferencing or predicting operations based, at least in part, on weight parameters calculated using neural network training operations, neural network functions and/or architectures, or neural network use cases described herein. Inference and/or training logic 1015 are used to perform inferencing and/or training operations associated with one or more embodiments.

Processors

Figure 28:
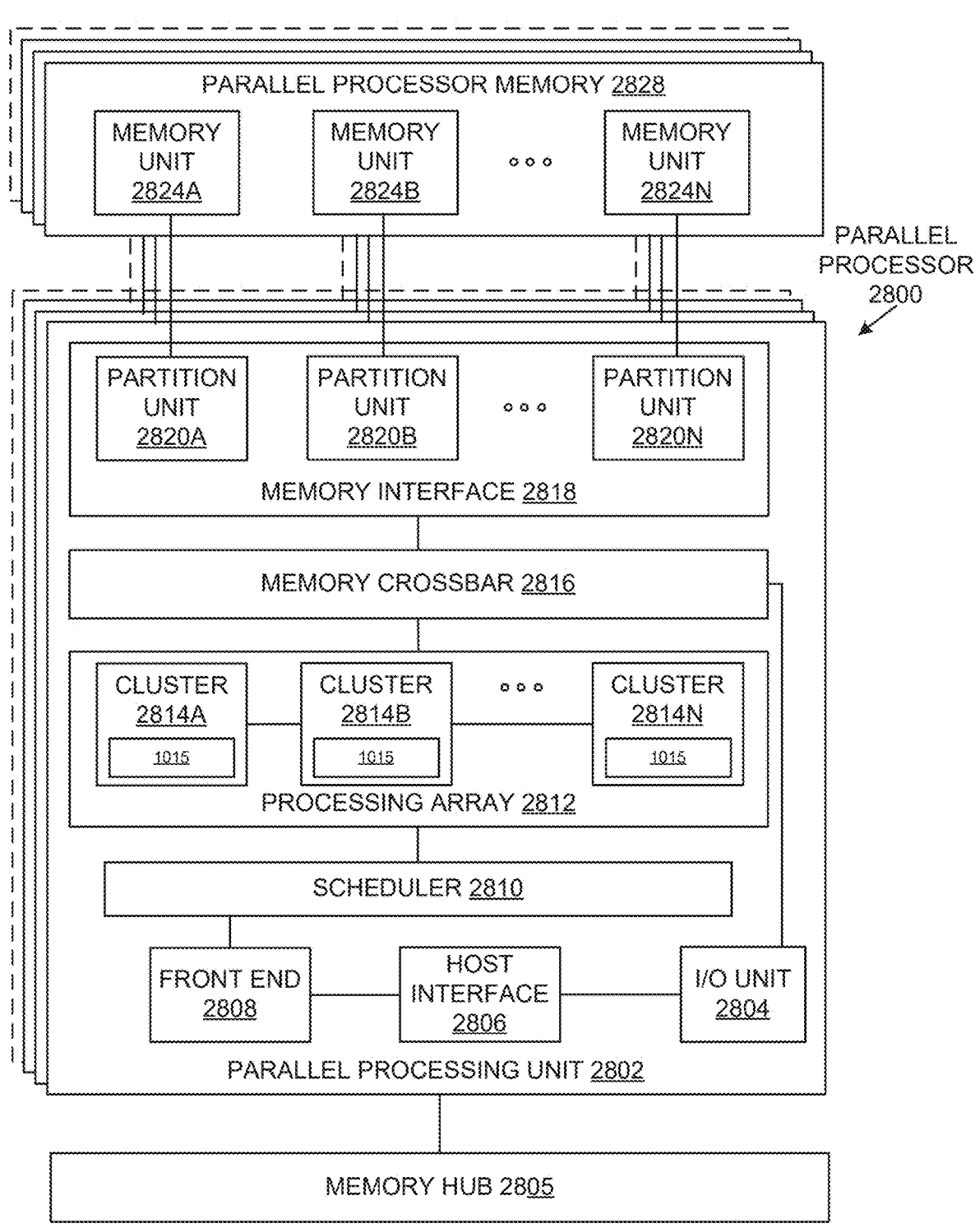
FIG. 28 illustrates a parallel processor, according to at least one embodiment.

FIG. 28 illustrates a parallel processor 2800 according to at least one embodiment. In at least one embodiment, various components of parallel processor 2800 may be implemented using one or more integrated circuit devices, such as programmable processors, application specific integrated circuits (ASICs), or field programmable gate arrays (FPGA). In at least one embodiment, illustrated parallel processor 2800 is a variant of one or more parallel processor(s) 2712 shown in FIG. 27 according to an exemplary embodiment.

In at least one embodiment, parallel processor 2800 includes a parallel processing unit 2802. In at least one embodiment, parallel processing unit 2802 includes an I/O unit 2804 that enables communication with other devices, including other instances of parallel processing unit 2802. In at least one embodiment, I/O unit 2804 may be directly connected to other devices. In at least one embodiment, I/O unit 2804 connects with other devices via use of a hub or switch interface, such as memory hub 2705. In at least one embodiment, connections between memory hub 2705 and I/O unit 2804 form a communication link 2713. In at least one embodiment, I/O unit 2804 connects with a host interface 2806 and a memory crossbar 2816, where host interface 2806 receives commands directed to performing processing operations and memory crossbar 2816 receives commands directed to performing memory operations.

In at least one embodiment, when host interface 2806 receives a command buffer via I/O unit 2804, host interface 2806 can direct work operations to perform those commands to a front end 2808. In at least one embodiment, front end 2808 couples with a scheduler 2810, which is configured to distribute commands or other work items to a processing cluster array 2812. In at least one embodiment, scheduler 2810 ensures that processing cluster array 2812 is properly configured and in a valid state before tasks are distributed to processing cluster array 2812. In at least one embodiment, scheduler 2810 is implemented via firmware logic executing on a microcontroller. In at least one embodiment, microcontroller implemented scheduler 2810 is configurable to perform complex scheduling and work distribution operations at coarse and fine granularity, enabling rapid preemption and context switching of threads executing on processing array 2812. In at least one embodiment, host software can prove workloads for scheduling on processing array 2812 via one of multiple graphics processing doorbells. In at least one embodiment, workloads can then be automatically distributed across processing array 2812 by scheduler 2810 logic within a microcontroller including scheduler 2810.

In at least one embodiment, processing cluster array 2812 can include up to "N" processing clusters (e.g., cluster 2814A, cluster 2814B, through cluster 2814N). In at least one embodiment, each cluster 2814A-2814N of processing cluster array 2812 can execute a large number of concurrent threads. In at least one embodiment, scheduler 2810 can allocate work to clusters 2814A-2814N of processing cluster array 2812 using various scheduling and/or work distribution algorithms, which may vary depending on workload arising for each type of program or computation. In at least one embodiment, scheduling can be handled dynamically by scheduler 2810, or can be assisted in part by compiler logic during compilation of program logic configured for execution by processing cluster array 2812. In at least one embodiment, different clusters 2814A-2814N of processing cluster array 2812 can be allocated for processing different types of programs or for performing different types of computations.

In at least one embodiment, processing cluster array 2812 can be configured to perform various types of parallel processing operations. In at least one embodiment, processing cluster array 2812 is configured to perform general-purpose parallel compute operations. For example, in at least one embodiment, processing cluster array 2812 can include logic to execute processing tasks including filtering of video and/or audio data, performing modeling operations, including physics operations, and performing data transformations.

In at least one embodiment, processing cluster array 2812 is configured to perform parallel graphics processing operations. In at least one embodiment, processing cluster array 2812 can include additional logic to support execution of such graphics processing operations, including, but not limited to texture sampling logic to perform texture operations, as well as tessellation logic and other vertex processing logic. In at least one embodiment, processing cluster array 2812 can be configured to execute graphics processing related shader programs such as, but not limited to vertex shaders, tessellation shaders, geometry shaders, and pixel shaders. In at least one embodiment, parallel processing unit 2802 can transfer data from system memory via I/O unit 2804 for processing. In at least one embodiment, during processing, transferred data can be stored to on-chip memory (e.g., parallel processor memory 2822) during processing, then written back to system memory.

In at least one embodiment, when parallel processing unit 2802 is used to perform graphics processing, scheduler 2810 can be configured to divide a processing workload into approximately equal sized tasks, to better enable distribution of graphics processing operations to multiple clusters 2814A-2814N of processing cluster array 2812. In at least one embodiment, portions of processing cluster array 2812 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2814A-2814N may be stored in buffers to allow intermediate data to be transmitted between clusters 2814A-2814N for further processing.

In at least one embodiment, processing cluster array 2812 can receive processing tasks to be executed via scheduler 2810, which receives commands defining processing tasks from front end 2808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2810 may be configured to fetch indices corresponding to tasks or may receive indices from front end 2808. In at least one embodiment, front end 2808 can be configured to ensure processing cluster array 2812 is configured to a valid state before a workload specified by incoming command buffers (e.g., batch-buffers, push buffers, etc.) is initiated.

In at least one embodiment, each of one or more instances of parallel processing unit 2802 can couple with parallel processor memory 2822. In at least one embodiment, parallel processor memory 2822 can be accessed via memory crossbar 2816, which can receive memory requests from processing cluster array 2812 as well as I/O unit 2804. In at least one embodiment, memory crossbar 2816 can access parallel processor memory 2822 via a memory interface 2818. In at least one embodiment, memory interface 2818 can include multiple partition units (e.g., partition unit 2820A, partition unit 2820B, through partition unit 2820N) that can each couple to a portion (e.g., memory unit) of parallel processor memory 2822. In at least one embodiment, a number of partition units 2820A-2820N is configured to be equal to a number of memory units, such that a first partition unit 2820A has a corresponding first memory unit 2824A, a second partition unit 2820B has a corresponding memory unit 2824B, and a Nth partition unit 2820N has a corresponding Nth memory unit 2824N. In at least one embodiment, a number of partition units 2820A-2820N may not be equal to a number of memory devices.

In at least one embodiment, memory units 2824A-2824N can include various types of memory devices, including dynamic random access memory (DRAM) or graphics random access memory, such as synchronous graphics random access memory (SGRAM), including graphics double data rate (GDDR) memory. In at least one embodiment, memory units 2824A-2824N may also include 3D stacked memory, including but not limited to high bandwidth memory (HBM). In at least one embodiment, render targets, such as frame buffers or texture maps may be stored across memory units 2824A-2824N, allowing partition units 2820A-2820N to write portions of each render target in parallel to efficiently use available bandwidth of parallel processor memory 2822. In at least one embodiment, a local instance of parallel processor memory 2822 may be excluded in favor of a unified memory design that utilizes system memory in conjunction with local cache memory.

In at least one embodiment, any one of clusters 2814A-2814N of processing cluster array 2812 can process data that will be written to any of memory units 2824A-2824N within parallel processor memory 2822. In at least one embodiment, memory crossbar 2816 can be configured to transfer an output of each cluster 2814A-2814N to any partition unit 2820A-2820N or to another cluster 2814A-2814N, which can perform additional processing operations on an output. In at least one embodiment, each cluster 2814A-2814N can communicate with memory interface 2818 through memory crossbar 2816 to read from or write to various external memory devices. In at least one embodiment, memory crossbar 2816 has a connection to memory interface 2818 to communicate with I/O unit 2804, as well as a connection to a local instance of parallel processor memory 2822, enabling processing units within different processing clusters 2814A-2814N to communicate with system memory or other memory that is not local to parallel processing unit 2802. In at least one embodiment, memory crossbar 2816 can use virtual channels to separate traffic streams between clusters 2814A-2814N and partition units 2820A-2820N.

In at least one embodiment, multiple instances of parallel processing unit 2802 can be provided on a single add-in card, or multiple add-in cards can be interconnected. In at least one embodiment, different instances of parallel processing unit 2802 can be configured to inter-operate even if different instances have different numbers of processing cores, different amounts of local parallel processor memory, and/or other configuration differences. For example, in at least one embodiment, some instances of parallel processing unit 2802 can include higher precision floating point units relative to other instances. In at least one embodiment, systems incorporating one or more instances of parallel processing unit 2802 or parallel processor 2800 can be implemented in a variety of configurations and form factors, including but not limited to desktop, laptop, or handheld personal computers, servers, workstations, game consoles, and/or embedded systems.

Figure 29:
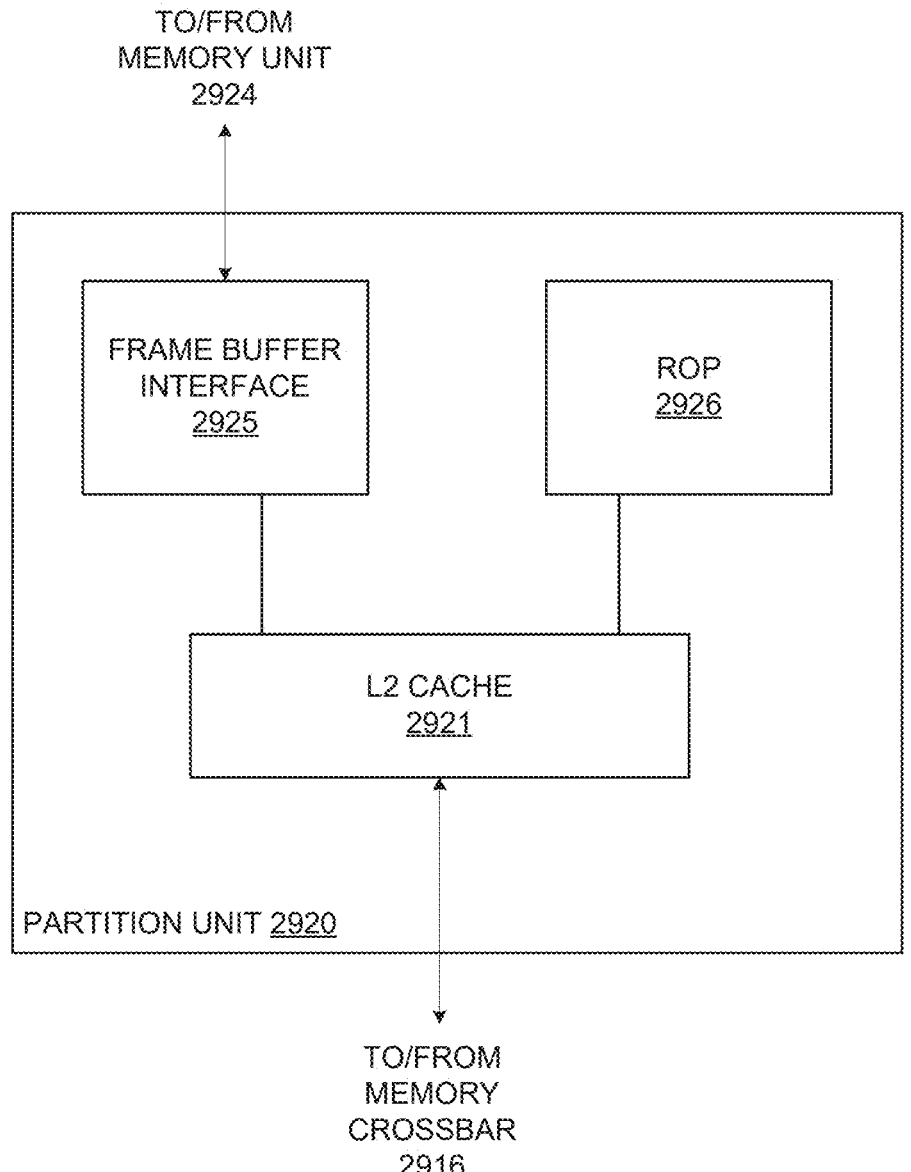
FIG. 29 illustrates a partition unit, according to at least one embodiment.

FIG. 29 is a block diagram of a partition unit 2820 according to at least one embodiment. In at least one embodiment, partition unit 2820 is an instance of one of partition units 2820A-2820N of FIG. 28. In at least one embodiment, partition unit 2820 includes an L2 cache 2821, a frame buffer interface 2825, and a raster operations unit ("ROP") 2826. L2 cache 2821 is a read/write cache that is configured to perform load and store operations received from memory crossbar 2816 and ROP 2826. In at least one embodiment, read misses and urgent write-back requests are output by L2 cache 2821 to frame buffer interface 2825 for processing. In at least one embodiment, updates can also be sent to a frame buffer via frame buffer interface 2825 for processing. In at least one embodiment, frame buffer interface 2825 interfaces with one of memory units in parallel processor memory, such as memory units 2824A-2824N of FIG. 28 (e.g., within parallel processor memory 2822).

In at least one embodiment, ROP 2826 is a processing unit that performs raster operations such as stencil, z test, blending, and so forth. In at least one embodiment, ROP 2826 then outputs processed graphics data that is stored in graphics memory. In at least one embodiment, ROP 2826 includes compression logic to compress depth or color data that is written to memory and decompress depth or color data that is read from memory. In at least one embodiment, compression logic can be lossless compression logic that makes use of one or more of multiple compression algorithms. Compression logic that is performed by ROP 2826 can vary based on statistical characteristics of data to be compressed. For example, in at least one embodiment, delta color compression is performed on depth and color data on a per-tile basis.

In at least one embodiment, ROP 2826 is included within each processing cluster (e.g., cluster 2814A-2814N of FIG. 28) instead of within partition unit 2820. In at least one embodiment, read and write requests for pixel data are transmitted over memory crossbar 2816 instead of pixel fragment data. In at least one embodiment, processed graphics data may be displayed on a display device, such as one of one or more display device(s) 2710 of FIG. 27, routed for further processing by processor(s) 2702, or routed for further processing by one of processing entities within parallel processor 2800 of FIG. 28.

Figure 30:
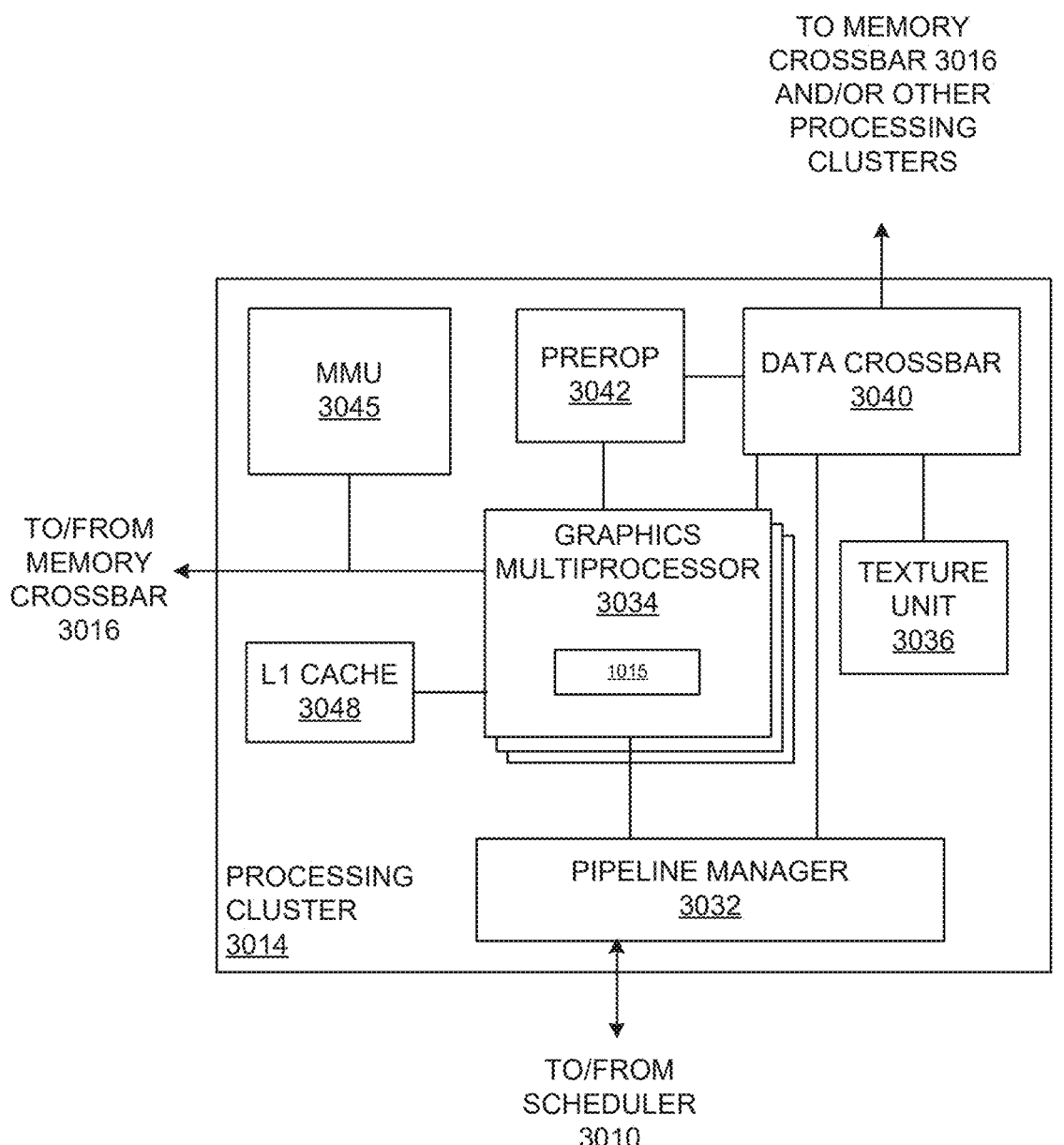
FIG. 30 illustrates a processing cluster, according to at least one embodiment.

FIG. 30 is a block diagram of a processing cluster 2814 within a parallel processing unit according to at least one embodiment. In at least one embodiment, a processing cluster is an instance of one of processing clusters 2814A-2814N of FIG. 28. In at least one embodiment, one of more of processing cluster(s) 2814 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2814 can be controlled via a pipeline manager 2832 that distributes processing tasks to SIMT parallel processors. In at least one embodiment, pipeline manager 2832 receives instructions from scheduler 2810 of FIG. 28 and manages execution of those instructions via a graphics multiprocessor 2834 and/or a texture unit 2836. In at least one embodiment, graphics multiprocessor 2834 is an exemplary instance of a SIMT parallel processor. However, in at least one embodiment, various types of SIMT parallel processors of differing architectures may be included within processing cluster 2814. In at least one embodiment, one or more instances of graphics multiprocessor 2834 can be included within a processing cluster 2814. In at least one embodiment, graphics multiprocessor 2834 can process data and a data crossbar 2840 can be used to distribute processed data to one of multiple possible destinations, including other shader units. In at least one embodiment, pipeline manager 2832 can facilitate distribution of processed data by specifying destinations for processed data to be distributed vis data crossbar 2840.

In at least one embodiment, each graphics multiprocessor 2834 within processing cluster 2814 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2814 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 2834. In at least one embodiment, a thread group may include fewer threads than a number of processing engines within graphics multiprocessor 2834. In at least one embodiment, when a thread group includes fewer threads than a number of processing engines, one or more processing engines may be idle during cycles in which that thread group is being processed. In at least one embodiment, a thread group may also include more threads than a number of processing engines within graphics multiprocessor 2834. In at least one embodiment, when a thread group includes more threads than processing engines within graphics multiprocessor 2834, processing can be performed over consecutive clock cycles. In at least one embodiment, multiple thread groups can be executed concurrently on a graphics multiprocessor 2834.

In at least one embodiment, graphics multiprocessor 2834 includes an internal cache memory to perform load and store operations. In at least one embodiment, graphics multiprocessor 2834 can forego an internal cache and use a cache memory (e.g., L1 cache 2848) within processing cluster 2814. In at least one embodiment, each graphics multiprocessor 2834 also has access to L2 caches within partition units (e.g., partition units 2820A-2820N of FIG. 28) that are shared among all processing clusters 2814 and may be used to transfer data between threads. In at least one embodiment, graphics multiprocessor 2834 may also access off-chip global memory, which can include one or more of local parallel processor memory and/or system memory. In at least one embodiment, any memory external to parallel processing unit 2802 may be used as global memory. In at least one embodiment, processing cluster 2814 includes multiple instances of graphics multiprocessor 2834 can share common instructions and data, which may be stored in L1 cache 2848.

In at least one embodiment, each processing cluster 2814 may include a memory management unit ("MMU") 2845 that is configured to map virtual addresses into physical addresses. In at least one embodiment, one or more instances of MMU 2845 may reside within memory interface 2818 of FIG. 28. In at least one embodiment, MMU 2845 includes a set of page table entries (PTEs) used to map a virtual address to a physical address of a tile and optionally a cache line index. In at least one embodiment, MMU 2845 may include address translation lookaside buffers (TLB) or caches that may reside within graphics multiprocessor 2834 or L1 cache or processing cluster 2814. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 2814 may be configured such that each graphics multiprocessor 2834 is coupled to a texture unit 2836 for performing texture mapping operations, e.g., determining texture sample positions, reading texture data, and filtering texture data. In at least one embodiment, texture data is read from an internal texture L1 cache (not shown) or from an L1 cache within graphics multiprocessor 2834 and is fetched from an L2 cache, local parallel processor memory, or system memory, as needed. In at least one embodiment, each graphics multiprocessor 2834 outputs processed tasks to data crossbar 2840 to provide processed task(s) to another processing cluster 2814 for further processing or to store processed task(s) in an L2 cache, local parallel processor memory, or system memory via memory crossbar 2816. In at least one embodiment, preROP 2842 (pre-raster operations unit) is configured to receive data from graphics multiprocessor 2834, direct data to ROP units, which may be located with partition units as described herein (e.g., partition units 2820A-2820N of FIG. 28). In at least one embodiment, PreROP 2842 unit can perform optimizations for color blending, organize pixel color data, and perform address translations.

Figure 31:
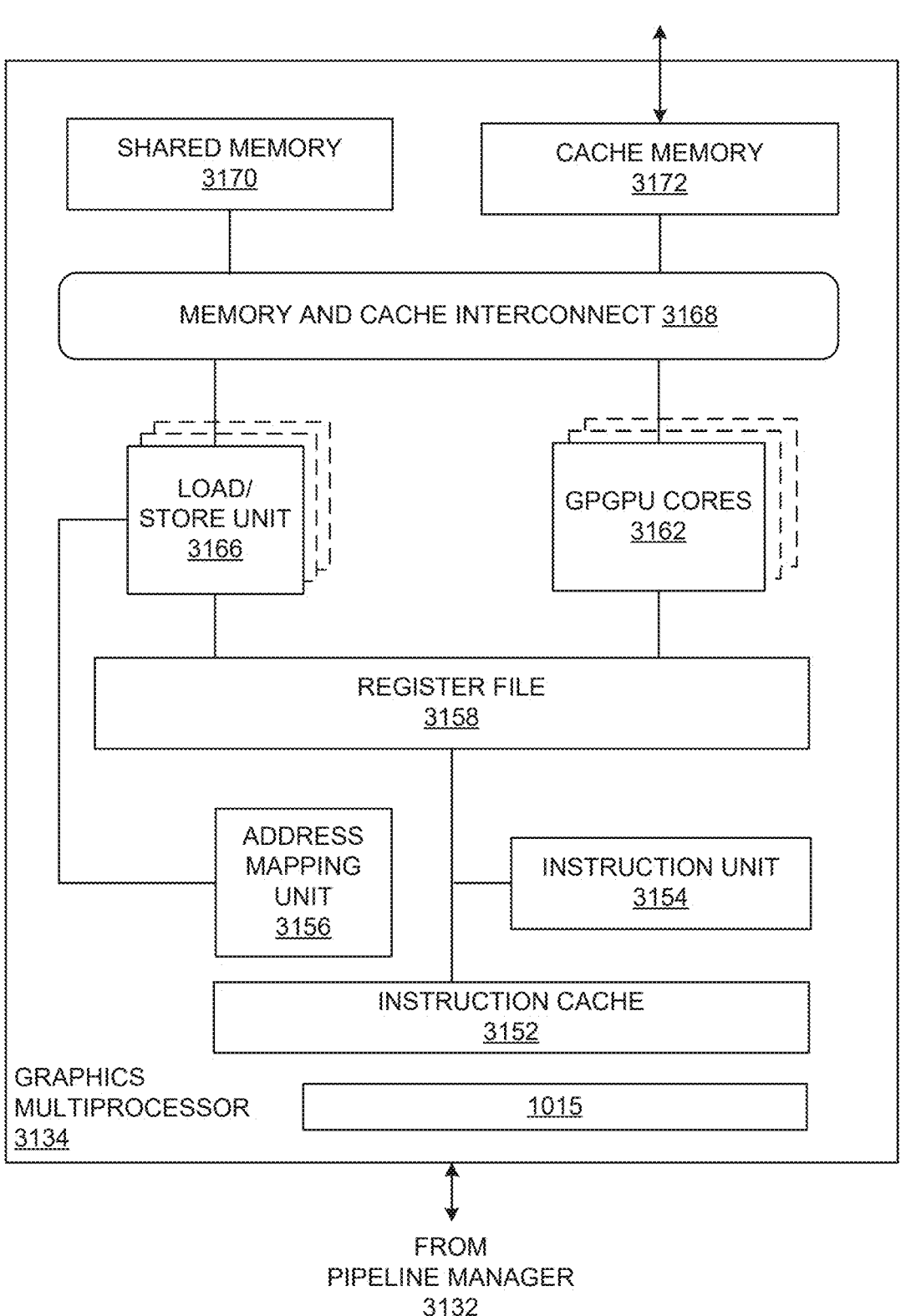
FIG. 31 illustrates a graphics multiprocessor, according to at least one embodiment.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in graphics processing cluster 2814 for inferencing or predicting operations based, at least in part, on weight parameters calculated using neural network training operations, neural network functions and/or architectures, or neural network use cases described herein. Inference and/or training logic 1015 are used to perform inferencing and/or training operations associated with one or more embodiments FIG. 31 shows a graphics multiprocessor 2834 according to at least one embodiment. In at least one embodiment, graphics multiprocessor 2834 couples with pipeline manager 2832 of processing cluster 2814. In at least one embodiment, graphics multiprocessor 2834 has an execution pipeline including but not limited to an instruction cache 2852, an instruction unit 2854, an address mapping unit 2856, a register file 2858, one or more general purpose graphics processing unit (GPGPU) cores 2862, and one or more load/store units 2866. GPGPU core(s) 2862 and load/store unit(s) 2866 are coupled with cache memory 2872 and shared memory 2870 via a memory and cache interconnect 2868.

In at least one embodiment, instruction cache 2852 receives a stream of instructions to execute from pipeline manager 2832. In at least one embodiment, instructions are cached in instruction cache 2852 and dispatched for execution by instruction unit 2854. In at least one embodiment, instruction unit 2854 can dispatch instructions as thread groups (e.g., warps), with each thread group assigned to a different execution unit within GPGPU core(s) 2862. In at least one embodiment, an instruction can access any of a local, shared, or global address space by specifying an address within a unified address space. In at least one embodiment, address mapping unit 2856 can be used to translate addresses in a unified address space into a distinct memory address that can be accessed by load/store unit(s) 2866.

In at least one embodiment, register file 2858 provides a set of registers for functional units of graphics multiprocessor 2834. In at least one embodiment, register file 2858 provides temporary storage for operands connected to data paths of functional units (e.g., GPGPU cores 2862, load/store units 2866) of graphics multiprocessor 2834. In at least one embodiment, register file 2858 is divided between each of functional units such that each functional unit is allocated a dedicated portion of register file 2858. In at least one embodiment, register file 2858 is divided between different warps being executed by graphics multiprocessor 2834.

In at least one embodiment, GPGPU cores 2862 can each include floating point units (FPUs) and/or integer arithmetic logic units (ALUs) that are used to execute instructions of graphics multiprocessor 2834. GPGPU cores 2862 can be similar in architecture or can differ in architecture. In at least one embodiment, a first portion of GPGPU cores 2862 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 2834 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 2862 include SIMD logic capable of performing a single instruction on multiple sets of data. In at least one embodiment GPGPU cores 2862 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2868 is an interconnect network that connects each functional unit of graphics multiprocessor 2834 to register file 2858 and to shared memory 2870. In at least one embodiment, memory and cache interconnect 2868 is a crossbar interconnect that allows load/store unit 2866 to implement load and store operations between shared memory 2870 and register file 2858. In at least one embodiment, register file 2858 can operate at a same frequency as GPGPU cores 2862, thus data transfer between GPGPU cores 2862 and register file 2858 is very low latency. In at least one embodiment, shared memory 2870 can be used to enable communication between threads that execute on functional units within graphics multiprocessor 2834. In at least one embodiment, cache memory 2872 can be used as a data cache for example, to cache texture data communicated between functional units and texture unit 2836. In at least one embodiment, shared memory 2870 can also be used as a program managed cache. In at least one embodiment, threads executing on GPGPU cores 2862 can programmatically store data within shared memory in addition to automatically cached data that is stored within cache memory 2872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in graphics multiprocessor 2834 for inferencing or predicting operations based, at least in part, on weight parameters calculated using neural network training operations, neural network functions and/or architectures, or neural network use cases described herein. In at least one embodiment, inference and/or training logic 1015 are used to perform segmentation based on extreme points.

Figure 32:
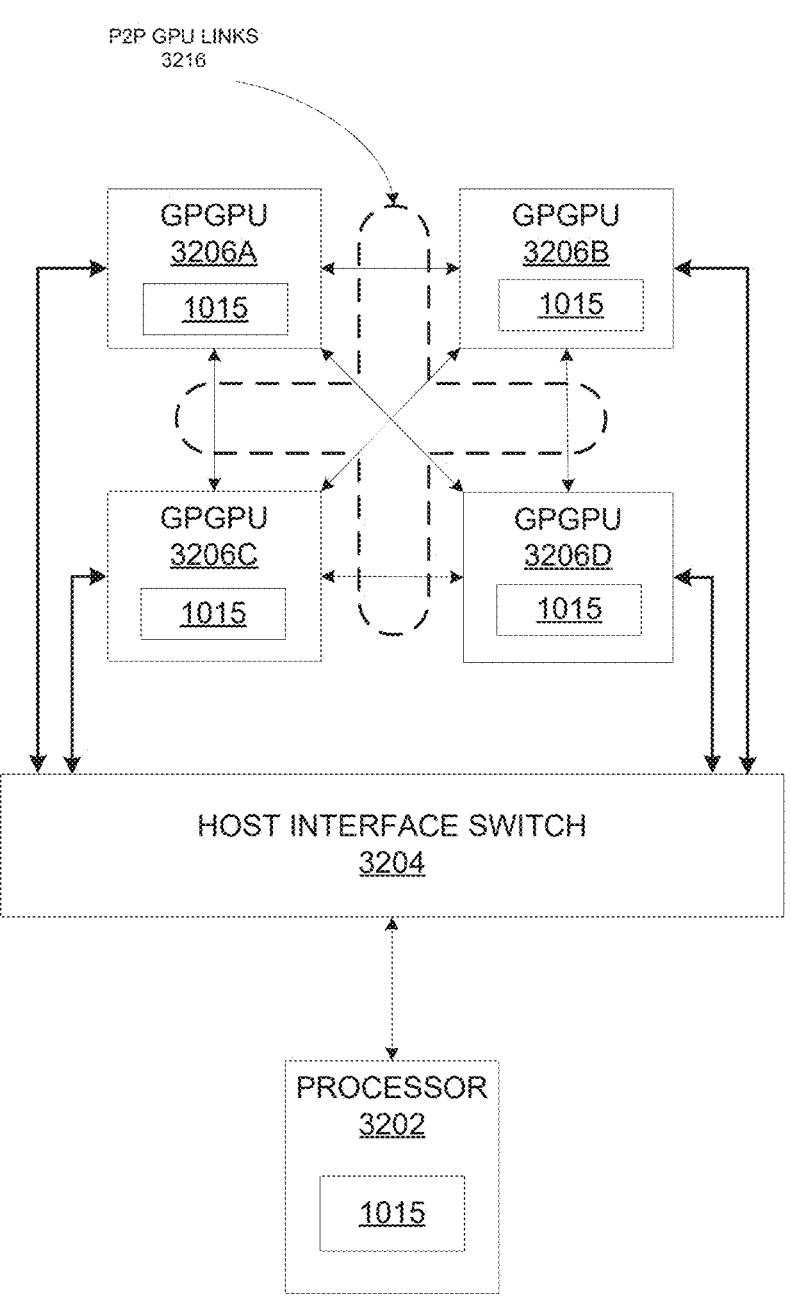
FIG. 32 illustrates a multi-graphics processing unit (GPU) system, according to at least one embodiment.

FIG. 32 illustrates a multi-GPU computing system 3200, according to at least one embodiment. In at least one embodiment, multi-GPU computing system 3200 can include a processor 3202 coupled to multiple general purpose graphics processing units (GPGPUs) 3206A-D via a host interface switch 3204. In at least one embodiment, host interface switch 3204 is a PCI express switch device that couples processor 3202 to a PCI express bus over which processor 3202 can communicate with GPGPUs 3206A-D. GPGPUs 3206A-D can interconnect via a set of high-speed point to point GPU to GPU links 3216. In at least one embodiment, GPU to GPU links 3216 connect to each of GPGPUs 3206A-D via a dedicated GPU link. In at least one embodiment, P2P GPU links 3216 enable direct communication between each of GPGPUs 3206A-D without requiring communication over host interface bus 3204 to which processor 3202 is connected. In at least one embodiment, with GPU-to-GPU traffic directed to P2P GPU links 3216, host interface bus 3204 remains available for system memory access or to communicate with other instances of multi-GPU computing system 3200, for example, via one or more network devices. While in at least one embodiment GPGPUs 3206A-D connect to processor 3202 via host interface switch 3204, in at least one embodiment processor 3202 includes direct support for P2P GPU links 3216 and can connect directly to GPGPUs 3206A-D.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in multi-GPU computing system 3200 for inferencing or predicting operations based, at least in part, on weight parameters calculated using neural network training operations, neural network functions and/or architectures, or neural network use cases described herein. In at least one embodiment, inference and/or training logic 1015 are used to perform segmentation based on extreme points.

Figure 33:
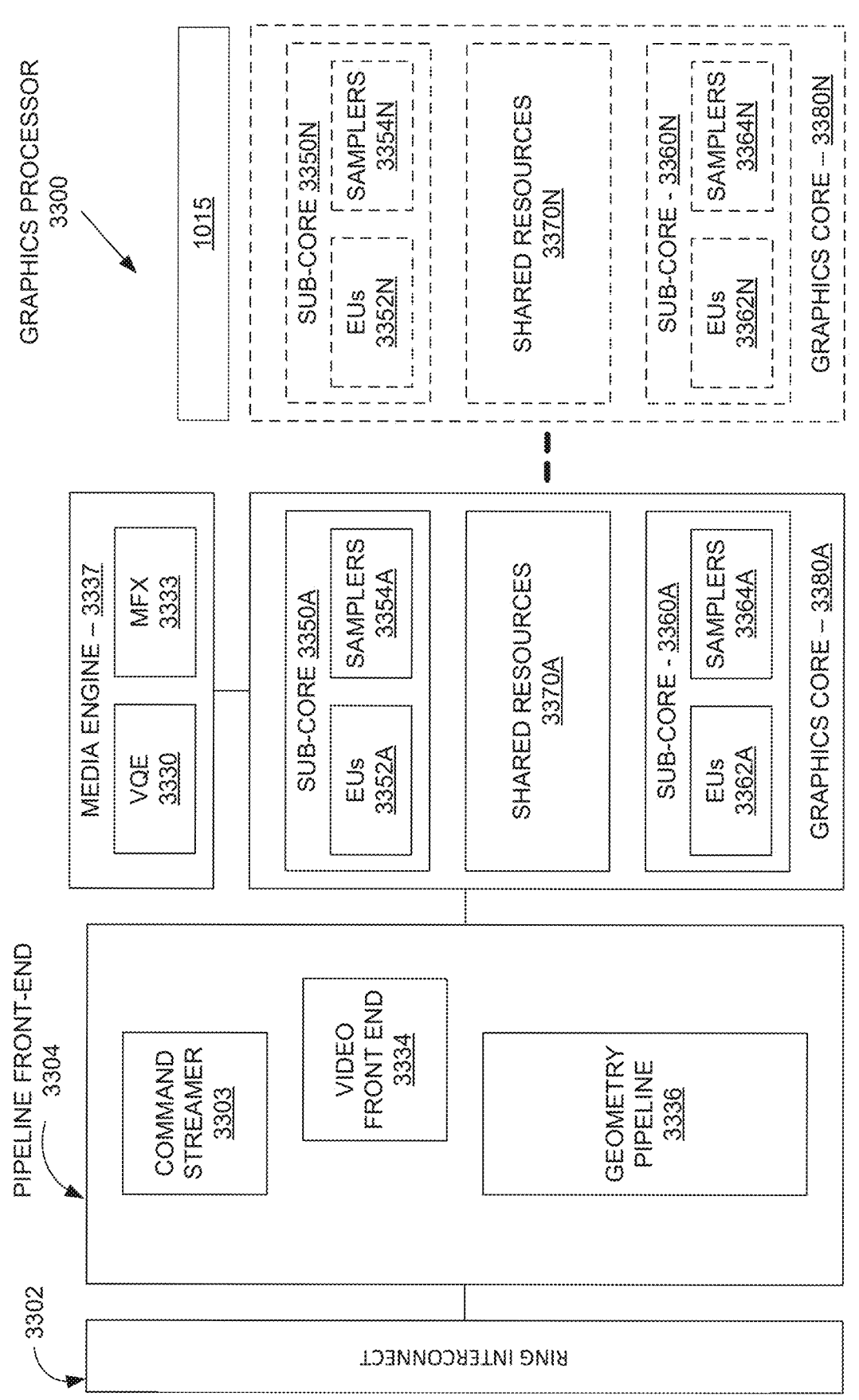
FIG. 33 illustrates a graphics processor, according to at least one embodiment.

FIG. 33 is a block diagram of a graphics processor 3300, according to at least one embodiment. In at least one embodiment, graphics processor 3300 includes a ring interconnect 3302, a pipeline front-end 3304, a media engine 3337, and graphics cores 3380A-3380N. In at least one embodiment, ring interconnect 3302 couples graphics processor 3300 to other processing units, including other graphics processors or one or more general-purpose processor cores. In at least one embodiment, graphics processor 3300 is one of many processors integrated within a multi-core processing system.

In at least one embodiment, graphics processor 3300 receives batches of commands via ring interconnect 3302. In at least one embodiment, incoming commands are interpreted by a command streamer 3303 in pipeline front-end 3304. In at least one embodiment, graphics processor 3300 includes scalable execution logic to perform 3D geometry processing and media processing via graphics core(s) 3380A-3380N. In at least one embodiment, for 3D geometry processing commands, command streamer 3303 supplies commands to geometry pipeline 3336. In at least one embodiment, for at least some media processing commands, command streamer 3303 supplies commands to a video front end 3334, which couples with a media engine 3337. In at least one embodiment, media engine 3337 includes a Video Quality Engine (VQE) 3330 for video and image post-processing and a multi-format encode/decode (MFX) 3333 engine to provide hardware-accelerated media data encode and decode. In at least one embodiment, geometry pipeline 3336 and media engine 3337 each generate execution threads for thread execution resources provided by at least one graphics core 3380A.

In at least one embodiment, graphics processor 3300 includes scalable thread execution resources featuring modular cores 3380A-3380N (sometimes referred to as core slices), each having multiple sub-cores 3350A-3350N, 3360A-3360N (sometimes referred to as core sub-slices). In at least one embodiment, graphics processor 3300 can have any number of graphics cores 3380A through 3380N. In at least one embodiment, graphics processor 3300 includes a graphics core 3380A having at least a first sub-core 3350A and a second sub-core 3360A. In at least one embodiment, graphics processor 3300 is a low power processor with a single sub-core (e.g., 3350A). In at least one embodiment, graphics processor 3300 includes multiple graphics cores 3380A-3380N, each including a set of first sub-cores 3350A-3350N and a set of second sub-cores 3360A-3360N. In at least one embodiment, each sub-core in first sub-cores 3350A-3350N includes at least a first set of execution units 3352A-3352N and media/texture samplers 3354A-3354N. In at least one embodiment, each sub-core in second sub-cores 3360A-3360N includes at least a second set of execution units 3362A-3362N and samplers 3364A-3364N. In at least one embodiment, each sub-core 3350A-3350N, 3360A-3360N shares a set of shared resources 3370A-3370N. In at least one embodiment, shared resources include shared cache memory and pixel operation logic.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, inference and/or training logic 1015 may be used in graphics processor 3300 for inferencing or predicting operations based, at least in part, on weight parameters calculated using neural network training operations, neural network functions and/or architectures, or neural network use cases described herein. In at least one embodiment, inference and/or training logic 1015 are used to perform segmentation based on extreme points.

Figure 34:
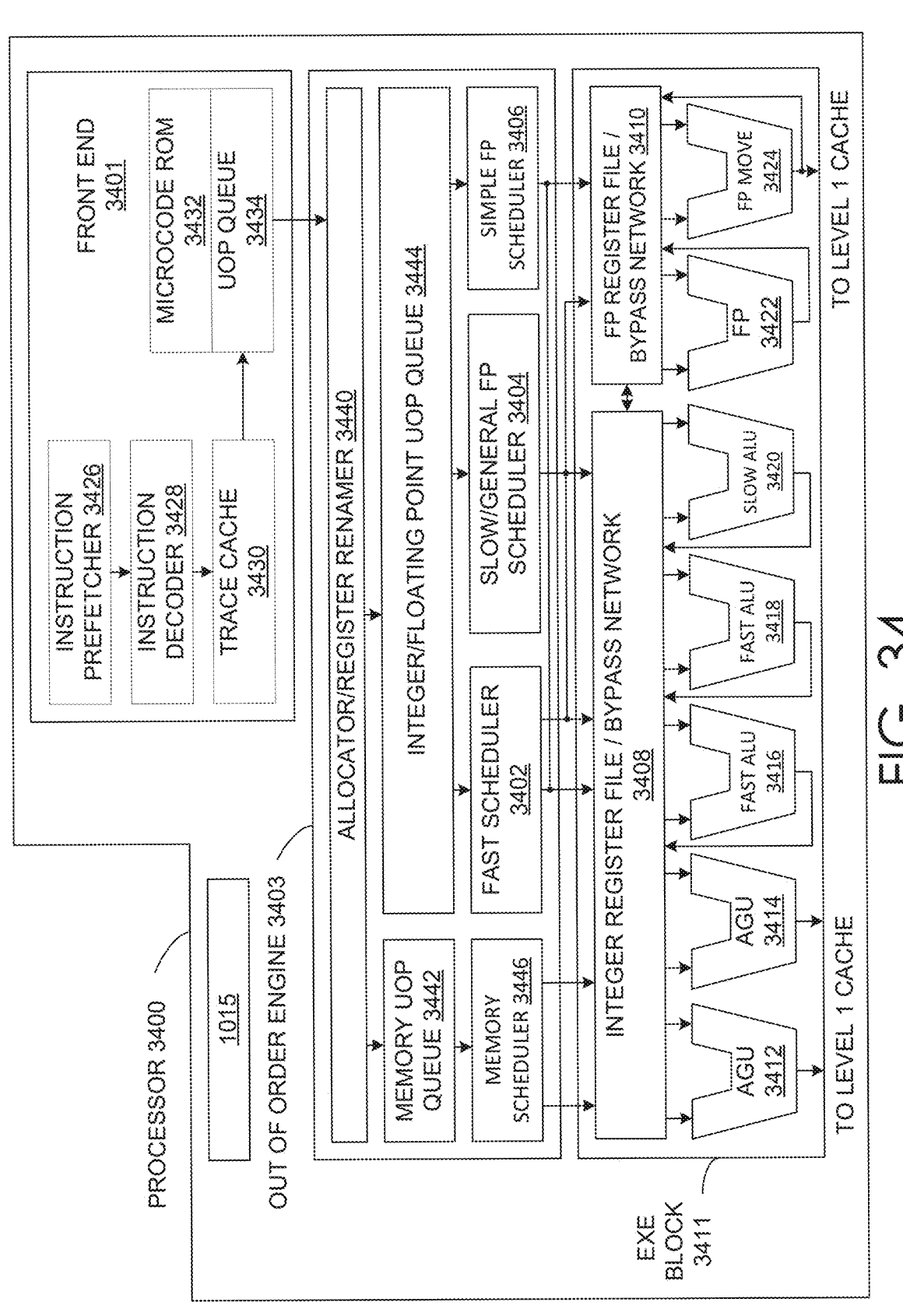
FIG. 34 illustrates a processor's micro-architecture, according to at least one embodiment.

FIG. 34 is a block diagram illustrating micro-architecture for a processor 3400 that may include logic circuits to perform instructions, according to at least one embodiment.

In at least one embodiment, processor 3400 may perform instructions, including x86 instructions, ARM instructions, specialized instructions for application-specific integrated circuits (ASICs), etc. In at least one embodiment, processor 3400 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 3400 may perform instructions to accelerate machine learning or deep learning algorithms, training, or inferencing.

In at least one embodiment, processor 3400 includes an in-order front end ("front end") 3401 to fetch instructions to be executed and prepare instructions to be used later in processor pipeline. In at least one embodiment, front end 3401 may include several units. In at least one embodiment, an instruction prefetcher 3426 fetches instructions from memory and feeds instructions to an instruction decoder 3428 which in turn decodes or interprets instructions. For example, in at least one embodiment, instruction decoder 3428 decodes a received instruction into one or more operations called "micro-instructions" or "micro-operations" (also called "micro ops" or "uops") that machine may execute. In at least one embodiment, instruction decoder 3428 parses instruction into an opcode and corresponding data and control fields that may be used by micro-architecture to perform operations in accordance with at least one embodiment. In at least one embodiment, a trace cache 3430 may assemble decoded uops into program ordered sequences or traces in a uop queue 3434 for execution. In at least one embodiment, when trace cache 3430 encounters a complex instruction, a microcode ROM 3432 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 3428 may access microcode ROM 3432 to perform instruction. In at least one embodiment, an instruction may be decoded into a small number of micro-ops for processing at instruction decoder 3428. In at least one embodiment, an instruction may be stored within microcode ROM 3432 should a number of micro-ops be needed to accomplish operation. In at least one embodiment, trace cache 3430 refers to an entry point programmable logic array ("PLA") to determine a correct micro-instruction pointer for reading microcode sequences to complete one or more instructions from microcode ROM 3432 in accordance with at least one embodiment. In at least one embodiment, after microcode ROM 3432 finishes sequencing micro-ops for an instruction, front end 3401 of machine may resume fetching micro-ops from trace cache 3430.

In at least one embodiment, out-of-order execution engine ("out of order engine") 3403 may prepare instructions for execution. In at least one embodiment, out-of-order execution logic has a number of buffers to smooth out and re-order flow of instructions to optimize performance as they go down pipeline and get scheduled for execution. In at least one embodiment, out-of-order execution engine 3403 includes, without limitation, an allocator/register renamer 3440, a memory uop queue 3442, an integer/floating point uop queue 3444, a memory scheduler 3446, a fast scheduler 3402, a slow/general floating point scheduler ("slow/general FP scheduler") 3404, and a simple floating point scheduler ("simple FP scheduler") 3406. In at least one embodiment, fast schedule 3402, slow/general floating point scheduler 3404, and simple floating point scheduler 3406 are also collectively referred to herein as "uop schedulers 3402, 3404, 3406." In at least one embodiment, allocator/register renamer 3440 allocates machine buffers and resources that each uop needs in order to execute. In at least one embodiment, allocator/register renamer 3440 renames logic registers onto entries in a register file. In at least one embodiment, allocator/register renamer 3440 also allocates an entry for each uop in one of two uop queues, memory uop queue 3442 for memory operations and integer/floating point uop queue 3444 for non-memory operations, in front of memory scheduler 3446 and uop schedulers 3402, 3404, 3406. In at least one embodiment, uop schedulers 3402, 3404, 3406 determine when a uop is ready to execute based on readiness of their dependent input register operand sources and availability of execution resources uops need to complete their operation. In at least one embodiment, fast scheduler 3402 of at least one embodiment may schedule on each half of main clock cycle while slow/general floating point scheduler 3404 and simple floating point scheduler 3406 may schedule once per main processor clock cycle. In at least one embodiment, uop schedulers 3402, 3404, 3406 arbitrate for dispatch ports to schedule uops for execution.

In at least one embodiment, execution block 3411 includes, without limitation, an integer register file/bypass network 3408, a floating point register file/bypass network ("FP register file/bypass network") 3410, address generation units ("AGUs") 3412 and 3414, fast Arithmetic Logic Units (ALUs) ("fast ALUs") 3416 and 3418, a slow Arithmetic Logic Unit ("slow ALU") 3420, a floating point ALU ("FP") 3422, and a floating point move unit ("FP move") 3424. In at least one embodiment, integer register file/bypass network 3408 and floating point register file/bypass network 3410 are also referred to herein as "register files 3408, 3410." In at least one embodiment, AGUs 3412 and 3414, fast ALUs 3416 and 3418, slow ALU 3420, floating point ALU 3422, and floating point move unit 3424 are also referred to herein as "execution units 3412, 3414, 3416, 3418, 3420, 3422, and 3424." In at least one embodiment, execution block b11 may include, without limitation, any number (including zero) and type of register files, bypass networks, address generation units, and execution units, in any combination.

In at least one embodiment, register files 3408, 3410 may be arranged between uop schedulers 3402, 3404, 3406, and execution units 3412, 3414, 3416, 3418, 3420, 3422, and 3424. In at least one embodiment, integer register file/bypass network 3408 performs integer operations. In at least one embodiment, floating point register file/bypass network 3410 performs floating point operations. In at least one embodiment, each of register files 3408, 3410 may include, without limitation, a bypass network that may bypass or forward just completed results that have not yet been written into register file to new dependent uops. In at least one embodiment, register files 3408, 3410 may communicate data with each other. In at least one embodiment, integer register file/bypass network 3408 may include, without limitation, two separate register files, one register file for low-order thirty-two bits of data and a second register file for high order thirty-two bits of data. In at least one embodiment, floating point register file/bypass network 3410 may include, without limitation, 128-bit wide entries because floating point instructions typically have operands from 64 to 128 bits in width.

In at least one embodiment, execution units 3412, 3414, 3416, 3418, 3420, 3422, 3424 may execute instructions. In at least one embodiment, register files 3408, 3410 store integer and floating point data operand values that micro-instructions need to execute. In at least one embodiment, processor 3400 may include, without limitation, any number and combination of execution units 3412, 3414, 3416, 3418, 3420, 3422, 3424. In at least one embodiment, floating point ALU 3422 and floating point move unit 3424, may execute floating point, MMX, SIMD, AVX and SSE, or other operations, including specialized machine learning instructions. In at least one embodiment, floating point ALU 3422 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3416, 3418. In at least one embodiment, fast ALUS 3416, 3418 may execute fast operations with an effective latency of half a clock cycle. In at least one embodiment, most complex integer operations go to slow ALU 3420 as slow ALU 3420 may include, without limitation, integer execution hardware for long-latency type of operations, such as a multiplier, shifts, flag logic, and branch processing. In at least one embodiment, memory load/store operations may be executed by AGUS 3412, 3414. In at least one embodiment, fast ALU 3416, fast ALU 3418, and slow ALU 3420 may perform integer operations on 64-bit data operands. In at least one embodiment, fast ALU 3416, fast ALU 3418, and slow ALU 3420 may be implemented to support a variety of data bit sizes including sixteen, thirty-two, 128, 256, etc. In at least one embodiment, floating point ALU 3422 and floating point move unit 3424 may be implemented to support a range of operands having bits of various widths. In at least one embodiment, floating point ALU 3422 and floating point move unit 3424 may operate on 128-bit wide packed data operands in conjunction with SIMD and multimedia instructions.

In at least one embodiment, uop schedulers 3402, 3404, 3406, dispatch dependent operations before parent load has finished executing. In at least one embodiment, as uops may be speculatively scheduled and executed in processor 3400, processor 3400 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment portions or all of inference and/or training logic 1015 may be incorporated into execution block 3411 and other memory or registers shown or not shown. For example, in at least one embodiment, training and/or inferencing techniques described herein may use one or more of ALUs illustrated in execution block 3411. Moreover, weight parameters may be stored in on-chip or off-chip memory and/or registers (shown or not shown) that configure ALUs of execution block 3411 to perform one or more machine learning algorithms, neural network architectures, use cases, or training techniques described herein. In at least one embodiment, inference and/or training logic 1015 are used to perform segmentation based on extreme points.

Figure 35:
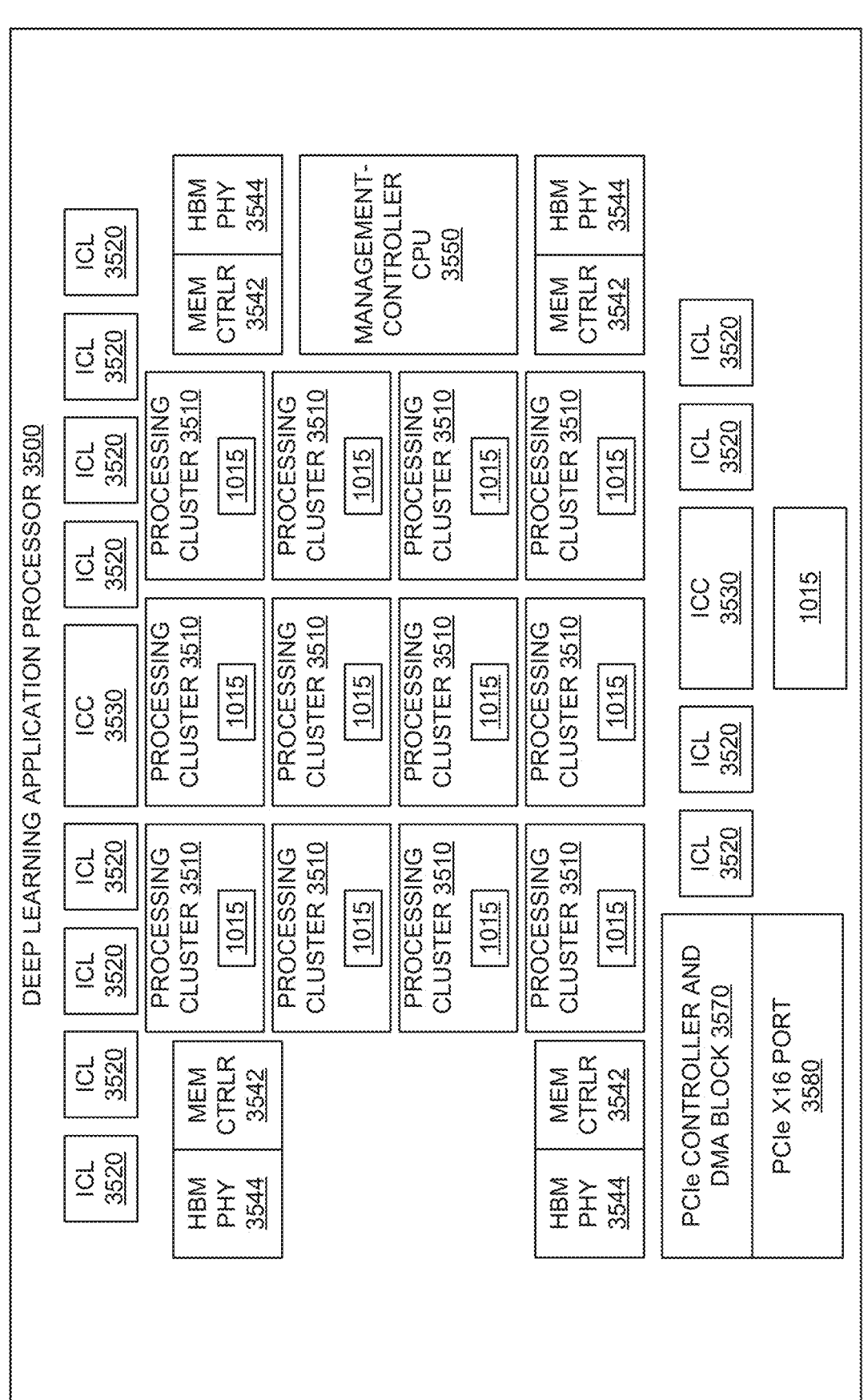
FIG. 35 illustrates a deep learning application processor, according to at least one embodiment.

FIG. 35 illustrates a deep learning application processor 3500, according to at least one embodiment. In at least one embodiment, deep learning application processor 3500 uses instructions that, if executed by deep learning application processor 3500, cause deep learning application processor 3500 to perform some or all of processes and techniques described throughout this disclosure. In at least one embodiment, deep learning application processor 3500 is an application-specific integrated circuit (ASIC). In at least one embodiment, application processor 3500 performs matrix multiply operations either "hard-wired" into hardware as a result of performing one or more instructions or both. In at least one embodiment, deep learning application processor 3500 includes, without limitation, processing clusters 3510(1)-3510(12), Inter-Chip Links ("ICLs") 3520(1)-3520(12), Inter-Chip Controllers ("ICCs") 3530(1)-3530(2), memory controllers ("Mem Ctrlrs") 3542(1)-3542(4), high bandwidth memory physical layer ("HBM PHY") 3544(1)-3544(4), a management-controller central processing unit ("management-controller CPU") 3550, a peripheral component interconnect express controller and direct memory access block ("PCIe Controller and DMA") 3570, and a sixteen-lane peripheral component interconnect express port ("PCI Express x16") 3580.

In at least one embodiment, processing clusters 3510 may perform deep learning operations, including inference or prediction operations based on weight parameters calculated one or more training techniques, including those described herein. In at least one embodiment, each processing cluster 3510 may include, without limitation, any number and type of processors. In at least one embodiment, deep learning application processor 3500 may include any number and type of processing clusters 3500. In at least one embodiment, Inter-Chip Links 3520 are bi-directional. In at least one embodiment, Inter-Chip Links 3520 and Inter-Chip Controllers 3530 enable multiple deep learning application processors 3500 to exchange information, including activation information resulting from performing one or more machine learning algorithms embodied in one or more neural networks. In at least one embodiment, deep learning application processor 3500 may include any number (including zero) and type of ICLs 3520 and ICCs 3530.

In at least one embodiment, HBM2s 3540 provide a total of 32 Gigabytes (GB) of memory. HBM2 3540(*i*) is associated with both memory controller 3542(*i*) and HBM PHY 3544(*i*). In at least one embodiment, any number of HBM2s 3540 may provide any type and total amount of high bandwidth memory and may be associated with any number (including zero) and type of memory controllers 3542 and HBM PHYs 3544. In at least one embodiment, SPI, I2C, GPIO 3560, PCIe Controller and DMA 3570, and/or PCIe 3580 may be replaced with any number and type of blocks that enable any number and type of communication standards in any technically feasible fashion.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, deep learning application processor 3500 is used to train a machine learning model, such as a neural network, to predict or infer information provided to deep learning application processor 3500. In at least one embodiment, deep learning application processor 3500 is used to infer or predict information based on a trained machine learning model (e.g., neural network) that has been trained by another processor or system or by deep learning application processor 3500. In at least one embodiment, processor 3500 may be used to perform one or more neural network use cases described herein. In at least one embodiment, inference and/or training logic 1015 are used to perform segmentation based on extreme points.

Figure 36:
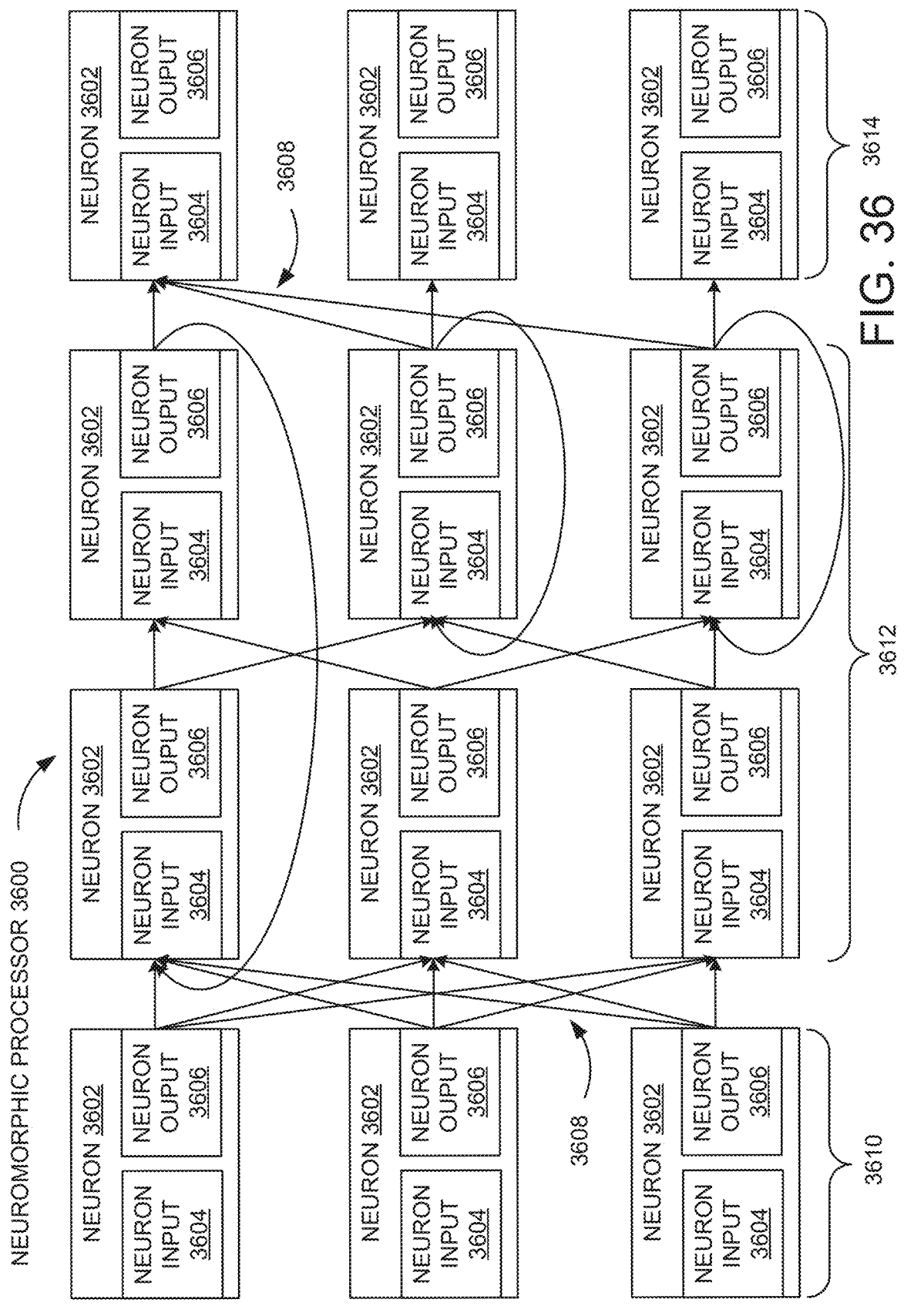
FIG. 36 illustrates an example neuromorphic processor, according to at least one embodiment.

FIG. 36 is a block diagram of a neuromorphic processor 3600, according to at least one embodiment. In at least one embodiment, neuromorphic processor 3600 may receive one or more inputs from sources external to neuromorphic processor 3600. In at least one embodiment, these inputs may be transmitted to one or more neurons 3602 within neuromorphic processor 3600. In at least one embodiment, neurons 3602 and components thereof may be implemented using circuitry or logic, including one or more arithmetic logic units (ALUs). In at least one embodiment, neuromorphic processor 3600 may include, without limitation, thousands or millions of instances of neurons 3602, but any suitable number of neurons 3602 may be used. In at least one embodiment, each instance of neuron 3602 may include a neuron input 3604 and a neuron output 3606. In at least one embodiment, neurons 3602 may generate outputs that may be transmitted to inputs of other instances of neurons 3602. For example, in at least one embodiment, neuron inputs 3604 and neuron outputs 3606 may be interconnected via synapses 3608.

In at least one embodiment, neurons 3602 and synapses 3608 may be interconnected such that neuromorphic processor 3600 operates to process or analyze information received by neuromorphic processor 3600. In at least one embodiment, neurons 3602 may transmit an output pulse (or "fire" or "spike") when inputs received through neuron input 3604 exceed a threshold. In at least one embodiment, neurons 3602 may sum or integrate signals received at neuron inputs 3604. For example, in at least one embodiment, neurons 3602 may be implemented as leaky integrate-and-fire neurons, wherein if a sum (referred to as a "membrane potential") exceeds a threshold value, neuron 3602 may generate an output (or "fire") using a transfer function such as a sigmoid or threshold function. In at least one embodiment, a leaky integrate-and-fire neuron may sum signals received at neuron inputs 3604 into a membrane potential and may also apply a decay factor (or leak) to reduce a membrane potential. In at least one embodiment, a leaky integrate-and-fire neuron may fire if multiple input signals are received at neuron inputs 3604 rapidly enough to exceed a threshold value (i.e., before a membrane potential decays too low to fire). In at least one embodiment, neurons 3602 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3602 may include, without limitation, comparator circuits or logic that generate an output spike at neuron output 3606 when result of applying a transfer function to neuron input 3604 exceeds a threshold. In at least one embodiment, once neuron 3602 fires, it may disregard previously received input information by, for example, resetting a membrane potential to 0 or another suitable default value. In at least one embodiment, once membrane potential is reset to 0, neuron 3602 may resume normal operation after a suitable period of time (or refractory period).

In at least one embodiment, neurons 3602 may be interconnected through synapses 3608. In at least one embodiment, synapses 3608 may operate to transmit signals from an output of a first neuron 3602 to an input of a second neuron 3602. In at least one embodiment, neurons 3602 may transmit information over more than one instance of synapse 3608. In at least one embodiment, one or more instances of neuron output 3606 may be connected, via an instance of synapse 3608, to an instance of neuron input 3604 in same neuron 3602. In at least one embodiment, an instance of neuron 3602 generating an output to be transmitted over an instance of synapse 3608 may be referred to as a "pre-synaptic neuron" with respect to that instance of synapse 3608. In at least one embodiment, an instance of neuron 3602 receiving an input transmitted over an instance of synapse 3608 may be referred to as a "post-synaptic neuron" with respect to that instance of synapse 3608. Because an instance of neuron 3602 may receive inputs from one or more instances of synapse 3608, and may also transmit outputs over one or more instances of synapse 3608, a single instance of neuron 3602 may therefore be both a "pre-synaptic neuron" and "post-synaptic neuron," with respect to various instances of synapses 3608, in at least one embodiment.

In at least one embodiment, neurons 3602 may be organized into one or more layers. Each instance of neuron 3602 may have one neuron output 3606 that may fan out through one or more synapses 3608 to one or more neuron inputs 3604. In at least one embodiment, neuron outputs 3606 of neurons 3602 in a first layer 3610 may be connected to neuron inputs 3604 of neurons 3602 in a second layer 3612. In at least one embodiment, layer 3610 may be referred to as a "feed-forward layer." In at least one embodiment, each instance of neuron 3602 in an instance of first layer 3610 may fan out to each instance of neuron 3602 in second layer 3612. In at least one embodiment, first layer 3610 may be referred to as a "fully connected feed-forward layer." In at least one embodiment, each instance of neuron 3602 in an instance of second layer 3612 may fan out to fewer than all instances of neuron 3602 in a third layer 3614. In at least one embodiment, second layer 3612 may be referred to as a "sparsely connected feed-forward layer." In at least one embodiment, neurons 3602 in second layer 3612 may fan out to neurons 3602 in multiple other layers, including to neurons 3602 in (same) second layer 3612. In at least one embodiment, second layer 3612 may be referred to as a "recurrent layer." In at least one embodiment, neuromorphic processor 3600 may include, without limitation, any suitable combination of recurrent layers and feed-forward layers, including, without limitation, both sparsely connected feed-forward layers and fully connected feed-forward layers.

In at least one embodiment, neuromorphic processor 3600 may include, without limitation, a reconfigurable interconnect architecture or dedicated hard wired interconnects to connect synapse 3608 to neurons 3602. In at least one embodiment, neuromorphic processor 3600 may include, without limitation, circuitry or logic that allows synapses to be allocated to different neurons 3602 as needed based on neural network topology and neuron fan-in/out. For example, in at least one embodiment, synapses 3608 may be connected to neurons 3602 using an interconnect fabric, such as network-on-chip, or with dedicated connections. In at least one embodiment, synapse interconnections and components thereof may be implemented using circuitry or logic. In at least one embodiment, inference and/or training logic 1015 are used to perform segmentation based on extreme points.

Figure 37:
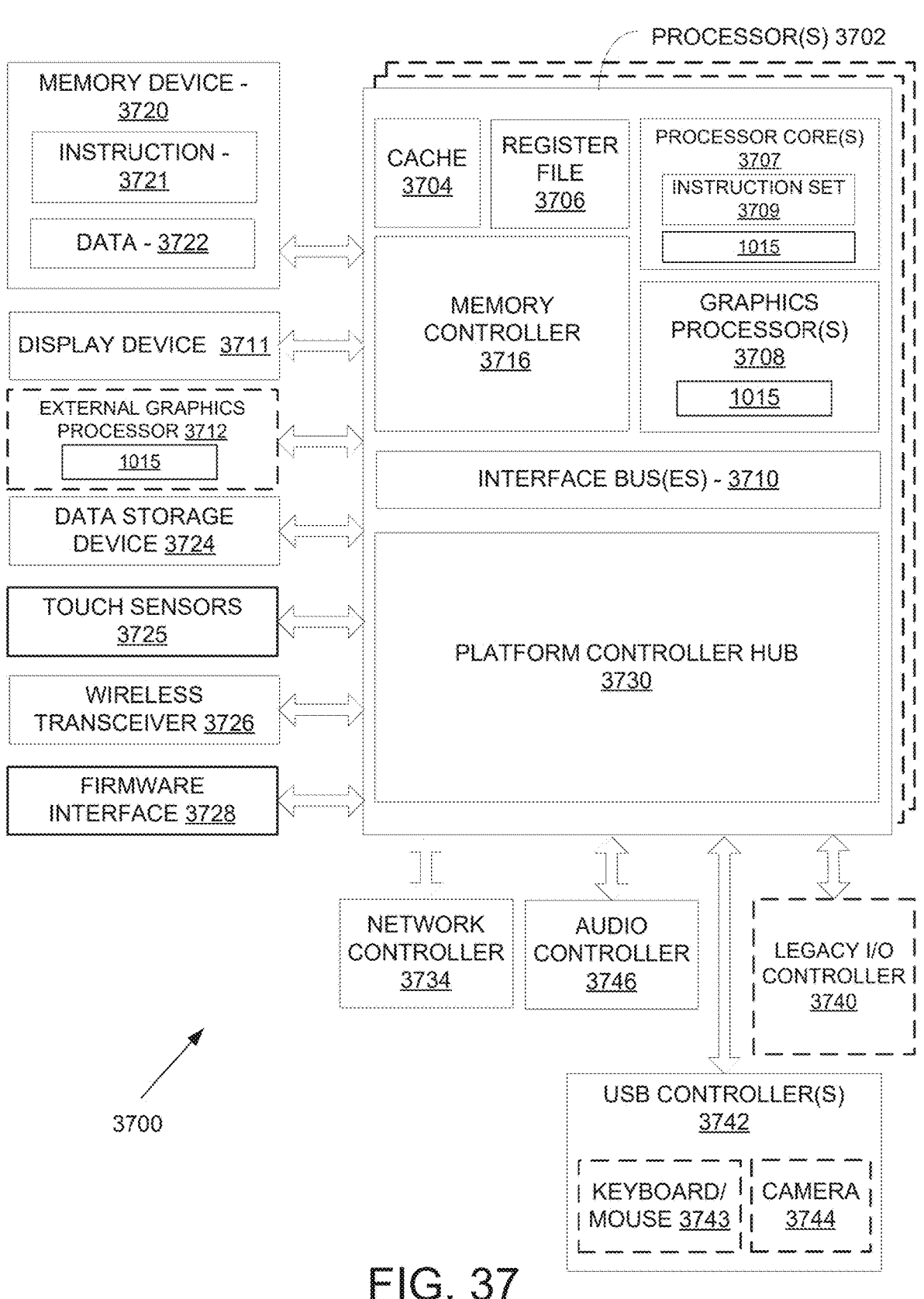
FIGS. 37 and 38 illustrate at least portions of a graphics processor, according to at least one embodiment.

FIG. 37 is a block diagram of a processing system, according to at least one embodiment. In at least one embodiment, system 3700 includes one or more processors 3702 and one or more graphics processors 3708, and may be a single processor desktop system, a multiprocessor work-station system, or a server system having a large number of processors 3702 or processor cores 3707. In at least one embodiment, system 3700 is a processing platform incorporated within a system-on-a-chip (SoC) integrated circuit for use in mobile, handheld, or embedded devices.

In at least one embodiment, system 3700 can include, or be incorporated within a server-based gaming platform, a game console, including a game and media console, a mobile gaming console, a handheld game console, or an online game console. In at least one embodiment, system 3700 is a mobile phone, smart phone, tablet computing device or mobile Internet device. In at least one embodiment, processing system 3700 can also include, couple with, or be integrated within a wearable device, such as a smart watch wearable device, smart eyewear device, augmented reality device, or virtual reality device. In at least one embodiment, processing system 3700 is a television or set top box device having one or more processors 3702 and a graphical interface generated by one or more graphics processors 3708.

In at least one embodiment, one or more processors 3702 each include one or more processor cores 3707 to process instructions which, when executed, perform operations for system and user software. In at least one embodiment, each of one or more processor cores 3707 is configured to process a specific instruction set 3709. In at least one embodiment, instruction set 3709 may facilitate Complex Instruction Set Computing (CISC), Reduced Instruction Set Computing (RISC), or computing via a Very Long Instruction Word (VLIW). In at least one embodiment, processor cores 3707 may each process a different instruction set 3709, which may include instructions to facilitate emulation of other instruction sets. In at least one embodiment, processor core 3707 may also include other processing devices, such a Digital Signal Processor (DSP).

In at least one embodiment, processor 3702 includes cache memory 3704. In at least one embodiment, processor 3702 can have a single internal cache or multiple levels of internal cache. In at least one embodiment, cache memory is shared among various components of processor 3702. In at least one embodiment, processor 3702 also uses an external cache (e.g., a Level-3 (L3) cache or Last Level Cache (LLC)) (not shown), which may be shared among processor cores 3707 using known cache coherency techniques. In at least one embodiment, register file 3706 is additionally included in processor 3702 which may include different types of registers for storing different types of data (e.g., integer registers, floating point registers, status registers, and an instruction pointer register). In at least one embodiment, register file 3706 may include general-purpose registers or other registers.

In at least one embodiment, one or more processor(s) 3702 are coupled with one or more interface bus(es) 3710 to transmit communication signals such as address, data, or control signals between processor 3702 and other components in system 3700. In at least one embodiment, interface bus 3710, in one embodiment, can be a processor bus, such as a version of a Direct Media Interface (DMI) bus. In at least one embodiment, interface 3710 is not limited to a DMI bus, and may include one or more Peripheral Component Interconnect buses (e.g., PCI, PCI Express), memory busses, or other types of interface busses. In at least one embodiment processor(s) 3702 include an integrated memory controller 3716 and a platform controller hub 3730. In at least one embodiment, memory controller 3716 facilitates communication between a memory device and other components of system 3700, while platform controller hub (PCH) 3730 provides connections to I/O devices via a local I/O bus.

In at least one embodiment, memory device 3720 can be a dynamic random access memory (DRAM) device, a static random access memory (SRAM) device, flash memory device, phase-change memory device, or some other memory device having suitable performance to serve as process memory. In at least one embodiment memory device 3720 can operate as system memory for system 3700, to store data 3722 and instructions 3721 for use when one or more processors 3702 executes an application or process. In at least one embodiment, memory controller 3716 also couples with an optional external graphics processor 3712, which may communicate with one or more graphics processors 3708 in processors 3702 to perform graphics and media operations. In at least one embodiment, a display device 3711 can connect to processor(s) 3702. In at least one embodiment display device 3711 can include one or more of an internal display device, as in a mobile electronic device or a laptop device or an external display device attached via a display interface (e.g., DisplayPort, etc.). In at least one embodiment, display device 3711 can include a head mounted display (HMD) such as a stereoscopic display device for use in virtual reality (VR) applications or augmented reality (AR) applications.

In at least one embodiment, platform controller hub 3730 enables peripherals to connect to memory device 3720 and processor 3702 via a high-speed I/O bus. In at least one embodiment, I/O peripherals include, but are not limited to, an audio controller 3746, a network controller 3734, a firmware interface 3728, a wireless transceiver 3726, touch sensors 3725, a data storage device 3724 (e.g., hard disk drive, flash memory, etc.). In at least one embodiment, data storage device 3724 can connect via a storage interface (e.g., SATA) or via a peripheral bus, such as a Peripheral Component Interconnect bus (e.g., PCI, PCI Express). In at least one embodiment, touch sensors 3725 can include touch screen sensors, pressure sensors, or fingerprint sensors. In at least one embodiment, wireless transceiver 3726 can be a Wi-Fi transceiver, a Bluetooth transceiver, or a mobile network transceiver such as a 3G, 4G, or Long Term Evolution (LTE) transceiver. In at least one embodiment, firmware interface 3728 enables communication with system firmware, and can be, for example, a unified extensible firmware interface (UEFI). In at least one embodiment, network controller 3734 can enable a network connection to a wired network. In at least one embodiment, a high-performance network controller (not shown) couples with interface bus 3710. In at least one embodiment, audio controller 3746 is a multi-channel high definition audio controller. In at least one embodiment, system 3700 includes an optional legacy I/O controller 3740 for coupling legacy (e.g., Personal System 2 (PS/2)) devices to system. In at least one embodiment, platform controller hub 3730 can also connect to one or more Universal Serial Bus (USB) controllers 3742 connect input devices, such as keyboard and mouse 3743 combinations, a camera 3744, or other USB input devices.

In at least one embodiment, an instance of memory controller 3716 and platform controller hub 3730 may be integrated into a discreet external graphics processor, such as external graphics processor 3712. In at least one embodiment, platform controller hub 3730 and/or memory controller 3716 may be external to one or more processor(s) 3702. For example, in at least one embodiment, system 3700 can include an external memory controller 3716 and platform controller hub 3730, which may be configured as a memory controller hub and peripheral controller hub within a system chipset that is in communication with processor(s) 3702.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment portions or all of inference and/or training logic 1015 may be incorporated into graphics processor 3700. For example, in at least one embodiment, training and/or inferencing techniques described herein may use one or more of ALUs embodied in graphics processor 3712. Moreover, in at least one embodiment, inferencing and/or training operations described herein may be done using logic other than logic illustrated in FIG. 9 or 10. In at least one embodiment, weight parameters may be stored in on-chip or off-chip memory and/or registers (shown or not shown) that configure ALUs of graphics processor 3700 to perform one or more machine learning algorithms, neural network architectures, use cases, or training techniques described herein. In at least one embodiment, inference and/or training logic 1015 are used to perform segmentation based on extreme points.

Figure 38:
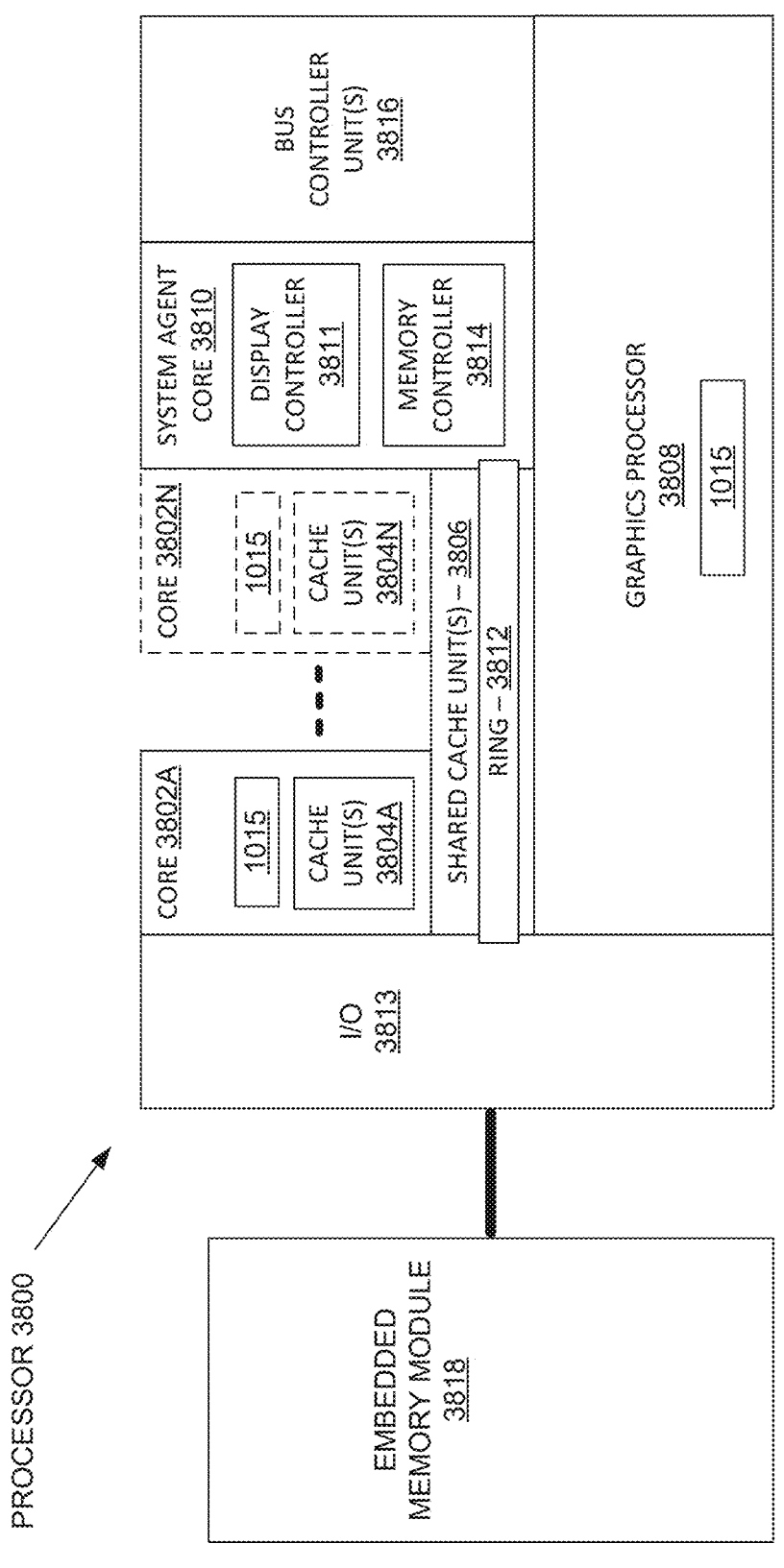

FIG. 38 is a block diagram of a processor 3800 having one or more processor cores 3802A-3802N, an integrated memory controller 3814, and an integrated graphics processor 3808, according to at least one embodiment. In at least one embodiment, processor 3800 can include additional cores up to and including additional core 3802N represented by dashed lined boxes. In at least one embodiment, each of processor cores 3802A-3802N includes one or more internal cache units 3804A-3804N. In at least one embodiment, each processor core also has access to one or more shared cached units 3806.

In at least one embodiment, internal cache units 3804A-3804N and shared cache units 3806 represent a cache memory hierarchy within processor 3800. In at least one embodiment, cache memory units 3804A-3804N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3806 and 3804A-3804N.

In at least one embodiment, processor 3800 may also include a set of one or more bus controller units 3816 and a system agent core 3810. In at least one embodiment, one or more bus controller units 3816 manage a set of peripheral buses, such as one or more PCI or PCI express busses. In at least one embodiment, system agent core 3810 provides management functionality for various processor components. In at least one embodiment, system agent core 3810 includes one or more integrated memory controllers 3814 to manage access to various external memory devices (not shown).

In at least one embodiment, one or more of processor cores 3802A-3802N include support for simultaneous multi-threading. In at least one embodiment, system agent core 3810 includes components for coordinating and operating cores 3802A-3802N during multi-threaded processing. In at least one embodiment, system agent core 3810 may additionally include a power control unit (PCU), which includes logic and components to regulate one or more power states of processor cores 3802A-3802N and graphics processor 3808.

In at least one embodiment, processor 3800 additionally includes graphics processor 3808 to execute graphics processing operations. In at least one embodiment, graphics processor 3808 couples with shared cache units 3806, and system agent core 3810, including one or more integrated memory controllers 3814. In at least one embodiment, system agent core 3810 also includes a display controller 3811 to drive graphics processor output to one or more coupled displays. In at least one embodiment, display controller 3811 may also be a separate module coupled with graphics processor 3808 via at least one interconnect, or may be integrated within graphics processor 3808.

In at least one embodiment, a ring based interconnect unit 3812 is used to couple internal components of processor 3800. In at least one embodiment, an alternative interconnect unit may be used, such as a point-to-point interconnect, a switched interconnect, or other techniques. In at least one embodiment, graphics processor 3808 couples with ring interconnect 3812 via an I/O link 3813.

In at least one embodiment, I/O link 3813 represents at least one of multiple varieties of I/O interconnects, including an on package I/O interconnect which facilitates communication between various processor components and a high-performance embedded memory module 3818, such as an eDRAM module. In at least one embodiment, each of processor cores 3802A-3802N and graphics processor 3808 use embedded memory modules 3818 as a shared Last Level Cache.

In at least one embodiment, processor cores 3802A-3802N are homogenous cores executing a common instruction set architecture. In at least one embodiment, processor cores 3802A-3802N are heterogeneous in terms of instruction set architecture (ISA), where one or more of processor cores 3802A-3802N execute a common instruction set, while one or more other cores of processor cores 3802A-38-02N executes a subset of a common instruction set or a different instruction set. In at least one embodiment, processor cores 3802A-3802N are heterogeneous in terms of microarchitecture, where one or more cores having a relatively higher power consumption couple with one or more power cores having a lower power consumption. In at least one embodiment, processor 3800 can be implemented on one or more chips or as an SoC integrated circuit.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment portions or all of inference and/or training logic 1015 may be incorporated into processor 3800. For example, in at least one embodiment, training and/or inferencing techniques described herein may use one or more of ALUs embodied in graphics processor 3712, graphics core(s) 3802A-3802N, or other components in FIG. 38. Moreover, in at least one embodiment, inferencing and/or training operations described herein may be done using logic other than logic illustrated in FIG. 9 or 10. In at least one embodiment, weight parameters may be stored in on-chip or off-chip memory and/or registers (shown or not shown) that configure ALUs of graphics processor 3800 to perform one or more machine learning algorithms, neural network architectures, use cases, or training techniques described herein. In at least one embodiment, inference and/or training logic 1015 are used to perform segmentation based on extreme points.

Figure 39:
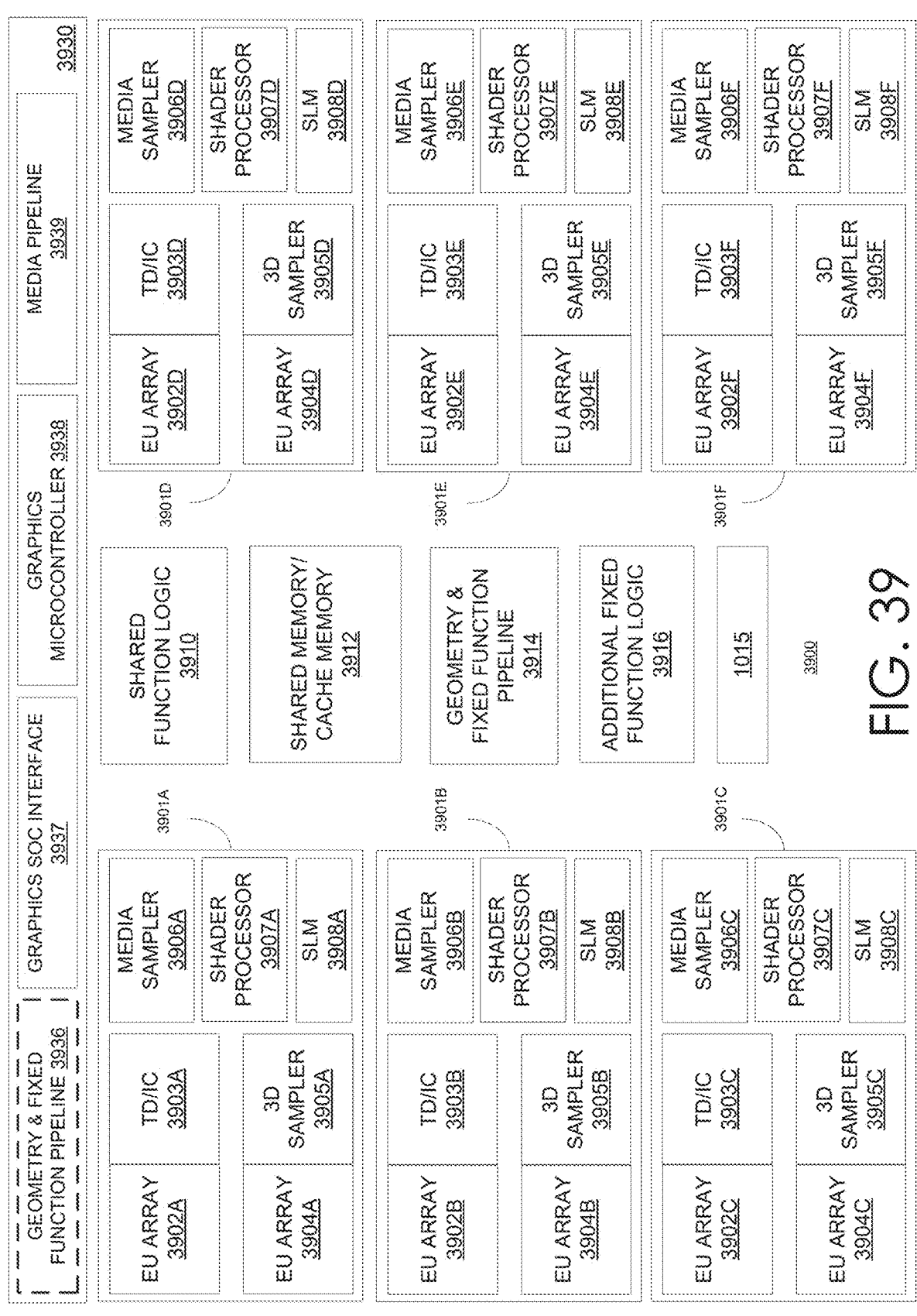
FIG. 39 illustrates at least portions of a graphics processor core, according to at least one embodiment.

FIG. 39 is a block diagram of hardware logic of a graphics processor core 3900, according to at least one embodiment described herein. In at least one embodiment, graphics processor core 3900 is included within a graphics core array. In at least one embodiment, graphics processor core 3900, sometimes referred to as a core slice, can be one or multiple graphics cores within a modular graphics processor. In at least one embodiment, graphics processor core 3900 is exemplary of one graphics core slice, and a graphics processor as described herein may include multiple graphics core slices based on target power and performance envelopes. In at least one embodiment, each graphics core 3900 can include a fixed function block 3930 coupled with multiple sub-cores 3901A-3901F, also referred to as sub-slices, that include modular blocks of general-purpose and fixed function logic.

In at least one embodiment, fixed function block 3930 includes a geometry/fixed function pipeline 3936 that can be shared by all sub-cores in graphics processor 3900, for example, in lower performance and/or lower power graphics processor implementations. In at least one embodiment, geometry/fixed function pipeline 3936 includes a 3D fixed function pipeline, a video front-end unit, a thread spawner and thread dispatcher, and a unified return buffer manager, which manages unified return buffers.

In at least one embodiment fixed, function block 3930 also includes a graphics SoC interface 3937, a graphics microcontroller 3938, and a media pipeline 3939. In at least one embodiment fixed, graphics SoC interface 3937 provides an interface between graphics core 3900 and other processor cores within a system on a chip integrated circuit. In at least one embodiment, graphics microcontroller 3938 is a programmable sub-processor that is configurable to manage various functions of graphics processor 3900, including thread dispatch, scheduling, and pre-emption. In at least one embodiment, media pipeline 3939 includes logic to facilitate decoding, encoding, pre-processing, and/or post-processing of multimedia data, including image and video data. In at least one embodiment, media pipeline 3939 implements media operations via requests to compute or sampling logic within sub-cores 3901-3901F.

In at least one embodiment, SoC interface 3937 enables graphics core 3900 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3937 can also enable communication with fixed function devices within an SoC, such as camera imaging pipelines, and enables use of and/or implements global memory atomics that may be shared between graphics core 3900 and CPUs within an SoC. In at least one embodiment, SoC interface 3937 can also implement power management controls for graphics core 3900 and enable an interface between a clock domain of graphic core 3900 and other clock domains within an SoC. In at least one embodiment, SoC interface 3937 enables receipt of command buffers from a command streamer and global thread dispatcher that are configured to provide commands and instructions to each of one or more graphics cores within a graphics processor. In at least one embodiment, commands and instructions can be dispatched to media pipeline 3939, when media operations are to be performed, or a geometry and fixed function pipeline (e.g., geometry and fixed function pipeline 3936, geometry and fixed function pipeline 3914) when graphics processing operations are to be performed.

In at least one embodiment, graphics microcontroller 3938 can be configured to perform various scheduling and management tasks for graphics core 3900. In at least one embodiment, graphics microcontroller 3938 can perform graphics and/or compute workload scheduling on various graphics parallel engines within execution unit (EU) arrays 3902A-3902F, 3904A-3904F within sub-cores 3901A-3901F. In at least one embodiment, host software executing on a CPU core of an SoC including graphics core 3900 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3938 can also facilitate low-power or idle states for graphics core 3900, providing graphics core 3900 with an ability to save and restore registers within graphics core 3900 across low-power state transitions independently from an operating system and/or graphics driver software on a system.

In at least one embodiment, graphics core 3900 may have greater than or fewer than illustrated sub-cores 3901A-3901F, up to N modular sub-cores. For each set of N sub-cores, in at least one embodiment, graphics core 3900 can also include shared function logic 3910, shared and/or cache memory 3912, a geometry/fixed function pipeline 3914, as well as additional fixed function logic 3916 to accelerate various graphics and compute processing operations. In at least one embodiment, shared function logic 3910 can include logic units (e.g., sampler, math, and/or inter-thread communication logic) that can be shared by each N sub-cores within graphics core 3900. In at least one embodiment fixed, shared and/or cache memory 3912 can be a last-level cache for N sub-cores 3901A-3901F within graphics core 3900 and can also serve as shared memory that is accessible by multiple sub-cores. In at least one embodiment, geometry/fixed function pipeline 3914 can be included instead of geometry/fixed function pipeline 3936 within fixed function block 3930 and can include same or similar logic units.

In at least one embodiment, graphics core 3900 includes additional fixed function logic 3916 that can include various fixed function acceleration logic for use by graphics core 3900. In at least one embodiment, additional fixed function logic 3916 includes an additional geometry pipeline for use in position only shading. In position-only shading, at least two geometry pipelines exist, whereas in a full geometry pipeline within geometry/fixed function pipeline 3916, 3936, and a cull pipeline, which is an additional geometry pipeline which may be included within additional fixed function logic 3916. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3916 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 3916 can also include machine-learning acceleration logic, such as fixed function matrix multiplication logic, for implementations including optimizations for machine learning training or inferencing.

In at least one embodiment, within each graphics sub-core 3901A-3901F includes a set of execution resources that may be used to perform graphics, media, and compute operations in response to requests by graphics pipeline, media pipeline, or shader programs. In at least one embodiment, graphics sub-cores 3901A-3901F include multiple EU arrays 3902A-3902F, 3904A-3904F, thread dispatch and inter-thread communication (TD/IC) logic 3903A-3903F, a 3D (e.g., texture) sampler 3905A-3905F, a media sampler 3906A-3906F, a shader processor 3907A-3907F, and shared local memory (SLM) 3908A-3908F. EU arrays 3902A-3902F, 3904A-3904F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3903A-3903F performs local thread dispatch and thread control operations for execution units within a sub-core and facilitate communication between threads executing on execution units of a sub-core. In at least one embodiment, 3D sampler 3905A-3905F can read texture or other 3D graphics related data into memory. In at least one embodiment, 3D sampler can read texture data differently based on a configured sample state and texture format associated with a given texture. In at least one embodiment, media sampler 3906A-3906F can perform similar read operations based on a type and format associated with media data. In at least one embodiment, each graphics sub-core 3901A-3901F can alternately include a unified 3D and media sampler. In at least one embodiment, threads executing on execution units within each of sub-cores 3901A-3901F can make use of shared local memory 3908A-3908F within each sub-core, to enable threads executing within a thread group to execute using a common pool of on-chip memory.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, portions or all of inference and/or training logic 1015 may be incorporated into graphics processor 3910. For example, in at least one embodiment, training and/or inferencing techniques described herein may use one or more of ALUs embodied in graphics processor 3712, graphics microcontroller 3938, geometry & fixed function pipeline 3914 and 3936, or other logic in FIG. 38. Moreover, in at least one embodiment, inferencing and/or training operations described herein may be done using logic other than logic illustrated in FIG. 9 or 10. In at least one embodiment, weight parameters may be stored in on-chip or off-chip memory and/or registers (shown or not shown) that configure ALUs of graphics processor 3900 to perform one or more machine learning algorithms, neural network architectures, use cases, or training techniques described herein. In at least one embodiment, inference and/or training logic 1015 are used to perform segmentation based on extreme points.

Figure 40:
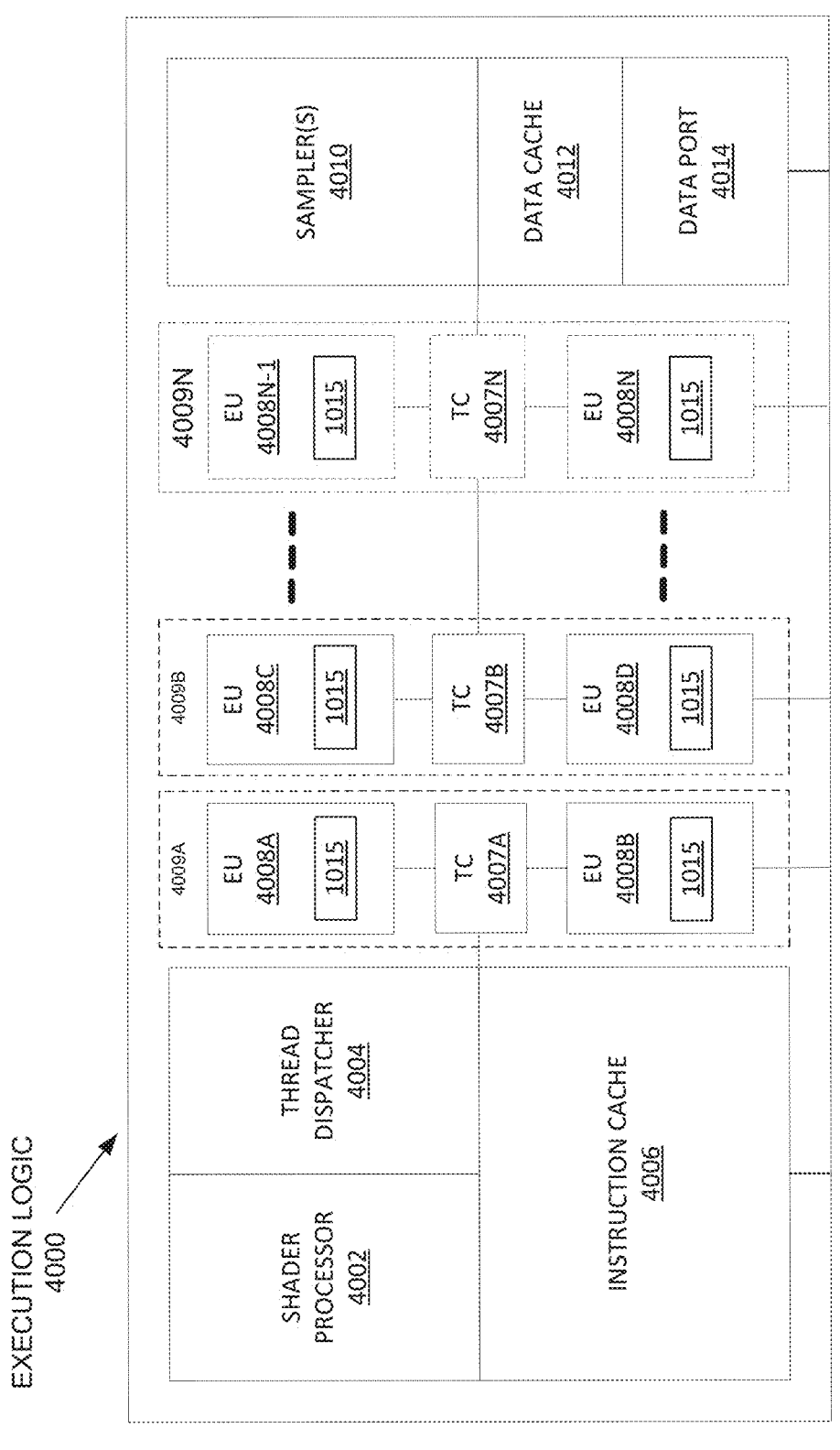
FIGS. 40-41 illustrate at least portions of a graphics processor core, according to at least one embodiment.
Figure 41:
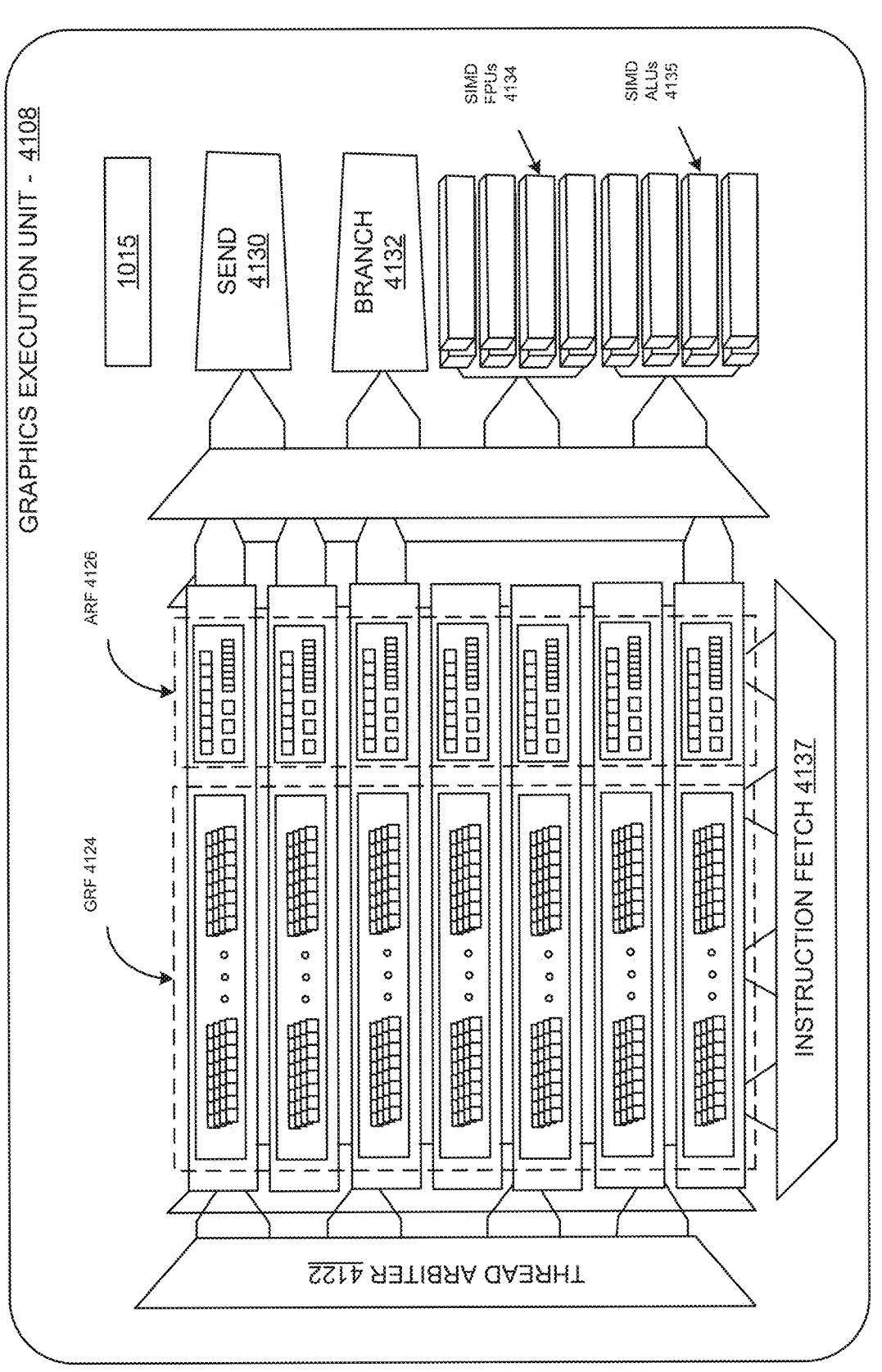

FIGS. 40-41 illustrate thread execution logic 4000 including an array of processing elements of a graphics processor core according to at least one embodiment. FIG. 40 illustrates at least one embodiment, in which thread execution logic 4000 is used. FIG. 41 illustrates exemplary internal details of an execution unit, according to at least one embodiment.

As illustrated in FIG. 40, in at least one embodiment, thread execution logic 4000 includes a shader processor 4002, a thread dispatcher 4004, instruction cache 4006, a scalable execution unit array including a plurality of execution units 4008A-4008N, sampler(s) 4010, a data cache 4012, and a data port 4014. In at least one embodiment a scalable execution unit array can dynamically scale by enabling or disabling one or more execution units (e.g., any of execution unit 4008A, 4008B, 4008C, 4008D, through 4008N-1 and 4008N) based on computational requirements of a workload, for example. In at least one embodiment, scalable execution units are interconnected via an interconnect fabric that links to each of execution unit. In at least one embodiment, thread execution logic 4000 includes one or more connections to memory, such as system memory or cache memory, through one or more of instruction cache 4006, data port 4014, sampler 4010, and execution units 4008A-4008N. In at least one embodiment, each execution unit (e.g., 4008A) is a stand-alone programmable general-purpose computational unit that is capable of executing multiple simultaneous hardware threads while processing multiple data elements in parallel for each thread. In at least one embodiment, array of execution units 4008A-4008N is scalable to include any number individual execution units.

In at least one embodiment, execution units 4008A-4008N are primarily used to execute shader programs. In at least one embodiment, shader processor 4002 can process various shader programs and dispatch execution threads associated with shader programs via a thread dispatcher 4004. In at least one embodiment, thread dispatcher 4004 includes logic to arbitrate thread initiation requests from graphics and media pipelines and instantiate requested threads on one or more execution units in execution units 4008A-4008N. For example, in at least one embodiment, a geometry pipeline can dispatch vertex, tessellation, or geometry shaders to thread execution logic for processing. In at least one embodiment, thread dispatcher 4004 can also process runtime thread spawning requests from executing shader programs.

In at least one embodiment, execution units 4008A-4008N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 4008A-4008N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 4008A-4008N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 4008A-4008N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 4008A-4008N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 4009A-4009N having thread control logic (4007A-4007N) that is common to fused EUs. In at least one embodiment, multiple EUs can be fused into an EU group. In at least one embodiment, each EU in fused EU group can be configured to execute a separate SIMD hardware thread. Number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 4009A-4009N includes at least two execution units. For example, in at least one embodiment, fused execution unit 4009A includes a first EU 4008A, second EU 4008B, and thread control logic 4007A that is common to first EU 4008A and second EU 4008B. In at least one embodiment, thread control logic 4007A controls threads executed on fused graphics execution unit 4009A, allowing each EU within fused execution units 4009A-4009N to execute using a common instruction pointer register.

In at least one embodiment, one or more internal instruction caches (e.g., 4006) are included in thread execution logic 4000 to cache thread instructions for execution units. In at least one embodiment, one or more data caches (e.g., 4012) are included to cache thread data during thread execution. In at least one embodiment, a sampler 4010 is included to provide texture sampling for 3D operations and media sampling for media operations. In at least one embodiment, sampler 4010 includes specialized texture or media sampling functionality to process texture or media data during a sampling process before providing sampled data to an execution unit.

During execution, in at least one embodiment, graphics and media pipelines send thread initiation requests to thread execution logic 4000 via thread spawning and dispatch logic. In at least one embodiment, once a group of geometric objects has been processed and rasterized into pixel data, pixel processor logic (e.g., pixel shader logic, fragment shader logic, etc.) within shader processor 4002 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 4002 then executes an application programming interface (API)-supplied pixel or fragment shader program. In at least one embodiment, to execute a shader program, shader processor 4002 dispatches threads to an execution unit (e.g., 4008A) via thread dispatcher 4004. In at least one embodiment, shader processor 4002 uses texture sampling logic in sampler 4010 to access texture data in texture maps stored in memory. In at least one embodiment, arithmetic operations on texture data and input geometry data compute pixel color data for each geometric fragment, or discards one or more pixels from further processing.

In at least one embodiment, data port 4014 provides a memory access mechanism for thread execution logic 4000 to output processed data to memory for further processing on a graphics processor output pipeline. In at least one embodiment, data port 4014 includes or couples to one or more cache memories (e.g., data cache 4012) to cache data for memory access via a data port.

As illustrated in FIG. 41, in at least one embodiment, a graphics execution unit 4008 can include an instruction fetch unit 4037, a general register file array (GRF) 4024, an architectural register file array (ARF) 4026, a thread arbiter 4022, a send unit 4030, a branch unit 4032, a set of SIMD floating point units (FPUs) 4034, and, in at least one embodiment, a set of dedicated integer SIMD ALUs 4035. In at least one embodiment, GRF 4024 and ARF 4026 includes a set of general register files and architecture register files associated with each simultaneous hardware thread that may be active in graphics execution unit 4008. In at least one embodiment, per thread architectural state is maintained in ARF 4026, while data used during thread execution is stored in GRF 4024. In at least one embodiment, execution state of each thread, including instruction pointers for each thread, can be held in thread-specific registers in ARF 4026.

In at least one embodiment, graphics execution unit 4008 has an architecture that is a combination of Simultaneous Multi-Threading (SMT) and fine-grained Interleaved Multi-Threading (TMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 4008 can co-issue multiple instructions, which may each be different instructions. In at least one embodiment, thread arbiter 4022 of graphics execution unit thread 4008 can dispatch instructions to one of send unit 4030, branch unit 4042, or SIMD FPU(s) 4034 for execution. In at least one embodiment, each execution thread can access 128 general-purpose registers within GRF 4024, where each register can store 32 bytes, accessible as a SIMD 8-element vector of 32-bit data elements. In at least one embodiment, each execution unit thread has access to 4 Kbytes within GRF 4024, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 4024 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 4030. In at least one embodiment, branch instructions are dispatched to a dedicated branch unit 4032 to facilitate SIMD divergence and eventual convergence.

In at least one embodiment graphics execution unit 4008 includes one or more SIMD floating point units (FPU(s)) 4034 to perform floating-point operations. In at least one embodiment, FPU(s) 4034 also support integer computation. In at least one embodiment FPU(s) 4034 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 4035 are also present, and may be specifically optimized to perform operations associated with machine learning computations.

In at least one embodiment, arrays of multiple instances of graphics execution unit 4008 can be instantiated in a graphics sub-core grouping (e.g., a sub-slice). In at least one embodiment, execution unit 4008 can execute instructions across a plurality of execution channels. In at least one embodiment, each thread executed on graphics execution unit 4008 is executed on a different channel.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, portions or all of inference and/or training logic 1015 may be incorporated into execution logic 4000. Moreover, in at least one embodiment, inferencing and/or training operations described herein may be done using logic other than logic illustrated in FIG. 9 or 10. In at least one embodiment, weight parameters may be stored in on-chip or off-chip memory and/or registers (shown or not shown) that configure ALUs of execution logic 4000 to perform one or more machine learning algorithms, neural network architectures, use cases, or training techniques described herein. In at least one embodiment, inference and/or training logic 1015 are used to perform segmentation based on extreme points.

Figure 42:
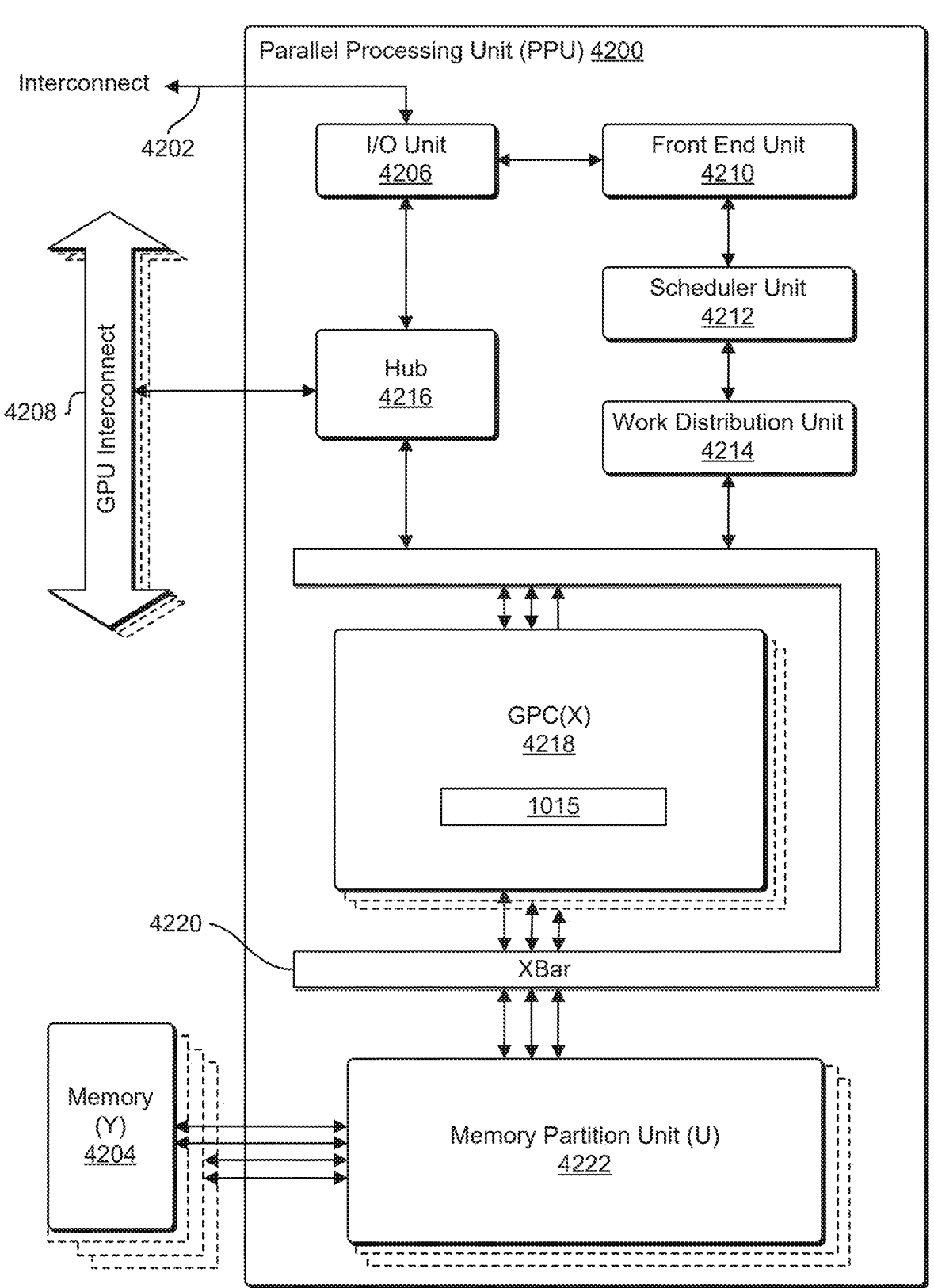
FIG. 42 illustrates a parallel processing unit ("PPU"), according to at least one embodiment.

FIG. 42 illustrates a parallel processing unit ("PPU") 4200, according to at least one embodiment. In at least one embodiment, PPU 4200 is configured with machine-readable code that, if executed by PPU 4200, causes PPU 4200 to perform some or all of processes and techniques described throughout this disclosure. In at least one embodiment, PPU 4200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4200. In at least one embodiment, PPU 4200 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 4200 is utilized to perform computations such as linear algebra operations and machine-learning operations. FIG. 42 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 4200 are configured to accelerate High Performance Computing ("HPC"), data center, and machine learning applications. In at least one embodiment, PPU 4200 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 4200 includes, without limitation, an Input/Output ("I/O") unit 4206, a front-end unit 4210, a scheduler unit 4212, a work distribution unit 4214, a hub 4216, a crossbar ("Xbar") 4220, one or more general processing clusters ("GPCs") 4218, and one or more partition units ("memory partition units") 4222. In at least one embodiment, PPU 4200 is connected to a host processor or other PPUs 4200 via one or more high-speed GPU interconnects ("GPU interconnects") 4208. In at least one embodiment, PPU 4200 is connected to a host processor or other peripheral devices via an interconnect 4202. In at least one embodiment, PPU 4200 is connected to a local memory comprising one or more memory devices ("memory") 4204. In at least one embodiment, memory devices 4204 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4208 may refer to a wire-based multi-lane communications link that is used by systems to scale and include one or more PPUs 4200 combined with one or more central processing units ("CPUs"), supports cache coherence between PPUs 4200 and CPUs, and CPU mastering. In at least one embodiment, data and/or commands are transmitted by high-speed GPU interconnect 4208 through hub 4216 to/from other units of PPU 4200 such as one or more copy engines, video encoders, video decoders, power management units, and other components which may not be explicitly illustrated in FIG. 42.

In at least one embodiment, I/O unit 4206 is configured to transmit and receive communications (e.g., commands, data) from a host processor (not illustrated in FIG. 42) over system bus 4202. In at least one embodiment, I/O unit 4206 communicates with host processor directly via system bus 4202 or through one or more intermediate devices such as a memory bridge. In at least one embodiment, I/O unit 4206 may communicate with one or more other processors, such as one or more of PPUs 4200 via system bus 4202. In at least one embodiment, I/O unit 4206 implements a Peripheral Component Interconnect Express ("PCIe") interface for communications over a PCIe bus. In at least one embodiment, I/O unit 4206 implements interfaces for communicating with external devices.

In at least one embodiment, I/O unit 4206 decodes packets received via system bus 4202. In at least one embodiment, at least some packets represent commands configured to cause PPU 4200 to perform various operations. In at least one embodiment, I/O unit 4206 transmits decoded commands to various other units of PPU 4200 as specified by commands. In at least one embodiment, commands are transmitted to front-end unit 4210 and/or transmitted to hub 4216 or other units of PPU 4200 such as one or more copy engines, a video encoder, a video decoder, a power management unit, etc. (not explicitly illustrated in FIG. 42). In at least one embodiment, I/O unit 4206 is configured to route communications between and among various logical units of PPU 4200.

In at least one embodiment, a program executed by host processor encodes a command stream in a buffer that provides workloads to PPU 4200 for processing. In at least one embodiment, a workload comprises instructions and data to be processed by those instructions. In at least one embodiment, buffer is a region in a memory that is accessible (e.g., read/write) by both host processor and PPU 4200—a host interface unit may be configured to access buffer in a system memory connected to system bus 4202 via memory requests transmitted over system bus 4202 by I/O unit 4206. In at least one embodiment, host processor writes command stream to buffer and then transmits a pointer to start of command stream to PPU 4200 such that front-end unit 4210 receives pointers to one or more command streams and manages one or more command streams, reading commands from command streams and forwarding commands to various units of PPU 4200.

In at least one embodiment, front-end unit 4210 is coupled to scheduler unit 4212 that configures various GPCs 4218 to process tasks defined by one or more command streams. In at least one embodiment, scheduler unit 4212 is configured to track state information related to various tasks managed by scheduler unit 4212 where state information may indicate which of GPCs 4218 a task is assigned to, whether task is active or inactive, a priority level associated with task, and so forth. In at least one embodiment, scheduler unit 4212 manages execution of a plurality of tasks on one or more of GPCs 4218.

In at least one embodiment, scheduler unit 4212 is coupled to work distribution unit 4214 that is configured to dispatch tasks for execution on GPCs 4218. In at least one embodiment, work distribution unit 4214 tracks a number of scheduled tasks received from scheduler unit 4212 and work distribution unit 4214 manages a pending task pool and an active task pool for each of GPCs 4218. In at least one embodiment, pending task pool comprises a number of slots (e.g., 32 slots) that contain tasks assigned to be processed by a particular GPC 4218; active task pool may comprise a number of slots (e.g., 4 slots) for tasks that are actively being processed by GPCs 4218 such that as one of GPCs 4218 completes execution of a task, that task is evicted from active task pool for GPC 4218 and one of other tasks from pending task pool is selected and scheduled for execution on GPC 4218. In at least one embodiment, if an active task is idle on GPC 4218, such as while waiting for a data dependency to be resolved, then active task is evicted from GPC 4218 and returned to pending task pool while another task in pending task pool is selected and scheduled for execution on GPC 4218.

In at least one embodiment, work distribution unit 4214 communicates with one or more GPCs 4218 via XBar 4220. In at least one embodiment, XBar 4220 is an interconnect network that couples many of units of PPU 4200 to other units of PPU 4200 and can be configured to couple work distribution unit 4214 to a particular GPC 4218. In at least one embodiment, one or more other units of PPU 4200 may also be connected to XBar 4220 via hub 4216.

In at least one embodiment, tasks are managed by scheduler unit 4212 and dispatched to one of GPCs 4218 by work distribution unit 4214. GPC 4218 is configured to process task and generate results. In at least one embodiment, results may be consumed by other tasks within GPC 4218, routed to a different GPC 4218 via XBar 4220, or stored in memory 4204. In at least one embodiment, results can be written to memory 4204 via partition units 4222, which implement a memory interface for reading and writing data to/from memory 4204. In at least one embodiment, results can be transmitted to another PPU 4204 or CPU via high-speed GPU interconnect 4208. In at least one embodiment, PPU 4200 includes, without limitation, a number U of partition units 4222 that is equal to number of separate and distinct memory devices 4204 coupled to PPU 4200. In at least one embodiment, partition unit 4222 will be described in more detail below in conjunction with FIG. 44.

In at least one embodiment, a host processor executes a driver kernel that implements an application programming interface ("API") that enables one or more applications executing on host processor to schedule operations for execution on PPU 4200. In at least one embodiment, multiple compute applications are simultaneously executed by PPU 4200 and PPU 4200 provides isolation, quality of service ("QoS"), and independent address spaces for multiple compute applications. In at least one embodiment, an application generates instructions (e.g., in form of API calls) that cause driver kernel to generate one or more tasks for execution by PPU 4200 and driver kernel outputs tasks to one or more streams being processed by PPU 4200. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 44.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, deep learning application processor is used to train a machine learning model, such as a neural network, to predict or infer information provided to PPU 4200. In at least one embodiment, PPU 4200 is used to infer or predict information based on a trained machine learning model (e.g., neural network) that has been trained by another processor or system or by PPU 4200. In at least one embodiment, PPU 4200 may be used to perform one or more neural network use cases described herein. In at least one embodiment, inference and/or training logic 1015 are used to perform segmentation based on extreme points.

Figure 43:
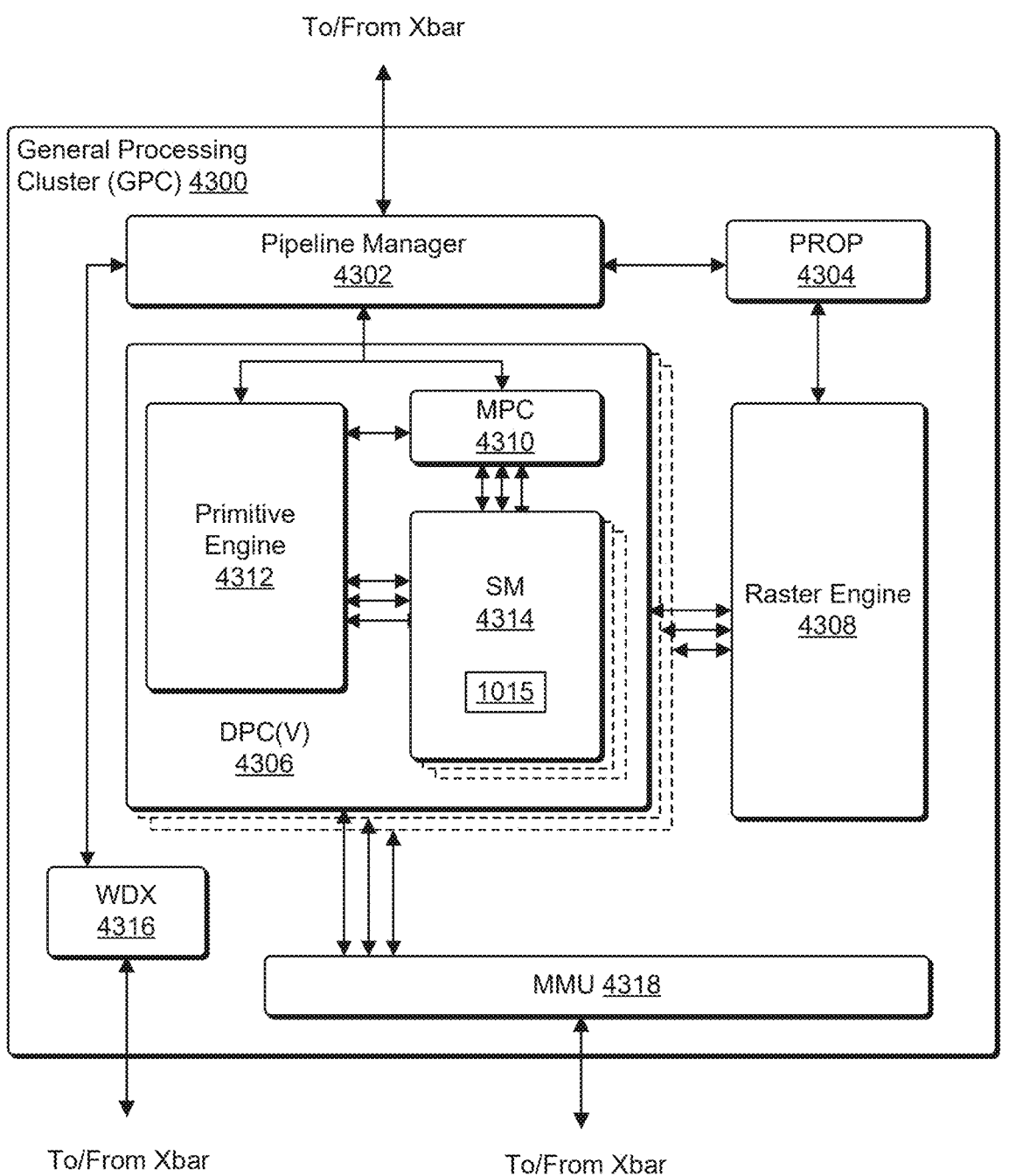
FIG. 43 illustrates a general processing cluster ("GPC"), according to at least one embodiment.

FIG. 43 illustrates a general processing cluster ("GPC") 4300, according to at least one embodiment. In at least one embodiment, GPC 4300 is GPC 4218 of FIG. 42. In at least one embodiment, each GPC 4300 includes, without limitation, a number of hardware units for processing tasks and each GPC 4300 includes, without limitation, a pipeline manager 4302, a pre-raster operations unit ("PROP") 4304, a raster engine 4308, a work distribution crossbar ("WDX") 4316, a memory management unit ("MMU") 4318, one or more Data Processing Clusters ("DPCs") 4306, and any suitable combination of parts.

In at least one embodiment, operation of GPC 4300 is controlled by pipeline manager 4302. In at least one embodiment, pipeline manager 4302 manages configuration of one or more DPCs 4306 for processing tasks allocated to GPC 4300. In at least one embodiment, pipeline manager 4302 configures at least one of one or more DPCs 4306 to implement at least a portion of a graphics rendering pipeline. In at least one embodiment, DPC 4306 is configured to execute a vertex shader program on a programmable streaming multi-processor ("SM") 4314. In at least one embodiment, pipeline manager 4302 is configured to route packets received from a work distribution unit to appropriate logical units within GPC 4300, in at least one embodiment, and some packets may be routed to fixed function hardware units in PROP 4304 and/or raster engine 4308 while other packets may be routed to DPCs 4306 for processing by a primitive engine 4312 or SM 4314. In at least one embodiment, pipeline manager 4302 configures at least one of DPCs 4306 to implement a neural network model and/or a computing pipeline.

In at least one embodiment, PROP unit 4304 is configured, in at least one embodiment, to route data generated by raster engine 4308 and DPCs 4306 to a Raster Operations ("ROP") unit in partition unit 4222, described in more detail above in conjunction with FIG. 42. In at least one embodiment, PROP unit 4304 is configured to perform optimizations for color blending, organize pixel data, perform address translations, and more. In at least one embodiment, raster engine 4308 includes, without limitation, a number of fixed function hardware units configured to perform various raster operations, in at least one embodiment, and raster engine 4308 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 4308 comprises fragments to be processed by any suitable entity such as by a fragment shader implemented within DPC 4306.

In at least one embodiment, each DPC 4306 included in GPC 4300 comprise, without limitation, an M-Pipe Controller ("MPC") 4310; primitive engine 4312; one or more SMs 4314; and any suitable combination thereof. In at least one embodiment, MPC 4310 controls operation of DPC 4306, routing packets received from pipeline manager 4302 to appropriate units in DPC 4306. In at least one embodiment, packets associated with a vertex are routed to primitive engine 4312, which is configured to fetch vertex attributes associated with vertex from memory; in contrast, packets associated with a shader program may be transmitted to SM 4314.

In at least one embodiment, SM 4314 comprises, without limitation, a programmable streaming processor that is configured to process tasks represented by a number of threads. In at least one embodiment, SM 4314 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 4314 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 4314 are described in more detail below.

In at least one embodiment, MMU 4318 provides an interface between GPC 4300 and memory partition unit (e.g., partition unit 4222 of FIG. 42) and MMU 4318 provides translation of virtual addresses into physical addresses, memory protection, and arbitration of memory requests. In at least one embodiment, MMU 4318 provides one or more translation lookaside buffers ("TLBs") for performing translation of virtual addresses into physical addresses in memory.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, deep learning application processor is used to train a machine learning model, such as a neural network, to predict or infer information provided to GPC 4300. In at least one embodiment, GPC 4300 is used to infer or predict information based on a trained machine learning model (e.g., neural network) that has been trained by another processor or system or by GPC 4300. In at least one embodiment, GPC 4300 may be used to perform one or more neural network use cases described herein. In at least one embodiment, inference and/or training logic 1015 are used to perform segmentation based on extreme points. In at least one embodiment, inference and/or training logic 1015 are used to perform segmentation based on extreme points.

Figure 44:
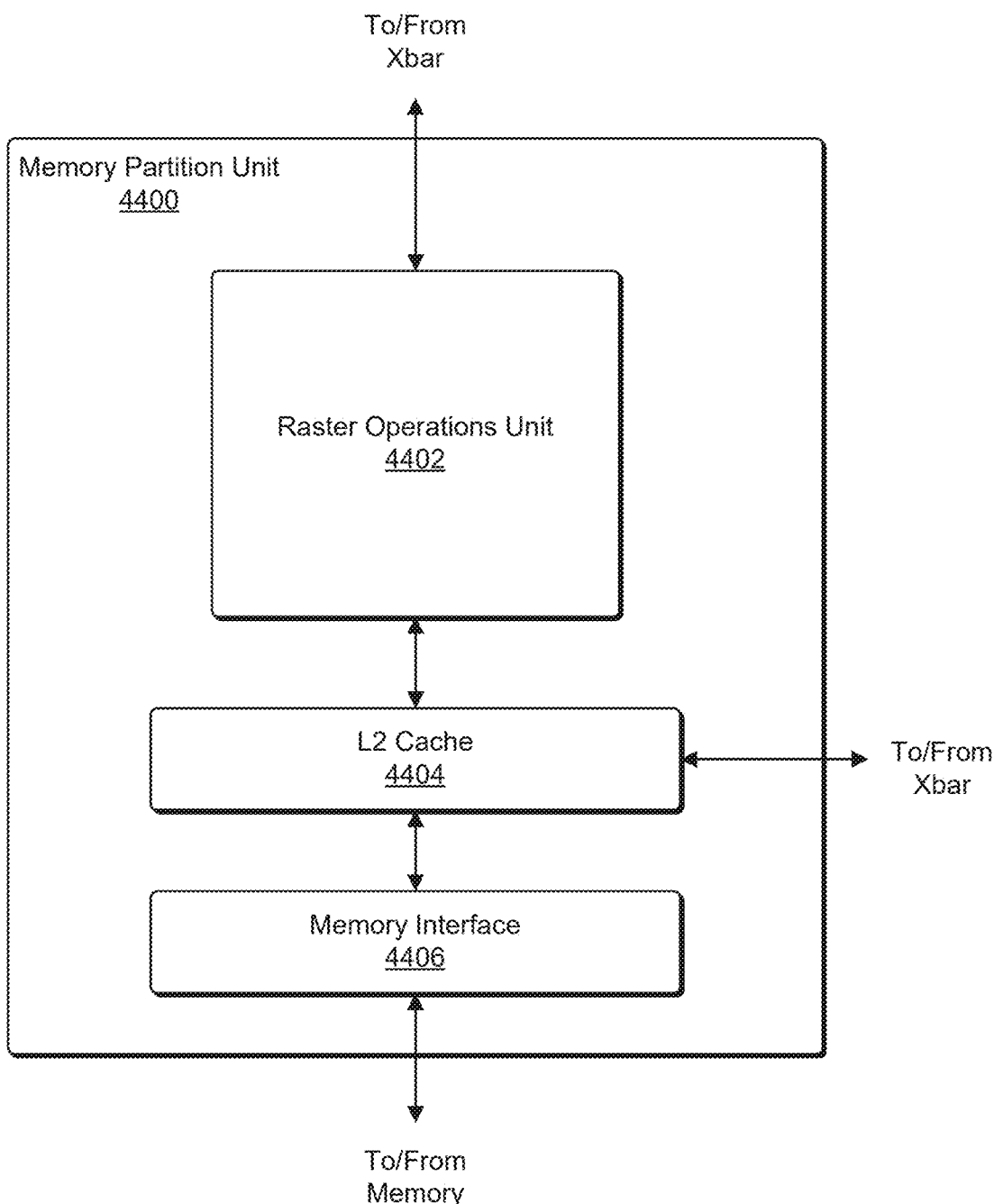
FIG. 44 illustrates a memory partition unit of a parallel processing unit ("PPU"), according to at least one embodiment.

FIG. 44 illustrates a memory partition unit 4400 of a parallel processing unit ("PPU"), in accordance with at least one embodiment. In at least one embodiment, memory partition unit 4400 includes, without limitation, a Raster Operations ("ROP") unit 4402; a level two ("L2") cache 4404; a memory interface 4406; and any suitable combination thereof. In at least one embodiment, memory interface 4406 is coupled to memory. In at least one embodiment, memory interface 4406 may implement 32, 64, 128, 1024-bit data buses, or similar implementations, for high-speed data transfer. In at least one embodiment, PPU incorporates U memory interfaces 4406, one memory interface 4406 per pair of partition units 4400, where each pair of partition units 4400 is connected to a corresponding memory device. For example, in at least one embodiment, PPU may be connected to up to Y memory devices, such as high bandwidth memory stacks or graphics double-data-rate, version 5, synchronous dynamic random a44ess memory ("GDDR5 SDRAM").

In at least one embodiment, memory interface 4406 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. In at least one embodiment, ECC provides higher reliability for compute applications that are sensitive to data corruption.

In at least one embodiment, PPU implements a multi-level memory hierarchy. In at least one embodiment, memory partition unit 4400 supports a unified memory to provide a single unified virtual address space for central processing unit ("CPU") and PPU memory, enabling data sharing between virtual memory systems. In at least one embodiment, frequency of accesses by a PPU to memory located on other processors is traced to ensure that memory pages are moved to physical memory of PPU that is accessing pages more frequently. In at least one embodiment, high-speed GPU interconnect 4208 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 4400 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 4204 of FIG. 42 or other system memory is fetched by memory partition unit 4400 and stored in L2 cache 4404, which is located on-chip and is shared between various GPCs, in accordance with at least one embodiment. Each memory partition unit 4400, in at least one embodiment, includes, without limitation, at least a portion of L2 cache associated with a corresponding memory device. In at least one embodiment, lower level caches are implemented in various units within GPCs. In at least one embodiment, each of SMs 4314 may implement a level one ("L1") cache wherein L1 cache is private memory that is dedicated to a particular SM 4314 and data from L2 cache 4404 is fetched and stored in each of L1 caches for processing in functional units of SMs 4314. In at least one embodiment, L2 cache 4404 is coupled to memory interface 4406 and XBar 4220.

ROP unit 4402 performs graphics raster operations related to pixel color, such as color compression, pixel blending, and more, in at least one embodiment. ROP unit 4402, in at least one embodiment, implements depth testing in conjunction with raster engine 4308, receiving a depth for a sample location associated with a pixel fragment from culling engine of raster engine 4308. In at least one embodiment, depth is tested against a corresponding depth in a depth buffer for a sample location associated with fragment. In at least one embodiment, if fragment passes depth test for sample location, then ROP unit 4402 updates depth buffer and transmits a result of depth test to raster engine 4308. It will be appreciated that number of partition units 4400 may be different than number of GPCs and, therefore, each ROP unit 4402 can, in at least one embodiment, be coupled to each of GPCs. In at least one embodiment, ROP unit 4402 tracks packets received from different GPCs and determines which that a result generated by ROP unit 4402 is routed to through XBar 4220.

Figure 45:
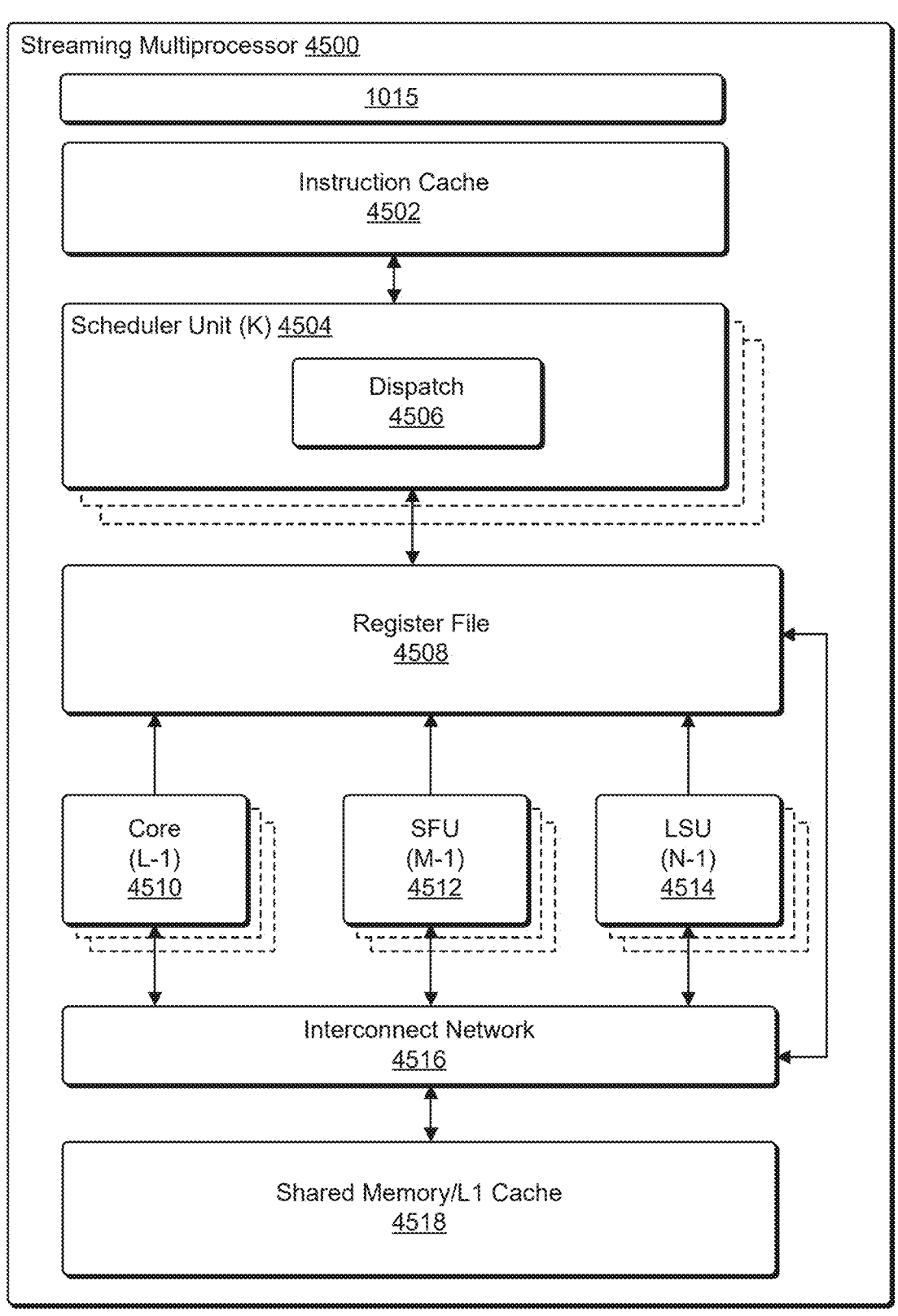
FIG. 45 illustrates a streaming multi-processor, according to at least one embodiment.

FIG. 45 illustrates a streaming multi-processor ("SM") 4500, according to at least one embodiment. In at least one embodiment, SM 4500 is SM 4314 of FIG. 43. In at least one embodiment, SM 4500 includes, without limitation, an instruction cache 4502; one or more scheduler units 4504; a register file 4508; one or more processing cores ("cores") 4510; one or more special function units ("SFUs") 4512; one or more load/store units ("LSUs") 4514; an interconnect network 4516; a shared memory/level one ("L1") cache 4518; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 4500. In at least one embodiment, scheduler unit 4504 receives tasks from work distribution unit and manages instruction scheduling for one or more thread blocks assigned to SM 4500. In at least one embodiment, scheduler unit 4504 schedules thread blocks for execution as warps of parallel threads, wherein each thread block is allocated at least one warp. In at least one embodiment, each warp executes threads. In at least one embodiment, scheduler unit 4504 manages a plurality of different thread blocks, allocating warps to different thread blocks and then dispatching instructions from plurality of different cooperative groups to various functional units (e.g., processing cores 4510, SFUs 4512, and LSUs 4514) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). In at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4506 is configured to transmit instructions to one or more of functional units and scheduler unit 4504 includes, without limitation, two dispatch units 4506 that enable two different instructions from same warp to be dispatched during each clock cycle. In at least one embodiment, each scheduler unit 4504 includes a single dispatch unit 4506 or additional dispatch units 4506.

In at least one embodiment, each SM 4500, in at least one embodiment, includes, without limitation, register file 4508 that provides a set of registers for functional units of SM 4500. In at least one embodiment, register file 4508 is divided between each of functional units such that each functional unit is allocated a dedicated portion of register file 4508. In at least one embodiment, register file 4508 is divided between different warps being executed by SM 4500 and register file 4508 provides temporary storage for operands connected to data paths of functional units. In at least one embodiment, each SM 4500 comprises, without limitation, a plurality of L processing cores 4510. In at least one embodiment, SM 4500 includes, without limitation, a large number (e.g., 128 or more) of distinct processing cores 4510. In at least one embodiment, each processing core 4510, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4510 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4510. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 4500 comprises, without limitation, M SFUs 4512 that perform special functions (e.g., attribute evaluation, reciprocal square root, etc.). In at least one embodiment, SFUs 4512 include, without limitation, a tree traversal unit configured to traverse a hierarchical tree data structure. In at least one embodiment, SFUs 4512 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4500. In at least one embodiment, texture maps are stored in shared memory/L1 cache 4518. In at least one embodiment, texture units implement texture operations such as filtering operations using mip-maps (e.g., texture maps of varying levels of detail), in accordance with at least one embodiment. In at least one embodiment, each SM 4500 includes, without limitation, two texture units.

Each SM 4500 comprises, without limitation, N LSUs 4514 that implement load and store operations between shared memory/L1 cache 4518 and register file 4508, in at least one embodiment. Each SM 4500 includes, without limitation, interconnect network 4516 that connects each of functional units to register file 4508 and LSU 4514 to register file 4508 and shared memory/L1 cache 4518 in at least one embodiment. In at least one embodiment, interconnect network 4516 is a crossbar that can be configured to connect any of functional units to any of registers in register file 4508 and connect LSUs 4514 to register file 4508 and memory locations in shared memory/L1 cache 4518.

In at least one embodiment, shared memory/L1 cache 4518 is an array of on-chip memory that allows for data storage and communication between SM 4500 and primitive engine and between threads in SM 4500, in at least one embodiment. In at least one embodiment, shared memory/L1 cache 4518 comprises, without limitation, 128 KB of storage capacity and is in path from SM 4500 to partition unit. In at least one embodiment, shared memory/L1 cache 4518, in at least one embodiment, is used to cache reads and writes. In at least one embodiment, one or more of shared memory/L1 cache 4518, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 4518 enables shared memory/L1 cache 4518 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 4500 to execute program and perform calculations, shared memory/L1 cache 4518 to communicate between threads, and LSU 4514 to read and write global memory through shared memory/L1 cache 4518 and memory partition unit. In at least one embodiment, when configured for general purpose parallel computation, SM 4500 writes commands that scheduler unit 4504 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated graphics processing unit ("iGPU") included in chipset of motherboard.

Inference and/or training logic 1015 are used to perform inferencing and/or training operations associated with one or more embodiments. Details regarding inference and/or training logic 1015 are provided below in conjunction with FIGS. 9 and/or 10. In at least one embodiment, deep learning application processor is used to train a machine learning model, such as a neural network, to predict or infer information provided to SM 4500. In at least one embodiment, SM 4500 is used to infer or predict information based on a trained machine learning model (e.g., neural network) that has been trained by another processor or system or by SM 4500. In at least one embodiment, SM 4500 may be used to perform one or more neural network use cases described herein. In at least one embodiment, inference and/or training logic 1015 are used to perform segmentation based on extreme points.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 1404 and/or secondary storage. Computer programs, if executed by one or more processors, enable system 1400 to perform various functions in accordance with at least one embodiment. In at least one embodiment, memory 1404, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1402; parallel processing system 1412; an integrated circuit capable of at least a portion of capabilities of both CPU 1402; parallel processing system 1412; a chipset (e.g., a group of integrated circuits designed to work and sold as a unit for performing related functions, etc.); and any suitable combination of integrated circuit(s).

Training and Inference

Figure 46:
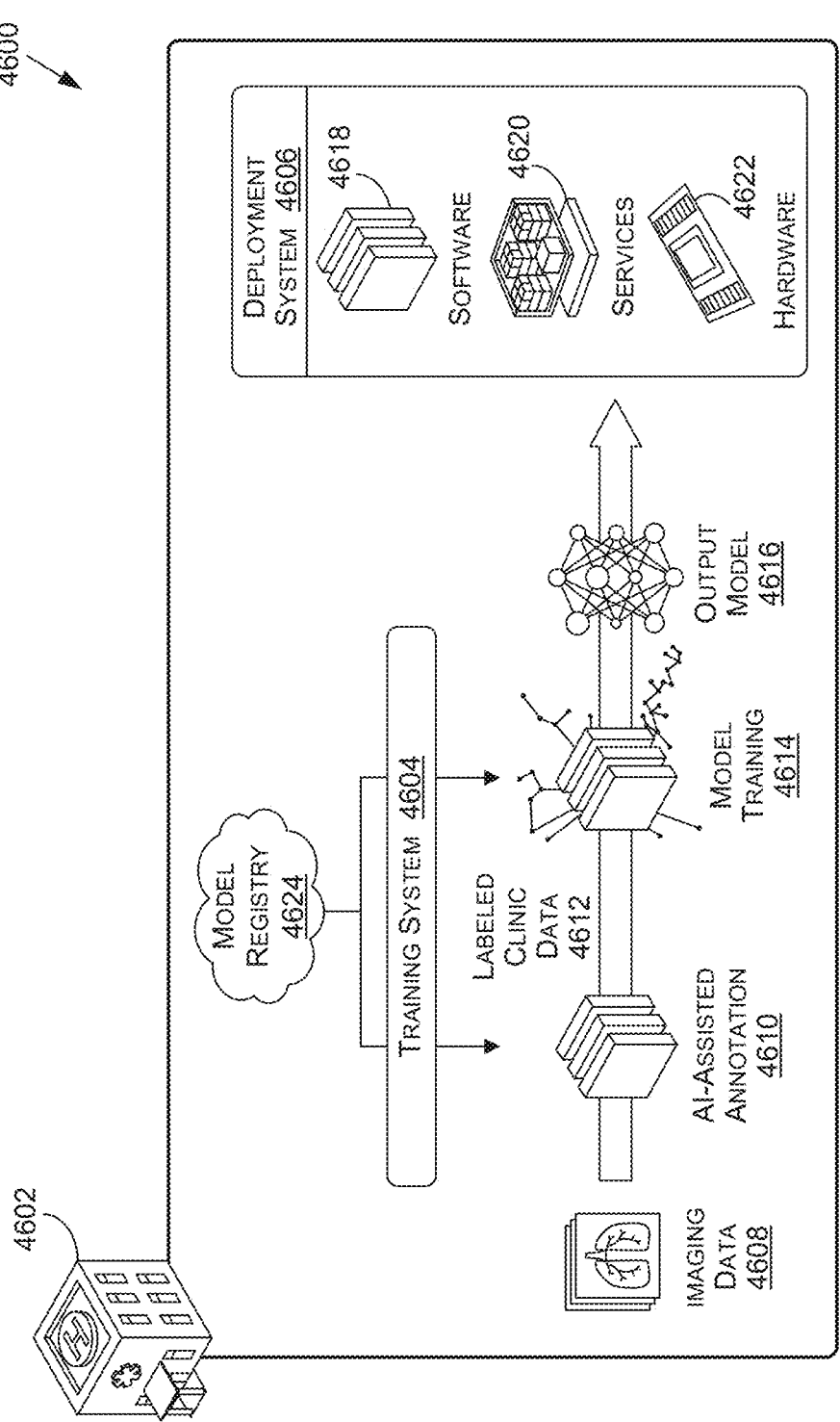
FIG. 46 is an example data flow diagram for an advanced computing pipeline, in accordance with at least one embodiment.

With reference to FIG. 46, FIG. 46 is an example data flow diagram for a process 4600 of generating and deploying an image processing and inferencing pipeline, in accordance with at least one embodiment. In at least one embodiment, process 4600 may be deployed for use with imaging devices, processing devices, genomics devices, gene sequencing devices, radiology devices, and/or other device types at one or more facilities 4602, such as medical facilities, hospitals, healthcare institutes, clinics, research or diagnostic labs, etc. In at least one embodiment, process 4600 may be deployed to perform genomics analysis and inferencing on sequencing data. Examples of genomic analyses that may be performed using systems and processes described herein include, without limitation, variant calling, mutation detection, and gene expression quantification. Process 4600 may be executed within a training system 4604 and/or a deployment system 4606. In at least one embodiment, training system 4604 may be used to perform training, deployment, and implementation of machine learning models (e.g., neural networks, object detection algorithms, computer vision algorithms, etc.) for use in deployment system 4606. In at least one embodiment, deployment system 4606 may be configured to offload processing and compute resources among a distributed computing environment to reduce infrastructure requirements at facility 4602. In at least one embodiment, deployment system 4606 may provide a streamlined platform for selecting, customizing, and implementing virtual instruments for use with imaging devices (e.g., MRI, CT Scan, X-Ray, Ultrasound, etc.) or sequencing devices at facility 4602. In at least one embodiment, virtual instruments may include software-defined applications for performing one or more processing operations with respect to imaging data generated by imaging devices, sequencing devices, radiology devices, and/or other device types. In at least one embodiment, one or more applications in a pipeline may use or call upon services (e.g., inference, visualization, compute, AI, etc.) of deployment system 4606 during execution of applications.

In at least one embodiment, some of applications used in advanced processing and inferencing pipelines may use machine learning models or other AI to perform one or more processing steps. In at least one embodiment, machine learning models may be trained at facility 4602 using data 4608 (such as imaging data) generated at facility 4602 (and stored on one or more picture archiving and communication system (PACS) servers at facility 4602), may be trained using imaging or sequencing data 4608 from another facility(ies) (e.g., a different hospital, lab, clinic, etc.), or a combination thereof. In at least one embodiment, training system 4604 may be used to provide applications, services, and/or other resources for generating working, deployable machine learning models for deployment system 4606.

In at least one embodiment, model registry 4624 may be backed by object storage that may support versioning and object metadata. In at least one embodiment, object storage may be accessible through, for example, a cloud storage (e.g., cloud 4726 of FIG. 47) compatible application programming interface (API) from within a cloud platform. In at least one embodiment, machine learning models within model registry 4624 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 4704 (FIG. 47) may include a scenario where facility 4602 is training their own machine learning model, or has an existing machine learning model that needs to be optimized or updated. In at least one embodiment, imaging data 4608 generated by imaging device(s), sequencing devices, and/or other device types may be received. In at least one embodiment, once imaging data 4608 is received, AI-assisted annotation 4610 may be used to aid in generating annotations corresponding to imaging data 4608 to be used as ground truth data for a machine learning model. In at least one embodiment, AI-assisted annotation 4610 may include one or more machine learning models (e.g., convolutional neural networks (CNNs)) that may be trained to generate annotations corresponding to certain types of imaging data 4608 (e.g., from certain devices) and/or certain types of anomalies in imaging data 4608. In at least one embodiment, AI-assisted annotations 4610 may then be used directly, or may be adjusted or fine-tuned using an annotation tool (e.g., by a researcher, a clinician, a doctor, a scientist, etc.), to generate ground truth data. In at least one embodiment, in some examples, labeled clinic data 4612 (e.g., annotations provided by a clinician, doctor, scientist, technician, etc.) may be used as ground truth data for training a machine learning model. In at least one embodiment, AI-assisted annotations 4610, labeled clinic data 4612, or a combination thereof may be used as ground truth data for training a machine learning model. In at least one embodiment, a trained machine learning model may be referred to as output model 4616, and may be used by deployment system 4606, as described herein.

In at least one embodiment, training pipeline 4704 (FIG. 47) may include a scenario where facility 4602 needs a machine learning model for use in performing one or more processing tasks for one or more applications in deployment system 4606, but facility 4602 may not currently have such a machine learning model (or may not have a model that is optimized, efficient, or effective for such purposes). In at least one embodiment, an existing machine learning model may be selected from a model registry 4624. In at least one embodiment, model registry 4624 may include machine learning models trained to perform a variety of different inference tasks on imaging data. In at least one embodiment, machine learning models in model registry 4624 may have been trained on imaging data from different facilities than facility 4602 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 4624. In at least one embodiment, a machine learning model may then be retrained, or updated, at any number of other facilities, and a retrained or updated model may be made available in model registry 4624. In at least one embodiment, a machine learning model may then be selected from model registry 4624—and referred to as output model 4616—and may be used in deployment system 4606 to perform one or more processing tasks for one or more applications of a deployment system.

In at least one embodiment, training pipeline 4704 (FIG. 47), a scenario may include facility 4602 requiring a machine learning model for use in performing one or more processing tasks for one or more applications in deployment system 4606, but facility 4602 may not currently have such a machine learning model (or may not have a model that is optimized, efficient, or effective for such purposes). In at least one embodiment, a machine learning model selected from model registry 4624 may not be fine-tuned or optimized for imaging data 4608 generated at facility 4602 because of differences in populations, genetic variations, robustness of training data used to train a machine learning model, diversity in anomalies of training data, and/or other issues with training data. In at least one embodiment, AI-assisted annotation 4610 may be used to aid in generating annotations corresponding to imaging data 4608 to be used as ground truth data for retraining or updating a machine learning model. In at least one embodiment, labeled clinic data 4612 (e.g., annotations provided by a clinician, doctor, scientist, etc.) may be used as ground truth data for training a machine learning model. In at least one embodiment, retraining or updating a machine learning model may be referred to as model training 4614. In at least one embodiment, model training 4614—e.g., AI-assisted annotations 4610, labeled clinic data 4612, or a combination thereof—may be used as ground truth data for retraining or updating a machine learning model. In at least one embodiment, a trained machine learning model may be referred to as output model 4616, and may be used by deployment system 4606, as described herein.

In at least one embodiment, deployment system 4606 may include software 4618, services 4620, hardware 4622, and/or other components, features, and functionality. In at least one embodiment, deployment system 4606 may include a software "stack," such that software 4618 may be built on top of services 4620 and may use services 4620 to perform some or all of processing tasks, and services 4620 and software 4618 may be built on top of hardware 4622 and use hardware 4622 to execute processing, storage, and/or other compute tasks of deployment system 4606. In at least one embodiment, software 4618 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of imaging device (e.g., CT, MRI, X-Ray, ultrasound, sonography, echocardiography, etc.), sequencing device, radiology device, genomics device, etc., there may be any number of containers that may perform a data processing task with respect to imaging data 4608 (or other data types, such as those described herein) generated by a device. In at least one embodiment, an advanced processing and inferencing pipeline may be defined based on selections of different containers that are desired or required for processing imaging data 4608, in addition to containers that receive and configure imaging data for use by each container and/or for use by facility 4602 after processing through a pipeline (e.g., to convert outputs back to a usable data type, such as digital imaging and communications in medicine (DICOM) data, radiology information system (RIS) data, clinical information system (CIS) data, remote procedure call (RPC) data, data substantially compliant with a representation state transfer (REST) interface, data substantially compliant with a file-based interface, and/or raw data, for storage and display at facility 4602). In at least one embodiment, a combination of containers within software 4618 (e.g., that make up a pipeline) may be referred to as a virtual instrument (as described in more detail herein), and a virtual instrument may leverage services 4620 and hardware 4622 to execute some or all processing tasks of applications instantiated in containers.

In at least one embodiment, a data processing pipeline may receive input data (e.g., imaging data 4608) in a DICOM, RIS, CIS, REST compliant, RPC, raw, and/or other format in response to an inference request (e.g., a request from a user of deployment system 4606, such as a clinician, a doctor, a radiologist, etc.). In at least one embodiment, input data may be representative of one or more images, video, and/or other data representations generated by one or more imaging devices, sequencing devices, radiology devices, genomics devices, and/or other device types. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 4616 of training system 4604.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 4624 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 4620 as a system (e.g., system 4700 of FIG. 47). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming DICOM data. In at least one embodiment, once validated by system 4700 (e.g., for accuracy, safety, patient privacy, etc.), an application may be available in a container registry for selection and/or implementation by a user (e.g., a hospital, clinic, lab, healthcare provider, etc.) to perform one or more processing tasks with respect to data at a facility (e.g., a second facility) of a user.

Figure 47:
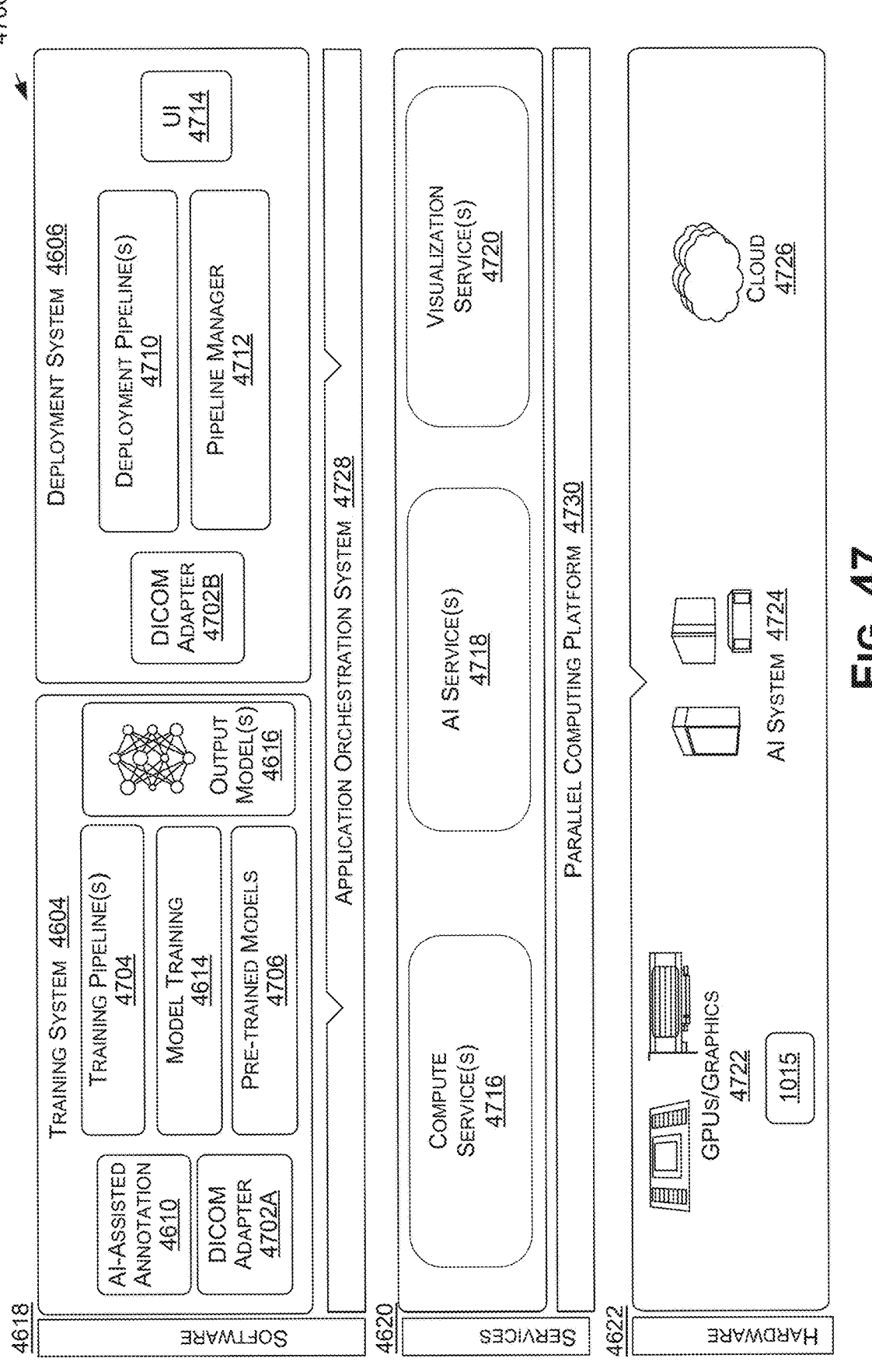
FIG. 47 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 4700 of FIG. 47). In at least one embodiment, completed and validated applications or containers may be stored in a container registry and associated machine learning models may be stored in model registry 4624. In at least one embodiment, a requesting entity (e.g., a user at a medical facility)—who provides an inference or image processing request—may browse a container registry and/or model registry 4624 for an application, container, dataset, machine learning model, etc., select a desired combination of elements for inclusion in data processing pipeline, and submit an imaging processing request.

In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 4606 (e.g., a cloud) to perform processing of data processing pipeline. In at least one embodiment, processing by deployment system 4606 may include referencing selected elements (e.g., applications, containers, models, etc.) from a container registry and/or model registry 4624. In at least one embodiment, once results are generated by a pipeline, results may be returned to a user for reference (e.g., for viewing in a viewing application suite executing on a local, on-premises workstation or terminal). In at least one embodiment, a radiologist may receive results from an data processing pipeline including any number of application and/or containers, where results may include anomaly detection in X-rays, CT scans, MRIs, etc.

In at least one embodiment, to aid in processing or execution of applications or containers in pipelines, services 4620 may be leveraged. In at least one embodiment, services 4620 may include compute services, artificial intelligence (AI) services, visualization services, and/or other service types. In at least one embodiment, services 4620 may provide functionality that is common to one or more applications in software 4618, so functionality may be abstracted to a service that may be called upon or leveraged by applications. In at least one embodiment, functionality provided by services 4620 may run dynamically and more efficiently, while also scaling well by allowing applications to process data in parallel (e.g., using a parallel computing platform 4730 (FIG. 47)). In at least one embodiment, rather than each application that shares a same functionality offered by a service 4620 being required to have a respective instance of service 4620, service 4620 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc. —to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 4620 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 4618 implementing advanced processing and inferencing pipeline that includes segmentation application and anomaly detection application may be streamlined because each application may call upon a same inference service to perform one or more inferencing tasks.

In at least one embodiment, hardware 4622 may include GPUs, CPUs, graphics cards, an AI/deep learning system (e.g., an AI supercomputer, such as NVIDIA's DGX), a cloud platform, or a combination thereof. In at least one embodiment, different types of hardware 4622 may be used to provide efficient, purpose-built support for software 4618 and services 4620 in deployment system 4606. In at least one embodiment, use of GPU processing may be implemented for processing locally (e.g., at facility 4602), within an AI/deep learning system, in a cloud system, and/or in other processing components of deployment system 4606 to improve efficiency, accuracy, and efficacy of image processing, image reconstruction, segmentation, MRI exams, stroke or heart attack detection (e.g., in real-time), image quality in rendering, etc. In at least one embodiment, a facility may include imaging devices, genomics devices, sequencing devices, and/or other device types on-premises that may leverage GPUs to generate imaging data representative of a subject's anatomy. In at least one embodiment, software 4618 and/or services 4620 may be optimized for GPU processing with respect to deep learning, machine learning, and/or high-performance computing, as non-limiting examples. In at least one embodiment, at least some of computing environment of deployment system 4606 and/or training system 4604 may be executed in a datacenter one or more supercomputers or high performance computing systems, with GPU optimized software (e.g., hardware and software combination of NVIDIA's DGX System). In at least one embodiment, datacenters may be compliant with provisions of HIPAA, such that receipt, processing, and transmission of imaging data and/or other patient data is securely handled with respect to privacy of patient data. In at least one embodiment, hardware 4622 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 47 is a system diagram for an example system 4700 for generating and deploying an imaging deployment pipeline, in accordance with at least one embodiment. In at least one embodiment, system 4700 may be used to implement process 4600 of FIG. 46 and/or other processes including advanced processing and inferencing pipelines. In at least one embodiment, system 4700 may include training system 4604 and deployment system 4606. In at least one embodiment, training system 4604 and deployment system 4606 may be implemented using software 4618, services 4620, and/or hardware 4622, as described herein.

In at least one embodiment, system 4700 (e.g., training system 4604 and/or deployment system 4606) may implemented in a cloud computing environment (e.g., using cloud 4726). In at least one embodiment, system 4700 may be implemented locally with respect to a healthcare services facility, or as a combination of both cloud and local computing resources. In at least one embodiment, in embodiments where cloud computing is implemented, patient data may be separated from, or unprocessed by, by one or more components of system 4700 that would render processing non-compliant with HIPAA and/or other data handling and privacy regulations or laws. In at least one embodiment, access to APIs in cloud 4726 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 4700, may be restricted to a set of public IPs that have been vetted or authorized for interaction.

In at least one embodiment, various components of system 4700 may communicate between and among one another using any of a variety of different network types, including but not limited to local area networks (LANs) and/or wide area networks (WANs) via wired and/or wireless communication protocols. In at least one embodiment, communication between facilities and components of system 4700 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 4604 may execute training pipelines 4704, similar to those described herein with respect to FIG. 46. In at least one embodiment, where one or more machine learning models are to be used in deployment pipelines 4710 by deployment system 4606, training pipelines 4704 may be used to train or retrain one or more (e.g. pre-trained) models, and/or implement one or more of pre-trained models 4706 (e.g., without a need for retraining or updating). In at least one embodiment, as a result of training pipelines 4704, output model(s) 4616 may be generated. In at least one embodiment, training pipelines 4704 may include any number of processing steps, such as but not limited to imaging data (or other input data) conversion or adaption (e.g., using DICOM adapter 4702A to convert DICOM images to another format suitable for processing by respective machine learning models, such as Neuroimaging Informatics Technology Initiative (NIfTI) format), AI-assisted annotation 4610, labeling or annotating of imaging data 4608 to generate labeled clinic data 4612, model selection from a model registry, model training 4614, training, retraining, or updating models, and/or other processing steps. In at least one embodiment, for different machine learning models used by deployment system 4606, different training pipelines 4704 may be used. In at least one embodiment, training pipeline 4704 similar to a first example described with respect to FIG. 46 may be used for a first machine learning model, training pipeline 4704 similar to a second example described with respect to FIG. 46 may be used for a second machine learning model, and training pipeline 4704 similar to a third example described with respect to FIG. 46 may be used for a third machine learning model. In at least one embodiment, any combination of tasks within training system 4604 may be used depending on what is required for each respective machine learning model. In at least one embodiment, one or more of machine learning models may already be trained and ready for deployment so machine learning models may not undergo any processing by training system 4604, and may be implemented by deployment system 4606.

In at least one embodiment, output model(s) 4616 and/or pre-trained model(s) 4706 may include any types of machine learning models depending on implementation or embodiment. In at least one embodiment, and without limitation, machine learning models used by system 4700 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 48A:
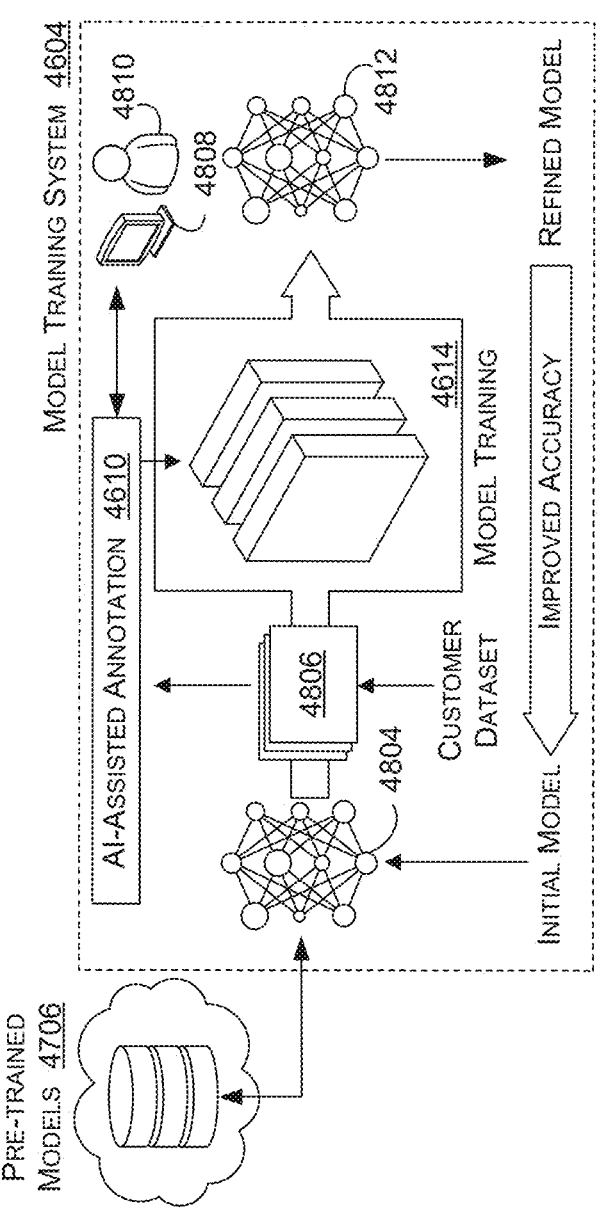
FIG. 48A illustrates a data flow diagram for a process to train a machine learning model, in accordance with at least one embodiment.
Figure 48B:
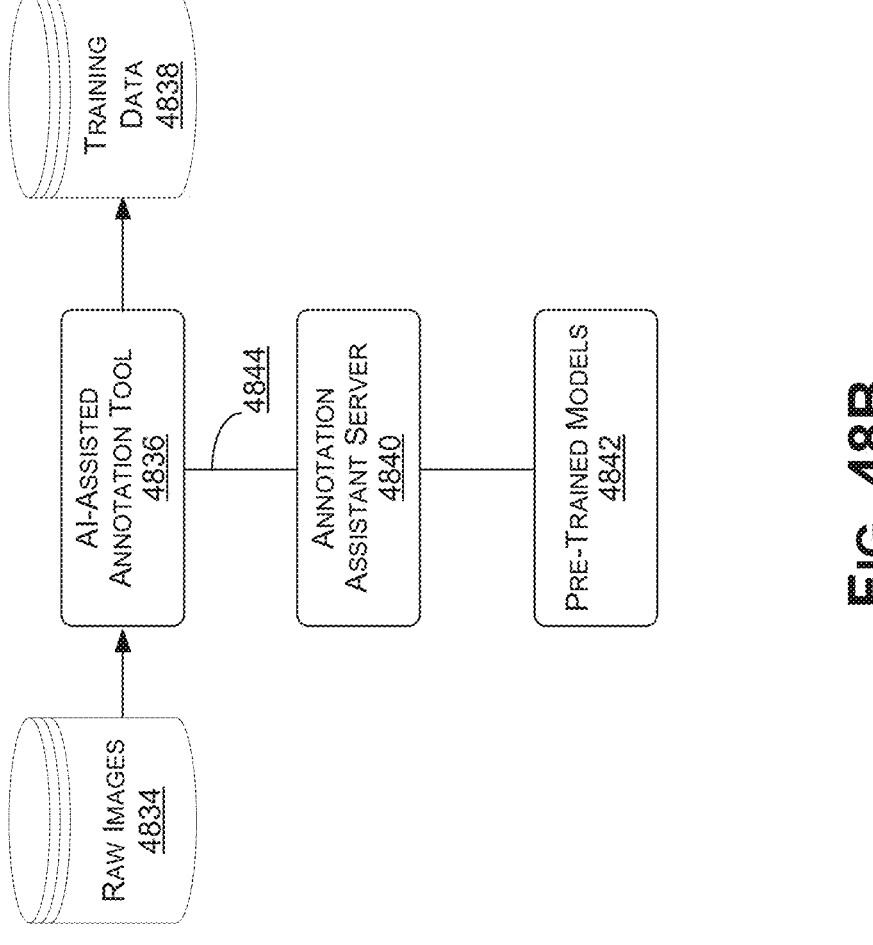
FIG. 48B is an example illustration of a client-server architecture to enhance annotation tools with pre-trained annotation models, in accordance with at least one embodiment.

In at least one embodiment, training pipelines 4704 may include AI-assisted annotation, as described in more detail herein with respect to at least FIG. 48B. In at least one embodiment, labeled clinic data 4612 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 4608 (or other data type used by machine learning models), there may be corresponding ground truth data generated by training system 4604. In at least one embodiment, AI-assisted annotation may be performed as part of deployment pipelines 4710; either in addition to, or in lieu of AI-assisted annotation included in training pipelines 4704. In at least one embodiment, system 4700 may include a multi-layer platform that may include a software layer (e.g., software 4618) of diagnostic applications (or other application types) that may perform one or more medical imaging and diagnostic functions. In at least one embodiment, system 4700 may be communicatively coupled to (e.g., via encrypted links) PACS server networks of one or more facilities. In at least one embodiment, system 4700 may be configured to access and referenced data (e.g., DICOM data, RIS data, raw data, CIS data, REST compliant data, RPC data, raw data, etc.) from PACS servers (e.g., via a DICOM adapter 4702, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 4602). In at least one embodiment, applications may then call or execute one or more services 4620 for performing compute, AI, or visualization tasks associated with respective applications, and software 4618 and/or services 4620 may leverage hardware 4622 to perform processing tasks in an effective and efficient manner.

In at least one embodiment, deployment system 4606 may execute deployment pipelines 4710. In at least one embodiment, deployment pipelines 4710 may include any number of applications that may be sequentially, non-sequentially, or otherwise applied to imaging data (and/or other data types) generated by imaging devices, sequencing devices, genomics devices, etc. —including AI-assisted annotation, as described above. In at least one embodiment, as described herein, a deployment pipeline 4710 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 4710 depending on information desired from data generated by a device. In at least one embodiment, where detections of anomalies are desired from an MRI machine, there may be a first deployment pipeline 4710, and where image enhancement is desired from output of an MRI machine, there may be a second deployment pipeline 4710.

In at least one embodiment, applications available for deployment pipelines 4710 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, deployment system 4606 may define constructs for each of applications, such that users of deployment system 4606 (e.g., medical facilities, labs, clinics, etc.) may understand constructs and adapt applications for implementation within their respective facility. In at least one embodiment, an application for image reconstruction may be selected for inclusion in deployment pipeline 4710, but data type generated by an imaging device may be different from a data type used within an application. In at least one embodiment, DICOM adapter 4702B (and/or a DICOM reader) or another data type adapter or reader (e.g., RIS, CIS, REST compliant, RPC, raw, etc.) may be used within deployment pipeline 4710 to convert data to a form useable by an application within deployment system 4606. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library (e.g., as one of services 4620) may be used to accelerate these operations. In at least one embodiment, to avoid bottlenecks of conventional processing approaches that rely on CPU processing, parallel computing platform 4730 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from model registry 4624. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 4700—such as services 4620 and hardware 4622—deployment pipelines 4710 may be even more user friendly, provide for easier integration, and produce more accurate, efficient, and timely results.

In at least one embodiment, deployment system 4606 may include a user interface 4714 (e.g., a graphical user interface, a web interface, etc.) that may be used to select applications for inclusion in deployment pipeline(s) 4710, arrange applications, modify or change applications or parameters or constructs thereof, use and interact with deployment pipeline(s) 4710 during set-up and/or deployment, and/or to otherwise interact with deployment system 4606. In at least one embodiment, although not illustrated with respect to training system 4604, user interface 4714 (or a different user interface) may be used for selecting models for use in deployment system 4606, for selecting models for training, or retraining, in training system 4604, and/or for otherwise interacting with training system 4604.

In at least one embodiment, pipeline manager 4712 may be used, in addition to an application orchestration system 4728, to manage interaction between applications or containers of deployment pipeline(s) 4710 and services 4620 and/or hardware 4622. In at least one embodiment, pipeline manager 4712 may be configured to facilitate interactions from application to application, from application to service 4620, and/or from application or service to hardware 4622. In at least one embodiment, although illustrated as included in software 4618, this is not intended to be limiting, and in some examples (e.g., as illustrated in FIG. 12*cc*) pipeline manager 4712 may be included in services 4620. In at least one embodiment, application orchestration system 4728 (e.g., Kubernetes, DOCKER, etc.) may include a container orchestration system that may group applications into containers as logical units for coordination, management, scaling, and deployment. In at least one embodiment, by associating applications from deployment pipeline(s) 4710 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 4712 and application orchestration system 4728. In at least one embodiment, so long as an expected input and/or output of each container or application is known by a system (e.g., based on constructs of applications or containers), application orchestration system 4728 and/or pipeline manager 4712 may facilitate communication among and between, and sharing of resources among and between, each of applications or containers. In at least one embodiment, because one or more of applications or containers in deployment pipeline(s) 4710 may share same services and resources, application orchestration system 4728 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 4728) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 4620 leveraged by and shared by applications or containers in deployment system 4606 may include compute services 4716, AI services 4718, visualization services 4720, and/or other service types. In at least one embodiment, applications may call (e.g., execute) one or more of services 4620 to perform processing operations for an application. In at least one embodiment, compute services 4716 may be leveraged by applications to perform super-computing or other high-performance computing (HPC) tasks. In at least one embodiment, compute service(s) 4716 may be leveraged to perform parallel processing (e.g., using a parallel computing platform 4730) for processing data through one or more of applications and/or one or more tasks of a single application, substantially simultaneously. In at least one embodiment, parallel computing platform 4730 (e.g., NVIDIA's CUDA) may enable general purpose computing on GPUs (GPGPU) (e.g., GPUs 4722). In at least one embodiment, a software layer of parallel computing platform 4730 may provide access to virtual instruction sets and parallel computational elements of GPUs, for execution of compute kernels. In at least one embodiment, parallel computing platform 4730 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 4730 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 4718 may be leveraged to perform inferencing services for executing machine learning model(s) associated with applications (e.g., tasked with performing one or more processing tasks of an application). In at least one embodiment, AI services 4718 may leverage AI system 4724 to execute machine learning model(s) (e.g., neural networks, such as CNNs) for segmentation, reconstruction, object detection, feature detection, classification, and/or other inferencing tasks. In at least one embodiment, applications of deployment pipeline(s) 4710 may use one or more of output models 4616 from training system 4604 and/or other models of applications to perform inference on imaging data (e.g., DICOM data, RIS data, CIS data, REST compliant data, RPC data, raw data, etc.). In at least one embodiment, two or more examples of inferencing using application orchestration system 4728 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 4728 may distribute resources (e.g., services 4620 and/or hardware 4622) based on priority paths for different inferencing tasks of AI services 4718.

In at least one embodiment, shared storage may be mounted to AI services 4718 within system 4700. In at least one embodiment, shared storage may operate as a cache (or other storage device type) and may be used to process inference requests from applications. In at least one embodiment, when an inference request is submitted, a request may be received by a set of API instances of deployment system 4606, and one or more instances may be selected (e.g., for best fit, for load balancing, etc.) to process a request. In at least one embodiment, to process a request, a request may be entered into a database, a machine learning model may be located from model registry 4624 if not already in a cache, a validation step may ensure appropriate machine learning model is loaded into a cache (e.g., shared storage), and/or a copy of a model may be saved to a cache. In at least one embodiment, a scheduler (e.g., of pipeline manager 4712) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 4620 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 4726, and an inference service may perform inferencing on a GPU.

In at least one embodiment, visualization services 4720 may be leveraged to generate visualizations for viewing outputs of applications and/or deployment pipeline(s) 4710. In at least one embodiment, GPUs 4722 may be leveraged by visualization services 4720 to generate visualizations. In at least one embodiment, rendering effects, such as ray-tracing, may be implemented by visualization services 4720 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 4720 may include an internal visualizer, cinematics, and/or other rendering or image processing capabilities or functionality (e.g., ray tracing, rasterization, internal optics, etc.).

In at least one embodiment, hardware 4622 may include GPUs 4722, AI system 4724, cloud 4726, and/or any other hardware used for executing training system 4604 and/or deployment system 4606. In at least one embodiment, GPUs 4722 (e.g., NVIDIA's TESLA and/or QUADRO GPUs) may include any number of GPUs that may be used for executing processing tasks of compute services 4716, AI services 4718, visualization services 4720, other services, and/or any of features or functionality of software 4618. For example, with respect to AI services 4718, GPUs 4722 may be used to perform pre-processing on imaging data (or other data types used by machine learning models), post-processing on outputs of machine learning models, and/or to perform inferencing (e.g., to execute machine learning models). In at least one embodiment, cloud 4726, AI system 4724, and/or other components of system 4700 may use GPUs 4722. In at least one embodiment, cloud 4726 may include a GPU-optimized platform for deep learning tasks. In at least one embodiment, AI system 4724 may use GPUs, and cloud 4726—or at least a portion tasked with deep learning or inferencing—may be executed using one or more AI systems 4724. As such, although hardware 4622 is illustrated as discrete components, this is not intended to be limiting, and any components of hardware 4622 may be combined with, or leveraged by, any other components of hardware 4622.

In at least one embodiment, AI system 4724 may include a purpose-built computing system (e.g., a super-computer or an HPC) configured for inferencing, deep learning, machine learning, and/or other artificial intelligence tasks. In at least one embodiment, AI system 4724 (e.g., NVIDIA's DGX) may include GPU-optimized software (e.g., a software stack) that may be executed using a plurality of GPUs 4722, in addition to CPUs, RAM, storage, and/or other components, features, or functionality. In at least one embodiment, one or more AI systems 4724 may be implemented in cloud 4726 (e.g., in a data center) for performing some or all of AI-based processing tasks of system 4700.

In at least one embodiment, cloud 4726 may include a GPU-accelerated infrastructure (e.g., NVIDIA's NGC) that may provide a GPU-optimized platform for executing processing tasks of system 4700. In at least one embodiment, cloud 4726 may include an AI system(s) 4724 for performing one or more of AI-based tasks of system 4700 (e.g., as a hardware abstraction and scaling platform). In at least one embodiment, cloud 4726 may integrate with application orchestration system 4728 leveraging multiple GPUs to enable seamless scaling and load balancing between and among applications and services 4620. In at least one embodiment, cloud 4726 may tasked with executing at least some of services 4620 of system 4700, including compute services 4716, AI services 4718, and/or visualization services 4720, as described herein. In at least one embodiment, cloud 4726 may perform small and large batch inference (e.g., executing NVIDIA's TENSOR RT), provide an accelerated parallel computing API and platform 4730 (e.g., NVIDIA's CUDA), execute application orchestration system 4728 (e.g., KUBERNETES), provide a graphics rendering API and platform (e.g., for ray-tracing, 2D graphics, 3D graphics, and/or other rendering techniques to produce higher quality cinematics), and/or may provide other functionality for system 4700.

In at least one embodiment, in an effort to preserve patient confidentiality (e.g., where patient data or records are to be used off-premises), cloud 4726 may include a registry—such as a deep learning container registry. In at least one embodiment, a registry may store containers for instantiations of applications that may perform pre-processing, post-processing, or other processing tasks on patient data. In at least one embodiment, cloud 4726 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

FIG. 48A illustrates a data flow diagram for a process 4800 to train, retrain, or update a machine learning model, in accordance with at least one embodiment. In at least one embodiment, process 4800 may be executed using, as a non-limiting example, system 4700 of FIG. 47. In at least one embodiment, process 4800 may leverage services 4620 and/or hardware 4622 of system 4700, as described herein. In at least one embodiment, refined models 4812 generated by process 4800 may be executed by deployment system 4606 for one or more containerized applications in deployment pipelines 4710.

In at least one embodiment, model training 4614 may include retraining or updating an initial model 4804 (e.g., a pre-trained model) using new training data (e.g., new input data, such as customer dataset 4806, and/or new ground truth data associated with input data). In at least one embodiment, to retrain, or update, initial model 4804, output or loss layer(s) of initial model 4804 may be reset, or deleted, and/or replaced with an updated or new output or loss layer(s). In at least one embodiment, initial model 4804 may have previously fine-tuned parameters (e.g., weights and/or biases) that remain from prior training, so training or retraining 4614 may not take as long or require as much processing as training a model from scratch. In at least one embodiment, during model training 4614, by having reset or replaced output or loss layer(s) of initial model 4804, parameters may be updated and re-tuned for a new data set based on loss calculations associated with accuracy of output or loss layer(s) at generating predictions on new, customer dataset 4806 (e.g., image data 4608 of FIG. 46).

In at least one embodiment, pre-trained models 4706 may be stored in a data store, or registry (e.g., model registry 4624 of FIG. 46). In at least one embodiment, pre-trained models 4706 may have been trained, at least in part, at one or more facilities other than a facility executing process 4800. In at least one embodiment, to protect privacy and rights of patients, subjects, or clients of different facilities, pre-trained models 4706 may have been trained, on-premise, using customer or patient data generated on-premise. In at least one embodiment, pre-trained models 4706 may be trained using cloud 4726 and/or other hardware 4622, but confidential, privacy protected patient data may not be transferred to, used by, or accessible to any components of cloud 4726 (or other off premise hardware). In at least one embodiment, where a pre-trained model 4706 is trained at using patient data from more than one facility, pre-trained model 4706 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 4706 on-premise and/or off premise, such as in a datacenter or other cloud computing infrastructure.

In at least one embodiment, when selecting applications for use in deployment pipelines 4710, a user may also select machine learning models to be used for specific applications. In at least one embodiment, a user may not have a model for use, so a user may select a pre-trained model 4706 to use with an application. In at least one embodiment, pre-trained model 4706 may not be optimized for generating accurate results on customer dataset 4806 of a facility of a user (e.g., based on patient diversity, demographics, types of medical imaging devices used, etc.). In at least one embodiment, prior to deploying pre-trained model 4706 into deployment pipeline 4710 for use with an application(s), pre-trained model 4706 may be updated, retrained, and/or fine-tuned for use at a respective facility.

In at least one embodiment, a user may select pre-trained model 4706 that is to be updated, retrained, and/or fine-tuned, and pre-trained model 4706 may be referred to as initial model 4804 for training system 4604 within process 4800. In at least one embodiment, customer dataset 4806 (e.g., imaging data, genomics data, sequencing data, or other data types generated by devices at a facility) may be used to perform model training 4614 (which may include, without limitation, transfer learning) on initial model 4804 to generate refined model 4812. In at least one embodiment, ground truth data corresponding to customer dataset 4806 may be generated by training system 4604. In at least one embodiment, ground truth data may be generated, at least in part, by clinicians, scientists, doctors, practitioners, at a facility (e.g., as labeled clinic data 4612 of FIG. 46).

In at least one embodiment, AI-assisted annotation 4610 may be used in some examples to generate ground truth data. In at least one embodiment, AI-assisted annotation 4610 (e.g., implemented using an AI-assisted annotation SDK) may leverage machine learning models (e.g., neural networks) to generate suggested or predicted ground truth data for a customer dataset. In at least one embodiment, user 4810 may use annotation tools within a user interface (a graphical user interface (GUI)) on computing device 4808.

In at least one embodiment, user 4810 may interact with a GUI via computing device 4808 to edit or fine-tune (auto)annotations. In at least one embodiment, a polygon editing feature may be used to move vertices of a polygon to more accurate or fine-tuned locations.

In at least one embodiment, once customer dataset 4806 has associated ground truth data, ground truth data (e.g., from AI-assisted annotation, manual labeling, etc.) may be used by during model training 4614 to generate refined model 4812. In at least one embodiment, customer dataset 4806 may be applied to initial model 4804 any number of times, and ground truth data may be used to update parameters of initial model 4804 until an acceptable level of accuracy is attained for refined model 4812. In at least one embodiment, once refined model 4812 is generated, refined model 4812 may be deployed within one or more deployment pipelines 4710 at a facility for performing one or more processing tasks with respect to medical imaging data.

In at least one embodiment, refined model 4812 may be uploaded to pre-trained models 4706 in model registry 4624 to be selected by another facility. In at least one embodiment, his process may be completed at any number of facilities such that refined model 4812 may be further refined on new datasets any number of times to generate a more universal model.

FIG. 48B is an example illustration of a client-server architecture 4832 to enhance annotation tools with pre-trained annotation models, in accordance with at least one embodiment. In at least one embodiment, AI-assisted annotation tools 4836 may be instantiated based on a client-server architecture 4832. In at least one embodiment, annotation tools 4836 in imaging applications may aid radiologists, for example, identify organs and abnormalities. In at least one embodiment, imaging applications may include software tools that help user 4810 to identify, as a non-limiting example, a few extreme points on a particular organ of interest in raw images 4834 (e.g., in a 3D MRI or CT scan) and receive auto-annotated results for all 2D slices of a particular organ. In at least one embodiment, results may be stored in a data store as training data 4838 and used as (for example and without limitation) ground truth data for training. In at least one embodiment, when computing device 4808 sends extreme points for AI-assisted annotation 4610, a deep learning model, for example, may receive this data as input and return inference results of a segmented organ or abnormality. In at least one embodiment, pre-instantiated annotation tools, such as AI-Assisted Annotation Tool 4836B in FIG. 48B, may be enhanced by making API calls (e.g., API Call 4844) to a server, such as an Annotation Assistant Server 4840 that may include a set of pre-trained models 4842 stored in an annotation model registry, for example. In at least one embodiment, an annotation model registry may store pre-trained models 4842 (e.g., machine learning models, such as deep learning models) that are pre-trained to perform AI-assisted annotation on a particular organ or abnormality. These models may be further updated by using training pipelines 4704. In at least one embodiment, pre-installed annotation tools may be improved over time as new labeled clinic data 4612 is added.

Hardware structure(s) 1015 are used to perform one or more embodiments. Details regarding hardware structure(x) 1015 are provided below in conjunction with FIGS. 10A and/or 10B.

Autonomous Vehicle

Figure 49A:
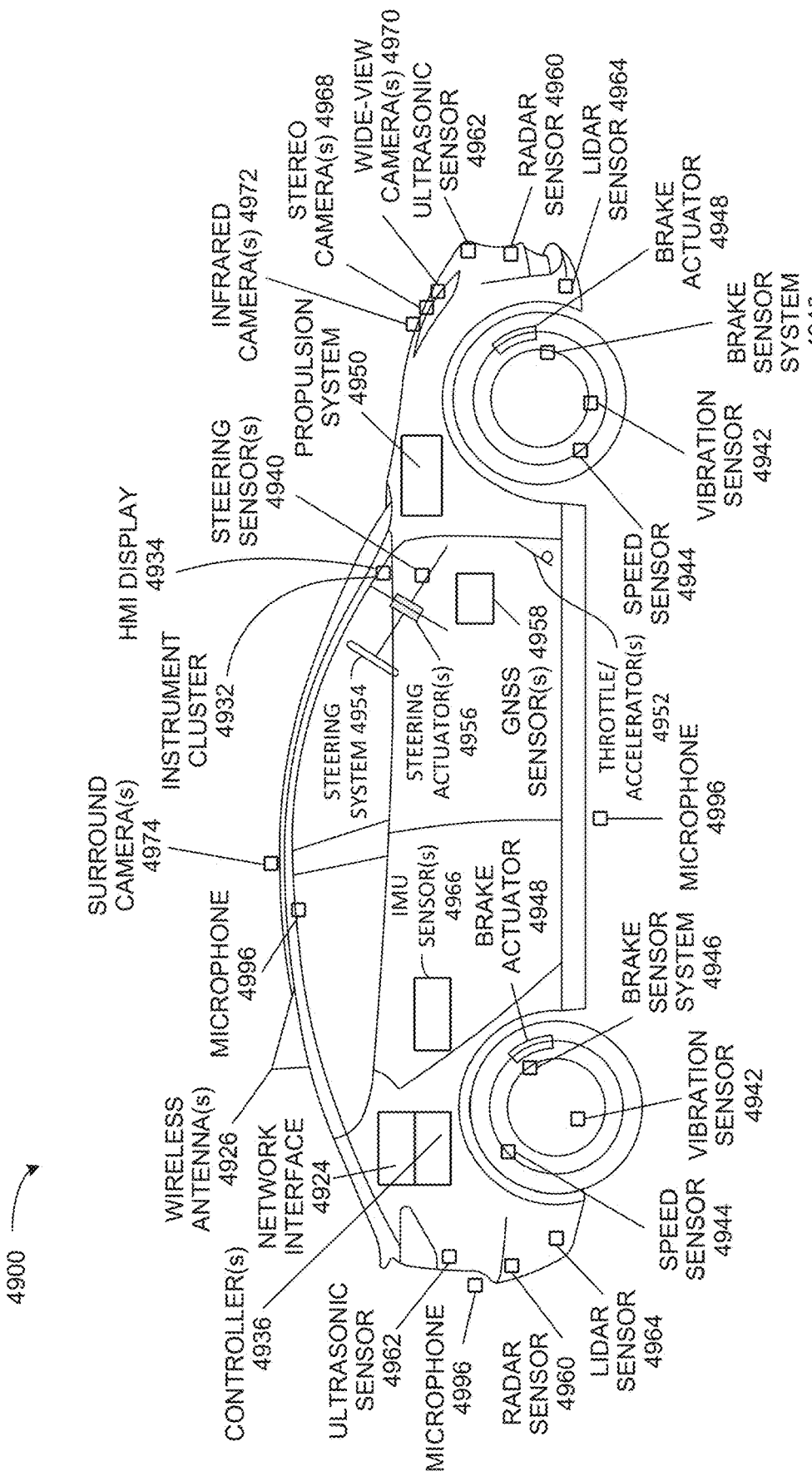
FIG. 49A illustrates an example of an autonomous vehicle, according to at least one embodiment.

FIG. 49A illustrates an example of an autonomous vehicle 4900, according to at least one embodiment. In at least one embodiment, autonomous vehicle 4900 (alternatively referred to herein as "vehicle 4900") may be, without limitation, a passenger vehicle, such as a car, a truck, a bus, and/or another type of vehicle that accommodates one or more passengers. In at least one embodiment, vehicle 1a00 may be a semi-tractor-trailer truck used for hauling cargo. In at least one embodiment, vehicle 1a00 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 4900 may be capable of functionality in accordance with one or more of level 1-level 5 of autonomous driving levels. For example, in at least one embodiment, vehicle 4900 may be capable of conditional automation (Level 3), high automation (Level 4), and/or full automation (Level 5), depending on embodiment.

In at least one embodiment, vehicle 4900 may include, without limitation, components such as a chassis, a vehicle body, wheels (e.g., 2, 4, 6, 8, 18, etc.), tires, axles, and other components of a vehicle. In at least one embodiment, vehicle 4900 may include, without limitation, a propulsion system 4950, such as an internal combustion engine, hybrid electric power plant, an all-electric engine, and/or another propulsion system type. In at least one embodiment, propulsion system 4950 may be connected to a drive train of vehicle 4900, which may include, without limitation, a transmission, to enable propulsion of vehicle 4900. In at least one embodiment, propulsion system 4950 may be controlled in response to receiving signals from a throttle/accelerator(s) 4952.

In at least one embodiment, a steering system 4954, which may include, without limitation, a steering wheel, is used to steer a vehicle 4900 (e.g., along a desired path or route) when a propulsion system 4950 is operating (e.g., when vehicle is in motion). In at least one embodiment, a steering system 4954 may receive signals from steering actuator(s) 4956. A steering wheel may be optional for full automation (Level 5) functionality. In at least one embodiment, a brake sensor system 4946 may be used to operate vehicle brakes in response to receiving signals from brake actuator(s) 4948 and/or brake sensors.

In at least one embodiment, controller(s) 4936, which may include, without limitation, one or more system on chips ("SoCs") (not shown in FIG. 49A) and/or graphics processing unit(s) ("GPU(s)"), provide signals (e.g., representative of commands) to one or more components and/or systems of vehicle 4900. For instance, in at least one embodiment, controller(s) 4936 may send signals to operate vehicle brakes via brake actuator(s) 4948, to operate steering system 4954 via steering actuator(s) 4956, and/or to operate propulsion system 4950 via throttle/accelerator(s) 4952. Controller(s) 4936 may include one or more onboard (e.g., integrated) computing devices (e.g., supercomputers) that process sensor signals, and output operation commands (e.g., signals representing commands) to enable autonomous driving and/or to assist a human driver in driving vehicle 4900. In at least one embodiment, controller(s) 4936 may include a first controller 4936 for autonomous driving functions, a second controller 4936 for functional safety functions, a third controller 4936 for artificial intelligence functionality (e.g., computer vision), a fourth controller 4936 for infotainment functionality, a fifth controller 4936 for redundancy in emergency conditions, and/or other controllers. In at least one embodiment, a single controller 4936 may handle two or more of above functionalities, two or more controllers 4936 may handle a single functionality, and/or any combination thereof.

In at least one embodiment, controller(s) 4936 provide signals for controlling one or more components and/or systems of vehicle 4900 in response to sensor data received from one or more sensors (e.g., sensor inputs). In at least one embodiment, sensor data may be received from, for example and without limitation, global navigation satellite systems ("GNSS") sensor(s) 4958 (e.g., Global Positioning System sensor(s)), RADAR sensor(s) 4960, ultrasonic sensor(s) 4962, LIDAR sensor(s) 4964, inertial measurement unit ("IMU") sensor(s) 4966 (e.g., accelerometer(s), gyroscope(s), magnetic compass(es), magnetometer(s), etc.), microphone(s) 4996, stereo camera(s) 4968, wide-view camera(s) 4970 (e.g., fisheye cameras), infrared camera(s) 4972, surround camera(s) 4974 (e.g., 360 degree cameras), long-range cameras (not shown in FIG. 49A), mid-range camera(s) (not shown in FIG. 49A), speed sensor(s) 4944 (e.g., for measuring speed of vehicle 4900), vibration sensor(s) 4942, steering sensor(s) 4940, brake sensor(s) (e.g., as part of brake sensor system 4946), and/or other sensor types.

In at least one embodiment, one or more of controller(s) 4936 may receive inputs (e.g., represented by input data) from an instrument cluster 4932 of vehicle 4900 and provide outputs (e.g., represented by output data, display data, etc.) via a human-machine interface ("HMI") display 4934, an audible annunciator, a loudspeaker, and/or via other components of vehicle 4900. In at least one embodiment, outputs may include information such as vehicle velocity, speed, time, map data (e.g., a High Definition map (not shown in FIG. 49A), location data (e.g., vehicle 4900's location, such as on a map), direction, location of other vehicles (e.g., an occupancy grid), information about objects and status of objects as perceived by controller(s) 4936, etc. For example, in at least one embodiment, HMI display 4934 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 4900 further includes a network interface 4924 which may use wireless antenna(s) 4926 and/or modem(s) to communicate over one or more networks. For example, in at least one embodiment, network interface 4924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 4926 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 49A for inferencing or predicting operations based, at least in part, on weight parameters calculated using neural network training operations, neural network functions and/or architectures, or neural network use cases described herein.

Inference and/or training logic 1015 are used to perform inferencing and/or training operations associated with one or more embodiments. Details regarding inference and/or training logic 1015 are provided above in conjunction with FIGS. 9 and/or 10. In at least one embodiment, inference and/or training logic 1015 may be used in autonomous vehicles for inferencing or predicting operations based, at least in part, on weight parameters calculated using neural network training operations, neural network functions and/or architectures, or neural network use cases described herein. Inference and/or training logic 1015 are used to perform inferencing and/or training operations associated with one or more embodiments to determine gaze for one or more users.

Figure 49B:
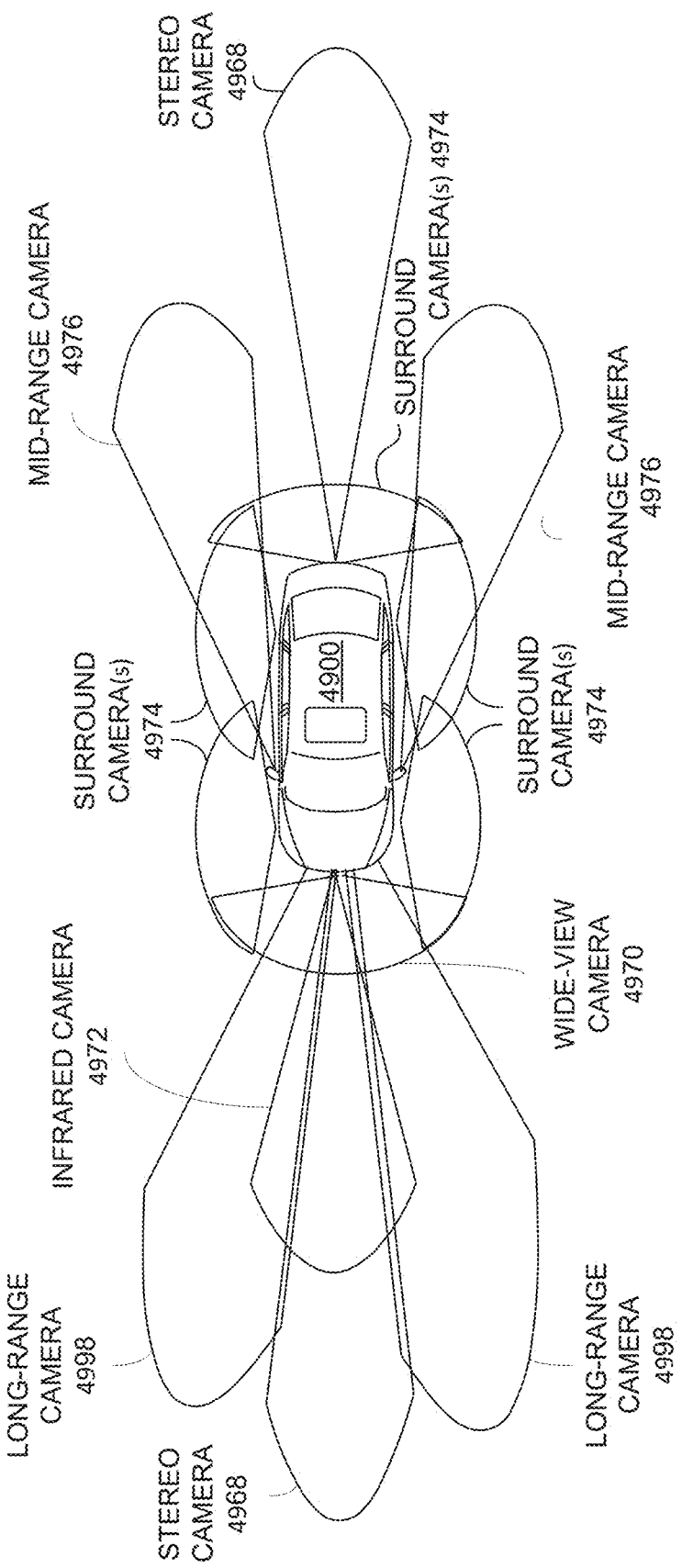
FIG. 49B illustrates an example of camera locations and fields of view for the autonomous vehicle of FIG. 49A, according to at least one embodiment.

FIG. 49B illustrates an example of camera locations and fields of view for autonomous vehicle 4900 of FIG. 49A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 4900.

In at least one embodiment, camera types for cameras may include, but are not limited to, digital cameras that may be adapted for use with components and/or systems of vehicle 4900. In at least one embodiment, one or more of camera(s) may operate at automotive safety integrity level ("ASIL") B and/or at another ASIL. In at least one embodiment, camera types may be capable of any image capture rate, such as 60 frames per second (fps), 120 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cabIn at least one embodiment.

In at least one embodiment, cameras with a field of view that include portions of environment in front of vehicle 4900 (e.g., front-facing cameras) may be used for surround view, to help identify forward facing paths and obstacles, as well as aid in, with help of one or more of controllers 4936 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 4970 may be used to perceive objects coming into view from periphery (e.g., pedestrians, crossing traffic or bicycles). Although only one wide-view camera 4970 is illustrated in FIG. 49B, in other embodiments, there may be any number (including zero) of wide-view camera(s) 4970 on vehicle 4900. In at least one embodiment, any number of long-range camera(s) 4998 (e.g., a long-view stereo camera pair) may be used for depth-based object detection, especially for objects for which a neural network has not yet been trained.

In at least one embodiment, long-range camera(s) 4998 may also be used for object detection and classification, as well as basic object tracking.

In at least one embodiment, any number of stereo camera(s) 4968 may also be included in a front-facing configuration. In at least one embodiment, one or more of stereo camera(s) 4968 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 4900, including a distance estimate for all points in image. In at least one embodiment, one or more of stereo camera(s) 4968 may include, without limitation, compact stereo vision sensor(s) that may include, without limitation, two camera lenses (one each on left and right) and an image processing chip that may measure distance from vehicle 4900 to target object and use generated information (e.g., metadata) to activate autonomous emergency braking and lane departure warning functions. In at least one embodiment, other types of stereo camera(s) 4968 may be used in addition to, or alternatively from, those described herein.

In at least one embodiment, cameras with a field of view that include portions of environment to side of vehicle 4900 (e.g., side-view cameras) may be used for surround view, providing information used to create and update occupancy grid, as well as to generate side impact collision warnings. For example, in at least one embodiment, surround camera(s) 4974 (e.g., four surround cameras 4974 as illustrated in FIG. 49B) could be positioned on vehicle 4900. In at least one embodiment, surround camera(s) 4974 may include, without limitation, any number and combination of wide-view camera(s) 4970, fisheye camera(s), 360 degree camera(s), and/or like. For instance, in at least one embodiment, four fisheye cameras may be positioned on front, rear, and sides of vehicle 4900. In at least one embodiment, vehicle 4900 may use three surround camera(s) 4974 (e.g., left, right, and rear), and may leverage one or more other camera(s) (e.g., a forward-facing camera) as a fourth surround-view camera.

In at least one embodiment, cameras with a field of view that include portions of environment to rear of vehicle 4900 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 4998 and/or mid-range camera(s) 4976, stereo camera(s) 4968), infrared camera(s) 4972, etc.), as described herein.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 49B for inferencing or predicting operations based, at least in part, on weight parameters calculated using neural network training operations, neural network functions and/or architectures, or neural network use cases described herein.

Inference and/or training logic 1015 are used to perform inferencing and/or training operations associated with one or more embodiments. Details regarding inference and/or training logic 1015 are provided above in conjunction with FIGS. 9 and/or 10. In at least one embodiment, inference and/or training logic 1015 may be used in autonomous vehicles for inferencing or predicting operations based, at least in part, on weight parameters calculated using neural network training operations, neural network functions and/or architectures, or neural network use cases described herein. Inference and/or training logic 1015 are used to perform inferencing and/or training operations associated with one or more embodiments to determine gaze for one or more users.

Figure 49C:
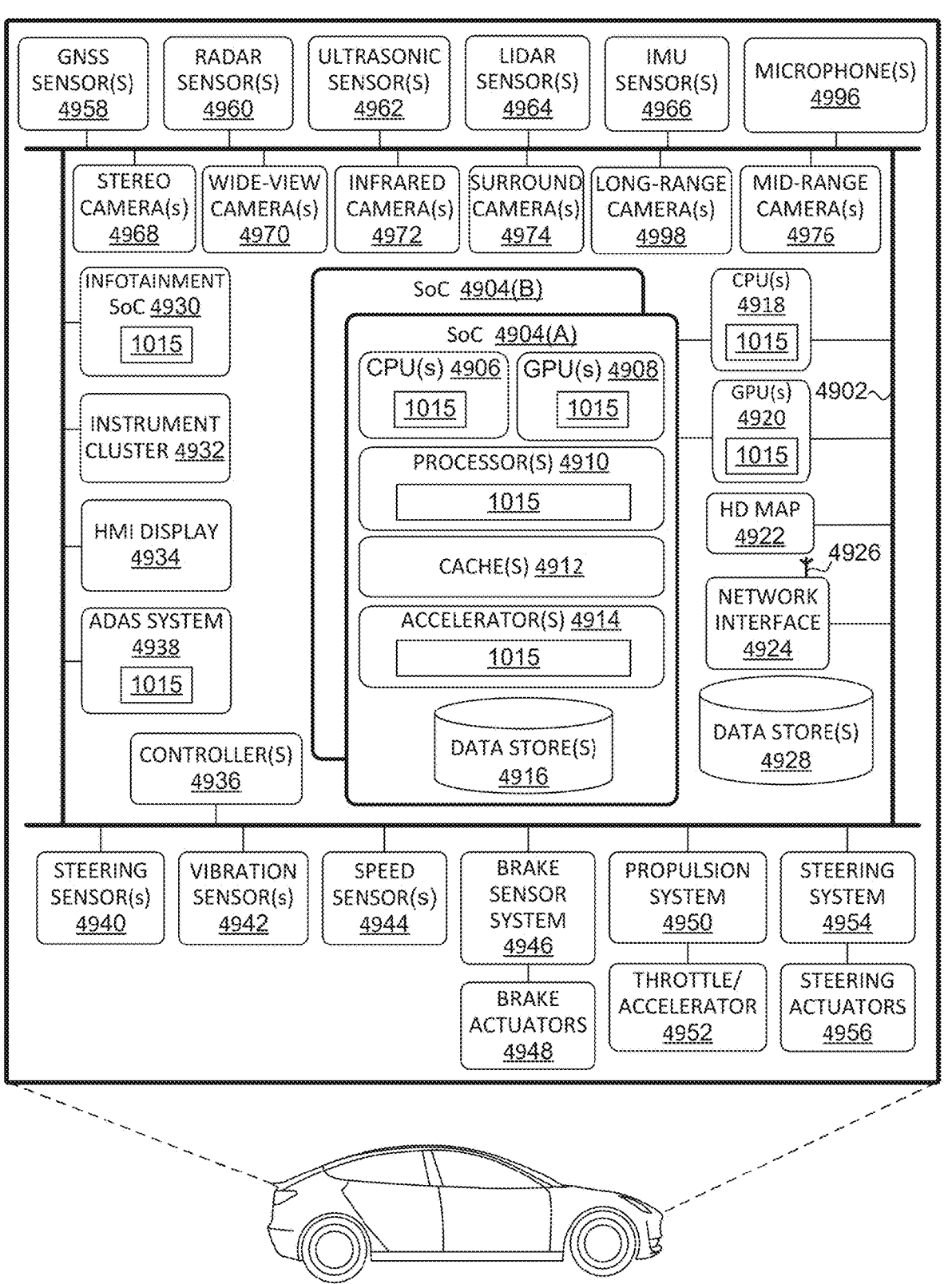
FIG. 49C illustrates an example system architecture for the autonomous vehicle of FIG. 49A, according to at least one embodiment.

FIG. 49C is a block diagram illustrating an example system architecture for autonomous vehicle 4900 of FIG. 49A, according to at least one embodiment. In at least one embodiment, each of components, features, and systems of vehicle 4900 in FIG. 49C are illustrated as being connected via a bus 4902. In at least one embodiment, bus 4902 may include, without limitation, a CAN data interface (alternatively referred to herein as a "CAN bus"). In at least one embodiment, a CAN bus may be a network inside vehicle 4900 used to aid in control of various features and functionality of vehicle 4900, such as actuation of brakes, acceleration, braking, steering, windshield wipers, etc. In at least one embodiment, bus 4902 may be configured to have dozens or even hundreds of nodes, each with its own unique identifier (e.g., a CAN ID). In at least one embodiment, bus 4902 may be read to find steering wheel angle, ground speed, engine revolutions per minute ("RPMs"), button positions, and/or other vehicle status indicators. In at least one embodiment, bus 4902 may be a CAN bus that is ASIL B compliant.

In at least one embodiment, in addition to, or alternatively from CAN, FlexRay and/or Ethernet may be used. In at least one embodiment, there may be any number of busses 4902, which may include, without limitation, zero or more CAN busses, zero or more FlexRay busses, zero or more Ethernet busses, and/or zero or more other types of busses using a different protocol. In at least one embodiment, two or more busses 4902 may be used to perform different functions, and/or may be used for redundancy. For example, a first bus 4902 may be used for collision avoidance functionality and a second bus 4902 may be used for actuation control. In at least one embodiment, each bus 4902 may communicate with any of components of vehicle 4900, and two or more busses 4902 may communicate with same components. In at least one embodiment, each of any number of system(s) on chip(s) ("SoC(s)") 4904, each of controller(s) 4936, and/or each computer within vehicle may have access to same input data (e.g., inputs from sensors of vehicle 4900), and may be connected to a common bus, such CAN bus.

In at least one embodiment, vehicle 4900 may include one or more controller(s) 4936, such as those described herein with respect to FIG. 49A. Controller(s) 4936 may be used for a variety of functions. In at least one embodiment, controller(s) 4936 may be coupled to any of various other components and systems of vehicle 4900, and may be used for control of vehicle 4900, artificial intelligence of vehicle 4900, infotainment for vehicle 4900, and/or like.

In at least one embodiment, vehicle 4900 may include any number of SoCs 4904. Each of SoCs 4904 may include, without limitation, central processing units ("CPU(s)") 4906, graphics processing units ("GPU(s)") 4908, processor(s) 4910, cache(s) 4912, accelerator(s) 4914, data store(s) 4916, and/or other components and features not illustrated. In at least one embodiment, SoC(s) 4904 may be used to control vehicle 4900 in a variety of platforms and systems. For example, in at least one embodiment, SoC(s) 4904 may be combined in a system (e.g., system of vehicle 4900) with a High Definition ("HD") map 4922 which may obtain map refreshes and/or updates via network interface 4924 from one or more servers (not shown in FIG. 49C).

In at least one embodiment, CPU(s) 4906 may include a CPU cluster or CPU complex (alternatively referred to herein as a "CCPLEX"). In at least one embodiment, CPU(s) 4906 may include multiple cores and/or level two ("L2") caches. For instance, in at least one embodiment, CPU(s) 4906 may include eight cores in a coherent multi-processor configuration. In at least one embodiment, CPU(s) 4906 may include four dual-core clusters where each cluster has a dedicated L2 cache (e.g., a 2 MB L2 cache). In at least one embodiment, CPU(s) 4906 (e.g., CCPLEX) may be configured to support simultaneous cluster operation enabling any combination of clusters of CPU(s) 4906 to be active at any given time.

In at least one embodiment, one or more of CPU(s) 4906 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 4906 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 4908 may include an integrated GPU (alternatively referred to herein as an "iGPU"). In at least one embodiment, GPU(s) 4908 may be programmable and may be efficient for parallel workloads. In at least one embodiment, GPU(s) 4908, in at least one embodiment, may use an enhanced tensor instruction set. In at least one embodiment, GPU(s) 4908 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 4908 may include at least eight streaming microprocessors. In at least one embodiment, GPU(s) 4908 may use compute application programming interface(s) (API(s)). In at least one embodiment, GPU(s) 4908 may use one or more parallel computing platforms and/or programming models (e.g., NVIDIA's CUDA).

In at least one embodiment, one or more of GPU(s) 4908 may be power-optimized for best performance in automotive and embedded use cases. For example, in on embodiment, GPU(s) 4908 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 4908 may include a high bandwidth memory ("HBM) and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 4908 may include unified memory technology. In at least one embodiment, address translation services ("ATS") support may be used to allow GPU(s) 4908 to access CPU(s) 4906 page tables directly. In at least one embodiment, embodiment, when GPU(s) 4908 memory management unit ("MMU") experiences a miss, an address translation request may be transmitted to CPU(s) 4906. In response, CPU(s) 4906 may look in its page tables for virtual-to-physical mapping for address and transmits translation back to GPU(s) 4908, in at least one embodiment. In at least one embodiment, unified memory technology may allow a single unified virtual address space for memory of both CPU(s) 4906 and GPU(s) 4908, thereby simplifying GPU(s) 4908 programming and porting of applications to GPU(s) 4908.

In at least one embodiment, GPU(s) 4908 may include any number of access counters that may keep track of frequency of access of GPU(s) 4908 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 4904 may include any number of cache(s) 4912, including those described herein. For example, in at least one embodiment, cache(s) 4912 could include a level three ("L3") cache that is available to both CPU(s) 4906 and GPU(s) 4908 (e.g., that is connected both CPU(s) 4906 and GPU(s) 4908). In at least one embodiment, cache(s) 4912 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 4904 may include one or more accelerator(s) 4914 (e.g., hardware accelerators, software accelerators, or a combination thereof). In at least one embodiment, SoC(s) 4904 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 4908 and to off-load some of tasks of GPU(s) 4908 (e.g., to free up more cycles of GPU(s) 4908 for performing other tasks). In at least one embodiment, accelerator(s) 4914 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 4914 (e.g., hardware acceleration cluster) may include a deep learning accelerator(s) ("DLA(s)"). DLA(s) may include, without limitation, one or more Tensor processing units ("TPU(s)") that may be configured to provide an additional ten trillion operations per second for deep learning applications and inferencing. In at least one embodiment, TPU(s) may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 4996; a CNN for facial recognition and vehicle owner identification using data from camera sensors; and/or a CNN for security and/or safety related events.

In at least one embodiment, DLA(s) may perform any function of GPU(s) 4908, and by using an inference accelerator, for example, a designer may target either DLA(s) or GPU(s) 4908 for any function. For example, in at least one embodiment, designer may focus processing of CNNs and floating point operations on DLA(s) and leave other functions to GPU(s) 4908 and/or other accelerator(s) 4914.

In at least one embodiment, accelerator(s) 4914 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 4938, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 4906. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU may include a digital signal processor such as, for example, a single instruction, multiple data ("SIMD"), very long instruction word ("VLIW") digital signal processor. In at least one embodiment, a combination of SEID and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 4914 (e.g., hardware acceleration cluster) may include a computer vision network on-chip and static random-access memory ("SRAM"), for providing a high-bandwidth, low latency SRAM for accelerator(s) 4914. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 4904 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 4914 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 4900, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IU sensor(s) 4966 that correlates with vehicle 4900 orientation, distance, 3D location estimates of object obtained from neural network and/or other sensors (e.g., LIDAR sensor(s) 4964 or RADAR sensor(s) 4960), among others.

In at least one embodiment, one or more of SoC(s) 4904 may include data store(s) 4916 (e.g., memory). In at least one embodiment, data store(s) 4916 may be on-chip memory of SoC(s) 4904, which may store neural networks to be executed on GPU(s) 4908 and/or DLA. In at least one embodiment, data store(s) 4916 may be large enough in capacity to store multiple instances of neural networks for redundancy and safety. In at least one embodiment, data store(s) 4916 may comprise L2 or L3 cache(s).

In at least one embodiment, one or more of SoC(s) 4904 may include any number of processor(s) 4910 (e.g., embedded processors). In at least one embodiment, processor(s) 4910 may include a boot and power management processor that may be a dedicated processor and subsystem to handle boot power and management functions and related security enforcement. In at least one embodiment, boot and power management processor may be a part of SoC(s) 4904 boot sequence and may provide runtime power management services. In at least one embodiment, boot power and management processor may provide clock and voltage programming, assistance in system low power state transitions, management of SoC(s) 4904 thermals and temperature sensors, and/or management of SoC(s) 4904 power states. In at least one embodiment, each temperature sensor may be implemented as a ring-oscillator whose output frequency is proportional to temperature, and SoC(s) 4904 may use ring-oscillators to detect temperatures of CPU(s) 4906, GPU(s) 4908, and/or accelerator(s) 4914. In at least one embodiment, if temperatures are determined to exceed a threshold, then boot and power management processor may enter a temperature fault routine and put SoC(s) 4904 into a lower power state and/or put vehicle 4900 into a chauffeur to safe stop mode (e.g., bring vehicle 4900 to a safe stop).

In at least one embodiment, processor(s) 4910 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 4910 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 4910 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 4910 may further include a real-time camera engine that may include, without limitation, a dedicated processor subsystem for handling real-time camera management. In at least one embodiment, processor(s) 4910 may further include a high-dynamic range signal processor that may include, without limitation, an image signal processor that is a hardware engine that is part of camera processing pipeline.

In at least one embodiment, processor(s) 4910 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 4970, surround camera(s) 4974, and/or on in-cabin monitoring camera sensor(s). In at least one embodiment, in-cabin monitoring camera sensor(s) are preferably monitored by a neural network running on another instance of SoC(s) 4904, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 4908 are not required to continuously render new surfaces. In at least one embodiment, when GPU(s) 4908 are powered on and active doing 3D rendering, video image compositor may be used to offload GPU(s) 4908 to improve performance and responsiveness.

In at least one embodiment, one or more of SoC(s) 4904 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 4904 may further include an input/output controller(s) that may be controlled by software and may be used for receiving I/O signals that are uncommitted to a specific role.

In at least one embodiment, one or more of SoC(s) 4904 may further include a broad range of peripheral interfaces to enable communication with peripherals, audio encoders/decoders ("codecs"), power management, and/or other devices. SoC(s) 4904 may be used to process data from cameras (e.g., connected over Gigabit Multimedia Serial Link and Ethernet), sensors (e.g., LIDAR sensor(s) 4964, RADAR sensor(s) 4960, etc. that may be connected over Ethernet), data from bus 4902 (e.g., speed of vehicle 4900, steering wheel position, etc.), data from GNSS sensor(s) 4958 (e.g., connected over Ethernet or CAN bus), etc. In at least one embodiment, one or more of SoC(s) 4904 may further include dedicated high-performance mass storage controllers that may include their own DMA engines, and that may be used to free CPU(s) 4906 from routine data management tasks.

In at least one embodiment, SoC(s) 4904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 4904 may be faster, more reliable, and even more energy-efficient and space-efficient than conventional systems. For example, in at least one embodiment, accelerator(s) 4914, when combined with CPU(s) 4906, GPU(s) 4908, and data store(s) 4916, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 4920) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, a sign itself may be identified as a traffic sign by a first deployed neural network (e.g., a neural network that has been trained) and a text "flashing lights indicate icy conditions" may be interpreted by a second deployed neural network, which informs vehicle's path planning software (preferably executing on CPU Complex) that when flashing lights are detected, icy conditions exist. In at least one embodiment, a flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 4908.

In at least one embodiment, a CNN for facial recognition and vehicle owner identification may use data from camera sensors to identify presence of an authorized driver and/or owner of vehicle 4900. In at least one embodiment, an always on sensor processing engine may be used to unlock vehicle when owner approaches driver door and turn on lights, and, in security mode, to disable vehicle when owner leaves vehicle. In this way, SoC(s) 4904 provide for security against theft and/or carjacking.

In at least one embodiment, a CNN for emergency vehicle detection and identification may use data from microphones 4996 to detect and identify emergency vehicle sirens. In at least one embodiment, SoC(s) 4904 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 4958. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 4962, until emergency vehicle(s) passes.

In at least one embodiment, vehicle 4900 may include CPU(s) 4918 (e.g., discrete CPU(s), or dCPU(s)), that may be coupled to SoC(s) 4904 via a high-speed interconnect (e.g., PCIe). In at least one embodiment, CPU(s) 4918 may include an X86 processor, for example. CPU(s) 4918 may be used to perform any of a variety of functions, including arbitrating potentially inconsistent results between ADAS sensors and SoC(s) 4904, and/or monitoring status and health of controller(s) 4936 and/or an infotainment system on a chip ("infotainment SoC") 4930, for example.

In at least one embodiment, vehicle 4900 may include GPU(s) 4920 (e.g., discrete GPU(s), or dGPU(s)), that may be coupled to SoC(s) 4904 via a high-speed interconnect (e.g., NVIDIA's NVLINK). In at least one embodiment, GPU(s) 4920 may provide additional artificial intelligence functionality, such as by executing redundant and/or different neural networks, and may be used to train and/or update neural networks based at least in part on input (e.g., sensor data) from sensors of vehicle 4900.

In at least one embodiment, vehicle 4900 may further include network interface 4924 which may include, without limitation, wireless antenna(s) 4926 (e.g., one or more wireless antennas 4926 for different communication protocols, such as a cellular antenna, a Bluetooth antenna, etc.). In at least one embodiment, network interface 4924 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 490 and other vehicle and/or an indirect link may be established (e.g., across networks and over Internet). In at least one embodiment, direct links may be provided using a vehicle-to-vehicle communication link. vehicle-to-vehicle communication link may provide vehicle 4900 information about vehicles in proximity to vehicle 4900 (e.g., vehicles in front of, on side of, and/or behind vehicle 4900). In at least one embodiment, aforementioned functionality may be part of a cooperative adaptive cruise control functionality of vehicle 4900.

In at least one embodiment, network interface 4924 may include an SoC that provides modulation and demodulation functionality and enables controller(s) 4936 to communicate over wireless networks. In at least one embodiment, network interface 4924 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 4900 may further include data store(s) 4928 which may include, without limitation, off-chip (e.g., off SoC(s) 4904) storage. In at least one embodiment, data store(s) 4928 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 4900 may further include GNSS sensor(s) 4958 (e.g., GPS and/or assisted GPS sensors), to assist in mapping, perception, occupancy grid generation, and/or path planning functions. In at least one embodiment, any number of GNSS sensor(s) 4958 may be used, including, for example and without limitation, a GPS using a USB connector with an Ethernet to Serial (e.g., RS-232) bridge.

In at least one embodiment, vehicle 4900 may further include RADAR sensor(s) 4960. RADAR sensor(s) 4960 may be used by vehicle 4900 for long-range vehicle detection, even in darkness and/or severe weather conditions. In at least one embodiment, RADAR functional safety levels may be ASIL B. RADAR sensor(s) 4960 may use CAN and/or bus 4902 (e.g., to transmit data generated by RADAR sensor(s) 4960) for control and to access object tracking data, with access to Ethernet to access raw data in some examples. In at least one embodiment, wide variety of RADAR sensor types may be used. For example, and without limitation, RADAR sensor(s) 4960 may be suitable for front, rear, and side RADAR use. In at least one embodiment, one or more of RADAR sensors(s) 4960 are Pulse Doppler RADAR sensor(s).

In at least one embodiment, RADAR sensor(s) 4960 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 4960 may help in distinguishing between static and moving objects, and may be used by ADAS system 4938 for emergency brake assist and forward collision warning. Sensors 4960(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle 4900's surroundings at higher speeds with minimal interference from traffic in adjacent lanes. In at least one embodiment, other two antennae may expand field of view, making it possible to quickly detect vehicles entering or leaving vehicle 4900's lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 4960 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 4938 for blind spot detection and/or lane change assist.

In at least one embodiment, vehicle 4900 may further include ultrasonic sensor(s) 4962. Ultrasonic sensor(s) 4962, which may be positioned at front, back, and/or sides of vehicle 4900, may be used for park assist and/or to create and update an occupancy grid. In at least one embodiment, a wide variety of ultrasonic sensor(s) 4962 may be used, and different ultrasonic sensor(s) 4962 may be used for different ranges of detection (e.g., 2.5 m, 4 m). In at least one embodiment, ultrasonic sensor(s) 4962 may operate at functional safety levels of ASIL B.

In at least one embodiment, vehicle 4900 may include LIDAR sensor(s) 4964. LIDAR sensor(s) 4964 may be used for object and pedestrian detection, emergency braking, collision avoidance, and/or other functions. In at least one embodiment, LIDAR sensor(s) 4964 may be functional safety level ASIL B. In at least one embodiment, vehicle 4900 may include multiple LIDAR sensors 4964 (e.g., two, four, six, etc.) that may use Ethernet (e.g., to provide data to a Gigabit Ethernet switch).

In at least one embodiment, LIDAR sensor(s) 4964 may be capable of providing a list of objects and their distances for a 360-degree field of view. In at least one embodiment, commercially available LIDAR sensor(s) 4964 may have an advertised range of approximately 100 m, with an accuracy of 2 cm-3 cm, and with support for a 100 Mbps Ethernet connection, for example. In at least one embodiment, one or more non-protruding LIDAR sensors 4964 may be used. In such an embodiment, LIDAR sensor(s) 4964 may be implemented as a small device that may be embedded into front, rear, sides, and/or corners of vehicle 4900. In at least one embodiment, LIDAR sensor(s) 4964, in such an embodiment, may provide up to a 120-degree horizontal and 35-degree vertical field-of-view, with a 200 m range even for low-reflectivity objects. In at least one embodiment, front-mounted LIDAR sensor(s) 4964 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 4900 up to approximately 200 m. In at least one embodiment, a flash LIDAR unit includes, without limitation, a receptor, which records laser pulse transit time and reflected light on each pixel, which in turn corresponds to range from vehicle 4900 to objects. In at least one embodiment, flash LIDAR may allow for highly accurate and distortion-free images of surroundings to be generated with every laser flash. In at least one embodiment, four flash LIDAR sensors may be deployed, one at each side of vehicle 4900. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device(s) may use a 5 nanosecond class I (eye-safe) laser pulse per frame and may capture reflected laser light in form of 3D range point clouds and co-registered intensity data.

In at least one embodiment, vehicle may further include IMU sensor(s) 4966. In at least one embodiment, IMU sensor(s) 4966 may be located at a center of rear axle of vehicle 4900, in at least one embodiment. In at least one embodiment, IMU sensor(s) 4966 may include, for example and without limitation, accelerometer(s), magnetometer(s), gyroscope(s), magnetic compass(es), and/or other sensor types. In at least one embodiment, such as in six-axis applications, IMU sensor(s) 4966 may include, without limitation, accelerometers and gyroscopes. In at least one embodiment, such as in nine-axis applications, IMU sensor(s) 4966 may include, without limitation, accelerometers, gyroscopes, and magnetometers.

In at least one embodiment, IMU sensor(s) 4966 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 4966 may enable vehicle 4900 to estimate heading without requiring input from a magnetic sensor by directly observing and correlating changes in velocity from GPS to IMU sensor(s) 4966. In at least one embodiment, IMU sensor(s) 4966 and GNSS sensor(s) 4958 may be combined in a single integrated unit.

In at least one embodiment, vehicle 4900 may include microphone(s) 4996 placed in and/or around vehicle 4900. In at least one embodiment, microphone(s) 4996 may be used for emergency vehicle detection and identification, among other things.

In at least one embodiment, vehicle 4900 may further include any number of camera types, including stereo camera(s) 4968, wide-view camera(s) 4970, infrared camera(s) 4972, surround camera(s) 4974, long-range camera(s) 4998, mid-range camera(s) 4976, and/or other camera types. In at least one embodiment, cameras may be used to capture image data around an entire periphery of vehicle 4900. In at least one embodiment, types of cameras used depends on vehicle 4900. In at least one embodiment, any combination of camera types may be used to provide necessary coverage around vehicle 4900. In at least one embodiment, number of cameras may differ depending on embodiment. For example, in at least one embodiment, vehicle 4900 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 49A and FIG. 49B.

In at least one embodiment, vehicle 4900 may further include vibration sensor(s) 4942. In at least one embodiment, vibration sensor(s) 4942 may measure vibrations of components of vehicle 4900, such as axle(s). For example, in at least one embodiment, changes in vibrations may indicate a change in road surfaces. In at least one embodiment, when two or more vibration sensors 4942 are used, differences between vibrations may be used to determine friction or slippage of road surface (e.g., when difference in vibration is between a power-driven axle and a freely rotating axle).

In at least one embodiment, vehicle 4900 may include ADAS system 4938. ADAS system 4938 may include, without limitation, an SoC, in some examples. In at least one embodiment, ADAS system 4938 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 4960, LIDAR sensor(s) 4964, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 4900 and automatically adjust speed of vehicle 4900 to maintain a safe distance from vehicles ahead. In at least one embodiment, lateral ACC system performs distance keeping, and advises vehicle 4900 to change lanes when necessary. In at least one embodiment, lateral ACC is related to other ADAS applications such as LC and CW.

In at least one embodiment, CACC system uses information from other vehicles that may be received via network interface 4924 and/or wireless antenna(s) 4926 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 4900), while I2V communication concept provides information about traffic further ahead. In at least one embodiment, CACC system may include either or both I2V and V2V information sources. In at least one embodiment, given information of vehicles ahead of vehicle 4900, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 4960, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 4960, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 4900 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 4900 if vehicle 4900 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 4960, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 4900 is backing up. In at least one embodiment, RCTW system includes AEB system to ensure that vehicle brakes are applied to avoid a crash. In at least one embodiment, RCTW system may use one or more rear-facing RADAR sensor(s) 4960, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 4900 itself decides, in case of conflicting results, whether to heed result from a primary computer or a secondary computer (e.g., first controller 4936 or second controller 4936). For example, in at least one embodiment, ADAS system 4938 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 4938 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 4904.

In at least one embodiment, ADAS system 4938 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 4938 may be fed into primary computer's perception block and/or primary computer's dynamic driving task block. For example, in at least one embodiment, if ADAS system 4938 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 4900 may further include infotainment SoC 4930 (e.g., an in-vehicle infotainment system (IVI)). Although illustrated and described as an SoC, infotainment system 4930, in at least one embodiment, may not be an SoC, and may include, without limitation, two or more discrete components. In at least one embodiment, infotainment SoC 4930 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 4900. For example, infotainment SoC 4930 could include radios, disk players, navigation systems, video players, USB and Bluetooth connectivity, carputers, in-car entertainment, WiFi, steering wheel audio controls, hands free voice control, a heads-up display ("HUD"), HMI display 4934, a telematics device, a control panel (e.g., for controlling and/or interacting with various components, features, and/or systems), and/or other components. In at least one embodiment, infotainment SoC 4930 may further be used to provide information (e.g., visual and/or audible) to user(s) of vehicle, such as information from ADAS system 4938, autonomous driving information such as planned vehicle maneuvers, trajectories, surrounding environment information (e.g., intersection information, vehicle information, road information, etc.), and/or other information.

In at least one embodiment, infotainment SoC 4930 may include any amount and type of GPU functionality. In at least one embodiment, infotainment SoC 4930 may communicate over bus 4902 (e.g., CAN bus, Ethernet, etc.) with other devices, systems, and/or components of vehicle 4900. In at least one embodiment, infotainment SoC 4930 may be coupled to a supervisory MCU such that GPU of infotainment system may perform some self-driving functions in event that primary controller(s) 4936 (e.g., primary and/or backup computers of vehicle 4900) fail. In at least one embodiment, infotainment SoC 4930 may put vehicle 4900 into a chauffeur to safe stop mode, as described herein.

In at least one embodiment, vehicle 4900 may further include instrument cluster 4932 (e.g., a digital dash, an electronic instrument cluster, a digital instrument panel, etc.). In at least one embodiment, instrument cluster 4932 may include, without limitation, a controller and/or supercomputer (e.g., a discrete controller or supercomputer). In at least one embodiment, instrument cluster 4932 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 4930 and instrument cluster 4932. In at least one embodiment, instrument cluster 4932 may be included as part of infotainment SoC 4930, or vice versa.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 49C for inferencing or predicting operations based, at least in part, on weight parameters calculated using neural network training operations, neural network functions and/or architectures, or neural network use cases described herein.

Inference and/or training logic 1015 are used to perform inferencing and/or training operations associated with one or more embodiments. Details regarding inference and/or training logic 1015 are provided above in conjunction with FIGS. 9 and/or 10. In at least one embodiment, inference and/or training logic 1015 may be used in autonomous vehicles for inferencing or predicting operations based, at least in part, on weight parameters calculated using neural network training operations, neural network functions and/or architectures, or neural network use cases described herein. Inference and/or training logic 1015 are used to perform inferencing and/or training operations associated with one or more embodiments to determine gaze for one or more users.

Figure 49D:
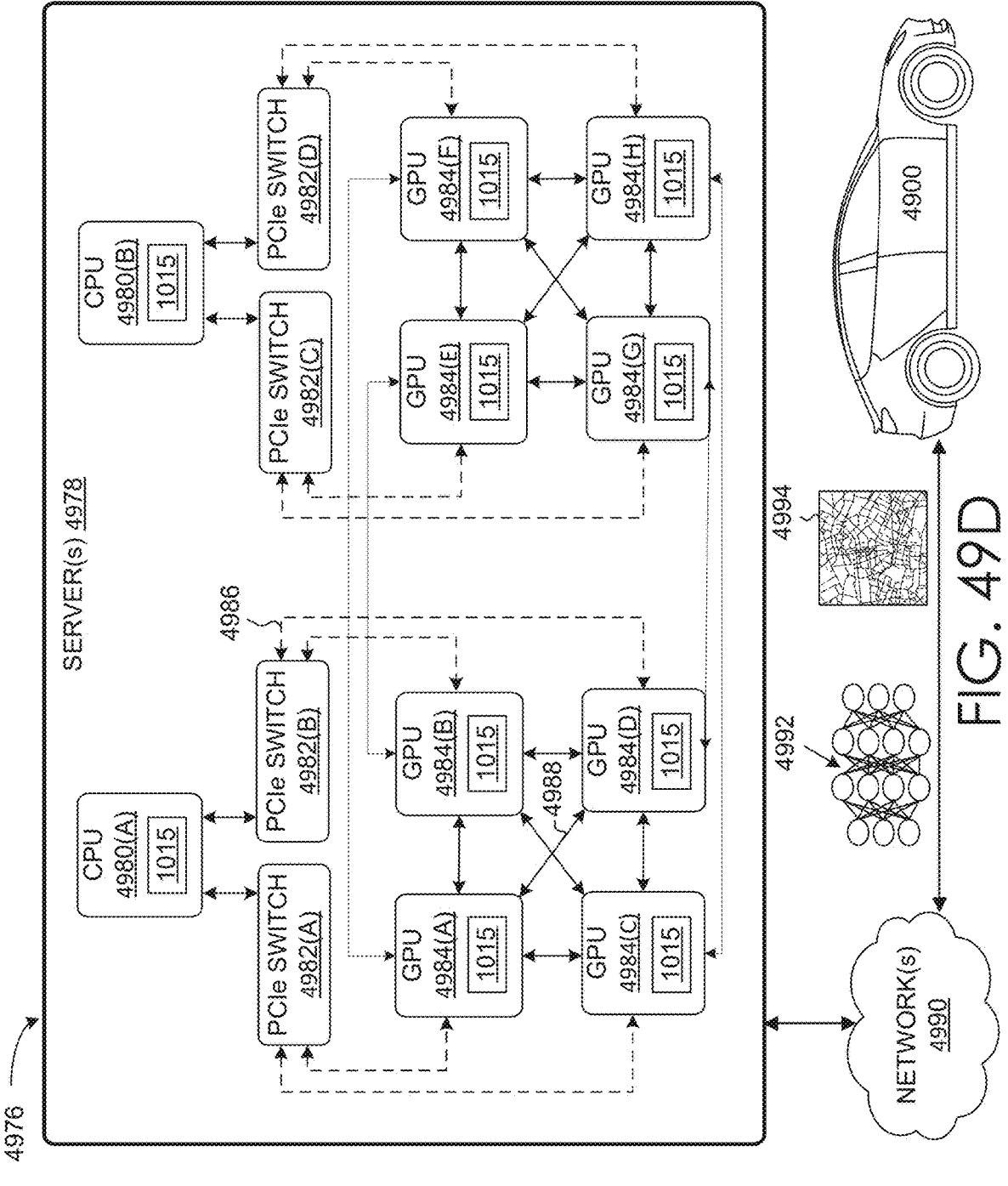
FIG. 49D illustrates a system for communication between cloud-based server(s) and the autonomous vehicle of FIG. 49A, according to at least one embodiment.

FIG. 49D is a diagram of a system 4976 for communication between cloud-based server(s) and autonomous vehicle 4900 of FIG. 49A, according to at least one embodiment. In at least one embodiment, system 4976 may include, without limitation, server(s) 4978, network(s) 4990, and any number and type of vehicles, including vehicle 4900. In at least one embodiment, server(s) 4978 may include, without limitation, a plurality of GPUs 4984(A)-4984(H) (collectively referred to herein as GPUs 4984), PCIe switches 4982(A)-4982(D) (collectively referred to herein as PCIe switches 4982), and/or CPUs 4980(A)-4980(B) (collectively referred to herein as CPUs 4980). GPUs 4984, CPUs 4980, and PCIe switches 4982 may be interconnected with high-speed interconnects such as, for example and without limitation, NVLink interfaces 4988 developed by NVIDIA and/ or PCIe connections 4986. In at least one embodiment, GPUs 4984 are connected via an NVLink and/or NVSwitch SoC and GPUs 4984 and PCIe switches 4982 are connected via PCIe interconnects. In at least one embodiment, although eight GPUs 4984, two CPUs 4980, and four PCIe switches 4982 are illustrated, this is not intended to be limiting. In at least one embodiment, each of server(s) 4978 may include, without limitation, any number of GPUs 4984, CPUs 4980, and/or PCIe switches 4982, in any combination. For example, in at least one embodiment, server(s) 4978 could each include eight, sixteen, thirty-two, and/or more GPUs 4984.

In at least one embodiment, server(s) 4978 may receive, over network(s) 4990 and from vehicles, image data representative of images showing unexpected or changed road conditions, such as recently commenced road-work. In at least one embodiment, server(s) 4978 may transmit, over network(s) 4990 and to vehicles, neural networks 4992, updated neural networks 4992, and/or map information 4994, including, without limitation, information regarding traffic and road conditions. In at least one embodiment, updates to map information 4994 may include, without limitation, updates for HD map 4922, such as information regarding construction sites, potholes, detours, flooding, and/or other obstructions. In at least one embodiment, neural networks 4992, updated neural networks 4992, and/or map information 4994 may have resulted from new training and/or experiences represented in data received from any number of vehicles in environment, and/or based at least in part on training performed at a data center (e.g., using server(s) 4978 and/or other servers).

In at least one embodiment, server(s) 4978 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 4990, and/or machine learning models may be used by server(s) 4978 to remotely monitor vehicles.

In at least one embodiment, server(s) 4978 may receive data from vehicles and apply data to up-to-date real-time neural networks for real-time intelligent inferencing. In at least one embodiment, server(s) 4978 may include deep-learning supercomputers and/or dedicated AI computers powered by GPU(s) 4984, such as a DGX and DGX Station machines developed by NVIDIA. However, in at least one embodiment, server(s) 4978 may include deep learning infrastructure that use CPU-powered data centers.

In at least one embodiment, deep-learning infrastructure of server(s) 4978 may be capable of fast, real-time inferencing, and may use that capability to evaluate and verify health of processors, software, and/or associated hardware in vehicle 4900. For example, in at least one embodiment, deep-learning infrastructure may receive periodic updates from vehicle 4900, such as a sequence of images and/or objects that vehicle 4900 has located in that sequence of images (e.g., via computer vision and/or other machine learning object classification techniques). In at least one embodiment, deep-learning infrastructure may run its own neural network to identify objects and compare them with objects identified by vehicle 4900 and, if results do not match and deep-learning infrastructure concludes that AI in vehicle 4900 is malfunctioning, then server(s) 4978 may transmit a signal to vehicle 4900 instructing a fail-safe computer of vehicle 4900 to assume control, notify passengers, and complete a safe parking maneuver.

In at least one embodiment, server(s) 4978 may include GPU(s) 4984 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, inference and/or training logic 1015 are used to perform one or more embodiments. Details regarding inference and/or training logic 1015 are provided below in conjunction with FIGS. 10A and/or 10B.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:
circuitry to use one or more neural networks to:
process one or more frames of a video to identify one or more events in one or more regions of the one or more frames;
generate, for one or more individual events of the one or more events, an importance value and a probability value of the one or more events occurring;
generate, for one or more individual regions of the one or more regions, one or more overall attention scores, at least in part, by combining the importance value and the probability value for the one or more events in the one or more regions; and
generate a saliency map using the one or more overall attention scores of the one or more regions to indicate one or more predicted gaze locations on the one or more frames by one or more users.

2. The one or more processors of claim 1, wherein the probability value of an event occurring is determined based, at least in part, on determining an occlusion by one or more second objects of one or more first objects in the one or more frames.

3. The one or more processors of claim 1, wherein events of a single event type are clustered for determining the importance value for those events.

4. The one or more processors of claim 1, wherein the one or more predicted gaze locations are determined using the one or more frames of the video, wherein pixels of the one or more frames are assigned to one or more cells of a grid, wherein the one or more overall attention scores for the one or more cells are determined using a sum of event probabilities for pixels of that cell multiplied by one or more importance values of that cell, and wherein the one or more overall attention scores are used to determine the one or more predicted gaze locations on the one or more frames.

5. The one or more processors of claim 1, wherein the one or more predicted gaze locations are determined with respect to one or more image features of a first frame, and wherein an occlusion is determined with respect to at least a second frame, wherein the second frame is prior to the first frame in the video.

6. A system comprising:
one or more processors to:
process one or more frames of a video to identify one or more events in one or more regions of the one or more frames;
generate, for one or more individual events of the one or more events, an importance value and a probability value of the one or more events occurring;
generate, for one or more individual regions of the one or more regions, one or more overall attention scores, at least in part, by combining the importance value and the probability value for the one or more events in the one or more regions; and
use one or more neural networks to generate a saliency map based, at least in part, on the one or more overall attention scores of the one or more regions, wherein the saliency map is to indicate one or more predicted gaze locations on the one or more frames by one or more users.

7. The system of claim 6, wherein the probability value of an event occurring is determined based at least in part on determining an occlusion by one or more second objects of one or more first objects in the one or more frames.

8. The system of claim 7, wherein:
the one or more predicted gaze locations of the one or more users are determined at least in part by combining the importance value indicates a likelihood of attracting a gaze;
the probability value for the one or more events indicates a likelihood of the one or more events occurring in the one or more regions;
the one or more frames includes a plurality of frames; and
the saliency map indicates an importance across the plurality of frames.

9. The system of claim 8, wherein at least a portion of the one or more events include a single event type that are clustered for determining the importance value for at least the portion of the one or more events.

10. The system of claim 8, wherein the one or more predicted gaze locations are determined using the one or more frames of the video, wherein pixels of the one or more frames are assigned to one or more cells of a grid, wherein the one or more overall attention scores for the one or more cells are determined using a sum of event probabilities for pixels of that cell multiplied by one or more importance values of that cell, and wherein the one or more overall attention scores are used to determine the one or more predicted gaze locations on the one or more frames.

11. The system of claim 6, wherein the one or more predicted gaze locations are determined with respect to one or more image features of a first frame, and wherein an occlusion is determined with respect to at least a second frame, wherein the second frame is prior to the first frame.

12. A method comprising:

using one or more neural networks to:

process one or more frames of a video to identify one or more events in one or more regions of the one or more frames;

generate, for one or more individual events of the one or more events, an importance value and a probability value of the one or more events occurring;

generate, for one or more individual regions of the one or more regions, one or more overall attention scores, at least in part, by combining the importance value and the probability value for the one or more events in the one or more regions; and generate a saliency map using the one or more overall attention scores of the one or more regions to indicate one or more predicted gaze locations on the one or more frames by one or more users.

13. The method of claim 12, wherein the probability value of an event occurring is determined based, at least in part, on determining an occlusion by one or more second objects of one or more first objects in the one or more frames.

14. The method of claim 13, wherein:

the one or more predicted gaze locations of the one or more users are determined at least in part by combining the importance value that indicates a likelihood of attracting a gaze and the probability value for the one or more events that indicates a likelihood of the one or more events occurring in the one or more regions.

15. The method of claim 14, wherein at least a portion of the one or more events include a single event type that are clustered for determining the importance value for at least the portion of the one or more events.

16. The method of claim 14, wherein the one or more predicted gaze locations are determined using the one or more frames of the video, wherein pixels of the one or more frames are assigned to one or more cells of a grid, wherein the one or more overall attention scores for the one or more cells are determined using a sum of event probabilities for pixels of that cell multiplied by one or more importance values of that cell, and wherein the one or more overall attention scores are used to determine the one or more predicted gaze locations on the one or more frames.

17. The method of claim 12, wherein the one or more predicted gaze locations are determined with respect to one or more image features of a first frame, and wherein an occlusion is determined with respect to at least a second frame, wherein the second frame is prior to the first frame in the video.

18. A non-transitory machine-readable medium having stored thereon a set of instructions, which if performed by one or more processors, cause the one or more processors to at least:

use one or more neural networks to:

process one or more frames of a video to identify one or more events in one or more regions of the one or more frames;

generate, for one or more individual events of the one or more events, an importance value and a probability value of the one or more events occurring;

generate, for one or more individual regions of the one or more regions, one or more overall attention scores, at least in part, by combining the importance value and the probability value for the one or more events in the one or more regions; and generate a saliency map using the one or more overall attention scores of the one or more regions to indicate one or more predicted gaze locations on the one or more frames by one or more users.

19. The non-transitory machine-readable medium of claim 18, wherein the probability value of an event occurring is determined based at least in part on determining an occlusion by one or more second objects of one or more first objects in the one or more frames.

20. The non-transitory machine-readable medium of claim 19, wherein: the one or more predicted gaze locations of the one or more users are determined at least in part by combining the importance value indicates a likelihood of attracting a gaze; and the probability value for the one or more events indicates a likelihood of the one or more events occurring in the one or more regions.

21. The non-transitory machine-readable medium of claim 20, wherein at least a portion of the one or more events include a single event type that are clustered for determining the importance value for at least the portion of the one or more those events.

22. The non-transitory machine-readable medium of claim 20, wherein the one or more predicted gaze locations are determined using the one or more frames of the video, wherein pixels of the one or more frames are assigned to one or more cells of a grid, wherein the one or more overall attention scores for the one or more cells are determined using a sum of event probabilities for pixels of that cell multiplied by one or more importance values of that cell, and wherein the one or more overall attention scores are to determine the one or more predicted gaze locations on the one or more frames.

23. The non-transitory machine-readable medium of claim 18, wherein the one or more predicted gaze locations are determined with respect to one or more image features of a first frame, and wherein an occlusion is determined with respect to at least a second frame, wherein the second frame is prior to the first frame in the video.

24. A processor comprising:

circuitry to:

process one or more frames of a video to identify one or more events in one or more regions of the one or more frames;

generate, for one or more individual events of the one or more events, an importance value and a probability value of the one or more events occurring;

generate, for one or more individual regions of the one or more regions, one or more overall attention scores, at least in part, by combining the importance value and the probability value for the one or more events in the one or more regions; and train one or more neural networks to generate a saliency map using the one or more overall attention scores of the one or more regions to indicate one or more predicted gaze locations on the one or more frames by one or more users.

25. The processor of claim 24, wherein the probability value of an event occurring is determined based, at least in part, on determining an occlusion by one or more second objects of one or more first objects in the one or more frames.

26. The processor of claim 25, wherein:

the one or more predicted gaze locations of the one or more users are determined at least in part by combining the importance value indicates a likelihood of attracting a gaze; and the probability value for the one or more events indicates a likelihood of the one or more events occurring in the one or more regions.

27. The processor of claim 26, wherein at least a portion of the one or more events include a single event type that are clustered for determining the importance value for at least the portion of the one or more those events.

28. The processor of claim 26, wherein the one or more predicted gaze locations are determined using the one or more frames of the video, wherein pixels of the one or more frames are assigned to one or more cells of a grid, wherein the one or more overall attention scores for the one or more cells are determined using a sum of event probabilities for pixels of that cell multiplied by one or more importance values of that cell, and wherein the one or more overall attention scores are used to determine the one or more predicted gaze locations on the one or more frames.

29. The processor of claim 24, wherein the one or more predicted gaze locations are determined with respect to one or more image features of a first frame, and wherein an occlusion is determined with respect to at least a second frame, wherein the second frame is prior to the first frame in the video.

30. A system comprising:

one or more processors to:

process one or more frames of a video to identify one or more events in one or more regions of the one or more frames;

generate, for one or more individual events of the one or more events, an importance value and a probability value of the one or more events occurring;

generate, for one or more individual regions of the one or more regions, one or more overall attention scores, at least in part, by combining the importance value and the probability value for the one or more events in the one or more regions; and train one or more neural networks to generate a saliency map using the one or more overall attention scores of the one or more regions to indicate one or more predicted gaze locations on the one or more frames by one or more users.

31. The system of claim 30, wherein the probability value of an event occurring is determined based, at least in part, on determining an occlusion by one or more second objects of one or more first objects in the one or more frames.

32. The system of claim 31, wherein: the one or more predicted gaze locations of the one or more users are determined at least in part by combining the importance value that indicates a likelihood of attracting a gaze and the probability value for the one or more events that indicates a likelihood of the one or more events occurring in the one or more regions.

33. The system of claim 32, wherein at least a portion of the one or more events include a single event type that are clustered for determining the importance value for at least the portion of the one or more those events.

34. The system of claim 32, wherein the one or more predicted gaze locations are determined using the one or more frames of the video, wherein pixels of the one or more frames are assigned to one or more cells of a grid, wherein the one or more overall attention scores for the one or more cells are determined using a sum of event probabilities for pixels of that cell multiplied by one or more importance values of that cell, and wherein the one or more overall attention scores are used to determine the one or more predicted gaze locations on the one or more frames.

35. A method comprising:

training one or more neural networks to:

process one or more frames of a video to identify one or more events in one or more regions of the one or more frames;

generate, for one or more individual events of the one or more events, an importance value and a probability value of the one or more events occurring;

generate, for one or more individual regions of the one or more regions, one or more overall attention scores, at least in part, by combining the importance value and the probability value for the one or more events in the one or more regions; and generate a saliency map using the one or more overall attention scores of the one or more regions to indicate one or more predicted gaze locations on the one or more frames by one or more users.

36. The method of claim 35, wherein the probability value of an event occurring is determined based, at least in part, on determining an occlusion by one or more second objects of one or more first objects in the one or more frames.

37. The method of claim 36, wherein: the one or more predicted gaze locations of the one or more users are determined at least in part by combining the importance value that indicates a likelihood of attracting a gaze and the probability value for the one or more events that indicates a likelihood of the one or more events occurring in the one or more regions.

38. The method of claim 37, wherein at least a portion of the one or more events include a single event type that are clustered for determining the importance value for at least the portion of the one or more those events.

39. The method of claim 37, wherein the one or more predicted gaze locations are determined using the one or more frames of the video, wherein pixels of the one or more frames are assigned to one or more cells of a grid, wherein the one or more overall attention scores for the one or more cells are determined using a sum of event probabilities for pixels of that cell multiplied by one or more importance values of that cell, and wherein the one or more overall attention scores are used to determine the one or more predicted gaze locations on the one or more frames.

* * * * *